(12) United States Patent
Gränsmark et al.

(10) Patent No.: US 12,673,619 B2
(45) Date of Patent: Jul. 7, 2026

(54) LOAD CARRIER APPARATUSES AND SYSTEMS

(71) Applicant: Thule Sweden AB, Hillerstorp (SE)

(72) Inventors: Arvid Gränsmark, Jönköping (SE); Praveen Saladi, Jönköping (SE); Fredrik Ekvall, Jönköping (SE); Sachin Rawool, Hillerstorp (SE); Olof Claesson, Skillingaryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 19/404,831

(22) Filed: Dec. 1, 2025

(65) Prior Publication Data

US 2026/0084626 A1 Mar. 26, 2026

Related U.S. Application Data

(63) Continuation of application No. 18/509,083, filed on Nov. 14, 2023.

(60) Provisional application No. 63/383,588, filed on Nov. 14, 2022, provisional application No. 63/490,890, filed on Mar. 17, 2023, provisional application No. 63/507,806, filed on Jun. 13, 2023.

(51) Int. Cl.
B60R 9/10 (2006.01)
B62H 3/08 (2006.01)

(52) U.S. Cl.
CPC .................................... B60R 9/10 (2013.01); B62H 3/08 (2013.01)

(58) Field of Classification Search
CPC .................................... B60R 9/10; B62H 3/08
USPC ....................................................... 224/539
See application file for complete search history.

(56) References Cited

U.S. PATENT DOCUMENTS

| | | | |
|---|---|---|---|
| 3,515,323 A | 6/1970 | Gilbert | |
| 4,442,961 A | 4/1984 | Bott | |
| 5,579,972 A | 12/1996 | Despain | |
| 5,598,959 A | 2/1997 | Lorensen et al. | |
| 5,833,074 A | 11/1998 | Phillips | |
| 6,019,266 A | 2/2000 | Johnson | |
| 6,425,509 B1 | 7/2002 | Dean et al. | |

(Continued)

FOREIGN PATENT DOCUMENTS

| | | |
|---|---|---|
| CA | 2046386 A1 | 1/1993 |
| CN | 105882542 A | 8/2016 |

(Continued)

OTHER PUBLICATIONS

KAC C2 Hitch Mounted 2-Bike Platform Bike Rack, "https://www.amazon.com/KAC-Platform-Standard-Retention-Prohibited/dp/B07TB9RG6J," 8 Pages.

(Continued)

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A bicycle carrier includes a base, a bicycle tray, a wheel holder, and a wheel securement arm. The bicycle tray can couple to the base and be configured to support a bicycle. The wheel holder can couple to the bicycle tray and be configured to translate relative to the bicycle tray. The wheel securement arm can rotatably couple to the bicycle tray or the wheel holder and be configured to secure a bicycle wheel in the wheel holder.

21 Claims, 58 Drawing Sheets

(56) References Cited

U.S. PATENT DOCUMENTS

| | | | | |
|---|---|---|---|---|
| 6,439,397 B1* | 8/2002 | Reeves | B60R 9/10 | |
| | | | 224/924 | |
| 6,494,351 B1 | 12/2002 | Dean | | |
| 6,547,116 B2 | 4/2003 | Anderson et al. | | |
| 6,752,302 B2 | 6/2004 | Anton | | |
| 6,761,297 B1* | 7/2004 | Pedrini | B60R 9/10 | |
| | | | 224/570 | |
| 7,044,347 B1 | 5/2006 | Pedrini | | |
| 7,222,763 B2 | 5/2007 | Pedrini | | |
| 7,264,145 B2 | 9/2007 | Lloyd et al. | | |
| 7,481,344 B2* | 1/2009 | Naslund | B60R 9/10 | |
| | | | 224/319 | |
| 7,648,151 B2 | 1/2010 | Pedrini | | |
| 7,815,084 B2* | 10/2010 | Allen | B60R 9/06 | |
| | | | 224/924 | |
| 8,113,398 B2* | 2/2012 | Sautter | B60R 9/06 | |
| | | | 224/924 | |
| 8,496,148 B2 | 7/2013 | Farney | | |
| 8,640,888 B2* | 2/2014 | Liu | B60R 9/10 | |
| | | | 224/501 | |
| 8,763,870 B2 | 7/2014 | Davis | | |
| 9,254,790 B2* | 2/2016 | Dreger | B60R 9/10 | |
| 9,376,062 B2 | 6/2016 | Cha et al. | | |
| 9,649,986 B2* | 5/2017 | Pedrini | B60R 9/10 | |
| 9,815,416 B2 | 11/2017 | Cha et al. | | |
| 10,150,424 B1 | 12/2018 | Phillips | | |
| 10,183,627 B1* | 1/2019 | Liu | B60R 9/06 | |
| 10,384,618 B2 | 8/2019 | Williams | | |
| 10,384,620 B2 | 8/2019 | Prescott et al. | | |
| 10,577,040 B1* | 3/2020 | Goates | B62H 3/12 | |
| 10,618,473 B2 | 4/2020 | Olaison et al. | | |
| 10,668,866 B2 | 6/2020 | Kuschmeader et al. | | |
| 10,759,351 B2 | 9/2020 | Westcott | | |
| 10,787,130 B2 | 9/2020 | Olaison et al. | | |
| 10,967,805 B2 | 4/2021 | Wang | | |
| 11,554,724 B2 | 1/2023 | Owen et al. | | |
| 11,572,022 B2 | 2/2023 | Owen et al. | | |
| 2002/0125279 A1* | 9/2002 | Edgerly | B60R 9/10 | |
| | | | 224/310 | |
| 2003/0111502 A1 | 6/2003 | DuPlantis | | |
| 2007/0007316 A1 | 1/2007 | Witczak | | |
| 2007/0164065 A1* | 7/2007 | Davis | B60R 9/10 | |
| | | | 224/324 | |
| 2008/0073395 A1* | 3/2008 | Reeves | B60R 9/10 | |
| | | | 224/324 | |
| 2011/0011909 A1 | 1/2011 | Liu | | |
| 2011/0290836 A1* | 12/2011 | Shen | B60R 9/048 | |
| | | | 224/325 | |
| 2013/0062383 A1* | 3/2013 | Jeli | B60R 9/10 | |
| | | | 224/549 | |
| 2014/0124551 A1 | 5/2014 | Condon et al. | | |
| 2015/0197204 A1* | 7/2015 | Shen | B62H 3/04 | |
| | | | 224/315 | |
| 2016/0039354 A1* | 2/2016 | Settelmayer | B60R 9/10 | |
| | | | 224/324 | |
| 2016/0068111 A1* | 3/2016 | Walker | B60R 9/10 | |
| | | | 224/521 | |
| 2016/0243998 A1 | 8/2016 | Maguire | | |
| 2017/0349112 A1 | 12/2017 | Rodriguez | | |
| 2020/0070734 A1 | 3/2020 | Settelmayer | | |
| 2020/0156724 A1 | 5/2020 | Kuschmeader et al. | | |
| 2021/0147023 A1 | 5/2021 | Harrill et al. | | |
| 2022/0017020 A1 | 1/2022 | McFadden et al. | | |
| 2022/0073008 A1 | 3/2022 | Settelmayer | | |
| 2022/0314895 A1* | 10/2022 | Wärnelöv | B60R 9/10 | |
| 2023/0174179 A1* | 6/2023 | Huang | B62H 3/00 | |
| | | | 224/42.4 | |
| 2023/0331171 A1* | 10/2023 | Wronski | B60R 9/06 | |
| 2023/0356665 A1* | 11/2023 | Huang | B60R 9/06 | |

FOREIGN PATENT DOCUMENTS

| | | |
|---|---|---|
| CN | 206393587 U | 8/2017 |
| CN | 208881704 U | 5/2019 |
| CN | 213768420 U | 7/2021 |
| CN | 114347911 A | 4/2022 |
| DE | 4141472 A1 | 6/1993 |
| DE | 102005012110 A1 | 9/2006 |
| DE | 102011112926 A1 | 8/2012 |
| DE | 102015014269 B3 | 1/2017 |
| DE | 202018103886 U1 | 7/2018 |
| DE | 102018131669 A1 | 3/2020 |
| EP | 2345558 A1 | 7/2011 |
| EP | 2428403 A2 | 3/2012 |
| EP | 2363323 B1 | 8/2013 |
| EP | 2995505 B1 | 3/2018 |
| EP | 3375667 A1 | 9/2018 |
| EP | 3188932 B1 | 4/2019 |
| GB | 2511160 A | 8/2014 |
| GB | 2576581 A | 2/2020 |
| JP | 2012035788 A | 2/2012 |
| KR | 101154526 B1 | 6/2012 |
| KR | 200480551 Y1 | 6/2016 |
| TW | M452895 U | 5/2013 |
| TW | M464362 U | 11/2013 |
| TW | M574986 U | 3/2019 |
| WO | 2013049276 A1 | 4/2013 |
| WO | 2023092035 A1 | 5/2023 |

OTHER PUBLICATIONS

Malone Pilot HM2 Solo 1.25" & 2" Hitch-Mount 2-Bike Carrier, "https://maloneautoracks.com/Pilot-TM-HM2-Solo-Hitch-Mount-Platform-2-Bike-Carrier-1.25-and-2.html," 5 Pages.

Replacement Wheel Tray for Saris Freedom or Freedom SuperClamp Bike Racks—Tray B, "https://www.etrailer.com/Accessories-and-Parts/Saris/SA25641.html," 10 pages.

Rhino Rack Dual Trekker Platform Hitch Bike Carrier, "https://www.amazon.com/Rhino-Rack-Trekker-Mounted-Powdercoated/dp/B00K6DS1UC/ref=cm_cr_arp_d_pdt_img_top?ie=UTF8," 5 Pages.

Swagman 64686 Semi 2.0 Locking Hitch Mount Rack, "https://www.walmart.com/ip/Swagman-64686-Semi-2-0-Locking-Hitch-Mount-Rack/880373661," 3 pages.

Universal Wheel Holders, "https://saris.com/products/universal-wheel-tray," 3 Pages.

Wheel Holder 1 psc—Bike Carrier Rack New Holder Giro Titan 2,3,4 with t-bolts, "https://www.ebay.co.uk/itm/293815630459," 8 Pages.

* cited by examiner

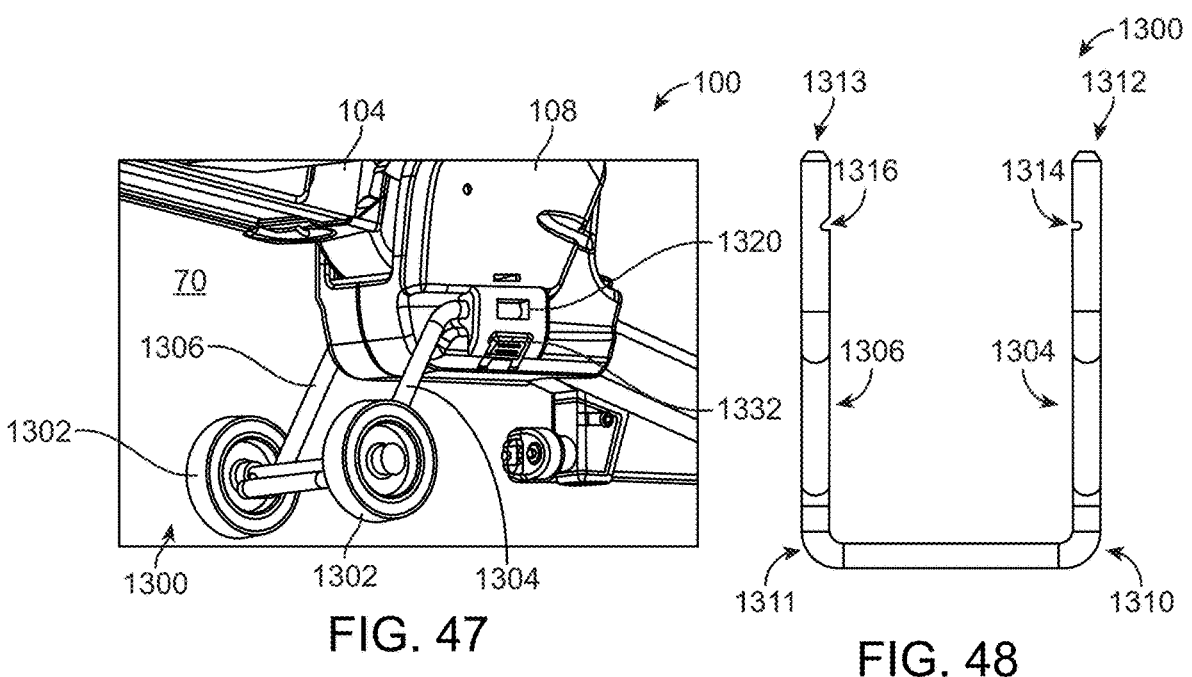
FIG. 47
FIG. 48
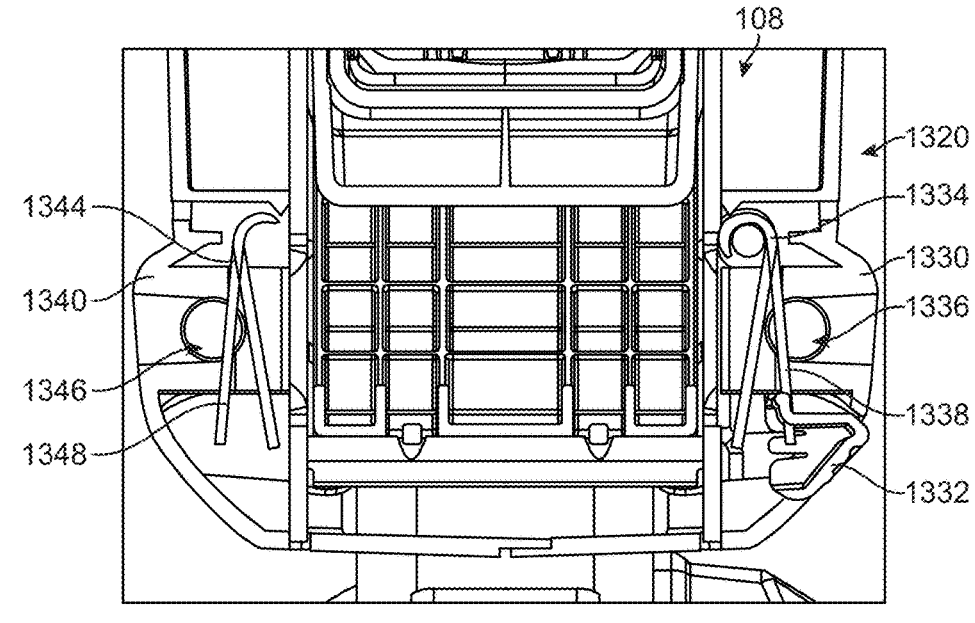
FIG. 49

LOAD CARRIER APPARATUSES AND SYSTEMS

CROSS REFERENCE TO RELATED APPLICATIONS

This application is a continuation of U.S. application Ser. No. 18/509,083, filed Nov. 14, 2023, which claims priority to U.S. Provisional Application No. 63/383,588, filed Nov. 14, 2022, U.S. Provisional Application No. 63/490,890, filed Mar. 17, 2023, and U.S. Provisional Application No. 63/507, 806, filed Jun. 13, 2023. Each of these applications is hereby incorporated herein in its entirety by reference.

BACKGROUND

Field

The present disclosure relates to load carriers. More specifically, embodiments of the present disclosure relate to vehicle mounted load carriers, for example, bicycle carriers, with a rotatable load arm.

BACKGROUND

Devices for carrying equipment on a vehicle can be used to transport the equipment from one place to another. In some examples, the load carrier can be secured to the vehicle safely and conveniently via a hitch, typically attached to the rear of the vehicle. Various mechanisms can be used to secure a load (e.g., a bicycle) to the load carrier, for example, straps and securement arms. However, these devices can be cumbersome, unstable, and difficult to use, or fail to securely fasten or balance the bicycle to the load carrier in a sufficient manner. Additionally, the load carrier can block vehicle information, for example, a vehicle identification and/or lights. Further, load carriers transporting multiple bicycles can rigidly position the bicycles relative to one another such that components of adjacent bicycles contact and cause damage during transport. As such, conventional load carriers require an adjustment for side stacking before loading multiple bicycles and then further require the bicycles to be loaded in the same order for future use.

BRIEF SUMMARY

Accordingly, there is a need to provide a load carrier with balanced and variable adjustment for securing loads, variable adjustment of load arm positions along the load carrier, adjustable tilt and vehicle information for storage and operational configurations, and adjustable side stacking of bicycles secured to the bicycle carrier.

In some embodiments, a bicycle carrier includes a base, a bicycle tray, a wheel holder, and a wheel securement arm. In some embodiments, the bicycle tray can couple to the base and be configured to support a bicycle. In some embodiments, the wheel holder can couple to the bicycle tray and be configured to translate relative to the bicycle tray. In some embodiments, the wheel securement arm rotatably can couple to the bicycle tray or the wheel holder and be configured to secure a bicycle wheel in the wheel holder.

In some embodiments, the wheel securement arm can be rotatably coupled to the bicycle tray. In some embodiments, the wheel holder translates in a longitudinal direction of the bicycle tray toward or away from an attachment location of the wheel securement arm. In some embodiments, the wheel holder can be configured to translate in a longitudinal direction of the bicycle tray. In some embodiments, the wheel securement arm can be rotatably coupled to the wheel holder and be configured to translate with the wheel holder in a longitudinal direction of the bicycle tray.

In some embodiments, the base can couple to a stinger configured to couple the bicycle carrier to a vehicle. In some embodiments, the base extends in a direction of travel in an in-use position, and the bicycle tray is perpendicular to the base. In some embodiments, the bicycle tray can be slideably coupled to the base and configured to translate perpendicular to the base.

In some embodiments, the wheel holder can include an extension arm and a wheel cradle coupled to the extension arm. In some embodiments, the extension arm can extend into an interior cavity of the bicycle tray and can be slideably coupled to the bicycle tray. In some embodiments, the bicycle tray includes a toothed strip. In some embodiments, the wheel holder includes an actuator configured to releasably couple with the toothed strip. In some embodiments, the actuator is moveable from a first position to a second position. In the first position, the actuator can engage the toothed strip to fixedly couple the wheel holder to the bicycle tray. In the second position, the actuator can disengage from the toothed strip such that the wheel holder is moveable relative to the bicycle tray.

In some embodiments, the bicycle carrier further includes a wheel support configured to secure a second bicycle wheel of the bicycle. In some embodiments, the wheel holder can be slideably coupled to a first load arm of the bicycle tray and the wheel support can be slideably coupled to a second load arm of the bicycle tray opposite the first end. In some embodiments, the wheel support includes a support body, a releasable fastener, and an engagement arm. In some embodiments, the releasable fastener can couple to the support body. In some embodiments, the engagement arm can couple with the releasable fastener and be configured to attach to the bicycle tray to lock the wheel support in position when the releasable fastener is operated. In some embodiments, the support body can include a disengagement arm configured to bias the engagement arm away from the bicycle tray when the releasable fastener is released.

In some embodiments, the wheel holder includes a first groove and a second groove formed in the first groove. In some embodiments, the first groove can be configured to accommodate a bicycle wheel of a first width. In some embodiments, the second groove can be configured to accommodate a bicycle wheel of a second width narrower than the first width.

In some embodiments, the wheel holder is configured to support a bicycle and includes a forward support, a rearward support, a recess formed between the first and second supports, a first sidewall, and a second sidewall. In some embodiments, the first sidewall can extend between the first and second supports. In some embodiments, the second sidewall can extend between the first and second supports opposite the first sidewall. In some embodiments, the bicycle is supported by the first support and the second support.

In some embodiments, a method of securing a bicycle to a bicycle carrier includes arranging a first wheel of the bicycle in a first wheel holder. In some embodiments, the method further includes translating the first wheel holder in a longitudinal direction of a bicycle tray of the bicycle carrier. In some embodiments, the method further includes rotating a first wheel securement arm to contact the first wheel to secure the first wheel in the first wheel holder.

In some embodiments, the method further includes arranging a second wheel of a second bicycle in a second wheel holder. In some embodiments, the method further includes translating the second wheel holder in a longitudinal direction of a second bicycle tray such that the bicycle and the second bicycle are spaced apart. In some embodiments, the second bicycle tray extends parallel to the bicycle tray. In some embodiments, the method further includes rotating a second wheel securement arm to contact the second wheel to secure the second wheel in the second wheel holder.

In some embodiments, the first wheel securement arm can include a housing rotatably coupled to the bicycle tray, and an extendable portion slideably coupled to the housing. In some embodiments, the housing can be configured to extend and retract in a longitudinal direction of the housing.

In some embodiments, the method can further include actuating an actuation member coupled to the first wheel holder to disengage the first wheel holder from a locked configuration before translating the first wheel holder. In some embodiments, translating the first wheel holder in the longitudinal direction of the bicycle tray occurs after arranging the first wheel of the bicycle in the first wheel holder.

In some embodiments, an extension strap system for a bicycle carrier can include an extension strap and a securement strap. In some embodiments, the extension strap can include a first end and a second end. In some embodiments, the second end can be configured to be secured to a releasable strap fastener. In some embodiments, the first end can be configured to couple to the securement strap that couples to the bicycle carrier to extend a length of the securement strap.

In some embodiments, the securement strap can couple to a wheel support. In some embodiments, the wheel support is coupled to the bicycle carrier and configured to translate relative to the bicycle carrier.

In some embodiments, the extension strap can further include a connector extending from the first end of the extension strap and configured to be disposed in an aperture formed in a tongue portion of the securement strap. In some embodiments, the connector can include a stem smaller than the aperture and a head larger than the aperture such that the head extends beyond a perimeter of the aperture when the extension strap is coupled to the securement strap. In some embodiments, the connector can be made of a deformable material. In some embodiments, the connector can be an asymmetrical shape.

In some embodiments, the extension strap can include a plurality of teeth configured to engage with the releasable strap fastener. In some embodiments, the securement strap can have a first length configured to accommodate a first bicycle wheel. In some embodiments, the extension strap can have a second length. In some embodiments, the extension strap and the securement strap can have an extension length when coupled together to accommodate a second bicycle wheel larger than the first bicycle wheel. In some embodiments, the first length can be different from the second length.

In some embodiments, a bicycle carrier can include a bicycle tray, a wheel securement arm, and an actuator. In some embodiments, the bicycle tray can be configured to support a bicycle. In some embodiments, the wheel securement arm can include a housing and an extendable portion. In some embodiments, the housing can be rotatably coupled to the bicycle tray. In some embodiments, the extendable portion can couple to the housing. In some embodiments, the actuator can couple to the extendable portion and be configured to disengage a locking mechanism such that the extendable portion translates relative to the housing.

In some embodiments, the locking mechanism can be configured to allow translation of the extendable portion into the housing and prevent translation of the extendable portion away from the housing. In some embodiments, the actuator can be configured to pull the locking mechanism to disengage the locking mechanism. In some embodiments, the extendable portion can be slideably disposed within the housing.

In some embodiments, the wheel securement arm can further include an actuator housing coupled to a distal end of the extendable portion and configured to contact a wheel of the bicycle. In some embodiments, the actuator can be disposed in an actuator recess formed in the actuator housing. In some embodiments, the actuator can be a lever pivotally coupled to the actuator housing. In some embodiments, the actuator recess can include an interior surface corresponding to an arc path of the lever.

In some embodiments, the locking mechanism can include a rocker and a ratchet member. In some embodiments, the rocker can couple to the actuator by a linkage. In some embodiments, the ratchet member can be configured to engage a toothed surface disposed in the housing. In some embodiments, the rocker can be configured to pivot and displace the ratchet member to disengage the ratchet member from the toothed surface when the actuator is operated. In some embodiments, the rocker and the ratchet member can be pivotally coupled to the extendable portion.

In some embodiments, a vehicle mounted load carrier can include a support arm and a vehicle information device. In some embodiments, the vehicle information device can couple to the support arm.

In some embodiments, the vehicle information device can be adjustable between a first position and a second position. In some embodiments, the vehicle information device can be a light. In some embodiments, the vehicle information device can be slideably coupled to the support arm. In some embodiments, a groove can be formed in the support arm. In some embodiments, the vehicle information device can include a coupling arm configured to extend into the groove of the support arm to couple the vehicle information device to the support arm.

In some embodiments, the vehicle information device can couple to a distal end of the support arm. In some embodiments, the vehicle information device can couple to a bottom surface of the support arm.

In some embodiments, a vehicle mounted load carrier can include a support arm, a carrier accessory, and a connector. In some embodiments, the carrier accessory can couple to the support arm. In some embodiments, the connector can extend through an attachment portion of the carrier accessory. In some embodiments, the connector can be configured to rotate from a first position where a distal end of the connector is spaced from the support arm, to a second position where the distal end contacts the support arm.

In some embodiments, the connector can include a lever or a knob. In some embodiments, the connector can include a protrusion extending from the distal end of the connector and configured to contact the support arm. In some embodiments, the protrusion can include TPE material.

In some embodiments, the connector can include a body, a head portion, a helical portion, and an engagement portion. In some embodiments, the head portion can be disposed at a proximal end of the body. In some embodiments, the head portion can include a handle extending away from the body and configured to be gripped by a user. In some embodiments, the helical portion can extend around and along the body between the proximal end and a distal end. In some embodiments, the helical portion can be configured to engage the attachment portion of the carrier accessory to translate the connector relative to the carrier accessory when the connector is rotated between the first and second positions. In some embodiments, the engagement portion can be disposed at the distal end of the body. In some embodiments, the engagement portion can include a protrusion extending away from the body and configured to contact the support arm.

In some embodiments, a vehicle mounted load carrier can include a support arm, a carrier accessory, and a protection arm. In some embodiments, the carrier accessory can couple to the support arm. In some embodiments, the protection arm can couple to the support arm and extend away from the carrier accessory by a first distance to prevent the carrier accessory from contacting the ground.

In some embodiments, the protection arm can be removably coupled to the support arm. In some embodiments, the protection arm can couple to a bottom surface of the support arm at a distal end of the support arm.

In some embodiments, the protection arm can include a first support and a second support spaced apart from the first support. In some embodiments, the first and second supports can include a first leg coupled with the support arm and extending away from the support arm and a second leg extending from a distal end of the first leg and coupling with the support arm. In some embodiments, the first leg can extend at a first angle relative to the support arm. In some embodiments, the second leg can extend at a second angle relative to the support arm different from the first angle. In some embodiments, the first support can be integrally formed with the second support.

In some embodiments, a vehicle mounted load carrier can include a support arm, a carrier accessory, and a cable management member. In some embodiments, the carrier accessory can couple to the support arm. In some embodiments, the cable management member can couple to the support arm. In some embodiments, the cable management member can include a groove formed along a length of the cable management member and configured to secure a cable to the support arm. In some embodiments, the cable can be configured to extend from the carrier accessory, along the support arm, and to the vehicle.

In some embodiments, the cable management member can include an extruded TPE material. In some embodiments, a plurality of grooves can be formed along the length of the cable management member.

In some embodiments, a vehicle mounted load carrier can be configured to rotate between a storage position and an in-use position and include a rotatable linkage and a vehicle information device. In some embodiments, the rotatable linkage can include a first end and a second end. In some embodiments, the vehicle information device can be rotatably coupled to the second end of the linkage.

In some embodiments, the load carrier can further include a support arm coupled to the vehicle. In some embodiments, the first end of the rotatable linkage can be rotatably coupled to a distal end of the support arm. In some embodiments, the support arm can include a handle coupled to the distal end of the support arm. In some embodiments, the first end of the rotatable linkage can be rotatably coupled to the handle. In some embodiments, the rotatable linkage can include a first linkage rotatably coupled to a first side of the handle and a second linkage coupled to a second side of the handle opposite the first side.

In some embodiments, the vehicle information device includes a first surface. In some embodiments, in a first position the first surface is disposed in a plane substantially parallel to the support arm. In some embodiments, in a second position the first surface is disposed in a plane substantially perpendicular to the support arm. In some embodiments, the vehicle information device is a license plate holder.

In some embodiments, a vehicle mounted load carrier can include a base and a first load arm. In some embodiments, the first load arm can be configured to couple to the base. In some embodiments, the first load arm can include a first assembly plate and a first protrusion extending from the first assembly plate. In some embodiments, the first protrusion can be configured to extend through a first aperture in a first side of the base.

In some embodiments, the load carrier can further include a second load arm configured to couple to a second side of the base opposite the first side. In some embodiments, the second load arm can include a second assembly plate and a second protrusion extending from the second assembly plate. In some embodiments, the second protrusion can be configured to extend through a second aperture in the second side of the base.

In some embodiments, the first protrusion can be configured to extend through a plate aperture formed through the second assembly plate. In some embodiments, the first protrusion can be integrally formed with the first assembly plate. In some embodiments, the first protrusion can be a sleeve removably coupled to the first assembly plate.

In some embodiments, an assembly bolt can be configured to extend through a plate aperture in the second assembly plate and couple with the first protrusion to couple the first load arm, the second load arm, and the base together. In some embodiments, the first load arm is perpendicular to the base. In some embodiments, the first assembly plate can be integrally formed with the first load arm.

In some embodiments, a method of assembling a vehicle mounted load carrier can include inserting a first protrusion of a first load arm through a first aperture formed in a first side of a base. In some embodiments, the method can further include arranging a second load arm on a second side of the base opposite the first side. In some embodiments, the method can further include inserting an assembly bolt through a plate aperture formed in an assembly plate of the second load arm. In some embodiments, the method can further include coupling the first assembly bolt to the first protrusion to couple the first load arm, the second load arm, and the base together.

In some embodiments, the method can further include inserting a second protrusion of the second load arm through a second aperture formed in the second side of the base. In some embodiments, the method can further include inserting a second assembly bolt through a plate aperture in an assembly plate of the first load arm. In some embodiments, the method can further include coupling the second assembly bolt to the second protrusion.

In some embodiments, the method can further include coupling the first protrusion to a first assembly plate of the first load arm. In some embodiments, the first protrusion is a sleeve.

In some embodiments, a bicycle carrier can include a wheel securement arm and a bicycle work stand. In some embodiments, the wheel securement arm rotatably can couple to a bicycle tray or a wheel holder. In some embodiments, the bicycle work stand can couple to the wheel securement arm and be configured to support a bicycle.

In some embodiments, the wheel securement arm can be configured to be disposed in a locked configuration and an unlocked configuration. In some embodiments, in the locked configuration, the wheel securement arm can be fixed relative to the bicycle tray. In some embodiments, in the unlocked configuration, the wheel securement arm can be permitted to rotate relative to the bicycle tray.

In some embodiments, the bicycle work stand can be rotatably coupled to the wheel securement arm and moveable between a stowed position and an in-use position. In some embodiments, the bicycle work stand can extend away from the wheel securement arm at an in-use angle such that a bicycle disposed on the work stand is disposed distally from the bicycle carrier.

In some embodiments, the bicycle work stand can include a support arm, a first support, and a second support. In some embodiments, the support arm can be pivotally coupled to the wheel securement arm. In some embodiments, the first support can couple to a distal end of the support arm. In some embodiments, the second support can couple to the support arm below the first support. In some embodiments, the first support and the second support can be configured to contact the bicycle to support the bicycle.

In some embodiments, a groove can be formed in the first support to accommodate a seat component of the bicycle. In some embodiments, the second support can be configured to contact a seat post or a frame of the bicycle.

In some embodiments, a vehicle mounted load carrier can include a first carrier portion, a second carrier portion, and a coupling member. In some embodiments, the second carrier portion can be disposed in a first interior cavity formed in the first carrier portion. In some embodiments, the coupling member can be disposed in a second interior cavity formed in the second carrier portion. In some embodiments, the coupling member can include a first contact portion and a second contact portion extending through an aperture in the second carrier portion. In some embodiments, the first contact portion exerts a force against an inside surface of the second carrier portion. In some embodiments, the second contact portion exerts a force against an inside surface of the first carrier portion to couple the first carrier portion and the second carrier portion together.

In some embodiments, the inside surface of the second carrier portion can be a sidewall. In some embodiments, the inside surface of the first carrier portion can be a corner of the first interior cavity.

In some embodiments, the load carrier can further include a second coupling member disposed in the second interior cavity. In some embodiments, the second coupling member can include a first contact portion and a second contact portion extending through a second aperture in the second carrier portion. In some embodiments, the second contact portion can be configured to exert a force against the inside surface of the second carrier portion and an inside surface of the first carrier portion to couple the first and second carrier portions together.

In some embodiments, the first contact portion of the coupling member can include a curved portion, and the second contact portion includes a tongue portion. In some embodiments, a first contact point of the first contact portion and a second contact point of the second contact portion can be disposed diagonally across the second interior cavity.

In some embodiments, a vehicle mounted load carrier can include a base and a lock. In some embodiments, the lock can be disposed at a distal end of the base and configured to secure a cable to the base.

In some embodiments, the load carrier can further include a handle disposed at the distal end of the base and configured to move the base from a first position to a second position, and the lock is disposed in the handle. In some embodiments, when the lock is disposed in a locked position, the lock can prevent the handle from moving the base between the first position to the second position.

In some embodiments, the lock includes a lock barrel, a lock protrusion, and a spring. In some embodiments, the lock protrusion can couple to the lock barrel. In some embodiments, the spring can be configured to bias the lock protrusion into a locked position. In some embodiments, a locking notch is formed in an end of the cable. In some embodiments, the lock protrusion can engage the locking notch to secure the cable to the base when the lock is disposed in a locked position.

In some embodiments, a vehicle mounted load carrier can include a base, a stinger, and a wheel assembly. In some embodiments, the base can be configured to carry a load. In some embodiments, the stinger can couple to the base by a hub and be configured to mount the base to a vehicle. In some embodiments, the wheel assembly can be removably coupled to the hub.

In some embodiments, the wheel assembly can include a support arm, and a wheel. In some embodiments, the wheel can be rotatably coupled to a first end of the support arm. In some embodiments, a coupling notch can be formed in a second end of the support arm and configured to engage a coupling member in the hub.

In some embodiments, the hub can include a coupling module and an aperture formed through the coupling module to receive the support arm. In some embodiments, the coupling module can include the coupling member and a release button. In some embodiments, the release button can be configured to move the coupling member between a first position where the coupling member engages the coupling notch of the support arm and a second position where the coupling member disengages the coupling notch.

In some embodiments, the coupling member can be a spring pin configured to bias into engagement with the coupling notch when the support arm is disposed in the aperture in the coupling module. In some embodiments, the wheel assembly can further include a second support arm and an angled notch formed in the second support arm such that the second support arm is releasably coupled to a second coupling member in the hub.

In some embodiments, a bicycle carrier can include a bicycle tray, and a wheel support. In some embodiments, the bicycle tray can be configured to support a bicycle. In some embodiments, the wheel support can couple to the bicycle tray and be configured to translate relative to the bicycle tray. In some embodiments, the wheel support can include a support body, a releasable fastener, and an engagement arm. In some embodiments, the releasable fastener can couple to the support body. In some embodiments, the engagement arm can couple with the releasable fastener and be configured to be attached to the bicycle tray to lock the wheel support in position when the releasable fastener is operated. In some embodiments, the support body can include a friction arm configured to contact the bicycle tray to limit movement of the wheel support relative to the bicycle tray when the releasable fastener is released.

In some embodiments, the bicycle carrier can further include a securement strap coupled to the wheel support. In some embodiments, the securement strap can be configured to be releasably coupled to the releasable fastener to secure a wheel of the bicycle to the wheel holder in a loaded configuration. In some embodiments, the securement strap can be configured to be slideably disposed in a strap recess formed in the support body in an unloaded configuration.

In some embodiments, a bicycle work stand system can be configured to support a bicycle and include a clamp, a support arm, and a first support. In some embodiments, the clamp can be configured to be releasably coupled to at least one of a vehicle load carrier and a wall mount. In some embodiments, the support arm can have a proximal end rotatably coupled to the clamp. In some embodiments, the first support can be coupled to a distal end of the support arm and configured to receive a component of the bicycle. In some embodiments, the support arm can be configured to move between a stowed position and an in-use position where the support arm is configured to support the bicycle.

In some embodiments, the clamp can include a first clamp portion configured to receive a wheel securement arm of the load carrier, a clamp protrusion of the wall mount, or both. In some embodiments, the bicycle work stand system can further include a bracket configured to couple to the first clamp portion when the bicycle work stand is releasably coupled to the wheel securement arm.

In some embodiments, the wall mount can include a wall bracket, an arm, and a mounting head. In some embodiments, the wall bracket can be configured to couple to a wall. In some embodiments, the arm can extend away from the wall bracket. In some embodiments, the mounting head can couple to a distal end of the arm and be configured to releasably couple with the first clamp portion of the clamp of the bicycle work stand. In some embodiments, the arm can include a plurality of ribs to form a plurality of cells in the arm to increase stiffness and reduce weight of the wall mount.

In some embodiments, a load carrier can include a vehicle attachment portion, a base, a locking mechanism, a connector, and a handle assembly. In some embodiments, the base can be rotatably coupled to the vehicle attachment portion and configured to carry a load. In some embodiments, the locking mechanism can be configured to secure the base relative to the vehicle attachment portion in at least one of a first position and a second position. In some embodiments, the connector can extend in a lengthwise direction of the base and be coupled between the locking mechanism and the handle assembly. In some embodiments, the handle assembly can be configured to release the locking mechanism so that the base can rotate with respect to the vehicle attachment portion between the first position and the second position. In some embodiments, the handle assembly can include a handle, an actuator, and a rotating arm. In some embodiments, the rotating arm can be configured to translate the connector toward the handle and release the locking mechanism.

In some embodiments, the rotating arm can be rotatably coupled to the actuator at a first end and rotatably coupled to the handle at a second end. In some embodiments, the actuator linearly translates towards the handle. In some embodiments, the actuator can be coupled to the rotating arm and configured to translate a first distance to release the locking mechanism. In some embodiments, the locking mechanism can translate a second distance, less than the first distance, when the actuator is translated.

In some embodiments, the load carrier can further include a spring configured to bias the locking mechanism away from the handle with a first force. In some embodiments, the actuator can be translated with a second force, less than the first force, to rotate the rotating arm, translate the connector, and release the locking mechanism.

In some embodiments, a method of assembling a vehicle mounted load carrier includes arranging a first assembly plate of a first load arm against a first side of a base. In some embodiments, the method can further include arranging a first support bracket against the first assembly plate and over an upper surface of the base to support the first load arm relative to the base.

In some embodiments, the method can further include arranging a second assembly plate of a second load arm against a second side of the base opposite the first load arm. In some embodiments, the method can further include arranging a second support bracket against the second assembly plate and over the upper surface of the base to support the second load arm relative to the base.

In some embodiments, the method can further include inserting a first assembly member through the first assembly plate, the base, and the second assembly plate. In some embodiments, the method can further include securing the first assembly member with a first coupling member to couple the first load arm, the second load arm, and the base together.

In some embodiments, the step of arranging the first assembly plate can further include aligning a first plate aperture of the first assembly plate with a first base aperture of the base. In some embodiments, step of arranging the first assembly plate can further include aligning a first plate aperture of the first assembly plate with a first base aperture of the base. In some embodiments the step of arranging the second assembly plate can further include aligning a first plate aperture of the second assembly plate with a second base aperture of the base.

In some embodiments, the method can further include inserting a first assembly member through the first aperture of the first assembly plate, the first and second base apertures of the base, and the first aperture of the second assembly plate. In some embodiments, the method can further include, securing the first assembly member with a first coupling member to couple the first load arm, the second load arm, and the base together. In some embodiments, the method can further include removing the first support bracket and the second support bracket.

In some embodiments, a vehicle mounted load carrier can include a base, a first load arm, and a support bracket. In some embodiments, the base can include a first side and a second side opposite the first side. In some embodiments, the first load arm can be configured to couple to the first side of the base. In some embodiments, the support bracket can be configured to support the first load arm relative to the base. In some embodiments, the first support bracket can include a main body, a first leg configured to contact the first load arm, and a second leg configured to contact the second side of the base.

In some embodiments, the first leg can extend from a first end of the main body, and the second leg can extend from a second end of the main body opposite the first end. In some embodiments, the first leg can include a curved portion extending from the main body and a contact portion extending in a direction substantially parallel to the body portion. In some embodiments, the second leg can include a retaining portion extending substantially perpendicular to the body portion. In some embodiments, the first side of the base can include a first flange. In some embodiments, the first leg can extend around the first flange and can be configured to contact a first assembly plate of the first load arm.

In some embodiments, the vehicle mounted load carrier can further include a second load arm configured to couple to the second side of the base opposite the first load arm. In some embodiments, the second leg of the support bracket can be spaced from the second load arm.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

FIG. 47 illustrates a perspective view of wheel assembly coupled to a load carrier, according to an embodiment.

FIG. 48 illustrates a support arm of a wheel assembly, according to an embodiment.

FIG. 49 illustrates a cross-sectional view of a wheel assembly coupling module of a load carrier, according to an embodiment.

Figure 1:
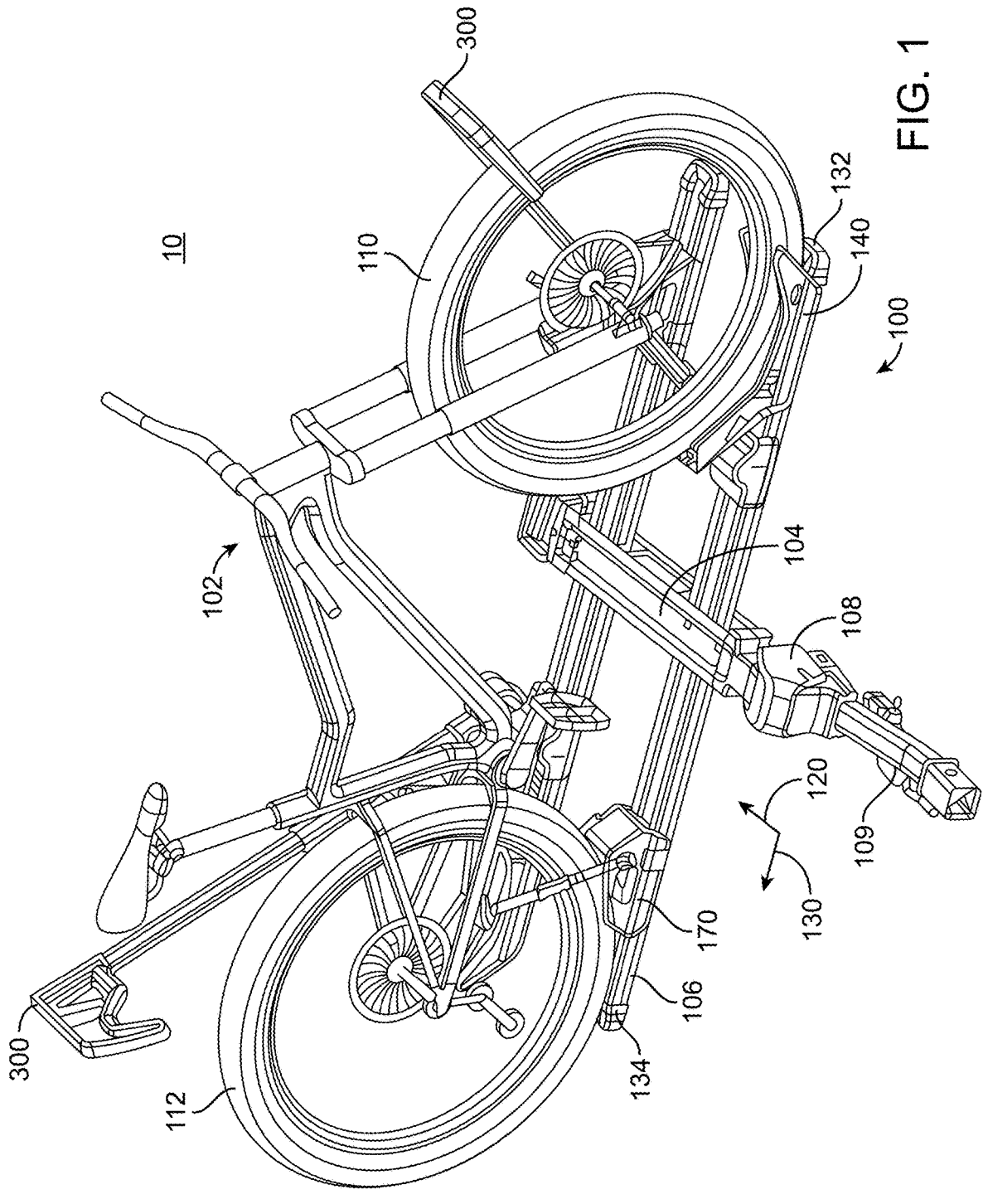
FIG. 1 illustrates a perspective view of a bicycle carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "about" or "substantially" as used herein indicates the value of a given quantity that can vary based on a particular technology. Based on the particular technology, the term "about" or "substantially" can indicate a value of a given quantity that varies within, for example, 1-15% of the value (e.g., ±1%, ±2%, ±5%, ±10%, or ±15% of the value).

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiment 1 of the description—A bicycle carrier includes a base; a bicycle tray coupled to the base and configured to support a bicycle; a wheel holder coupled to the bicycle tray and configured to translate relative to the bicycle tray; and a wheel securement arm rotatably coupled to the bicycle tray or the wheel holder and configured to secure a bicycle wheel in the wheel holder.

Embodiment 2 of the description—The bicycle carrier of embodiment 1, wherein the wheel securement arm is rotatably coupled to the bicycle tray, and the wheel holder translates in a longitudinal direction of the bicycle tray toward or away from an attachment location of the wheel securement arm.

Embodiment 3 of the description—The bicycle carrier of embodiment 1, wherein the wheel holder is configured to translate in a longitudinal direction of the bicycle tray.

Embodiment 4 of the description—The bicycle carrier of embodiment 1, wherein the wheel securement arm is rotatably coupled to the wheel holder and configured to translate with the wheel holder in a longitudinal direction of the bicycle tray.

Embodiment 5 of the description—The bicycle carrier of embodiment 1, wherein the base is coupled to a stinger configured to couple the bicycle carrier to a vehicle, wherein the base extends in a direction of travel in an in-use position, and wherein the bicycle tray is perpendicular to the base.

Embodiment 6 of the description—The bicycle carrier of embodiment 1, wherein the bicycle tray is slideably coupled to the base and configured to translate perpendicular to the base.

Embodiment 7 of the description—The bicycle carrier of embodiment 1, wherein the wheel holder includes an extension arm and a wheel cradle coupled to the extension arm, wherein the extension arm extends into an interior cavity of the bicycle tray and is slideably coupled to the bicycle tray.

Embodiment 8 of the description—The bicycle carrier of embodiment 1, wherein the bicycle tray includes a toothed strip, and wherein the wheel holder includes an actuator configured to releasably couple with the toothed strip.

Embodiment 9 of the description—The bicycle carrier of embodiment 8, wherein the actuator is moveable from a first position where the actuator engages the toothed strip to fixedly couple the wheel holder to the bicycle tray, to a second position where the actuator disengages from the toothed strip such that the wheel holder is moveable relative to the bicycle tray.

Embodiment 10 of the description—The bicycle carrier of embodiment 1, further including a wheel support configured to secure a second bicycle wheel of the bicycle, wherein the wheel holder is slideably coupled to a first load arm of the bicycle tray and the wheel support is slideably coupled to a second load arm of the bicycle tray opposite the first end.

Embodiment 11 of the description—The bicycle carrier of embodiment 10, wherein the wheel support includes a support body, a releasable fastener coupled to the support body, and an engagement arm coupled with the releasable fastener and configured to be attached to the bicycle tray to lock the wheel support in position when the releasable fastener is operated, wherein the support body includes a disengagement arm configured to bias the engagement arm away from the bicycle tray when the releasable fastener is released.

Embodiment 12 of the description—The bicycle carrier of embodiment 1, wherein the wheel holder includes a first groove and a second groove formed in the first groove, and wherein the first groove is configured to accommodate a bicycle wheel of a first width and the second groove is configured to accommodate a bicycle wheel of a second width narrower than the first width.

Embodiment 13 of the description—The bicycle carrier of embodiment 1, wherein the wheel holder is configured to support a bicycle and includes a forward support, a rearward support, a recess formed between the first and second supports, a first sidewall extending between the first and second supports, and a second sidewall extending between the first and second supports opposite the first sidewall, and wherein the bicycle is supported by the first support and the second support.

Embodiment 14 of the description—A method of securing a bicycle to a bicycle carrier, including arranging a first wheel of the bicycle in a first wheel holder; translating the first wheel holder in a longitudinal direction of a bicycle tray of the bicycle carrier; and rotating a first wheel securement arm to contact the first wheel to secure the first wheel in the first wheel holder.

Embodiment 15 of the description—The method of embodiment 14, further including arranging a second wheel of a second bicycle in a second wheel holder; translating the second wheel holder in a longitudinal direction of a second bicycle tray such that the bicycle and the second bicycle are spaced apart, wherein the second bicycle tray extends parallel to the bicycle tray; and rotating a second wheel securement arm to contact the second wheel to secure the second wheel in the second wheel holder.

Embodiment 16 of the description—The method of embodiment 14, wherein the first wheel securement arm includes a housing rotatably coupled to the bicycle tray, and an extendable portion slideably coupled to the housing, and configured to extend and retract in a longitudinal direction of the housing.

Embodiment 17 of the description—The method of embodiment 14, further including actuating an actuation member coupled to the first wheel holder to disengage the first wheel holder from a locked configuration before translating the first wheel holder.

Embodiment 18 of the description—The method of embodiment 14, wherein translating the first wheel holder in the longitudinal direction of the bicycle tray occurs after arranging the first wheel of the bicycle in the first wheel holder.

Embodiment 19 of the description—An extension strap system for a bicycle carrier, including an extension strap including a first end; and a second end configured to be secured to a releasable strap fastener, wherein the first end is configured to couple to a securement strap that couples to the bicycle carrier to extend a length of the securement strap.

Embodiment 20 of the description—The extension strap system of embodiment 19, further including the securement strap, wherein the securement strap couples to a wheel support, and the wheel support is coupled to the bicycle carrier and configured to translate relative to the bicycle carrier.

Embodiment 21 of the description—The extension strap system of embodiment 19, wherein the extension strap further includes a connector extending from the first end of the extension strap and configured to be disposed in an aperture formed in a tongue portion of the securement strap.

Embodiment 22 of the description—The extension strap system of embodiment 21, wherein the connector includes a stem smaller than the aperture and a head larger than the aperture such that the head extends beyond a perimeter of the aperture when the extension strap is coupled to the securement strap.

Embodiment 23 of the description—The extension strap system of embodiment 21, wherein the connector is made of a deformable material.

Embodiment 24 of the description—The extension strap system of embodiment 21, wherein the connector is an asymmetrical shape.

Embodiment 25 of the description—The extension strap system of embodiment 19, wherein the extension strap includes a plurality of teeth configured to engage with the releasable strap fastener.

Embodiment 26 of the description—The extension strap system of embodiment 19, wherein the securement strap has a first length configured to accommodate a first bicycle wheel, the extension strap has a second length, and the extension strap and the securement strap have an extension length when coupled together to accommodate a second bicycle wheel larger than the first bicycle wheel.

Embodiment 27 of the description—The extension strap system of embodiment 26, wherein the first length is different from the second length.

Embodiment 28 of the description—A bicycle carrier, including a bicycle tray configured to support a bicycle; a wheel securement arm including a housing rotatably coupled to the bicycle tray, an extendable portion coupled to the housing; and an actuator coupled to the extendable portion and configured to disengage a locking mechanism such that the extendable portion translates relative to the housing.

Embodiment 29 of the description—The bicycle carrier of embodiment 28, wherein the locking mechanism is configured to allow translation of the extendable portion into the housing and prevent translation of the extendable portion away from the housing.

Embodiment 30 of the description—The bicycle carrier of embodiment 28, wherein the actuator is configured to pull the locking mechanism to disengage the locking mechanism.

Embodiment 31 of the description—The bicycle carrier of embodiment 28, wherein the extendable portion is slideably disposed within the housing.

Embodiment 32 of the description—The bicycle carrier of embodiment 28, wherein the wheel securement arm further includes an actuator housing coupled to a distal end of the extendable portion and configured to contact a wheel of the bicycle, and wherein the actuator is disposed in an actuator recess formed in the actuator housing.

Embodiment 33 of the description—The bicycle carrier of embodiment 32, wherein the actuator is a lever pivotally coupled to the actuator housing, and the actuator recess includes an interior surface corresponding to an arc path of the lever.

Embodiment 34 of the description—The bicycle carrier of embodiment 28, wherein the locking mechanism includes a rocker coupled to the actuator by a linkage; and a ratchet member configured to engage a toothed surface disposed in the housing, wherein the rocker is configured to pivot and displace the ratchet member to disengage the ratchet member from the toothed surface when the actuator is operated.

Embodiment 35 of the description—The bicycle carrier of embodiment 34, wherein the rocker and the ratchet member are pivotally coupled to the extendable portion.

Embodiment 36 of the description—A vehicle mounted load carrier including a support arm; and a vehicle information device coupled to the support arm.

Embodiment 37 of the description—The vehicle mounted load carrier of embodiment 36, wherein the vehicle information device is adjustable between a first position and a second position.

Embodiment 38 of the description—The vehicle mounted load carrier of embodiment 36, wherein the vehicle information device is a light.

Embodiment 39 of the description—The vehicle mounted load carrier of embodiment 36, wherein the vehicle information device is slideably coupled to the support arm.

Embodiment 40 of the description—The vehicle mounted load carrier of embodiment 39, wherein a groove is formed in the support arm, and the vehicle information device includes a coupling arm configured to extend into the groove of the support arm to couple the vehicle information device to the support arm.

Embodiment 41 of the description—The vehicle mounted load carrier of embodiment 36, wherein the vehicle information device is coupled to a distal end of the support arm.

Embodiment 42 of the description—The vehicle mounted load carrier of embodiment 36, wherein the vehicle information device couples to a bottom surface of the support arm.

Embodiment 43 of the description—A vehicle mounted load carrier including a support arm; a carrier accessory coupled to the support arm; and a connector extending through an attachment portion of the carrier accessory, the connector configured to rotate from a first position where a distal end of the connector is spaced from the support arm, to a second position where the distal end contacts the support arm.

Embodiment 44 of the description—The vehicle mounted load carrier of embodiment 43, wherein the connector includes a lever or a knob.

Embodiment 45 of the description—The vehicle mounted load carrier of embodiment 43, wherein the connector includes a protrusion extending from the distal end of the connector and configured to contact the support arm.

Embodiment 46 of the description—The vehicle mounted load carrier of embodiment 45, wherein the protrusion includes TPE material.

Embodiment 47 of the description—The vehicle mounted load carrier of embodiment 43, wherein the connector includes a body; a head portion disposed at a proximal end of the body, the head portion including a handle extending away from the body and configured to be gripped by a user; a helical portion extending around and along the body between the proximal end and a distal end and configured to engage the attachment portion of the carrier accessory to translate the connector relative to the carrier accessory when the connector is rotated between the first and second positions; and an engagement portion disposed at the distal end of the body, the engagement portion including a protrusion extending away from the body and configured to contact the support arm.

Embodiment 48 of the description—A vehicle mounted load carrier including a support arm; a carrier accessory coupled to the support arm; and a protection arm coupled to the support arm and extending away from the carrier accessory by a first distance to prevent the carrier accessory from contacting the ground.

Embodiment 49 of the description—The vehicle mounted load carrier of embodiment 48, wherein the protection arm is removably coupled to the support arm.

Embodiment 50 of the description—The vehicle mounted load carrier of embodiment 48, wherein the protection arm is coupled to a bottom surface of the support arm at a distal end of the support arm.

Embodiment 51 of the description—The vehicle mounted load carrier of embodiment 48, wherein the protection arm includes a first support and a second support spaced apart from the first support, the first and second supports including a first leg coupled with the support arm and extending away from the support arm and a second leg extending from a distal end of the first leg and coupling with the support arm, wherein the first leg extends at a first angle relative to the support arm, and the second leg extends at a second angle relative to the support arm different from the first angle.

Embodiment 52 of the description—The vehicle mounted load carrier of embodiment 51, wherein the first support is integrally formed with the second support.

Embodiment 53 of the description—A vehicle mounted load carrier includes a support arm; a carrier accessory coupled to the support arm; and a cable management member coupled to the support arm, wherein the cable management member includes a groove formed along a length of the cable management member and configured to secure a cable to the support arm, and wherein the cable is configured to extend from the carrier accessory, along the support arm, and to the vehicle.

Embodiment 54 of the description—The vehicle mounted load carrier of embodiment 53, wherein the cable management member includes an extruded TPE material.

Embodiment 55 of the description—The vehicle mounted load carrier of embodiment 53, wherein a plurality of grooves are formed along the length of the cable management member.

Embodiment 56 of the description—A vehicle mounted load carrier configured to rotate between a storage position and an in-use position, the load carrier including a rotatable linkage including a first end and a second end; and a vehicle information device rotatably coupled to the second end of the linkage.

Embodiment 57 of the description—The load carrier of embodiment 56, further including a support arm coupled to the vehicle, wherein the first end of the rotatable linkage is rotatably coupled to a distal end of the support arm.

Embodiment 58 of the description—The load carrier of embodiment 57, wherein the support arm includes a handle coupled to the distal end of the support arm, and the first end of the rotatable linkage is rotatably coupled to the handle.

Embodiment 59 of the description—The load carrier of embodiment 58, wherein the rotatable linkage includes a first linkage rotatably coupled to a first side of the handle and a second linkage coupled to a second side of the handle opposite the first side.

Embodiment 60 of the description—The load carrier of embodiment 57, wherein the vehicle information device includes a first surface, wherein in a first position the first surface is disposed in a plane substantially parallel to the support arm, and wherein in a second position the first surface is disposed in a plane substantially perpendicular to the support arm.

Embodiment 61 of the description—The load carrier of embodiment 56, wherein the vehicle information device is a license plate holder.

Embodiment 62 of the description—A vehicle mounted load carrier including a base; and a first load arm configured to couple to the base, the first load arm including a first assembly plate and a first protrusion extending from the first assembly plate, wherein the first protrusion is configured to extend through a first aperture in a first side of the base.

Embodiment 63 of the description—The vehicle mounted load carrier of embodiment 62, further including a second load arm configured to couple to a second side of the base opposite the first side, the second load arm including a second assembly plate and a second protrusion extending from the second assembly plate, wherein the second protrusion is configured to extend through a second aperture in the second side of the base.

Embodiment 64 of the description—The vehicle mounted load carrier of embodiment 63, wherein the first protrusion is configured to extend through a plate aperture formed through the second assembly plate.

Embodiment 65 of the description—The vehicle mounted load carrier of embodiment 62, wherein the first protrusion is integrally formed with the first assembly plate.

Embodiment 66 of the description—The vehicle mounted load carrier of embodiment 62, wherein the first protrusion is a sleeve removably coupled to the first assembly plate.

Embodiment 67 of the description—The vehicle mounted load carrier of embodiment 63, wherein an assembly bolt is configured to extend through a plate aperture in the second assembly plate and couple with the first protrusion to couple the first load arm, the second load arm, and the base together.

Embodiment 68 of the description—The vehicle mounted load carrier of embodiment 62, wherein the first load arm is perpendicular to the base.

Embodiment 69 of the description—The vehicle mounted load carrier of embodiment 62, wherein the first assembly plate is integrally formed with the first load arm.

Embodiment 70 of the description—A method of assembling a vehicle mounted load carrier, including inserting a first protrusion of a first load arm through a first aperture formed in a first side of a base; arranging a second load arm on a second side of the base opposite the first side; inserting an assembly bolt through a plate aperture formed in an assembly plate of the second load arm; and coupling the first assembly bolt to the first protrusion to couple the first load arm, the second load arm, and the base together.

Embodiment 71 of the description—The method of embodiment 70, further including inserting a second protrusion of the second load arm through a second aperture formed in the second side of the base; inserting a second assembly bolt through a plate aperture in an assembly plate of the first load arm; and coupling the second assembly bolt to the second protrusion.

Embodiment 72 of the description—The method of embodiment 70, further including coupling the first protrusion to a first assembly plate of the first load arm, wherein the first protrusion is a sleeve.

Embodiment 73 of the description—A bicycle carrier including a wheel securement arm rotatably coupled to a bicycle tray or a wheel holder; and a bicycle work stand coupled to the wheel securement arm and configured to support a bicycle.

Embodiment 74 of the description—The bicycle carrier of embodiment 73, wherein the wheel securement arm is configured to be disposed in a locked configuration and an unlocked configuration, wherein in the locked configuration the wheel securement arm is fixed relative to the bicycle tray, and in the unlocked configuration the wheel securement arm is permitted to rotate relative to the bicycle tray.

Embodiment 75 of the description—The bicycle carrier of embodiment 73, wherein the bicycle work stand is rotatably coupled to the wheel securement arm and moveable between a stowed position and an in-use position.

Embodiment 76 of the description—The bicycle carrier of embodiment 73, wherein the bicycle work stand extends away from the wheel securement arm at an in-use angle such that a bicycle disposed on the work stand is disposed distally from the bicycle carrier.

Embodiment 77 of the description—The bicycle carrier of embodiment 73, wherein the bicycle work stand includes a support arm pivotally coupled to the wheel securement arm, a first support coupled to a distal end of the support arm, and a second support coupled to the support arm below the first support, and wherein the first support and the second support are configured to contact the bicycle to support the bicycle.

Embodiment 78 of the description—The bicycle carrier of embodiment 77, wherein a groove is formed in the first support to accommodate a seat component of the bicycle.

Embodiment 79 of the description—The bicycle carrier of embodiment 77, wherein the second support is configured to contact a seat post or a frame of the bicycle.

Embodiment 80 of the description—A vehicle mounted load carrier including a first carrier portion; a second carrier portion disposed in a first interior cavity formed in the first carrier portion; and a coupling member disposed in a second interior cavity formed in the second carrier portion, the coupling member including a first contact portion and a second contact portion extending through an aperture in the second carrier portion, wherein the first contact portion exerts a force against an inside surface of the second carrier portion, and the second contact portion exerts a force against an inside surface of the first carrier portion to couple the first carrier portion and the second carrier portion together.

Embodiment 81 of the description—The vehicle mounted load carrier of embodiment 80, wherein the inside surface of the second carrier portion is a sidewall, and the inside surface of the first carrier portion is a corner of the first interior cavity.

Embodiment 82 of the description—The vehicle mounted load carrier of embodiment 80, further including a second coupling member disposed in the second interior cavity, the second coupling member including a first contact portion and a second contact portion extending through a second aperture in the second carrier portion, and configured to exert a force against the inside surface of the second carrier portion and an inside surface of the first carrier portion to couple the first and second carrier portions together.

Embodiment 83 of the description—The vehicle mounted load carrier of embodiment 80, wherein the first contact portion of the coupling member includes a curved portion, and the second contact portion includes a tongue portion.

Embodiment 84 of the description—The vehicle mounted load carrier of embodiment 80, wherein a first contact point of the first contact portion and a second contact point of the second contact portion are disposed diagonally across the second interior cavity.

Embodiment 85 of the description—A vehicle mounted load carrier including a base; and a lock disposed at a distal end of the base and configured to secure a cable to the base.

Embodiment 86 of the description—The vehicle mounted load carrier of embodiment 85, further including a handle disposed at the distal end of the base and configured to move the base from a first position to a second position, wherein the lock is disposed in the handle.

Embodiment 87 of the description—The vehicle mounted load carrier of embodiment 86, wherein when the lock is disposed in a locked position, the lock prevents the handle from moving the base between the first position to the second position.

Embodiment 88 of the description—The vehicle mounted load carrier of embodiment 85, wherein the lock includes a lock barrel, a lock protrusion coupled to the lock barrel, and a spring configured to bias the lock protrusion into a locked position, wherein a locking notch is formed in an end of the cable, and wherein the lock protrusion engages the locking notch to secure the cable to the base when the lock is disposed in a locked position.

Embodiment 89 of the description—A vehicle mounted load carrier including a base configured to carry a load; a stinger coupled to the base by a hub and configured to mount the base to a vehicle; and a wheel assembly removably coupled to the hub.

Embodiment 90 of the description—The vehicle mounted load carrier of embodiment 89, wherein the wheel assembly includes a support arm and a wheel rotatably coupled to a first end of the support arm, and a coupling notch is formed in a second end of the support arm and configured to engage a coupling member in the hub.

Embodiment 91 of the description—The vehicle mounted load carrier of embodiment 90, wherein the hub includes a coupling module and an aperture formed therethrough to receive the support arm, wherein the coupling module includes the coupling member and a release button configured to move the coupling member between a first position where the coupling member engages the coupling notch of the support arm and a second position where the coupling member disengages the coupling notch.

Embodiment 92 of the description—The vehicle mounted load carrier of embodiment 91, wherein the coupling member is a spring pin configured to bias into engagement with the coupling notch when the support arm is disposed in the aperture in the coupling module.

Embodiment 93 of the description—The vehicle mounted load carrier of embodiment 90, wherein the wheel assembly further includes a second support arm and an angled notch formed in the second support arm such that the second support arm is releasably coupled to a second coupling member in the hub.

Embodiment 94 of the description—A bicycle carrier including a bicycle tray configured to support a bicycle; and a wheel support coupled to the bicycle tray and configured to translate relative to the bicycle tray, the wheel support including a support body, a releasable fastener coupled to the support body, and an engagement arm coupled with the releasable fastener and configured to be attached to the bicycle tray to lock the wheel support in position when the releasable fastener is operated, wherein the support body includes a friction arm configured to contact the bicycle tray to limit movement of the wheel support relative to the bicycle tray when the releasable fastener is released.

Embodiment 95 of the description—The bicycle carrier of embodiment 94, further including a securement strap coupled to the wheel support and configured to be releasably coupled to the releasable fastener to secure a wheel of the bicycle to the wheel holder in a loaded configuration, and slideably disposed in a strap recess formed in the support body in an unloaded configuration.

Embodiment 96 of the description—A bicycle work stand system configured to support a bicycle, the bicycle work stand system including a clamp configured to be releasably coupled to at least one of a vehicle load carrier and a wall mount; a support arm having a proximal end rotatably coupled to the clamp; and a first support coupled to a distal end of the support arm and configured to receive a component of the bicycle, wherein the support arm is configured to move between a stowed position and an in-use position where the support arm is configured to support the bicycle.

Embodiment 97 of the description—The bicycle work stand system of embodiment 96, wherein the clamp includes a first clamp portion configured to receive a wheel securement arm of the load carrier, a clamp protrusion of the wall mount, or both.

Embodiment 98 of the description—The bicycle work stand system of embodiment 97, further including a bracket configured to couple to the first clamp portion when the bicycle work stand is releasably coupled to the wheel securement arm.

Embodiment 99 of the description—The bicycle work stand system of embodiment 97, wherein the system further includes the wall mount and wherein the wall mount includes a wall bracket configured to couple to a wall; an arm extending away from the wall bracket; and a mounting head coupled to a distal end of the arm and configured to releasably couple with the first clamp portion of the clamp of the bicycle work stand.

Embodiment 100 of the description—The bicycle work stand system of embodiment 99, wherein the arm includes a plurality of ribs to form a plurality of cells in the arm to increase stiffness and reduce weight of the wall mount.

Embodiment 101 of the description—A load carrier including a vehicle attachment portion; a base rotatably coupled to the vehicle attachment portion and configured to carry a load; a locking mechanism configured to secure the base relative to the vehicle attachment portion in at least one of a first position and a second position; a connector extending in a lengthwise direction of the base and coupled between the locking mechanism and a handle assembly; and the handle assembly configured to release the locking mechanism so that the base can rotate with respect to the vehicle attachment portion between the first position and the second position, wherein the handle assembly comprises a handle, an actuator, and a rotating arm configured to translate the connector toward the handle and release the locking mechanism.

Embodiment 102 of the description—The load carrier of embodiment 101, wherein the rotating arm is rotatably coupled to the actuator at a first end and rotatably coupled to the handle at a second end.

Embodiment 103 of the description—The load carrier of embodiment 103, wherein the actuator linearly translates towards the handle.

Embodiment 104 of the description—The load carrier of embodiment 101, wherein the actuator is coupled to the rotating arm and configured to translate a first distance to release the locking mechanism, and wherein the locking mechanism translates a second distance, less than the first distance, when the actuator is translated.

Embodiment 105 of the description—The load carrier of embodiment 101, further including a spring configured to bias the locking mechanism away from the handle with a first force, and wherein the actuator is translated with a second force, less than the first force, to rotate the rotating arm, translate the connector, and release the locking mechanism.

Embodiment 106 of the description—A method of assembling a vehicle mounted load carrier, including arranging a first assembly plate of a first load arm against a first side of a base; and arranging a first support bracket against the first assembly plate and over an upper surface of the base to support the first load arm relative to the base.

Embodiment 107 of the description—The method of embodiment 106, further including arranging a second assembly plate of a second load arm against a second side of the base opposite the first load arm; and arranging a second support bracket against the second assembly plate and over the upper surface of the base to support the second load arm relative to the base.

Embodiment 108 of the description—The method of embodiment 107, further including inserting a first assembly member through the first assembly plate, the base, and the second assembly plate; and securing the first assembly member with a first coupling member to couple the first load arm, the second load arm, and the base together.

Embodiment 109 of the description—The method of embodiment 106, wherein the step of arranging the first assembly plate further includes aligning a first plate aperture of the first assembly plate with a first base aperture of the base.

Embodiment 110 of the description—The method of embodiment 107, wherein the step of arranging the first assembly plate further includes aligning a first plate aperture of the first assembly plate with a first base aperture of the base, and wherein the step of arranging the second assembly plate further includes aligning a first plate aperture of the second assembly plate with a second base aperture of the base.

Embodiment 111 of the description—The method of embodiment 110, further including inserting a first assembly member through the first aperture of the first assembly plate, the first and second base apertures of the base, and the first aperture of the second assembly plate; and securing the first assembly member with a first coupling member to couple the first load arm, the second load arm, and the base together.

Embodiment 112 of the description—The method of embodiment 111, further including removing the first support bracket and the second support bracket.

Embodiment 113 of the description—A vehicle mounted load carrier includes a base including a first side and a second side opposite the first side; a first load arm configured to couple to the first side of the base; and a support bracket configured to support the first load arm relative to the base, wherein the first support bracket includes a main body, a first leg configured to contact the first load arm, and a second leg configured to contact the second side of the base.

Embodiment 114 of the description—The vehicle mounted load carrier of embodiment 113, wherein the first leg extends from a first end of the main body, and the second leg extends from a second end of the main body opposite the first end.

Embodiment 115 of the description—The vehicle mounted load carrier of embodiment 113, wherein the first leg includes a curved portion extending from the main body and a contact portion extending in a direction substantially parallel to the body portion, and wherein the second leg includes a retaining portion extending substantially perpendicular to the body portion.

Embodiment 116 of the description—The vehicle mounted load carrier of embodiment 115, wherein the first side of the base includes a first flange, and wherein the first leg extends around the first flange and is configured to contact a first assembly plate of the first load arm.

Embodiment 117 of the description—The vehicle mounted load carrier of embodiment 113, further including a second load arm configured to couple to the second side of the base opposite the first load arm, and wherein the second leg of the support bracket is spaced from the second load arm.

Embodiments of the load carrier system 100 disclosed herein can be used with, for example, but not limited to, a bicycle carrier(s) or a cargo container. More specifically, the load carrier system 100 can include a vehicle mounted bicycle carrier, for example, a hitch-mounted bicycle carrier that can be attached to hitch receiver of a vehicle. Load carrier system 100 can be configured to secure one, two, three, four, or more bicycles.

As discussed above, it is important to securely mount a bicycle onto a bicycle carrier to reduce motion forces imparted on the bicycle that can result in instability and damage. Therefore, it is important to have a bicycle carrier that is properly balanced and adjustable for different sizes of bicycles and wheels. It is also important for a user to be able to quickly and easily manipulate the bicycle carrier during loading, securement, and unloading of the bicycle(s). Where multiple bikes are loaded on the bicycle carrier, it is important for a user to be able to quickly and easily manipulate each bicycle to side stack the bicycles such that they do not contact one another. Where different style bikes (e.g., road bikes, fat tire bikes) are loaded on the bicycle carrier, it is important to have versatile straps that can be extended in length to accommodate large wheel and tires. Where a load carrier can have multiple accessories that can be coupled separately to the load carrier, it is important that the accessories can be easily assembled to the load carrier, moved to multiple positions to the load carrier, easily fixed into position without the use of tools, and that any wires or cables from said accessories can be concealed. Where a load carrier has accessories attached thereto, it is important that the load carrier also include bumpers to prevent the accessories from hitting the ground and being damaged. Where a load carrier includes a vehicle information device, such as a license plate holder, it is important that the vehicle information device can be moved to a desired orientation, such as rearward-facing, regardless of the position of the load carrier between in-use and stowed. Also, it is important that vehicle information can be displayed in both storage and operational positions.

Embodiments of load carrier apparatuses, systems, and methods as discussed below can provide balance and variable adjustment for securing loads, variable adjustment of wheel holder positions along the load carrier, adjustable wheel securement arms, and adjustable tilt and vehicle information options for storage and operational configurations.

Example Load Carrier System

FIGS. 1-11 illustrate a moveable wheel holder 140 coupled to load carrier system 100, according to embodiments. Load carrier system 100 can be configured to secure a load, for example, bicycle 102, such that a wheel 110 is secured in a wheel holder 140. The wheel holder 140 can be repositioned along bicycle tray 106. In some embodiments, the wheel holder 140 can be configured to translate along bicycle tray 106 of the load carrier system 100 such that the loaded bicycle 102 can be moved relative to bicycle tray 106 to prevent contact with an adjacent loaded bicycle or an external component of a vehicle. Although load carrier system 100 is shown in FIGS. 1-11 as a stand-alone system, the embodiments of this disclosure can be used with other apparatuses and/or systems, such as, but not limited to extension strap system 200, wheel securement arm 300, carrier accessory 450, connector 500, bumper accessory 600, cable management member 700, vehicle information device 800, assembly system 900, bicycle work stand 1000, coupling mechanism 1100 and 1600, locking mechanism 1200, wheel assembly 1300, wall mount 1400, and tilt-release actuation mechanism 1500.

Load carrier system 100 can include a base 104, a bicycle tray 106, a hub 108, a stinger 109, a wheel holder 140, a wheel support 170, and/or a wheel securement arm 300, as shown, for example, in FIG. 1. Stinger 109 can insert into a hitch of a vehicle to couple the load carrier system 100 to the vehicle. Hub 108 couples between stinger 109 and base 104 and can include a tilt mechanism to pivot base 104 relative to the vehicle and stinger 109. Bicycle tray 106 can couple to base 104 and extend, for example, in a perpendicular direction away from base 104. In some embodiments, base 104 can pivot between a storage/upright position 15 and an in-use position 10. In the in-use position 10, base 104 extends in the direction of travel of the vehicle along longitudinal axis 120, and is approximately parallel with the ground. In the in-use position 10, load carrier system 100 can secure one or more loads (e.g., bicycle(s) 102) to one or more bicycle trays 106 coupled with base 104. In the illustrative embodiment shown in FIG. 1, load carrier system 100 includes two bicycle trays 106 to secure up to two bicycles 102. In some embodiments, load carrier system can include up to four bicycle trays 106 to secure up to four bicycles 102.

Bicycle tray 106 can be configured to secure a load (e.g., wheels 110, 112 of bicycle 102) and couple to base 104 as shown, for example, in FIGS. 1 and 9-12. Bicycle tray 106 extends in a perpendicular direction to base 104 along a lateral axis 130 and extends to both sides of base 104. Wheel holder 140, wheel support 170, and wheel securement arm 300 can be coupled to bicycle tray along the longitudinal length of bicycle tray 106. Bicycle tray 106 can extend between first end 132 and second end 134, and include toothed strip 136, upper surface 180, lower surface 182, and side surfaces 184. In some embodiments, grooves 138 can be formed in the side surfaces 184 of bicycle tray 106 and configured to receive coupling elements of wheel holder 140, wheel support 170, and other carrier accessories that will be described in more detail below.

First end 132 can be disposed on one side of base 104, and a second end 134 disposed on the opposite side of base 104. In the illustrative embodiment shown in FIGS. 1-3 and 9-11, wheel holder 140 and wheel securement arm 300 are coupled to bicycle tray 106 between first end 132 and base 104 and configured to secure a wheel 110 of bicycle 102 to the bicycle tray 106. In the illustrative embodiment shown in FIGS. 1, 2, and 9-12, wheel support 170 is coupled between second end 134 and base 104 and configured to secure a wheel 112 of bicycle 102 to bicycle tray 106.

In some embodiments, load carrier system 100 can include assembly system 900 such that bicycle tray 106 can include first and second load arms 906, 907 assembled to opposite sides of base 904, as will be described in more detail below and shown, for example, in FIGS. 29-31. In some embodiments, bicycle tray 106 can be a single component extending between first end 132 and second end 134.

Figure 2:
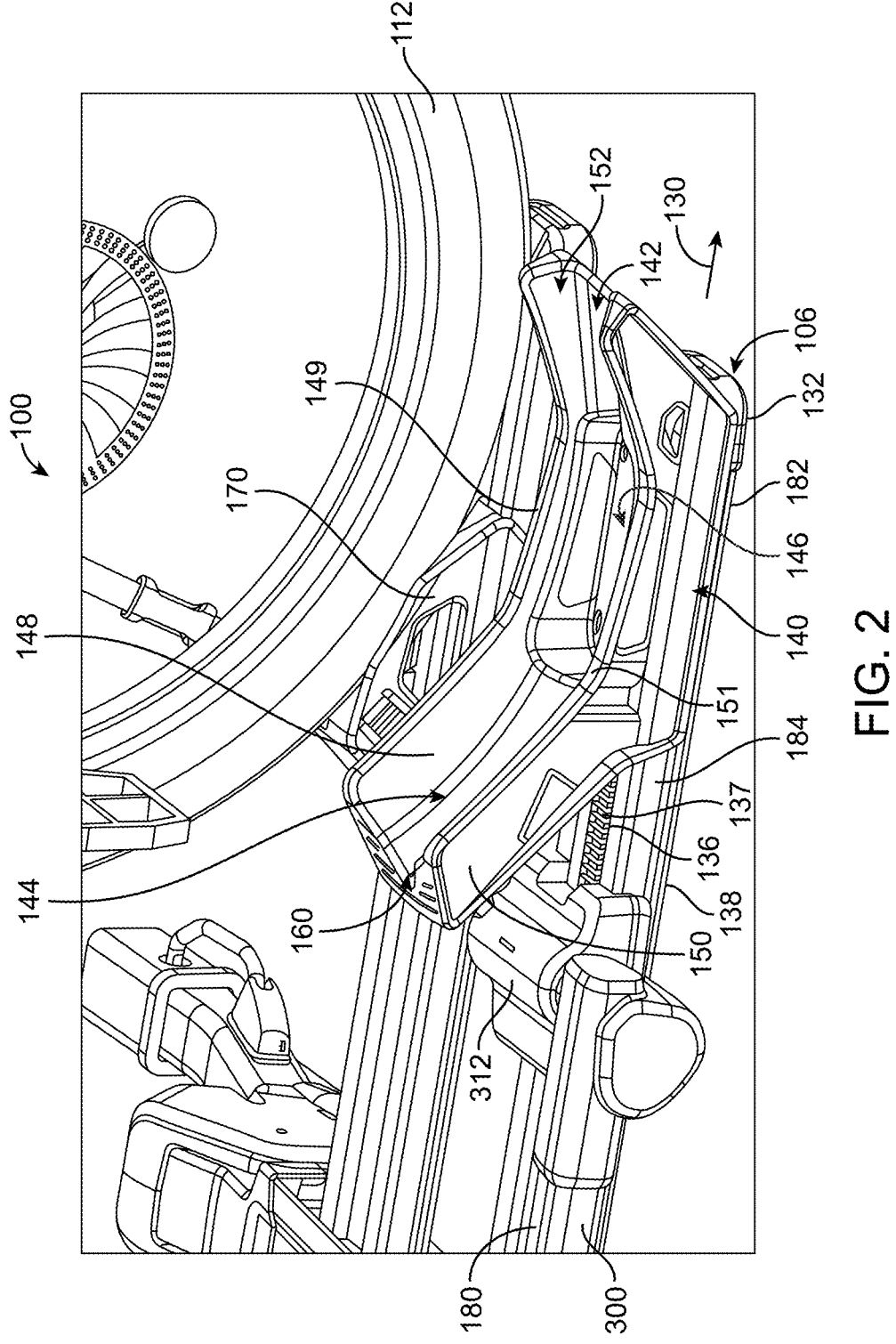
FIG. 2 illustrates a perspective view of a wheel holder of a bicycle carrier, according to an embodiment.
Figure 3:
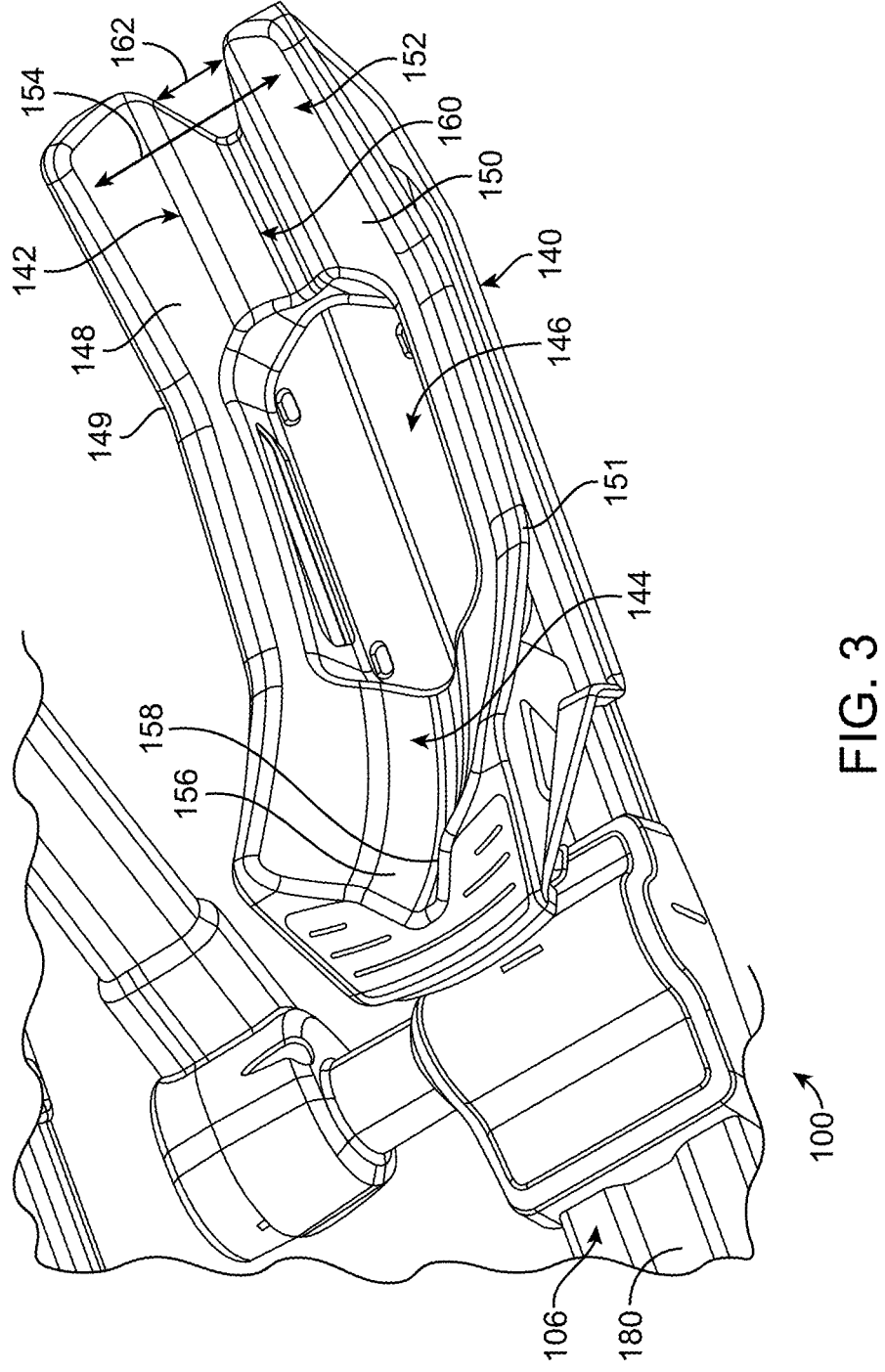
FIG. 3 illustrates a perspective view of a wheel holder of a bicycle carrier, according to an embodiment.
Figure 4:
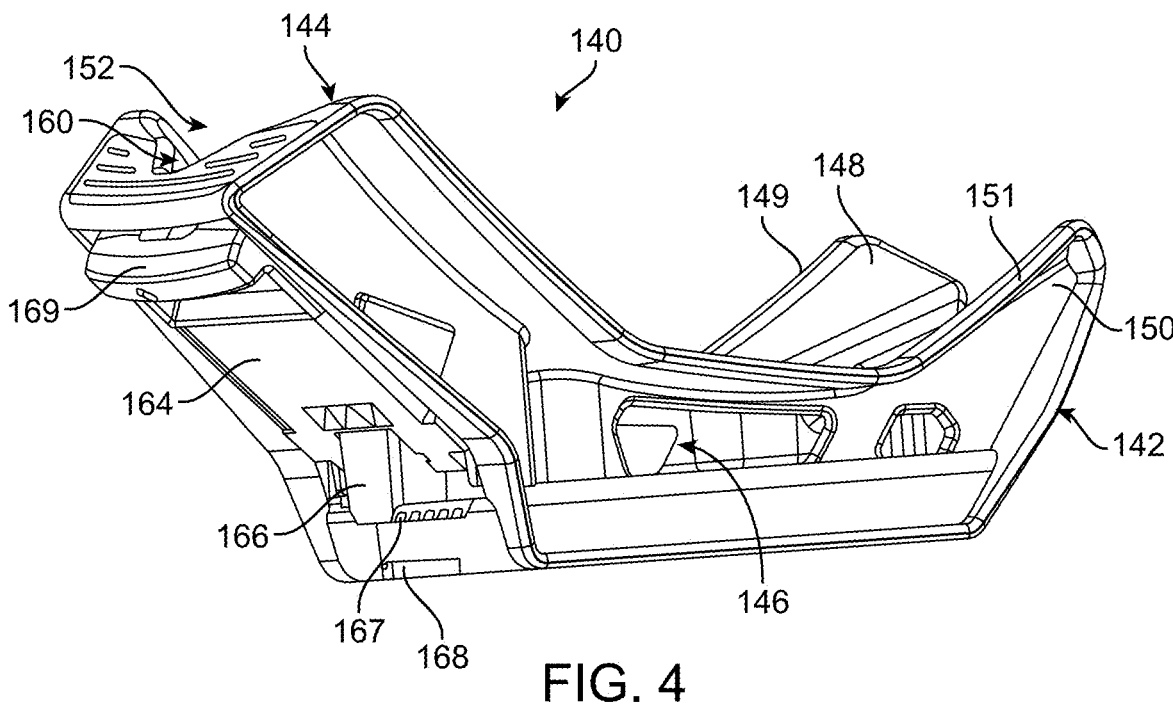
FIG. 4 illustrates a perspective view of a wheel holder, according to an embodiment.
Figure 5:
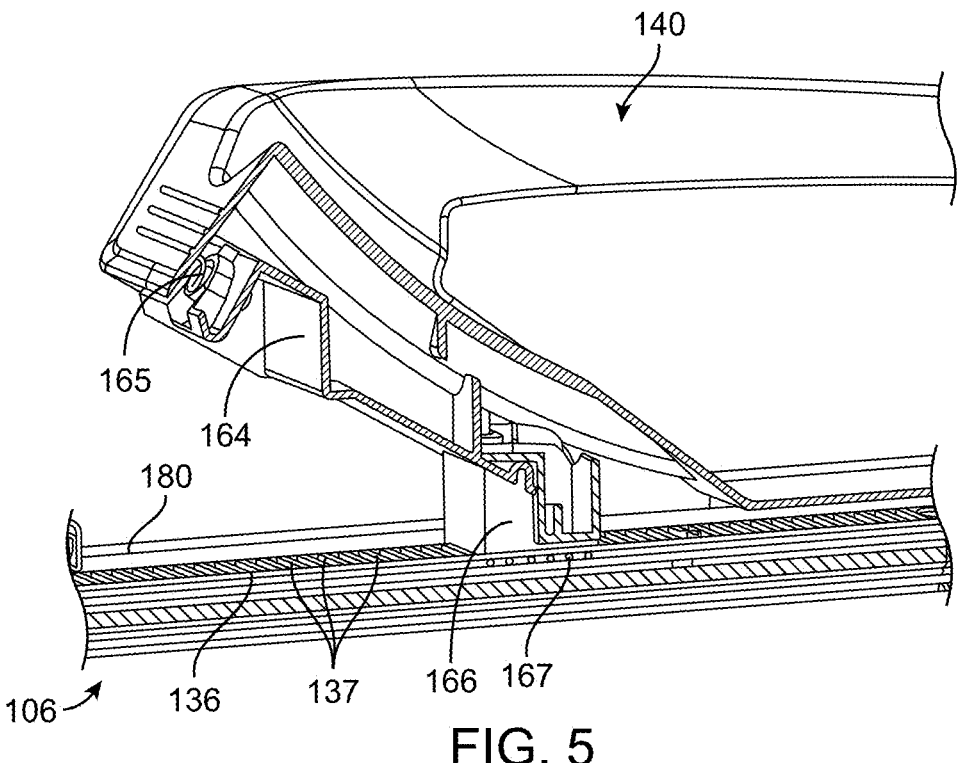
FIG. 5 illustrates a partial cutaway perspective view of a wheel holder of a bicycle carrier, according to an embodiment.

In some embodiments, toothed strip 136 can be disposed at first end 132 of bicycle tray 106 and extend toward base 104 along the lateral axis 130 as shown, for example, in FIGS. 2 and 5. Toothed strip 136 can couple to upper surface 180 and be disposed approximately centrally across the width of bicycle tray 106. Toothed strip 136 can include a plurality of teeth 137 and be configured to engage release member 166 of wheel holder 140 (see e.g., FIGS. 4-5) to lock wheel holder 140 in a lateral position on bicycle tray 106.

In some embodiments, wheel securement arm 300 can be rotatably coupled to bicycle tray 106, for example, by hinge connector 312, as shown, for example in FIGS. 1-3 and 9-11. In some embodiments, wheel securement arm 300 can be rotatably coupled to bicycle tray 106 via wheel holder 140 and configured to translate with wheel holder 140 along bicycle tray 106. Wheel securement arm 300 is configured to rotate into a securement position to secure wheel 110 to wheel holder 140 and bicycle tray 106. In some embodiments, wheel securement arm 300 can be configured to secure a front wheel 110 of bicycle 102. In some embodiments, wheel securement arm 300 can be rotated towards bicycle tray 106 in a collapsed configuration (e.g., parallel to bicycle tray 106 and adjacent upper surface 180), approximately 0 degrees relative to bicycle tray 106, for example, when no bicycles are loaded on the bicycle tray 106. Wheel securement arm 300 can rotated outwards by approximately 180 degrees, such that wheel securement arm 300 extends beyond first end 132 to provide space to load wheel 110 into wheel holder 140. In some embodiments, wheel securement arm 300 can be rotated more than 180 degrees relative to bicycle tray 106. In some embodiments, wheel securement arm 300 can couple to a proximal side of bicycle tray 106 closer to the vehicle. In some embodiments, wheel securement arm 300 can couple to a distal side of bicycle tray 106 away from the vehicle.

Wheel holder 140 is coupled to bicycle tray 106 and configured to move (e.g., translate) in a direction parallel to the lateral axis 130. Wheel holder 140 can support a wheel 110 and the translation can move and reposition bicycle 102 along the bicycle tray 106 as shown, for example, in FIGS. 9-11. This can be advantageous to adjust the side stacking or lateral position of bicycle 102 such that bicycle 102 does not make contact with an adjacent bicycle loaded on the load carrier system 100. For example, bicycle 102 can be translated such that a handlebar or pedal of bicycle 102 does not contact a seat post, bike frame, wheel, or other component of an adjacent bicycle. This may also be advantageous because a user can load multiple bicycles on to the load carrier 100 in any order and reposition the bicycles after loading to adjust the relative side stacking. In contrast, some conventional load carriers require users to rigidly couple securing features to the load carrier before bicycles are loaded, and then load bicycles in a set order to avoid contact. That set order must then be used each time the bicycles are loaded.

Figure 57:
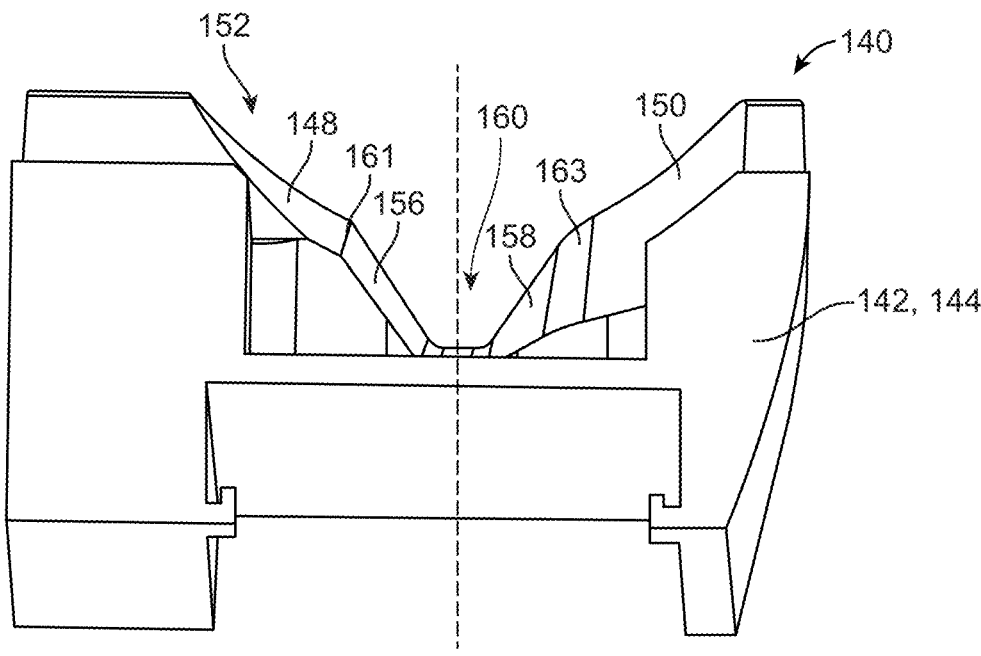
FIG. 57 illustrates a side cutaway view of a wheel holder, according to an embodiment.
Figure 58:
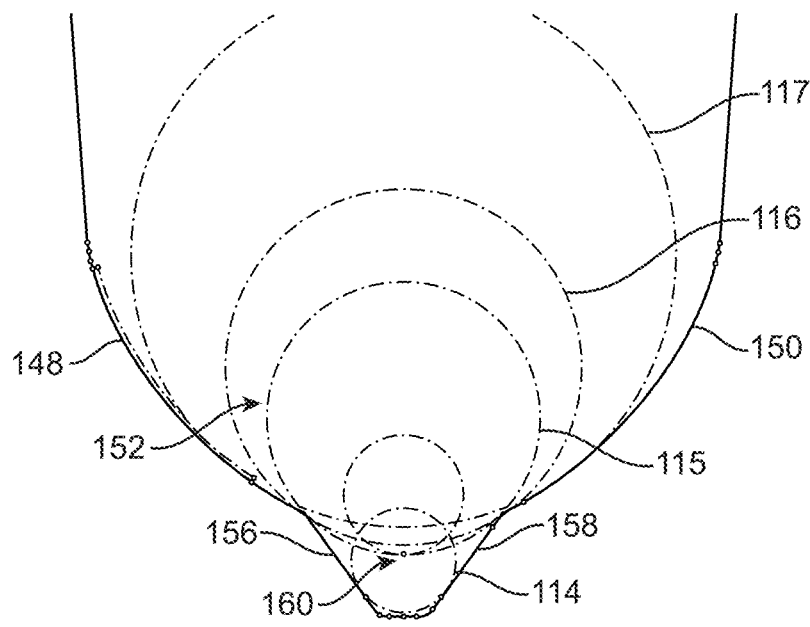
FIG. 58 illustrates a schematic cross-section view of a wheel holder, according to an embodiment.

Wheel holder 140 is configured to receive wheel 110 and support bicycle 102 in an upright position without additional supporting components. In some embodiments, wheel holder 140 includes a first support 142, a second support 144, a first wide sidewall 148, and a second wide sidewall 150, as shown, for example, in FIGS. 1-5. Second support 144 is spaced apart from first support 142 along lateral axis 130 by a recess 146. First wide sidewall 148 and second wide sidewall 150 extend between opposite edges of first support 142 and second support 144 to form a first groove 152 therebetween. First edge extension 149 can extend perpendicularly away from a top edge of first wide sidewall 148 and be configured to increase strength and stiffness of first wide sidewall 148. Second edge extension 151 can extend perpendicularly away from a top edge of second wide sidewall 150 and be configured to increase strength and stiffness of second wide sidewall 150. First groove 152 has first width 154 and can be sized to accommodate wheel 110 as shown, for example, in FIG. 1. In some embodiments, a second groove 160 extends into first and second supports 142, 144 and includes a first narrow sidewall 156 and a second narrow sidewall 158. In the illustrative embodiment shown in FIG. 57, first narrow sidewall 156 of second groove 160 can extend away from first wide sidewall 148 of first groove 152 to form an edge 161, and second narrow sidewall 158 of second groove 160 can extend away from second wide sidewall 150 of first groove 152 with a smooth radius 163. Smooth radius 163 can be advantageous in allowing wheel 110 to slide into second groove 160 if wheel 110 is initially misaligned on one side of first groove 152. In some embodiments, a smooth radius 163 can be formed on both sides of second groove 160 between both first and second narrow sidewalls 156, 158 and first and second wide sidewalls 148, 150. In some embodiments, edge 161 can be formed on both sides of second groove 160 between both first and second narrow sidewalls 156, 158 and first and second wide sidewalls 148, 150.

In the illustrative embodiments shown in FIGS. 2-5, 57, and 58, second groove 160 is a v-shaped groove. In some embodiments, second groove 160 can be u-shaped, square shape, or any other suitable shape to accommodate a tire. First narrow sidewall 156 and second narrow sidewall 158 are spaced apart at an entrance of second groove 160 by second width 162. Second width 162 is narrower than first width 154 and sized to accommodate a narrower tire 114 than wheel 110. For example, first groove 152 may accommodate a mountain bike tire 115, 116 or a fat bike tire 117, and second groove 160 may accommodate a road bike tire 114 as shown, for example, in FIG. 58. In some embodiments, tire 114 can on a road bicycle and have tire width between, for example, about 20 mm and about 45 mm (about 0.8 inches to about 1.8 inches). In some embodiments, tire 115 can be on a mountain bike and have tire width between, for example, about 48 mm and about 53 mm (about 1.9 inches to about 2.1 inches). In some embodiments, tire 116 can be on a mountain bike and have tire width, between, for example, about 53 mm and about 64 mm (about 2.1 inches to about 2.5 inches). In some embodiments, tire 117 can be on a fat tire bike and have tire width between, for example, about 76 mm and about 127 mm (about 3 inches to about 5 inches).

Wheel holder 140 can be configured to support and contact a wheel (e.g. wheel 110 shown in FIG. 1) in at least three locations. For example, wheel 110 can be supported by first support 142, second support 144, and first wide sidewall 148. In another example, wheel 110 can be supported by first support 142, second support 144, and second wide sidewall 150. In a further example, wheel 110 can be supported by at four points of contact including first support 142, second support 144, first wide sidewall 148, and second wide sidewall 150. In a further example, a narrow wheel can be supported by only first support 142 and second support 144 via second groove 160, such that the narrow wheel is supported by at least three points of contact including first narrow sidewall 156 and second narrow sidewall 158. In some embodiments, drain holes can be formed in first and second wide sidewalls 148, 150 adjacent to recess 146, and first and second grooves 152, 160 can have a bow-shape and be angled such that water, dirt, etc. can fall into recess 146 and out of wheel holder 140 through the drain holes.

In some embodiments, wheel holder 140 can be configured to translate along bicycle tray 106 by sliding over upper surface 180 of bicycle tray 106. In some embodiment, wheel holder 140 or bicycle tray 106 can include rollers 196 to reduce friction between wheel holder 140 and bicycle tray 106, where, for example, the load is heavy. In some embodiments, wheel holder 140 further includes actuator 164, spring 165, release member 166, and/or coupling arms 168 as shown, for example, in FIGS. 4 and 5. Coupling arms 168 extend away from first and second wide sidewalls 148, 150, adjacent to side surfaces 184 of bicycle tray 106, and insert into grooves 138 of bicycle tray 106. Coupling arms 168 are configured slide within grooves 138 to slideably couple wheel holder 140 to bicycle tray 106. In some embodiments, rollers can be included between coupling arms 168 and grooves 138 to reduce friction between wheel holder 140 and bicycle tray 106, where, for example, the load is heavy.

In some embodiments, actuator 164 can couple to second support 144 and release member 166 and be configured to move release member 166 between a fixed position and a released position. In some embodiments, release member 166 includes a plurality of teeth 167 that releasably engage toothed strip 136 of bicycle tray 106. In the fixed position, spring 165 biases actuator 164 toward bicycle tray 106 such that release member 166 is biased toward toothed strip 136 and the plurality of teeth 167 engage toothed strip 136 and wheel holder 140 is locked in position relative to bicycle tray 106. In some embodiments, release member 166 can engage upper surface 180 of bicycle tray 106 and friction forces between release member 166 and upper surface 180 can lock wheel holder 140 in position. In the released position, actuator 164 moves release member 166 away from toothed strip 136 such that the plurality of teeth 167 disengage toothed strip 136 and wheel holder 140 can be translated along bicycle tray 106 to side stack bicycle 102 as required. In the illustrative embodiment in FIGS. 4 and 5, actuator 164 is slideably coupled with a backside of second support 144. In some embodiments, actuator 164 includes a handle 169 configured to be gripped by a user to move actuator 164, and release member 166, between the fixed and released positions. In some embodiments, handle 169 can be configured to be gripped by a user to move actuator 164 between the fixed and released positions, and to simultaneously translate wheel holder 140 along bicycle tray 106. In some embodiments, wheel holder 140 translates along bicycle tray 106 between about 10 cm to about 40 cm. In some embodiments, wheel holder 140 translates along bicycle tray 106 between about 12 cm to about 30 cm. In some embodiments, wheel holder 140 translates along bicycle tray 106 about 15 cm.

Figure 7:
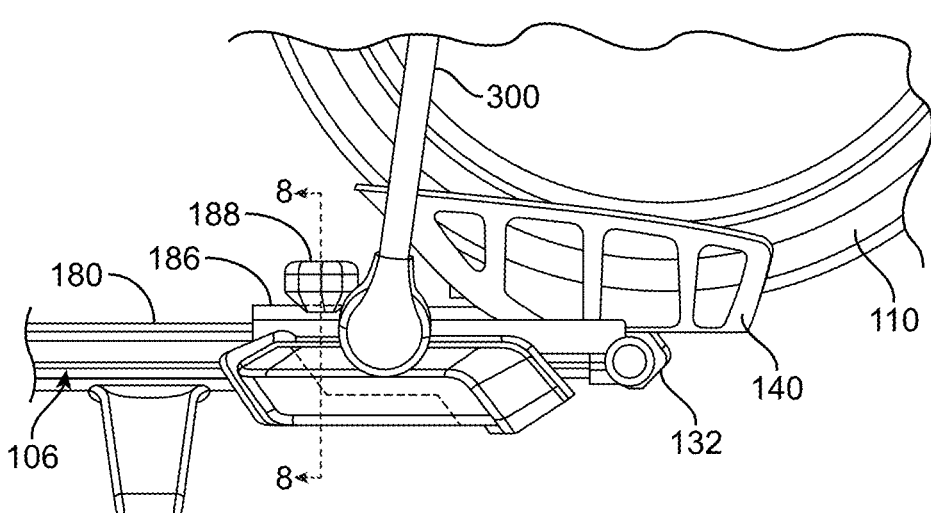
FIG. 7 illustrates a wheel holder of a bicycle carrier, according to an embodiment.
Figure 8:
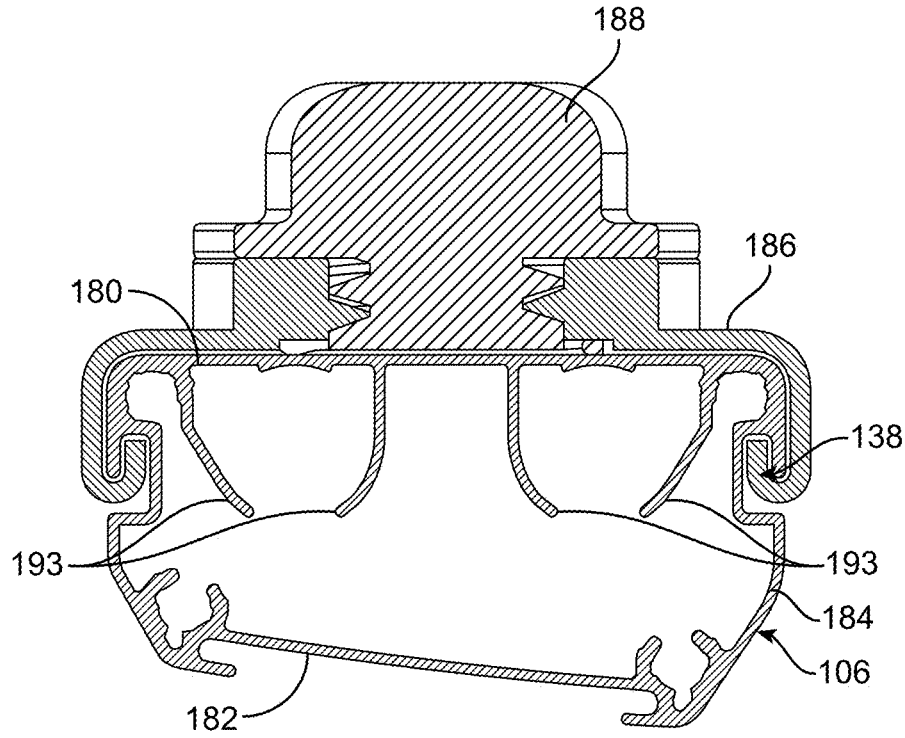
FIG. 8 illustrates a cross-sectional view of a bicycle carrier, according to an embodiment.
Figure 9:
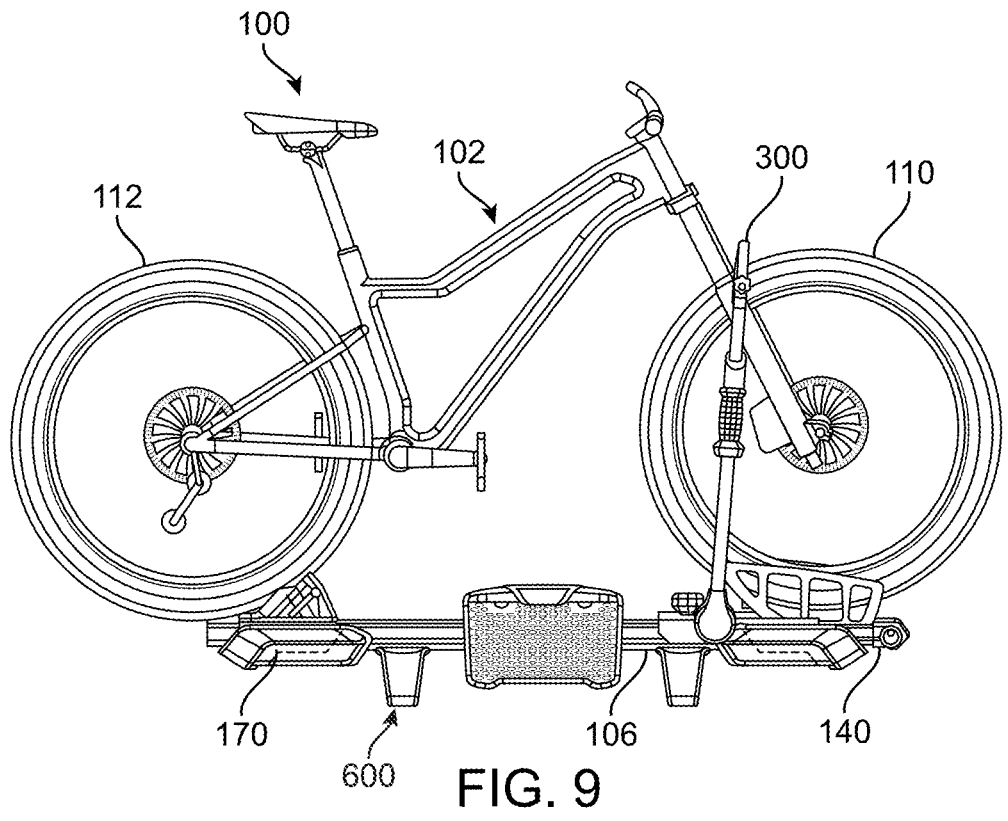
FIG. 9 illustrates a bicycle carrier, according to an embodiment.
Figure 10:
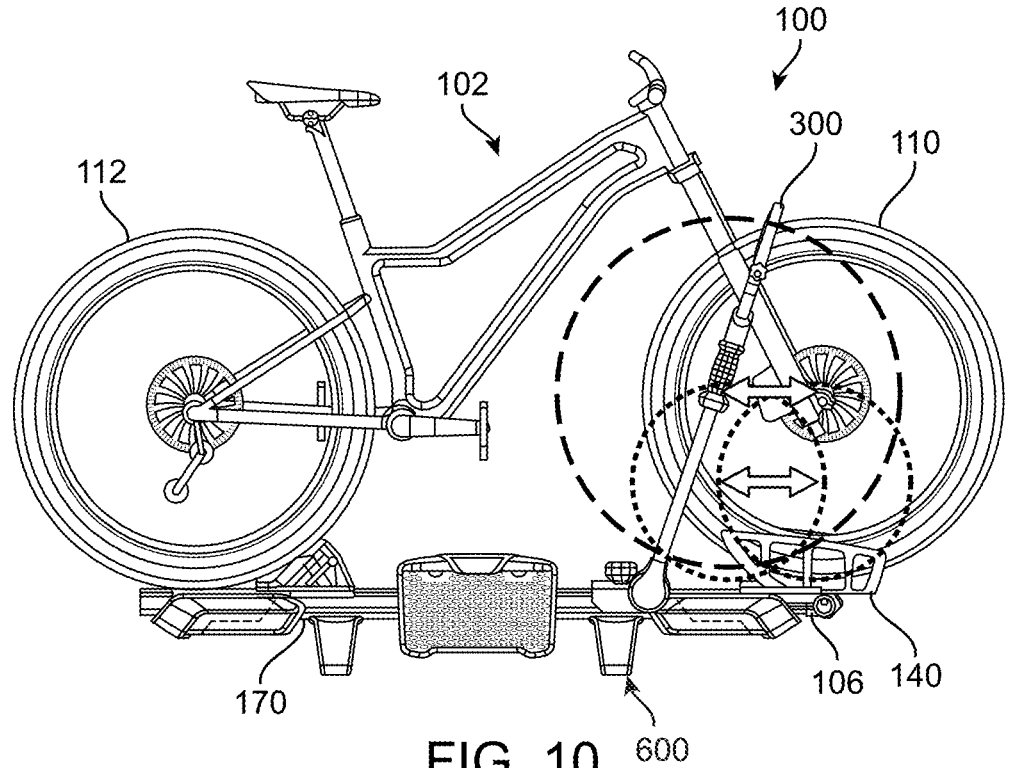
FIG. 10 illustrates a bicycle carrier, according to an embodiment.
Figure 11:
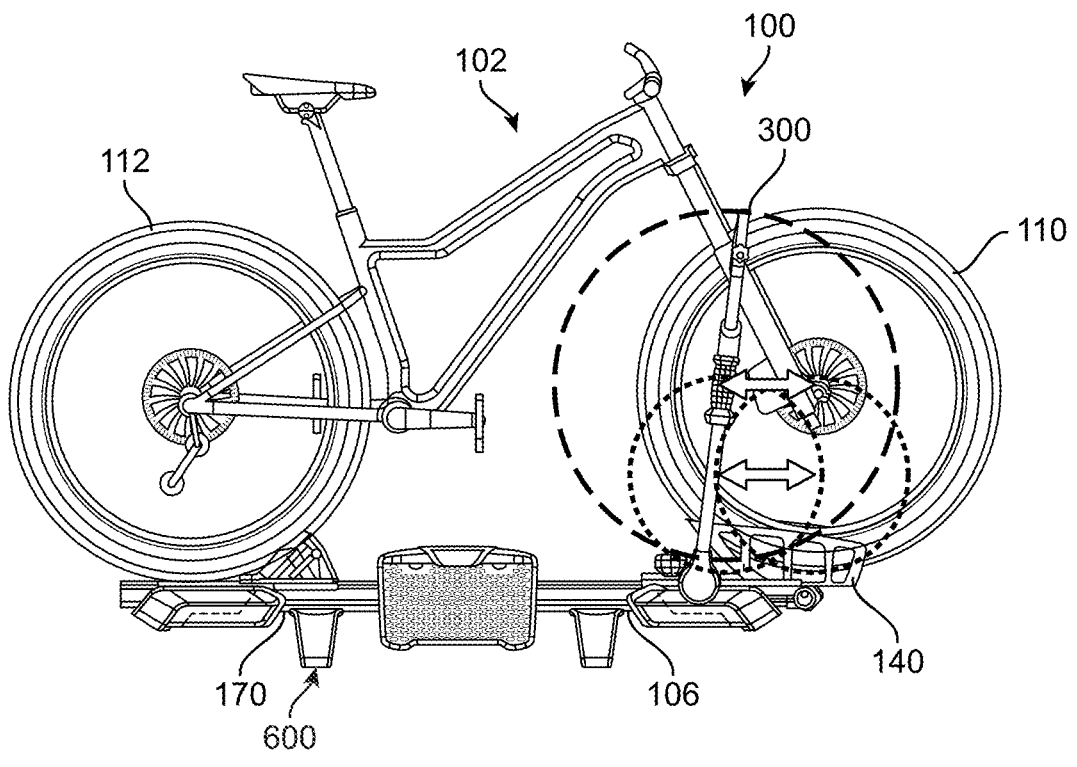
FIG. 11 illustrates a bicycle carrier, according to an embodiment.
Figure 12:
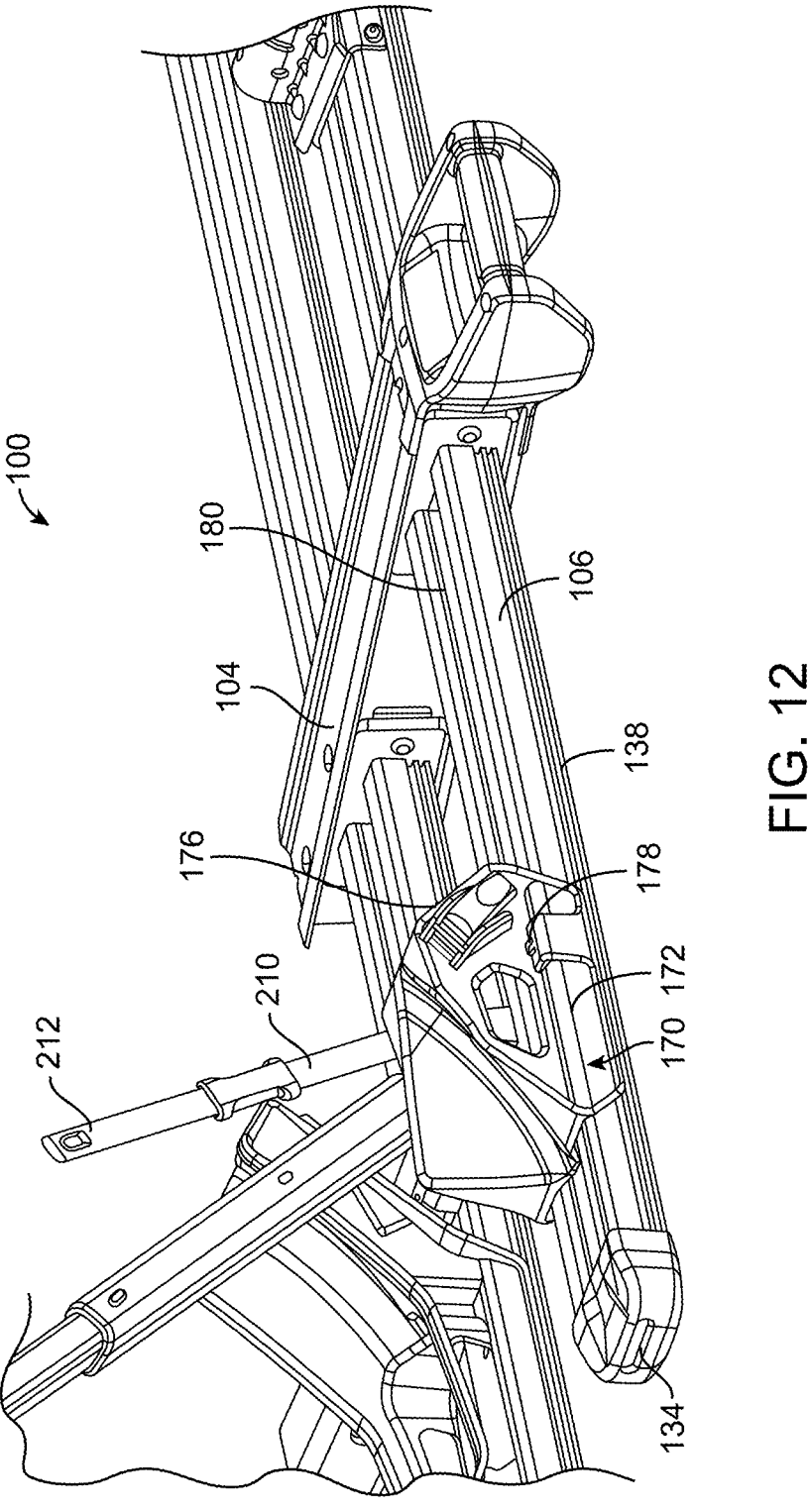
FIG. 12 illustrates a partial perspective view of a bicycle carrier, according to an embodiment.

In some embodiments, wheel holder 140 can include housing portion 186 that extends away from second support 144 adjacent to bicycle tray 106, and connector 188 extending through housing portion 186 and rotatably coupled thereto as shown, for example, in FIGS. 7 and 8. Connector 188 can be substantially similar to connector 500 shown in FIGS. 23-25. Connector 188 can include similar features to connector 500 as will be described in more detail below. Connector 188 can be rotated between a first position and a second position. In the first position, connector 188 is spaced apart from upper surface 180 of bicycle tray 106 such that wheel holder 140 can freely translate relative to bicycle tray 106. In the second position, connector 188 contacts upper surface 180 of bicycle tray 106 and exerts a friction force on upper surface 180 of bicycle tray 106 such that wheel holder 140 is locked in position relative to bicycle tray 106. Connector 188 can include a knob, handle, or lever to facilitate rotation by a user between the first and second positions.

In some embodiments, bicycle tray 106 can include stops that limit translation of wheel holder 140 when wheel holder 140 is translated relative to bicycle tray 106. In some embodiments, stops can be formed in grooves 138 and contact coupling arms 168 to limit movement. In some embodiments, bicycle tray 106 can include protrusions to act as stops that contact one of first support 142, second support 144, release member 166, or housing portion 186. Stops can prevent wheel holder 140 from extending too far inboard such that a second wheel may extend beyond second end 134 causing bicycle 102 to fall down, or from wheel holder 140 extending beyond first end 132 and becoming detached from bicycle tray 106.

In some embodiments, wheel securement arm 300 rotatably couples to bicycle tray 106 such that wheel holder 140 can translate relative to bicycle tray 106 and wheel securement arm 300 as shown, for example in FIGS. 1-3 and 10. In some embodiments, wheel securement arm 300 couples to wheel holder 140 such that wheel holder 140 and wheel securement arm 300 translate together relative to bicycle tray 106 as shown, for example, in FIGS. 7 and 11.

Figure 52:
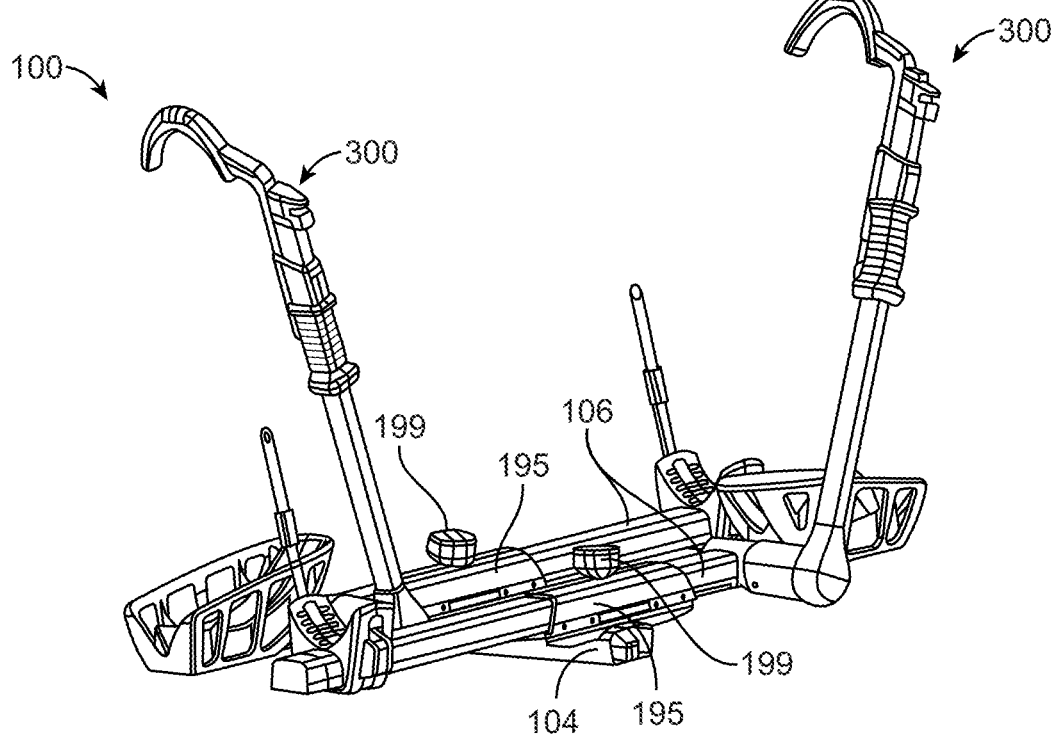
FIG. 52 illustrates a perspective view of a bicycle carrier, according to an embodiment.
Figure 53:
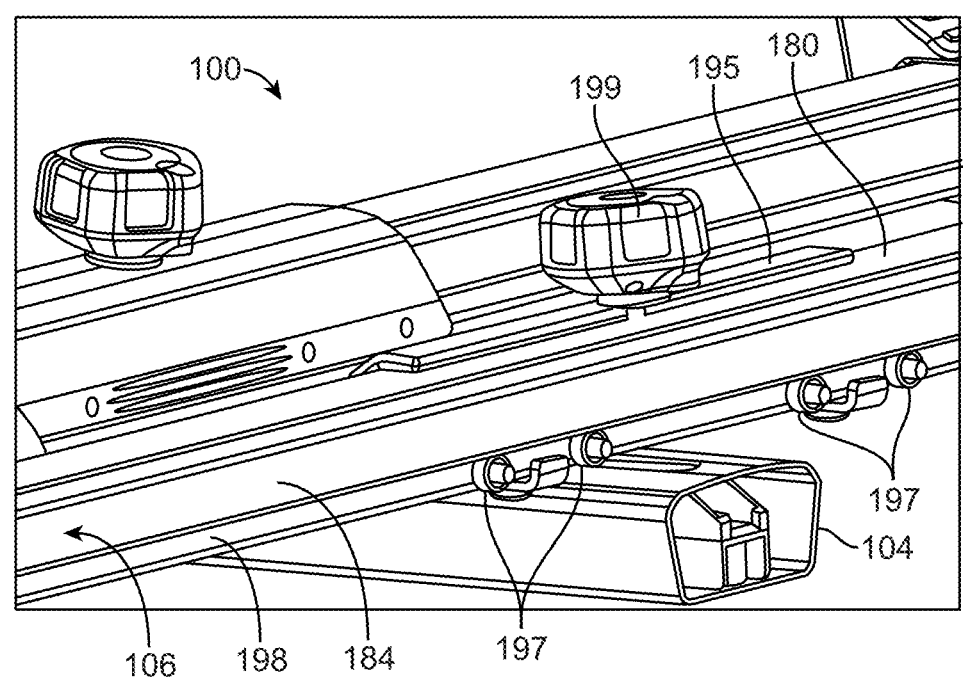
FIG. 53 illustrates a cutaway partial perspective view of a bicycle carrier, according to an embodiment.
Figure 54:
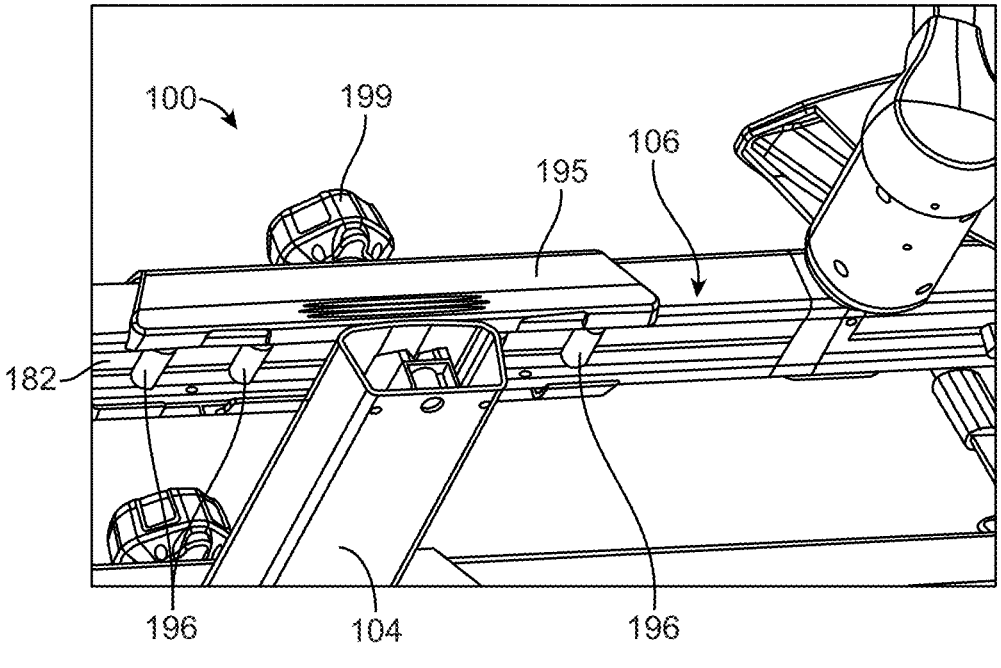
FIG. 54 illustrates a cutaway partial perspective view of a bicycle carrier, according to an embodiment.

In the illustrative embodiment shown in FIGS. 52-54, bicycle tray 106 extends between first end 132 and second end 134 as a single component, and can be slideably coupled to base 104 such that bicycle tray 106, and components coupled thereto, translate relative to base 104 to enable side stacking of adjacent bicycles. In some embodiments, bicycle tray 106 can be slideably coupled to base 104 via a releasable clamp, a ratchet and tooth configuration, or a connector such as connector 500. In the illustrative embodiment shown in FIGS. 52-54, load carrier 100 further includes a housing 195 that can be coupled to base 104 and configured to extend at least partially around bicycle tray 106 and support bicycle tray 106 on rollers 196 or bearings 197. Housing 195 can have a substantially similar cross-sectional shape as bicycle tray 106 such that lateral movement or wobble between bicycle tray 106 and housing 195 can be reduced. In the illustrative embodiment in FIG. 53, bearings 197 are coupled to housing 195 and configured to engage a shelf 198 formed in side surfaces 184 of bicycle tray 106. In the illustrative embodiment in FIG. 54, rollers 196 extend between lower edges of sidewalls of housing 195 and engage lower surface 182 of bicycle tray 106. Rollers 196 and bearings 197 can be configured to reduce friction between base 104 and bicycle tray 106 such that a user can easily slide bicycle tray 106 perpendicular to base 104. This can be advantageous where a heavy bicycle 102 is secured to bicycle tray 106 and rollers 196 and/or bearings 197 can reduce friction between bicycle tray 106 and base 104. In some embodiments, housing 195 can include an actuator 199 (e.g., a knob, lever, etc.) to lock and release bicycle tray 106 in a slideable configuration with base 104. Actuator 199 can be coupled to a T-bolt that extends into a groove formed in upper surface 180 along the length of bicycle tray 106. Actuator 199 can pull bicycle tray 106, via the T-bolt, toward actuator 199 such that upper surface 180 of bicycle tray 106 contacts housing 195 and frictional forces therebetween stop bicycle tray 106 from translating relative to base 104.

Figure 6:
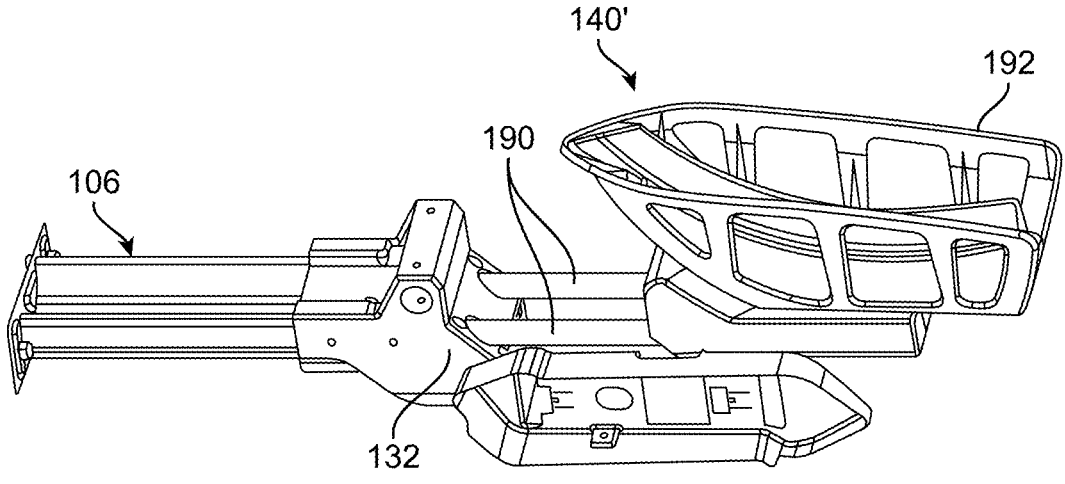
FIG. 6 illustrates a perspective view of a wheel holder of a bicycle carrier, according to an embodiment.

In the illustrative embodiment shown in FIG. 6, wheel holder 140' can include extension arms 190 and wheel cradle 192. Wheel cradle 192 can include substantially similar wheel securement features as wheel holder 140, such as first groove 152 and second groove 160. Extension arms 190 couple to wheel cradle 192 and extend into apertures (e.g., in a housing or into bicycle tray 106 itself) at first end 132 of bicycle tray 106 and can be supported by flanges 193. In the illustrative example in FIG. 8, flanges 193 can extend away from upper surface 180 and are spaced apart at distal ends. In some embodiments, flanges 193 can extend away from upper surface 180 and join at distal ends to surround extension arms 190. In some embodiments, flanges 193 can extend away from lower surface 182. Extension arms 190 are slideably coupled to bicycle tray 106 and can extend toward and away from bicycle tray 106 such that wheel cradle 192 translates in a direction parallel to lateral axis 130 to enable side stacking of bicycles 102 loaded on the load carrier.

Wheel support 170 can be configured to receive second wheel 112 and secure second wheel 112 to bicycle tray 106. In some embodiments, wheel support 170 is further configured to translate along bicycle tray 106, for example, by sliding over upper surface 180 of bicycle tray 106 between base 104 and second end 134. In some embodiments, wheel support 170 includes support body 172, engagement arm 174, and releasable fastener 176 as shown, for example, in FIGS. 12, 13, 59, and 60. In some embodiments, engagement arm 174 releasably couples to grooves 138 of bicycle tray 106 and extends along an inner surface of support body 172 to couple with releasable fastener 176. When wheel 112 is arranged in wheel support 170, a strap extends around wheel 112 and couples with releasable fastener 176. When wheel 112 is secured to wheel support 170, the strap is tightened and releasable fastener 176 is pulled towards wheel 112 and away from bicycle tray 106. Releasable fastener 176 pulls engagement arm 174 such that engagement arm 174 contacts grooves 138, thereby exerting frictional forces and locking wheel support 170 in position relative to bicycle tray 106.

Figure 13:
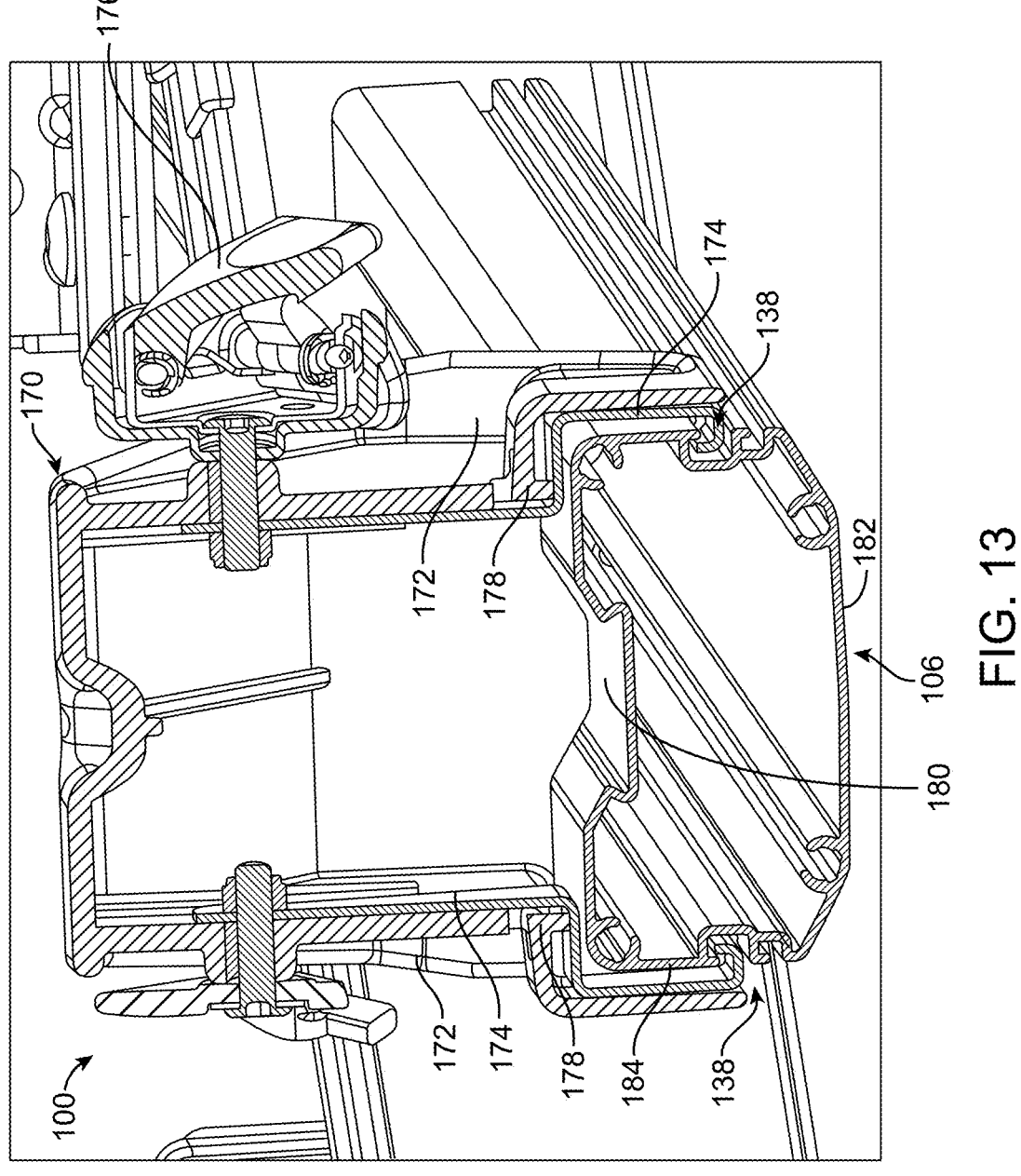
FIG. 13 illustrates partial cutaway perspective view of a wheel support of a bicycle carrier, according to an embodiment.
Figure 59:
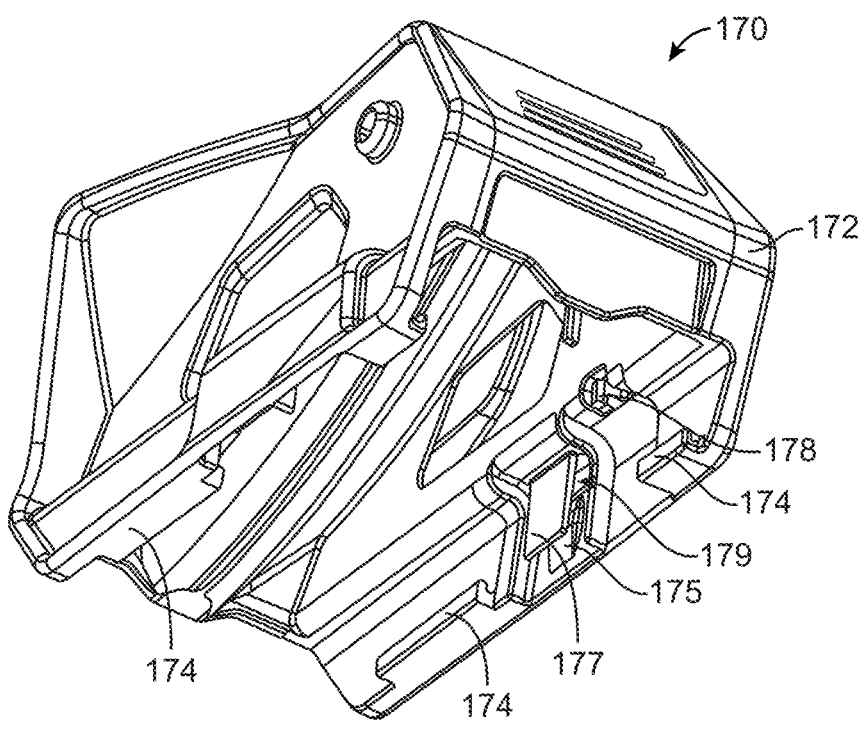
FIG. 59 illustrates a perspective view of a wheel support of a bicycle carrier, according to an embodiment.

In some embodiments, support body 172 includes friction arm 177 and biasing tongue 178 as shown, for example, in FIGS. 13 and 59. Biasing tongue 178 extends away from support body 172 and contacts engagement arm 174. When wheel 112 is secured, engagement arm 174 biases biasing tongue 178 towards support body 172. When wheel 112 is released, biasing tongue 178 biases towards engagement arm 174 to release engagement arm 174 from engagement with grooves 138. In some embodiments, releasable fastener 176 can be a ratchet. Friction arm 177 extends away from support body 172 and biases towards side surface 184 of bicycle tray 106. When wheel 112 is secured, engagement arm 174 contacts grooves 138 exerting frictional forces therebetween and locking wheel support 170 in position relative to bicycle tray 106. When wheel 112 is released, friction arm 177 biases towards and contacts side surface 184 to exert friction therebetween allowing wheel support 170 to translate along bicycle tray 106 when force is applied to wheel support, but preventing wheel support 170 from freely sliding along bicycle tray 106 without force being applied. Friction arms 177 can extend from both sides of support body 172 and contact opposite side surfaces 184 of bicycle tray 106 to center wheel support 170 relative to bicycle tray 106.

Figure 60:
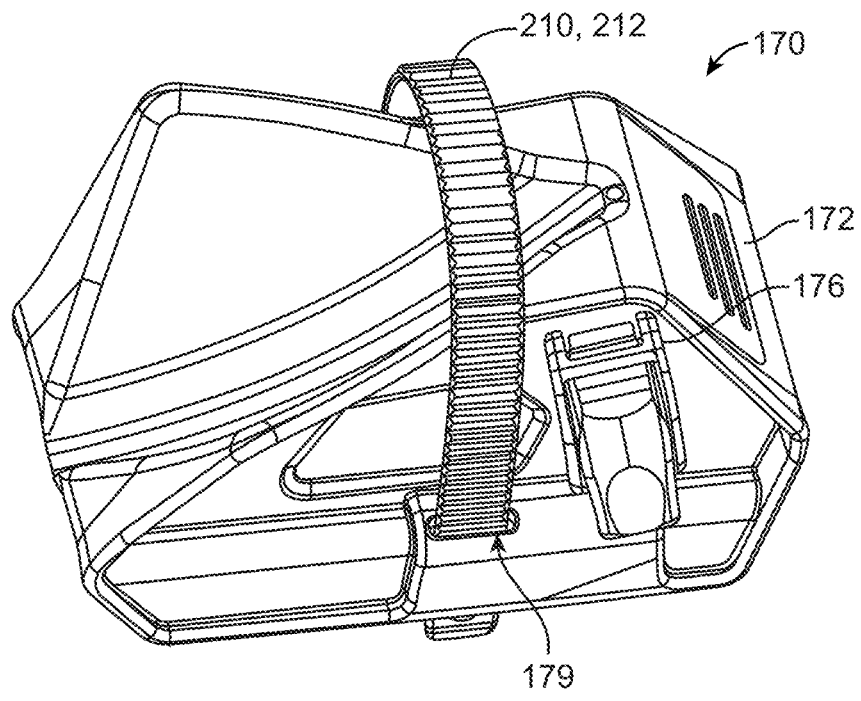
FIG. 60 illustrates a perspective view of a wheel support of a bicycle carrier, according to an embodiment.

In some embodiments, strap recess 179 can be formed in support body 172 adjacent to friction arm 177 as shown, for example, in FIGS. 59 and 60. Strap recess 179 can be sized to receive an end of a strap, such as, for example, securement strap 210 or extension strap 212, described in more detail below. Support body 172 can include protrusion 175 that can extend away from support body 172 and toward friction arm 177. A strap 210, 212 can be inserted into strap recess 179 and biased into contact with friction arm 177 by protrusion 175 thereby securing strap 210, 212 in strap recess 179. Strap recess 179 can be advantageous in releasably coupling an end of strap 210, 212 in close proximity to releasable fastener 176, and easily reachable to a user, when a bicycle 102 is being loaded on to carrier 100 and before wheel 112 is secured to wheel support 170. Strap recess 179 maintains strap 210, 212 in a compact configuration to avoid strap 210, 212 obstructing bicycle 102 as it is loaded on to bicycle tray 106 or obstructing a second bicycle 102 being loaded on to an adjacent bicycle tray 106. In some embodiments, after wheel 110 of bicycle 102 is secured to wheel holder 140 and bicycle tray 106, a user can easily pull strap 210, 212 out of strap recess 179, arrange strap 210, 212 around wheel 112 and secure it to releasable fastener 176 to secure wheel 112 to wheel support 170 and bicycle tray 106.

In some embodiments, some or all of the steps of the following method can be used, in the order described or in another order, for loading and side stacking multiple bicycles 102 to load carrier 100. A first bicycle 102 can be arranged on a first bicycle tray 106 with first wheel 110 secured in wheel holder 140. Wheel holder 140 can be released and translated in a direction parallel to the lateral axis 130 such that bicycle 102 is translated along bicycle tray 106 to move bicycle 102 into a desired lateral position on load carrier 100. Wheel securement arm 300 can be rotated around first wheel 110 and extendable portion 304 can be retracted into housing 302 until wheel contact portion 324 contacts first wheel 110 to secure first wheel 110 in wheel holder 140. Wheel support 170 can be translated along bicycle tray 106 adjacent to second wheel 112, and wheel 112 can be secured to wheel support 170 with a strap such as securement strap 210 or extension strap 212, as will be described in more detail below. The above steps can be repeated for a second bicycle arranged on a second bicycle tray parallel to the first bicycle tray, and the second bicycle can be translated along the second bicycle tray, and relative to the first bicycle 102, to side stack both bicycles such that the components (e.g. handlebars, pedals, wheels, frames, etc.) of the bicycles are spaced apart and do not contact one another. The steps above can be repeated for third and fourth bicycles where the load carrier is configured to secure up to four bicycles. In some embodiments, wheel holder 140 can be translated along bicycle tray 106 before bicycle 102 is arranged on bicycle tray 106.

Example Extendable Strap

FIGS. 14-17 illustrate an extension strap system 200, according to embodiments, for use with load carrier system 100. Load carrier 100 can be configured to accommodate different shapes and sizes of bicycle 102, and different shapes and sizes of wheels 110, 112 coupled to bicycle 102. Extension strap system 200 provides an elongated securement strap to accommodate large wheels and tires, such as, for example, a fat bike with tire width size of 3 inches and larger. Although extension strap system 200 is shown as a stand-alone apparatus and/or system, and illustratively shown for use with bicycle 102, extension strap system 200 can be applied to secure any load arranged on load carrier 100.

Figure 14A:
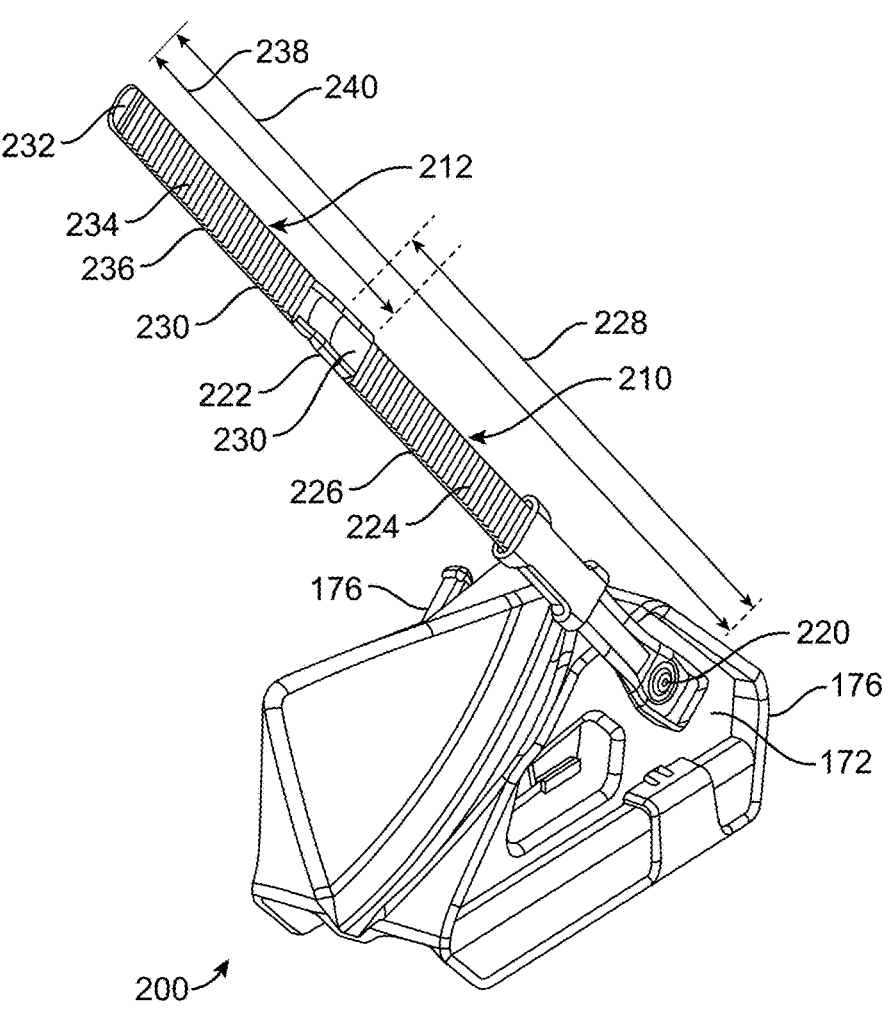
FIG. 14A illustrates a perspective view of a wheel holder assembly, according to an embodiment.
Figure 14B:
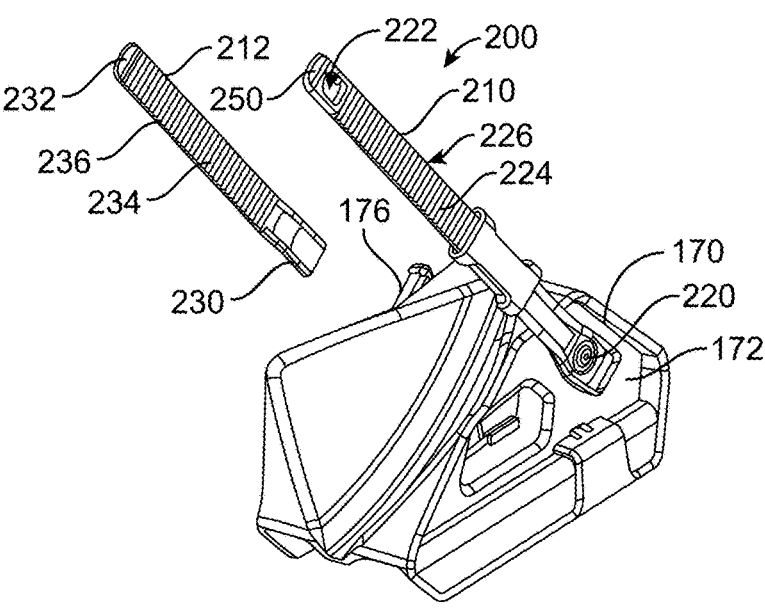
FIG. 14B illustrates an exploded perspective view of a wheel support assembly, according to an embodiment.

In some embodiments, extension strap system 200 can be rotatably coupled to wheel support 170 by securement strap 210, and extension strap 212 can be releasably coupled to securement strap 210 to extend the overall length of the strap as shown, for example, in FIGS. 14A and 14B. In some embodiments, extension strap system 200 can directly couple to bicycle tray 106. Extension strap system 200 includes extension strap 212 and securement strap 210. Securement strap 210 has first length 228 and can include tail portion 220, coupling tongue portion 222, a plurality of teeth 224, and/or a wheel engagement surface 226 as shown, for example in FIGS. 14-17. Tail portion 220 is disposed at a proximal end of securement strap 210 and can be rotatably coupled to wheel support 170 on an opposite side of support body 172 to releasable fastener 176. In some embodiments, tail portion 220 can be adjustably coupled to wheel support 170 to adjust a securing length of securement strap 210.

Coupling tongue portion 222 can be spaced apart from tail portion 220 and located on an opposite, distal end of securement strap 210. A coupling aperture 250 can be formed in coupling tongue portion 222 and configured to couple with extension strap 212. For example, coupling tongue portion 222 can be configured to receive a protrusion 260 of extension strap 212. In some embodiments, the plurality of teeth 224 are disposed on one side of securement strap 210 between the tail portion 220 and the coupling aperture 250. In some embodiments, wheel engagement surface 226 is substantially flat and disposed on the opposite side of securement strap 210 to the plurality of teeth 224 and configured to contact wheel 112. In some embodiments, coupling tongue portion 222 can be configured to be inserted into releasable fastener 176 such that the plurality of teeth 224 can engage releasable fastener 176, thereby releasably coupling the securement strap 210 to wheel support 170.

In some embodiments, extension strap 212 is configured to couple to securement strap 210 such that extension strap system has extension length 240, as shown, for example, in FIGS. 14-17. Extension strap 212 has a second length 238 and can include coupling portion 230, tongue portion 232, a plurality of teeth 234, and/or a wheel engagement surface 236. Coupling portion 230 is disposed at a proximal end of extension strap 212 and includes protrusion 260 that extends away from coupling portion 230 and can be configured to couple with securement strap 210. For example, protrusion 260 can be inserted into coupling aperture 250 to couple extension strap 212 to securement strap 210. In some embodiments, tongue portion 232 can be spaced apart from coupling portion 230 and located on an opposite, distal end of extension strap 212. In some embodiments, the plurality of teeth 234 are disposed on one side of extension strap 212 between the coupling portion 230 and the tongue portion 232. In some embodiments, wheel engagement surface 236 is substantially flat and disposed on the opposite side of extension strap 212 to the plurality of teeth 234 and configured to contact wheel 112. In some embodiments, tongue portion 232 can be configured to be inserted into releasable fastener 176 such that the plurality of teeth 234 can engage releasable fastener 176, thereby releasably coupling the extension strap 212 to wheel support 170.

In some embodiments, coupling aperture 250 receives protrusion 260 to couple securement strap 210 to extension strap 212 as shown, for example, in FIG. 14A. Coupling aperture 250 and protrusion 260 can have corresponding shapes such that protrusion 260 can be inserted into coupling aperture 250. In some embodiments, coupling tongue portion 222 of securement strap 210 can be made from a deformable material such that coupling aperture 250 can deform to receive protrusion 260. In some embodiments, protrusion 260 can be made from a deformable material and include a stem 270 extending away from coupling portion 230 and a head 272 disposed at the end of stem 270. Stem 270 can be smaller than coupling aperture 250 and be disposed in coupling aperture 250 when extension strap 212 is coupled securement strap 210. Head 272 extends perpendicularly away from stem 270 and beyond a perimeter of coupling aperture 250 to couple extension strap 212 to securement strap 210. Coupling portion 230 of extension strap 212 can include a step, notch, or thinner portion such that wheel engagement surface 226 of securement strap 210 can be approximately flush with wheel engagement surface 236 of extension strap 212 when extension strap 212 is coupled to securement strap 210. In some embodiments, protrusion 260 can extend from coupling tongue portion 222, and coupling aperture 250 can be formed in coupling portion 230.

Figures 15, 16, 17:
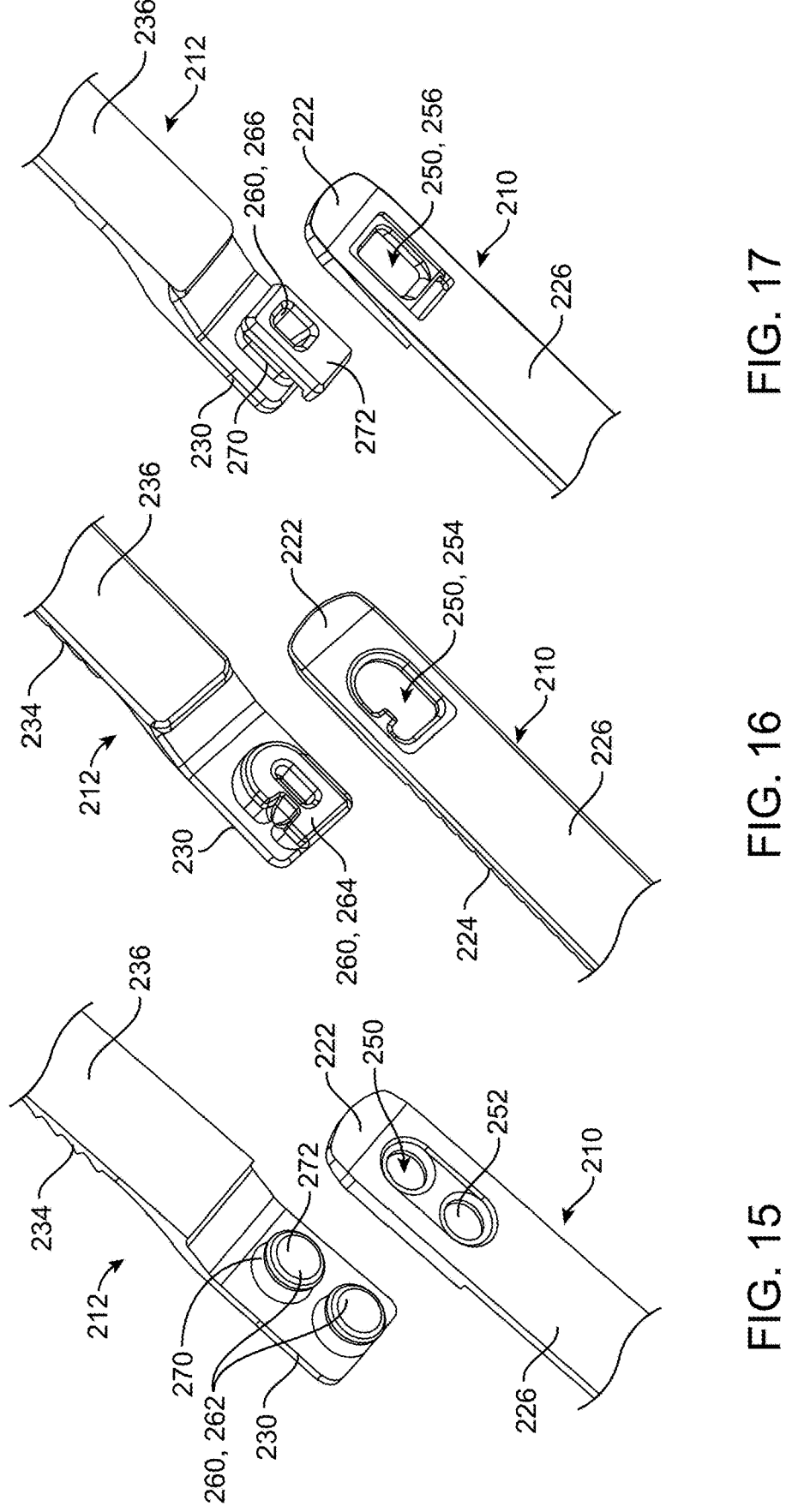
FIG. 15 illustrates an exploded view of an extendable strap connection, according to an embodiment.
FIG. 16 illustrates an exploded view of an extendable strap connection, according to an embodiment.
FIG. 17 illustrates an exploded view of an extendable strap connection, according to an embodiment.

In the illustrative embodiment in FIG. 15, extension strap 212 includes a plurality of round studs 262 and securement strap 210 includes a plurality of round apertures 252. In some embodiments, protrusion 260 can include one round stud 262, and coupling aperture can include one round aperture. In the illustrative embodiment in FIG. 16, extension strap 212 includes a J-shaped protrusion 264 and securement strap 210 includes a J-shaped aperture 254. For example, J-shaped protrusion 264 can include a straight side, an arcuate side, and a notch formed between the straight side and the arcuate side. J-shaped aperture 254 can include corresponding geometry such that an arm extending into J-shaped aperture 254 extends into the notch of J-shaped protrusion 264. This can be advantageous to provide anti-rotation features such that extension strap 212 and securement strap 210 remain aligned along their respective lengths. In the illustrative embodiment in FIG. 17, extension strap 212 includes a box protrusion 266 and securement strap 210 includes box aperture 256 that are, for example, rectangular. In some embodiments, box protrusion 266 and box aperture 256 can be square or any other suitable polygonal shape. In some embodiments, protrusion 260 can be inserted into coupling aperture 250 and rotated 90 degrees to lock protrusion 260 into coupling aperture 250. In some embodiments, coupling aperture 250 can include a round hole and a slot extending from the round hole such that head 272 of protrusion 260 can insert through the round hole and then protrusion 260 can be translated into the slot portion where head 272 overlaps the slot portion to couple therewith.

In some embodiments, first length 228 of securement strap 210 is equal to second length 238 of extension strap 212. In some embodiments, first length 228 of securement strap 210 is shorter than second length 238 of extension strap 212. In some embodiments, first length 228 of securement strap 210 is longer than second length 238 of extension strap 212. In some embodiments, extension strap 212 and securement strap 210 have equal widths and thicknesses. In some embodiments, extension strap 212 can be wider than securement strap 210 and/or be thicker than securement strap 210. In some embodiments, extension strap 212 can be narrower than securement strap 210 and/or be thinner than securement strap 210.

Example Wheel Securement Arm

Figure 18:
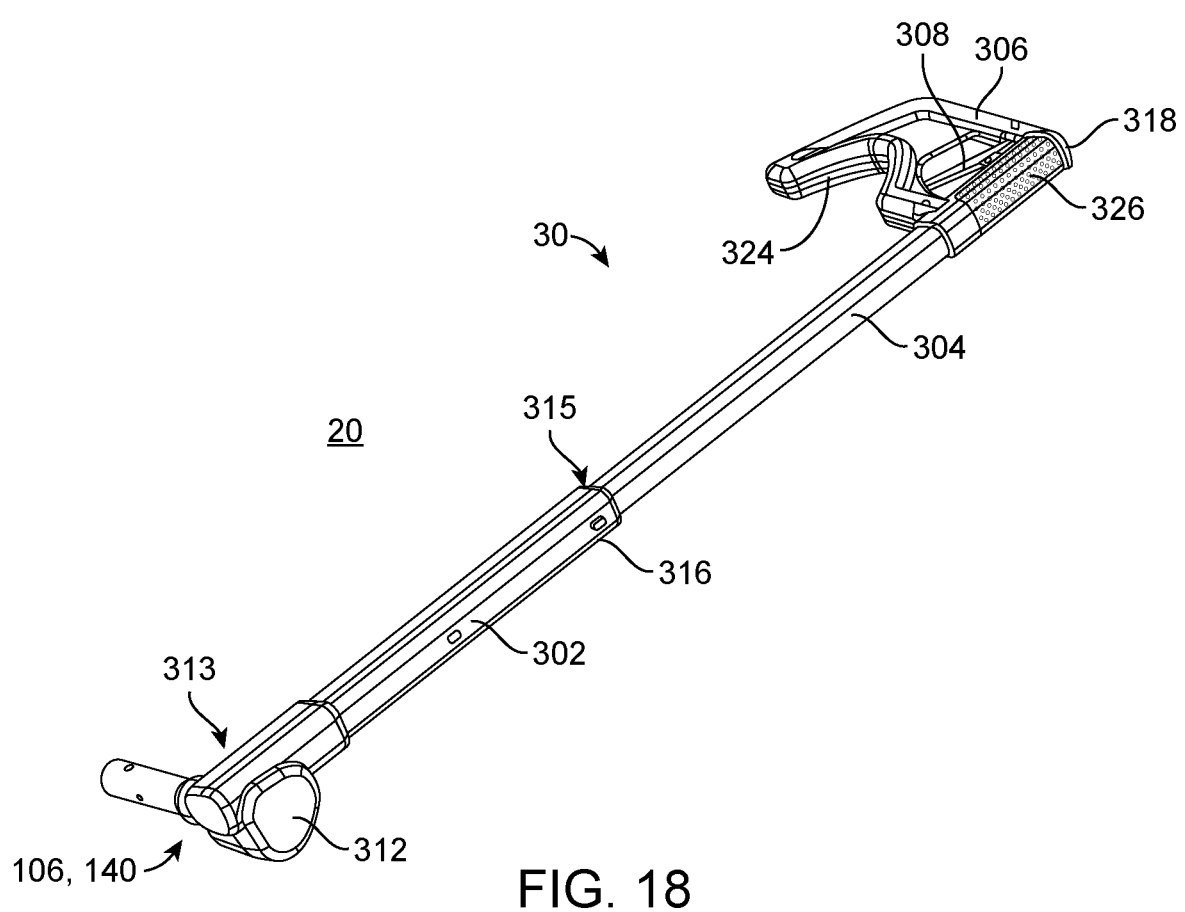
FIG. 18 illustrates a perspective view of a wheel securement arm, according to an embodiment.
Figure 19:
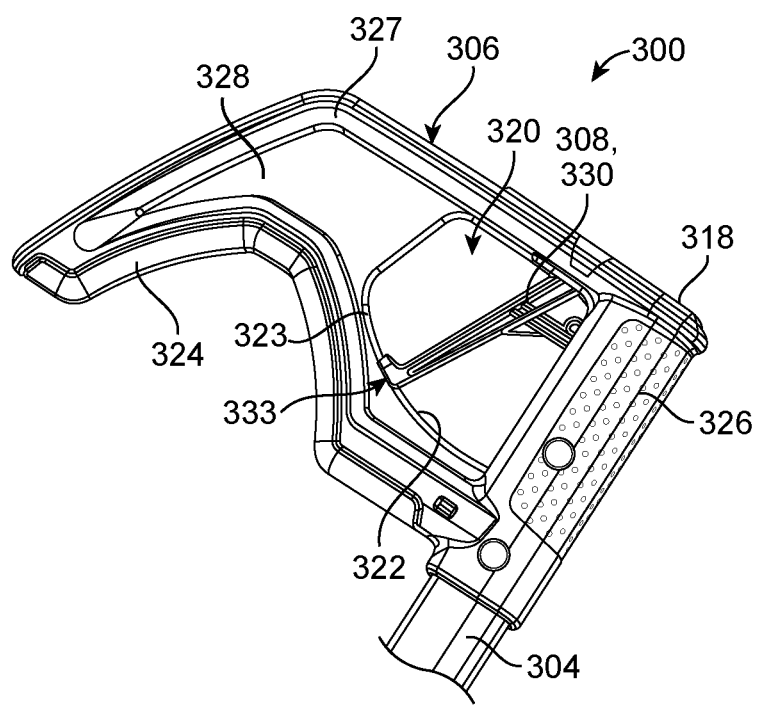
FIG. 19 illustrates a partial perspective view of an actuator housing of a wheel securement arm, according to an embodiment.
Figures 20, 20A, 20B:
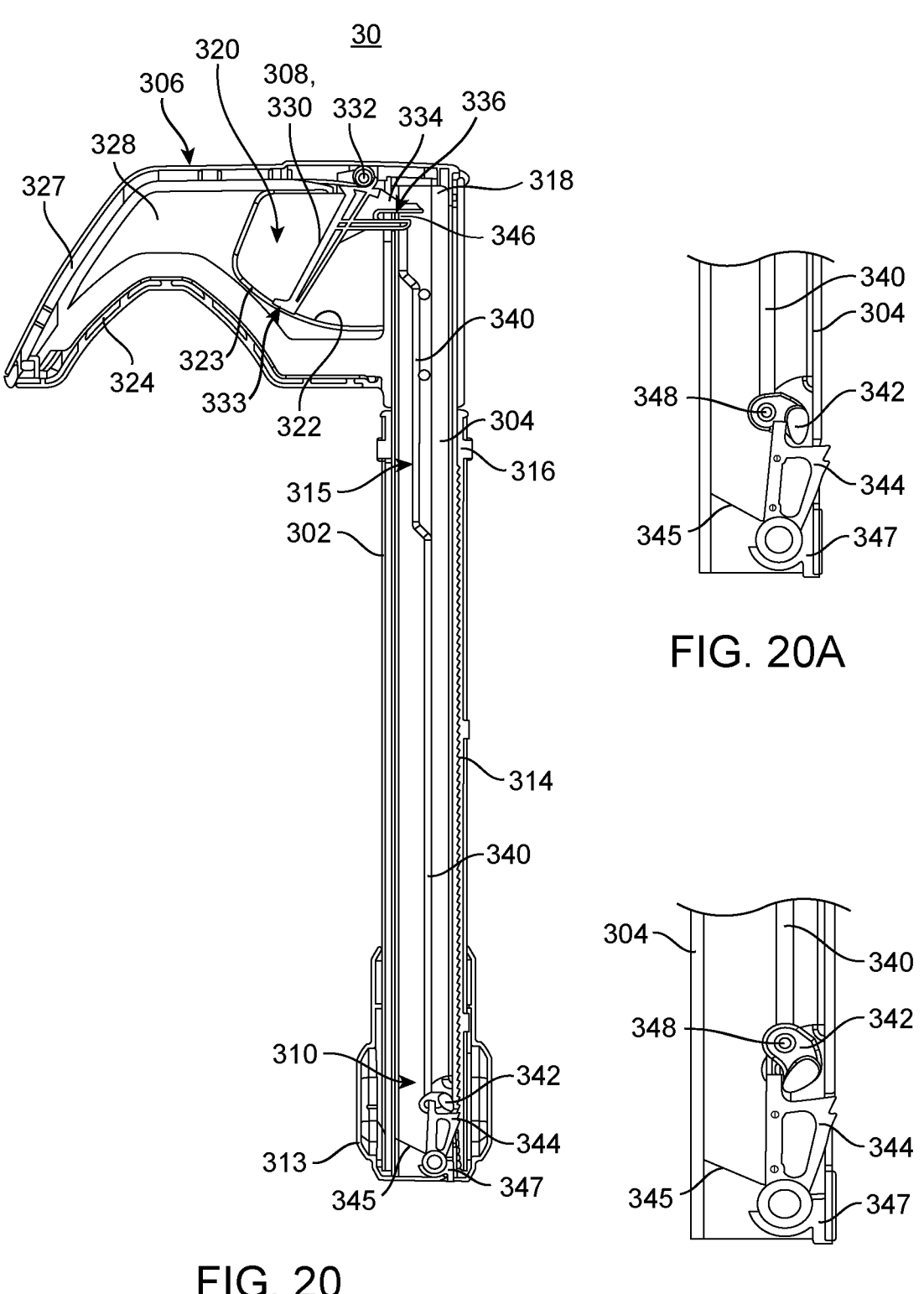
FIG. 20 illustrates a cross-section view of a wheel securement arm, according to an embodiment.
FIG. 20A illustrates a locking mechanism of a wheel securement arm, according to an embodiment.
FIG. 20B illustrates a locking mechanism of a wheel securement arm, according to an embodiment.

FIGS. 18-20 illustrate wheel securement arm 300 for use with load carrier system 100, according to an embodiment. Wheel securement arm 300 can be configured to secure wheel 110 of bicycle 102 to bicycle tray 106 of load carrier 100. Wheel securement arm 300 can be extended relative to bicycle tray 106 to accommodate different wheel 110 diameters. Although wheel securement arm 300 is shown as a stand-alone apparatus and/or system, the embodiments of this disclosure can be used with other apparatuses and/or systems, such as, but not limited to bicycle work stand 1000.

In some embodiments, wheel securement arm 300 can be configured to rotate into a securement position to secure wheel 110 to wheel holder 140 and/or bicycle tray 106. Wheel securement arm 300 can include housing 302, extendable portion 304, actuator housing 306, actuator 308, and/or locking mechanism 310 disposed in housing 302 and coupled to actuator 308, as shown, for example, in FIGS. 18-20. Housing 302 can be rotatably coupled to bicycle tray 106 and/or wheel holder 140, and can include hinge connector 312 and toothed surface 314 disposed on an interior of housing 302. Hinge connector 312 can be disposed at a proximal end 313 of housing 302. In some embodiments, hinge connector 312 can be coupled to bicycle tray 106 such that wheel securement arm 300 rotates relative to bicycle tray 106 and is fixed in position along bicycle tray 106. In some embodiments, hinge connector 312 can be coupled to wheel holder 140 such that wheel securement arm 300 is configured to translate with wheel holder 140 along bicycle tray 106 and rotate relative to bicycle tray 106. In some embodiments, an aperture 315 is formed in a distal end 316 of housing 302 and configured to receive extendable portion 304. In some embodiments, housing 302 can be inserted into an aperture formed in extendable portion 304.

In some embodiments, extendable portion 304 can be received in aperture 315 of housing 302 and be configured to be moved between an extended position 20 and a retracted position 30 as shown, for example, in FIGS. 18 and 20. In some embodiments, extendable portion 304 can be moved and fixed relative to housing 302 in any position between extended position 20 and retracted position 30. Extendable portion 304 can be moved to the extended position 20 in anticipation of load a bicycle 102. Extendable portion 304 can be translated in housing 302 toward the retracted position 30 until actuator housing contacts wheel 110 to secure wheel 110 to bicycle tray 106. In some embodiments, actuator 308 and locking mechanism 310 can control movement of extendable portion 304 such that extendable portion 304 can move freely in the direction from the extended position 20 to the retracted position 30. However, in some embodiments, locking mechanism 310 prevents movement of extendable portion 304 in the direction from the retracted position 30 to the extended position 20, unless actuator 308 is operated to release locking mechanism 310.

In some embodiments, actuator housing 306 couples to a distal end 318 of extendable portion 304 and moves therewith between the extended position 20 and the retracted position 30 as shown, for example, in FIGS. 18-20. In some embodiments, actuator housing 306 includes wheel contact portion 324, grip portion 326, structural portion 327, and central portion 328. In the illustrative embodiment shown in FIG. 19, actuator recess 320 is formed through central portion 328, and arcuate edge 322 extends along an edge of actuator recess 320. In some embodiment, arcuate edge 322 can have a radius with center point at actuator pivot 332. In some embodiments, actuator recess 320 is the only aperture extending through central portion 328 and actuator housing 306. Wheel contact portion 324 can be configured to contact wheel 110 when extendable portion 304 is moved from the extended position 20 towards the retracted position 30. Wheel contact portion 324 secures wheel 110 to bicycle tray 106 and/or wheel holder 140 and is shaped to accommodate a wheel 110 of bicycle 102. Grip portion 326 extends around extendable portion 304 adjacent to actuator recess and can include protrusions (e.g., bumps) to enhance the grip of a user (e.g., against a user's palm) when moving the wheel securement arm 300. In some embodiments, structural portion 327 can extend around a perimeter of actuator housing 306 and have a wider cross section than central portion 328, such that actuator housing 306 can have an I-beam cross-sectional shape for increased stiffness and strength. In some embodiments, wheel contact portion 324 can be coupled to structural portion 327 along a bottom edge of actuator housing 306. Wheel contact portion 324 can be configured to be flexible and compress to provide improved contact with wheel 110 when wheel securement arm 300 secure wheel 110. In some embodiments, actuator housing 306 can be made from plastic. In some embodiments, actuator housing 306 can be made from metal.

Figure 20C:
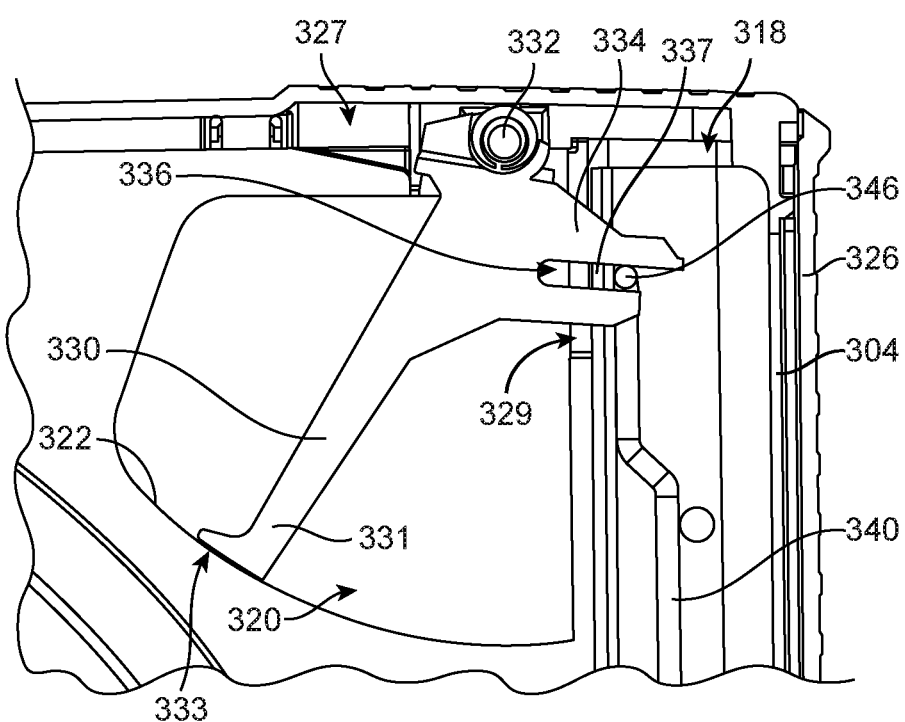
FIG. 20C illustrates an actuator and a locking mechanism of a wheel securement arm, according to an embodiment.

In some embodiments, actuator 308 can be configured to operate locking mechanism 310. In some embodiments, actuator 308 can be disposed in actuator recess 320 as shown, for example, in FIGS. 18-20. This can be advantageous because actuator 308 is flush or recessed from external surfaces of actuator housing 306 such that actuator housing 306 provides protection to actuator 308 during use. In the illustrative example shown in FIGS. 19, 20, and 20C, actuator 308 can include a lever 330, an actuator pivot 332, and a linkage arm 334. In some embodiments, lever 330 can pivotally couple to actuator housing 306 via an actuator pivot 332. In some embodiments, actuator pivot 332 can couple adjacent to a top edge of actuator housing 306 in structural portion 327. In some embodiments, actuator pivot 332 can be positioned above distal end 318 of extendable portion 304. In some embodiments, actuator pivot 332 can be spaced apart from wheel contact portion 324 in a direction parallel to the length of extendable portion 304. In some embodiments, actuator pivot 332 can couple to a bottom edge of actuator housing 306, in structural portion 327, between wheel contact portion 324 and grip portion 326.

In some embodiments, as actuator 308 is pushed or pulled, for example, around actuator pivot 332, a distal end 331 of lever 330 moves along arcuate edge 322 of actuator housing 306. In some embodiments, arcuate edge 322 provides a track 323 that engages with a slot 333 at the distal end 331 of lever 330 to limit lateral movement of lever 330 and provide smoother operation of actuator 308. In some embodiments, linkage arm 334 can extend away from lever 330 and through an aperture 329 formed in grip portion 326. Linkage recess 336 can be formed through linkage arm 334 and configured to couple with a first end 346 of linkage 340 of locking mechanism 310. In the illustrative embodiment shown in FIGS. 20 and 20C, linkage recess 336 can be a slot 337 such that first end 346 of linkage 340 can be slideably disposed in linkage recess 336 and translate along the slot 337 as actuator 308 rotates. As lever 330 rotates about actuator pivot 332, linkage arm 334 translates linkage 340 towards distal end 318 of extendable portion 304 to disengage the locking mechanism 310. In some embodiments, actuator 308 includes a spring to bias lever 330 into a lock position to prevent movement of extendable portion 304 relative to housing 302.

Figure 63:
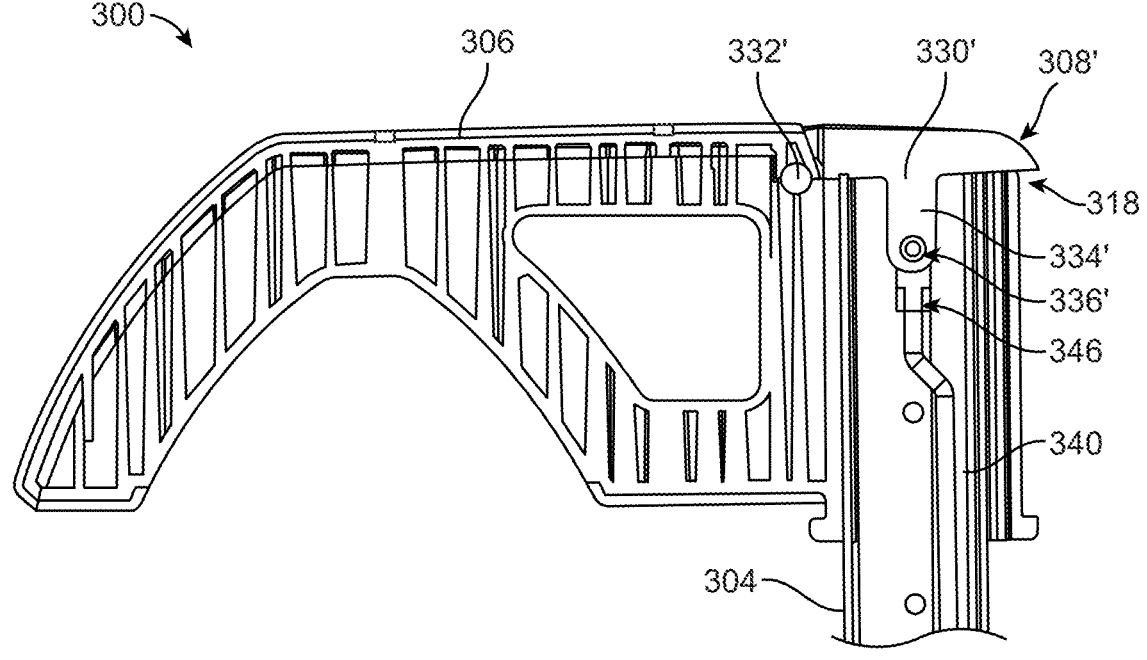
FIG. 63 illustrates a cutaway side view of an actuator housing of a wheel securement arm, according to an embodiment.

In some embodiment, actuator 308 can be a knob or button. In some embodiments, actuator 308 can be positioned on an external portion of actuator housing 306. In some embodiments, actuator 308 can be slideably coupled to actuator housing 306 such that translation of actuator 308 operates locking mechanism 310. In some embodiments, actuator housing 306 can include top and bottom guide edges to translate actuator 308 linearly toward and away from grip portion 326. In the illustrative embodiment shown in FIG. 63, actuator 308' includes a button 330' pivotally coupled to actuator housing 306 via actuator pivot 332', a linkage arm 334', and a linkage aperture 336' formed in linkage arm 334' and configured to couple to first end 346 of linkage 340. Button 330' can be disposed at distal end 318 of extendable portion 304 and configured to push or pull linkage 340 to engage or disengage locking mechanism 310. In some embodiments, lever 330 can have a U-shape and extend around grip portion 326 and away from actuator housing 306 and be configured to pivot around actuator pivot 332 disposed on the opposite side of grip portion 326.

Figure 20D:
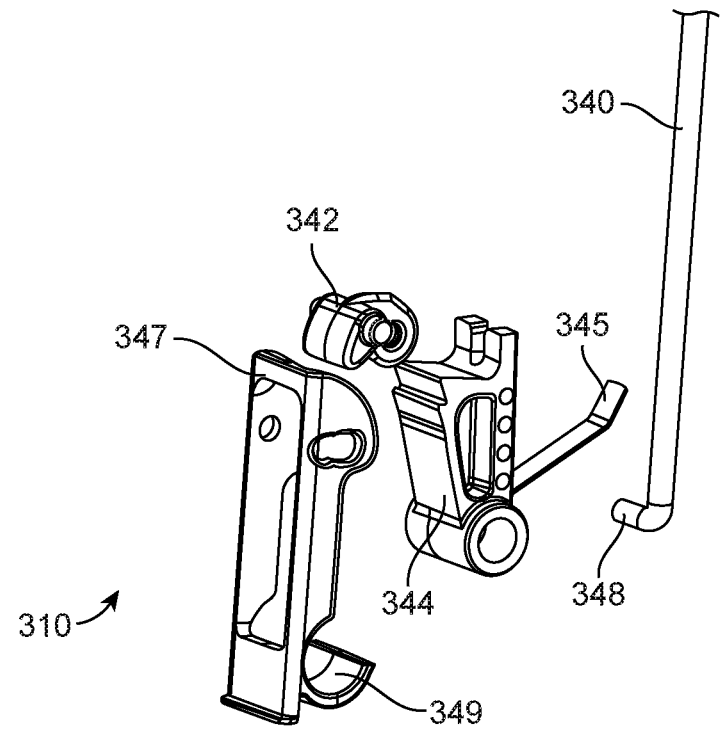
FIG. 20D illustrates an exploded perspective view of a locking mechanism, according to an embodiment.

In some embodiments, locking mechanism 310 can be configured to engage toothed surface 314 in or on housing 302 and can be operated by actuator 308 as shown for example in FIGS. 20-20D. In some embodiments, locking mechanism 310 can include linkage 340, rocker 342, ratchet member 344, spring 345, and cassette 347. Linkage 340 can be disposed in an interior cavity of extendable portion 304 and can include first end 346 coupled to actuator 308, and second end 348 coupled to rocker 342. Linkage 340 can be configured to translate movement of the actuator 308 into linear movement up and down the extendable portion 304 and move rocker 342. In the illustrative embodiment shown in FIGS. 20 and 20D, first end 346 of linkage 340 is disposed in linkage recess 336 such that actuator 308 pulls linkage 340 towards distal end 318 of extendable portion 304. In some embodiments, linkage 340 can be a wire or rod. In some embodiments, actuator 308 can push linkage 340 away from distal end 318 of extendable portion 304. Rocker 342 can rotatably couple to cassette 347 and be configured to translate linear movement from linkage 340 to rotational movement. Ratchet member 344 can be disposed in a cradle portion 349 of cassette 347 and configured rotate in cradle portion 349 to move between engagement and disengagement with toothed surface 314 on housing 302. In some embodiments, ratchet member 344 can be rotatable coupled to cassette 347 via a pin. In some embodiment, spring 345 can couple to ratchet member 344 and bias against an opposite side of the interior cavity of extendable portion 304 to bias ratchet member 344 into engagement with toothed surface 314. Cassette 347 can couple to an interior surface of extendable portion 304. Actuator 308 can rotate and translate linkage 340, which in turn can rotate rocker 342. Rocker 342 can rotate about cassette 347 and engage ratchet member 344 to rotate ratchet member 344 in cradle portion 349 against the biasing force of spring 345. Ratchet member 344 can then lift away from toothed surface 314, thereby releasing locking mechanism 310 and allowing extendable portion 304 to move from the retracted configuration 30 to the extended configuration 20.

Example Load Carrier Accessory

FIGS. 21-24 illustrate load carrier accessory 450 removably coupled to load carrier system 400, according to embodiments. Load carrier accessory 450 can be a stand-alone component that can be assembly to and fixed with vehicle load carrier 400 without the use of tools. Carrier accessory can couple to load carrier 400 for carrying a load behind a vehicle, such as a storage box, a cooler, a grill, or a bicycle 102, like load carrier system 100. Although load carrier accessory 450 is shown in FIGS. 21-24 as a stand-alone system, the embodiments of this disclosure can be used with other apparatuses and/or systems, such as, but not limited to load carrier system 100, extension strap system 200, wheel securement arm 300, bumper accessory 600, cable management member 700, vehicle information device 800, assembly system 900, bicycle work stand 1000, coupling mechanism 1100 and 1600, locking mechanism 1200, wheel assembly 1300, wall mount 1400, and tilt-release actuation mechanism 1500.

In some embodiments, load carrier system 400 can be substantially similar to load carrier 100 and include a base 404 that couples to a vehicle and a support arm 406 as shown, for example, in FIGS. 21-24. In some embodiments, base 404 can extend in the direction of travel of the vehicle and be configured to pivot relative to the vehicle between an in-use position and a storage/upright position. Support arm 406 can couple to base 404 and extend, for example, in a perpendicular direction away from base 404 along a lateral axis 430. Support arm 406 can be configured to support and secure a load (e.g., bicycle 102) and couple to base 404. Support arm 406 can extend on both sides of base 404. Support arm 406 can extend between first end 432 and second end 434, and include upper surface 480, lower surface 482, and side surfaces 484. In some embodiments, grooves 438 are formed in the side surfaces 484 of support arm 406 and configured to receive coupling elements of carrier accessory 450 and other carrier accessories such as wheel holder 140 and/or wheel support 170 as described in more detail above with respect to load carrier 100.

Figure 21:
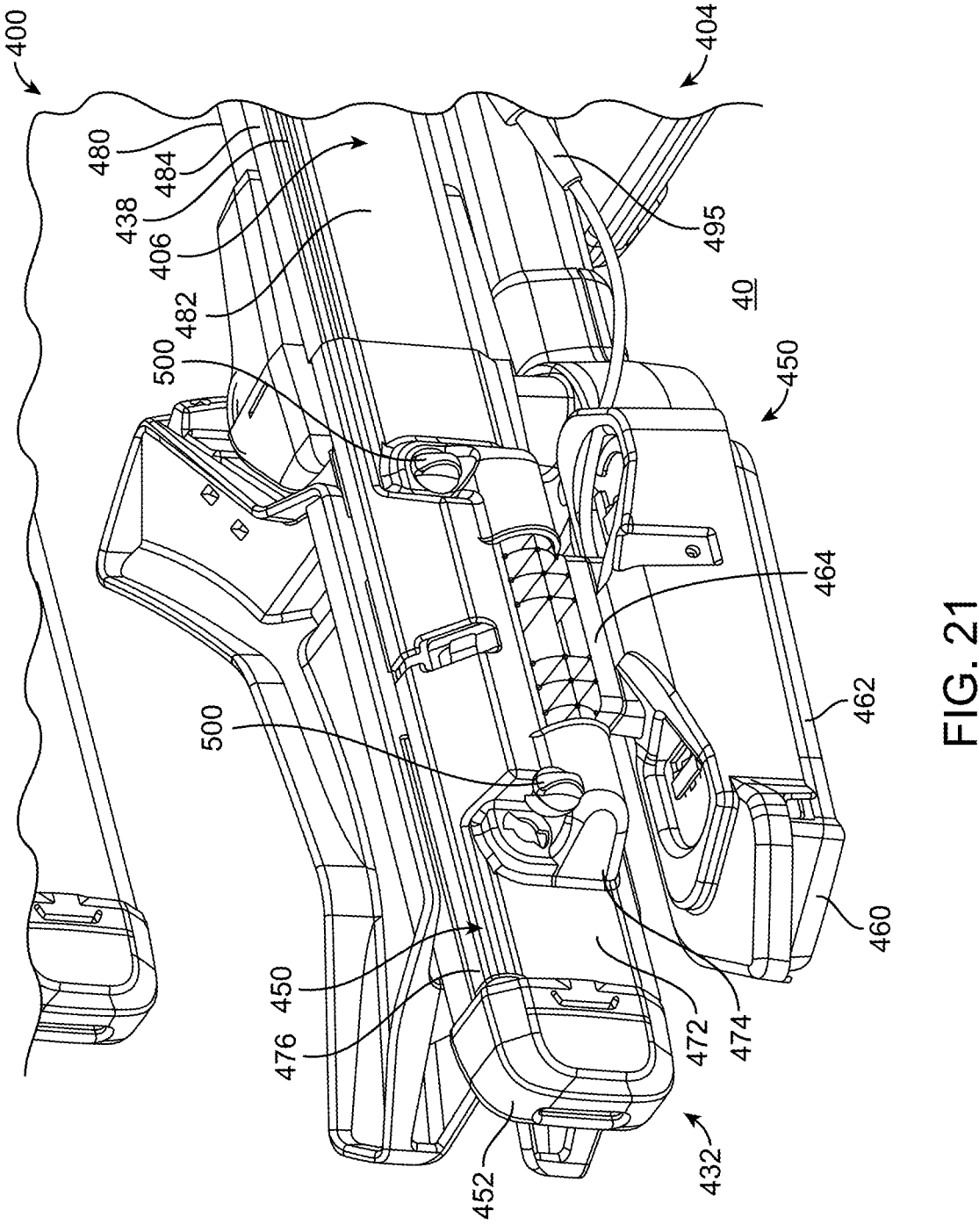
FIG. 21 illustrates a bottom perspective view of a carrier accessory of a load carrier, according to an embodiment.
Figure 22:
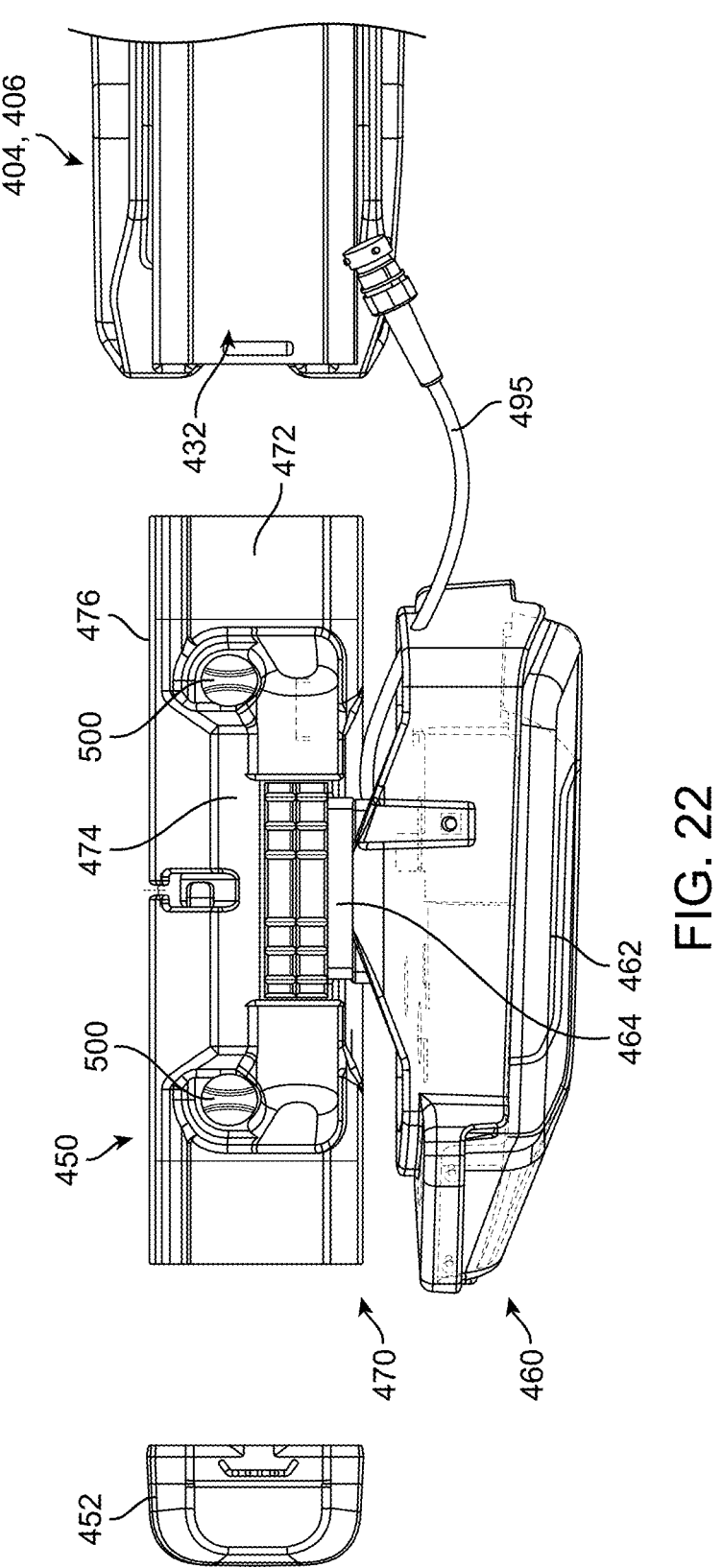
FIG. 22 illustrates a bottom exploded view of a carrier accessory of a load carrier, according to an embodiment.

In some embodiments, carrier accessory 450 can be a vehicle information device (e.g. a light assembly, a license plate holder) as shown, for example, in FIGS. 21 and 22. In some embodiments, carrier accessory 450 can include a vehicle information portion 460 and an attachment portion 470 rotatably coupled with vehicle information portion 460 and configured to couple with support arm 406. In some embodiments, attachment portion 470 can couple with base 404. Vehicle information portion 460 can be configured to rotate relative to attachment portion 470 and support arm 406 such that vehicle information portion 460 maintains an orientation relative to vehicle when base 404 is pivoted between the in-use and storage positions. In the illustrative embodiment shown in FIG. 21, vehicle information portion 460 is in a first position 40 when base 404 is in the in-use position, such that vehicle information portion 460 can be orientated rearwards relative the vehicle. In some embodiments, vehicle information portion 460 can be rotated through approximately 90 degrees into a second position when base 404 is in the storage/upright position, such that vehicle information portion 460 maintains the rearward orientation relative to the vehicle.

In some embodiments, vehicle information portion 460 can rotatably couple to attachment portion 470 and include identification device 462 and adjustment plate 464 as shown, for example, in FIG. 21. In the illustrative embodiment shown in FIG. 21, identification device 462 can be a light assembly configured to illuminate vehicle conditions (e.g., braking, turn signaling, reversing, etc.). In some embodiments, identification device 462 can be a license plate holder, a warning sign, or any other suitable vehicle identifying feature. Adjustment plate 464 can extend away from identification device 462 and rotatably couple to attachment portion 470.

Figure 21A:
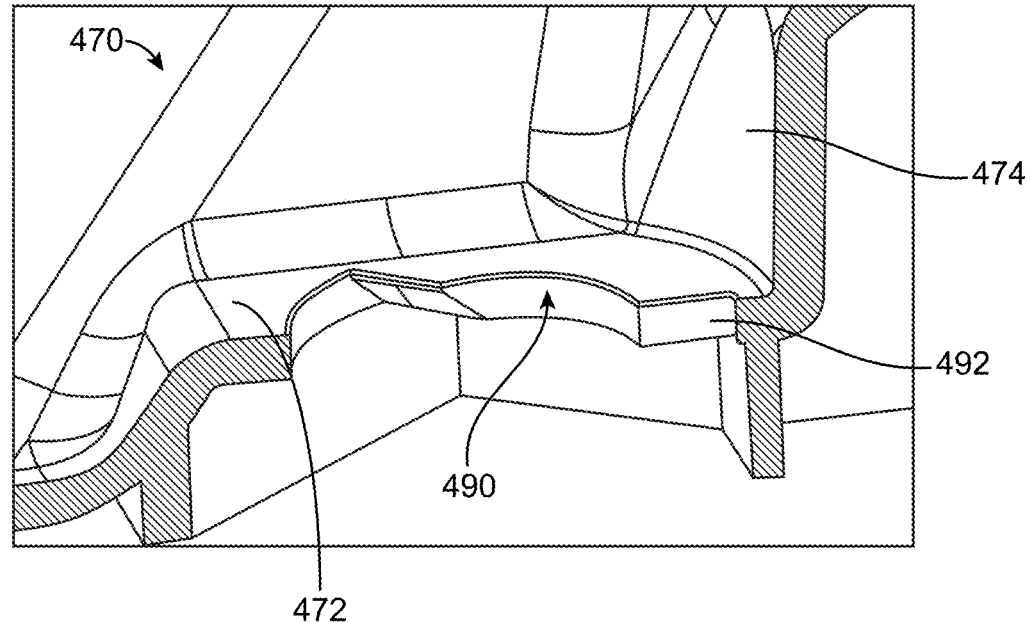
FIG. 21A illustrates a partial perspective view of a connector aperture in the carrier accessory shown in FIG. 21, according to an embodiment.

In some embodiments, attachment portion 470 can be slideably coupled to support arm 406 and fixed in position without use of tools. Attachment portion 470 can include cover 472, hinge housing 474, sidewalls 476, and/or coupling arms 478 as shown, for example, in FIGS. 21-24. Hinge housing 474 extends away from cover 472 and receives adjustment plate 464 of vehicle information portion 460 such that a hinge portion of adjustment plate 464 rotates within hinge housing 474. Cover 472 can be substantially flat and/or follow the contour shape of support arm 406. In the illustrative embodiment shown in FIGS. 21-24, cover 472 assembles adjacent to lower surface 482 of support arm 406 and has similar contoured shape across the width of support arm 406. In some embodiments, cover 472 can assemble adjacent to upper surface 480 of support arm 406. Connector aperture 490 can be formed through cover 472 and configured to receive connector 500, as will be described in more detail below and shown, for example, in FIG. 21A. In the illustrative embodiment shown in FIGS. 21 and 22, two connector apertures 490 are formed in cover 472, one on either side of hinge housing 474. In some embodiments, more than two connector apertures can be formed through cover 472. Sidewalls 476 extend approximately perpendicular to cover 472 at opposite edges and extend approximately parallel to side surfaces 484 of support arm 406. Coupling arms 478 extend inwardly from distal ends of sidewalls 476 and are configured to be received by grooves 438 to couple therewith. Coupling arms 478 can slide within grooves 438 and along support arm 406 to a desired position of the user.

In some embodiments, end cap 452 can be disposed at first end 432 of support arm 406 as shown, for example, in FIG. 21. End cap 452 prevents dirt, debris, water, etc. from entering the interior cavity of support arm 406 and provides a stop such that carrier accessory 450 cannot slide out of grooves 438. In some embodiments, carrier accessory 450 can include a cable 495 to provide power to vehicle information portion 460 and send electrical and/or mechanical signals to vehicle information portion 460 as shown, for example, in FIGS. 21 and 22. For example, carrier accessory 450 can be a light assembly, and cable 495 can provide an electrical signal to switch on a brake light or turn signal in the carrier accessory 450. Cable 495 can extend away from carrier accessory 450 and toward base 404 in cable management member 700 as will be described in more detail below.

An exploded view of an assembly sequence of coupling carrier accessory 450 to support arm 406 as shown, for example, in FIG. 22. To assembly carrier accessory 450 to support arm 406, end cap 452 can be removed from first end 432 of support arm 406. Carrier accessory 450 can be aligned with support arm 406 such that coupling arms 478 align with grooves 438. Grooves 438 receive coupling arms 478 and carrier accessory 450 can be slid along the lateral axis 430 onto support arm 406 and into a desired position of the user. In some embodiments, cover 472 can be adjacent to lower surface 482 such that carrier accessory can be disposed beneath support arm 406 in the in-use position. In some embodiments, cover 472 can be adjacent to upper surface 480 such that carrier accessory can be disposed above support arm 406 in the in-use position. In some embodiments, connectors 500 can be inserted and rotated in apertures 490 to exert a friction force against a surface 480, 482 of support arm 406 and lock carrier accessory 450 in position on support arm 406. In the illustrative embodiment in FIG. 21, one connector 500 is shown in the assembled, locking position, and another connector 500 is shown spaced apart from carrier accessory 450 before being assembled with load carrier 400. End cap 452 can be coupled to first end 432 of support arm 406 to complete the assembly. In some embodiments, the same steps can be carried out to assemble a second carrier accessory 450, for example, to an opposite end of support arm 406 adjacent to second end 434.

In the illustrative embodiment shown in FIG. 21, carrier accessory 450 can be disposed adjacent to first end 432 of support arm 406. In some embodiments, carrier accessory 450 can be disposed adjacent to second end 434 of support arm 406. In some embodiments, a second carrier accessory 450 can be disposed adjacent to second end 434 such that load carrier 400 includes two carrier accessories at opposite ends of support arm 406 (e.g. two lighting devices at opposite ends to replicate vehicle lighting including turn signals adjacent to left and rights sides of a vehicle).

Example Securing Connector

Figure 24:
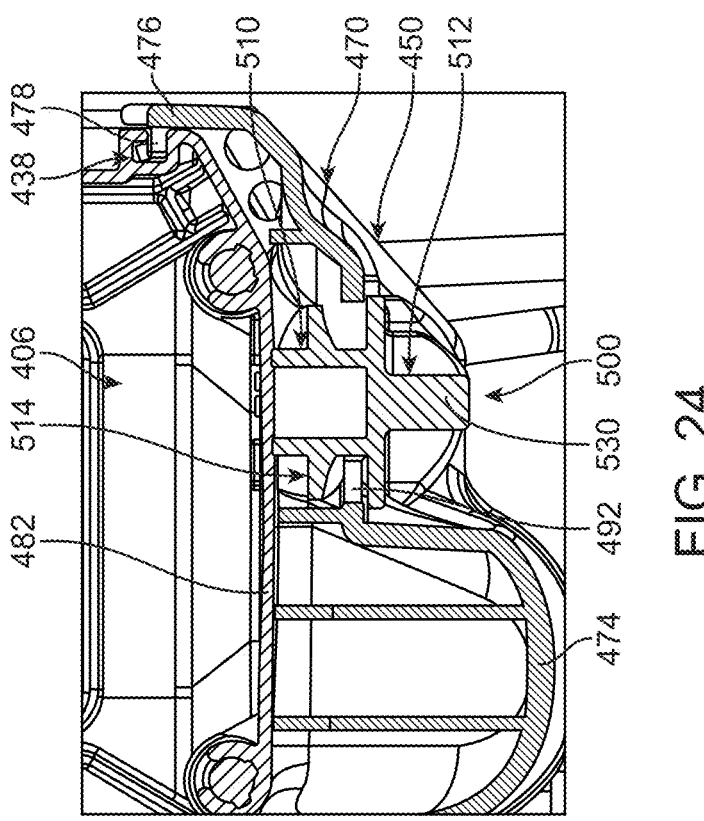
FIG. 24 illustrates a cross-sectional view of a carrier accessory of a load carrier, according to an embodiment.
Figure 23:
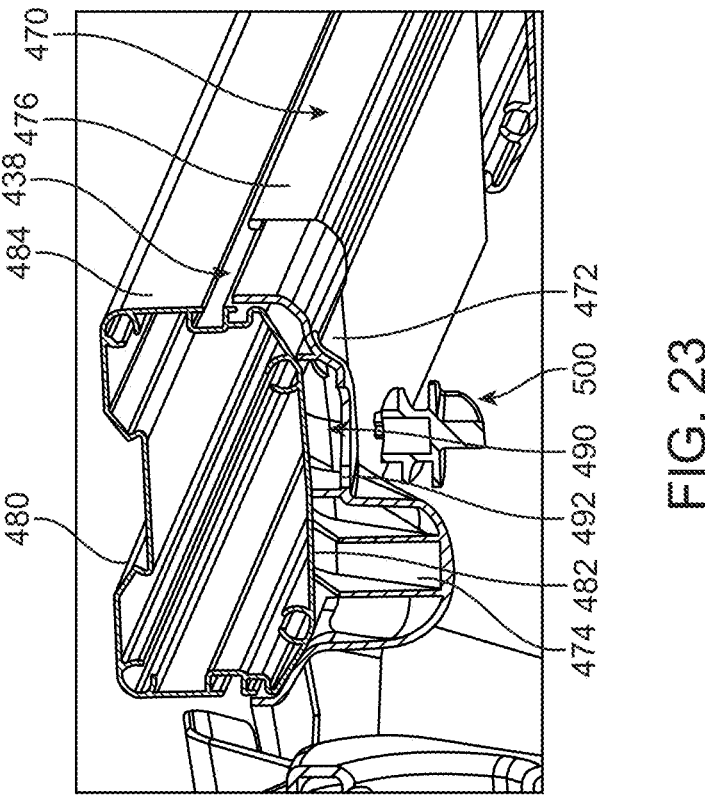
FIG. 23 illustrates a partial exploded cutaway perspective view of a carrier accessory of a load carrier, according to an embodiment.
Figure 25:
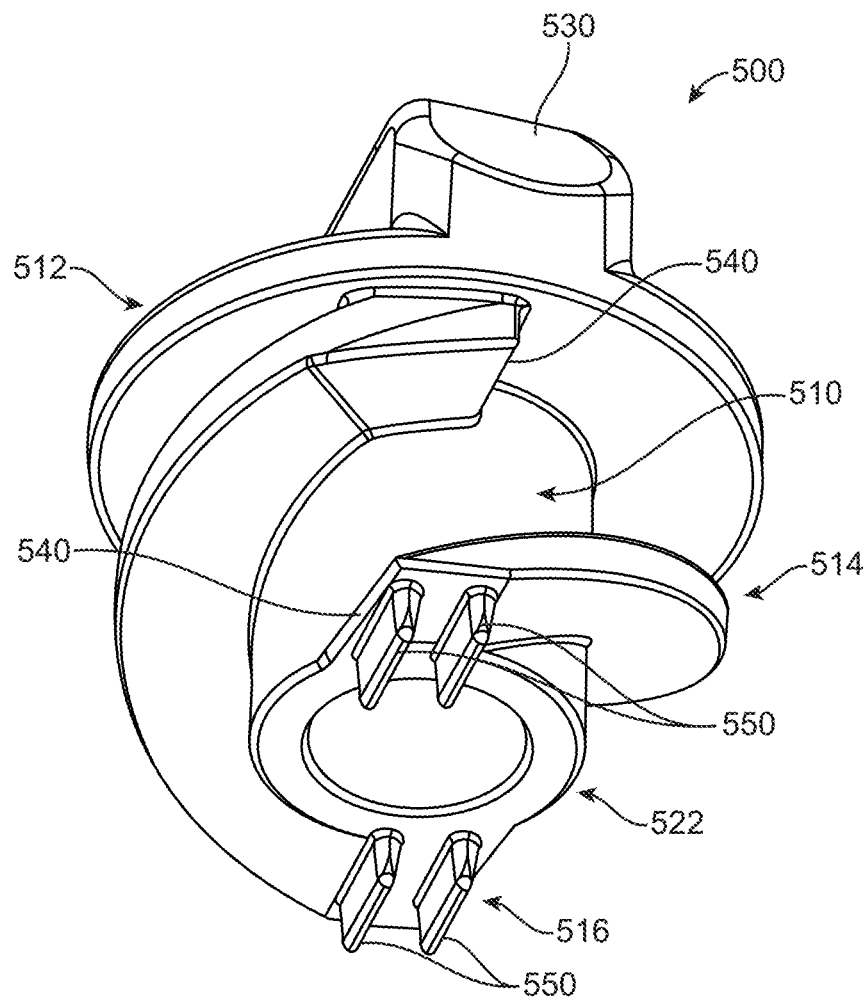
FIG. 25 illustrates a perspective view of a connector for a carrier accessory, according to an embodiment.

FIGS. 23-25 illustrate connector 500 that can be configured to secure carrier accessory 450 in position relative to support arm 406, according to embodiments. In some embodiments, connector 500 can be configured to secure wheel holder 140 to bicycle tray 106. In some embodiments, connector 500 can be a knob or lever and can be operated by a user without the use of tools to lock carrier accessory 450 in position relative to support arm 406. Although connector 500 is shown in FIG. 25 as a stand-alone system, the embodiments of this disclosure can be used with other apparatuses and/or systems, such as, but not limited to load carrier system 100, extension strap system 200, wheel securement arm 300, bumper accessory 600, cable management member 700, vehicle information device 800, assembly system 900, bicycle work stand 1000, coupling mechanism 1100 and 1600, locking mechanism 1200, wheel assembly 1300, wall mount 1400, and tilt-release actuation mechanism 1500.

In some embodiments, connector 500 can be a screw device and include a body 510, a head portion 512, a helical portion 514, and/or an engagement portion 516 as shown, for example, in FIGS. 23-25. Head portion 512 can be disposed at a distal end 520 of body 510. In some embodiments, head portion 512 can have a larger diameter than body 510 such that head portion 512 overlaps with cover 472 when body 510 is received in aperture 490. Head portion 512 can include a user protrusion 530 that extends away from body 510. User protrusion 530 can have an ergonomic shape such that a user can grip and rotate connector 500. In some embodiments, user protrusion 530 can be a lever configured to contact a surface 480, 482 when connector 500 engages support arm 406.

In some embodiments, helical portion 514 extends around and along at least a portion of body 510 between distal end 520 and a proximal end 522 of body 510. In the illustrative embodiment shown in FIG. 25, helical portion 514 includes two helices spaced apart by 180 degrees. In some embodiments, helical portion 514 can include more than two helices equally spaced apart around the circumference of body 510 and extending approximately 180 degrees around body 510. In some embodiments, helical portion 514 contacts and engagement arm 492 of cover 472 when body 510 is inserted through aperture 490. In some embodiments, helical portion 514 engages with engagement arm 492 of cover 472 to translate connector 500 toward and away from support arm 406 when connector 500 is rotated in aperture 490. In some embodiments, helical portion 514 includes a stop 540 configured to engage engagement arm 492 of cover 472 and prevent over-rotating connector 500 relative to carrier accessory 450 or to provide a snap-in function when stop 540 of helical portion 514 contacts engagement arm 492 of cover 472. Engagement arm 492 is illustratively shown in FIG. 21A. In some embodiments, stop 540 engages engagement arm 492 in the second position. In some embodiments, contact between stop 540 and engagement arm 492 can generate friction therebetween to lock connector 500 relative to cover 472 such that a predetermined amount of force is needed to overcome the friction and rotate connector 500 from the second position to the first position.

In some embodiments, engagement portion 516 can be disposed at proximal end 522 of body 510 and at terminating ends of helical portion 514. Engagement portion 516 can include one or more protrusions 550 configured, for example, to engage a surface 480, 482 of support arm 406. In the illustrative embodiment in FIG. 25, engagement portion 516 includes two protrusions 550 at the terminating ends of each helix in helical portion 514. In some embodiments, protrusions 550 can be made from a flexible material that can deform upon contact with an adjacent surface. In some embodiments, protrusions 550 can be made from a thermoplastic elastomer (TPE).

In some embodiments, connector 500 can be rotated between a first position and second position to engage and disengage from a surface 480, 482 of support arm 406 to lock or release carrier accessory 450 relative to support arm 406. In some embodiments, connector 500 can rotate through about 180 degrees between the first position and the second position. In some embodiments, engagement arm 492 and/or stop 540 can be positioned to limit rotation of connector 500 to 180 degrees between the first position and the second position. In some embodiments, connector 500 can rotate through a desired rotation, between about 45 degree and about 360 degrees, between the first position and the second position. In the first position, protrusions 550 can be spaced apart from surface 480, 482 of support arm 406 such that carrier accessory can slide along support arm 406 or be disassembled and removed from load carrier 400. In the second position, protrusions 550 can contact surface 480, 482 of support arm 406 and exert a frictional force therebetween such that carrier accessory 450 can be locked in position relative to support arm 406. A user can rotate connector 500, clockwise or counter-clockwise, such that helical portion 514 contacts engagement arm 492 to translate connector 500 toward or away from surface 480, 482 of support arm 406. In the illustrative embodiment shown in FIG. 25, clockwise rotation of connector 500 translates protrusions 550 towards support arm 406 and into the locked configuration, and counter-clockwise rotation of connector 500 translates protrusions 550 away from support arm 406 and into a released configuration.

Example Bumper System

FIGS. 35-38 illustrate protection arm 600, according to embodiments, that can couple to support arm 406 or base 404 and extend away from support arm 406 or base 404 to provide a first contact point with the ground. Protection arm 600 protects components or features of load carrier 400 that hang or extend from load carrier 400. For example, carrier accessory 450 can extend a first distance from support arm 406 and protection arm 600 can extend a second distance from support arm 406 longer than first distance, such that if load carrier 400 tilts towards the ground, protection arm 600 will contact the ground and carrier accessory will be spaced apart from the ground. Although protection arm 600 is shown in FIGS. 35-38 as a stand-alone system, the embodiments of this disclosure can be used with other apparatuses and/or systems, such as, but not limited to load carrier system 100, extension strap system 200, wheel securement arm 300, carrier accessory 450, connector 500, cable management member 700, vehicle information device 800, assembly system 900, bicycle work stand 1000, coupling mechanism 1100 and 1600, locking mechanism 1200, wheel assembly 1300, wall mount 1400, and tilt-release actuation mechanism 1500.

Figure 35:
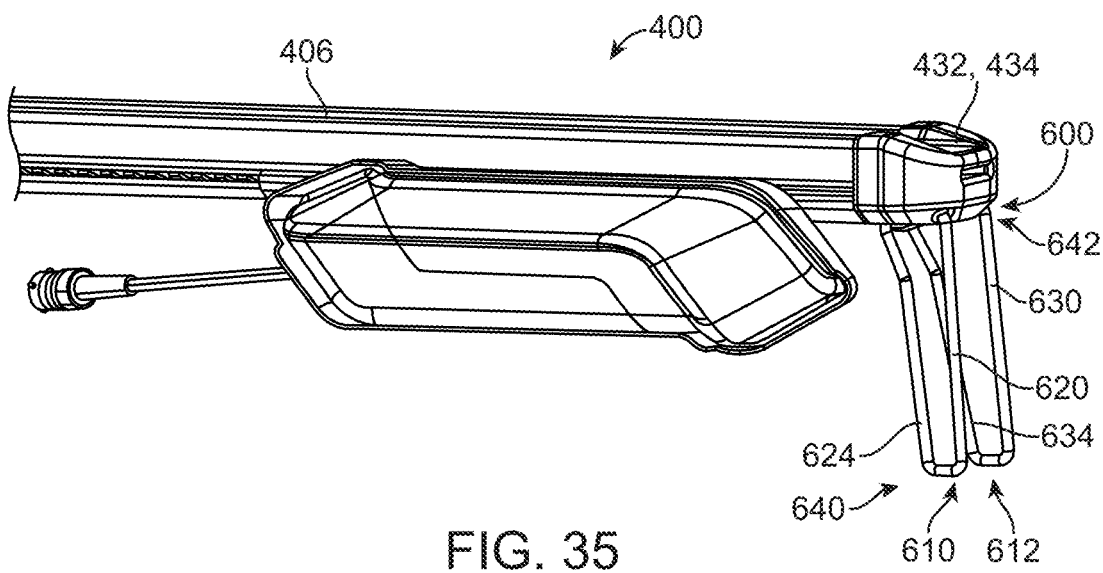
FIG. 35 illustrates a protection arm and a carrier accessory coupled to a support arm of a load carrier, according to an embodiment.
Figure 36:
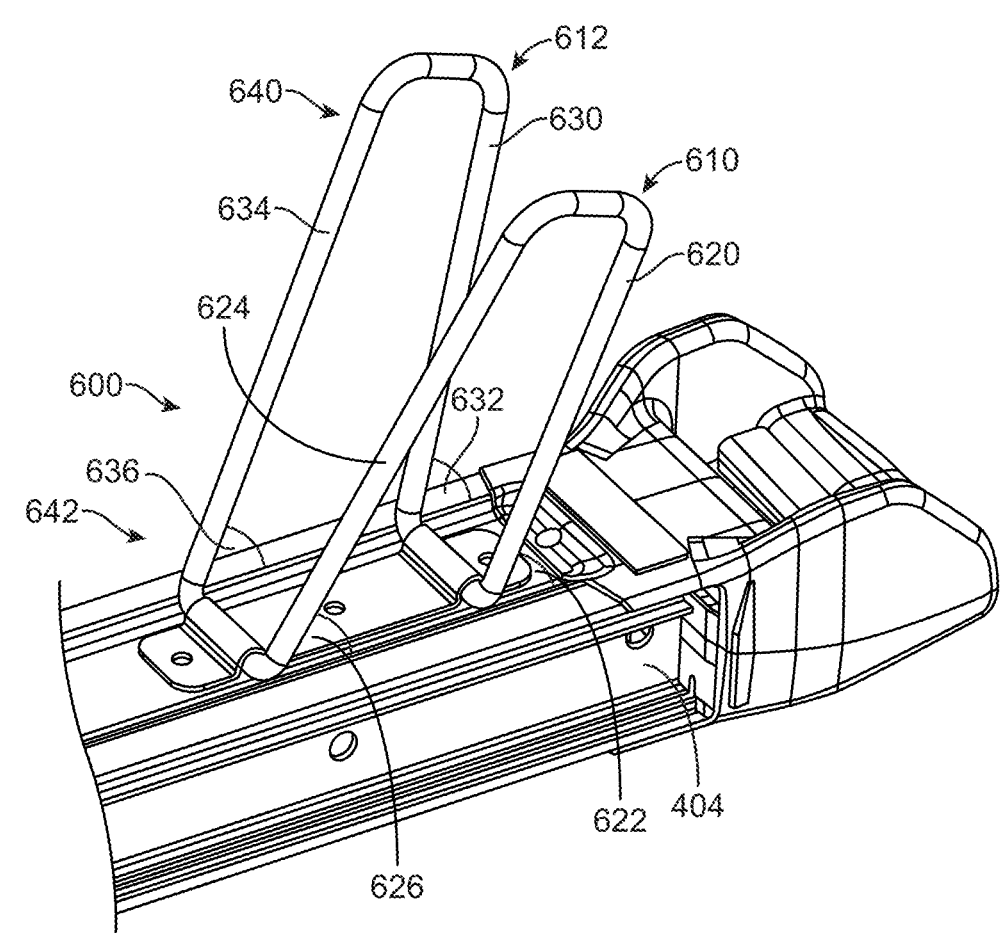
FIG. 36 illustrates a protection arm coupled to a support arm of a load carrier, according to an embodiment.
Figure 37:
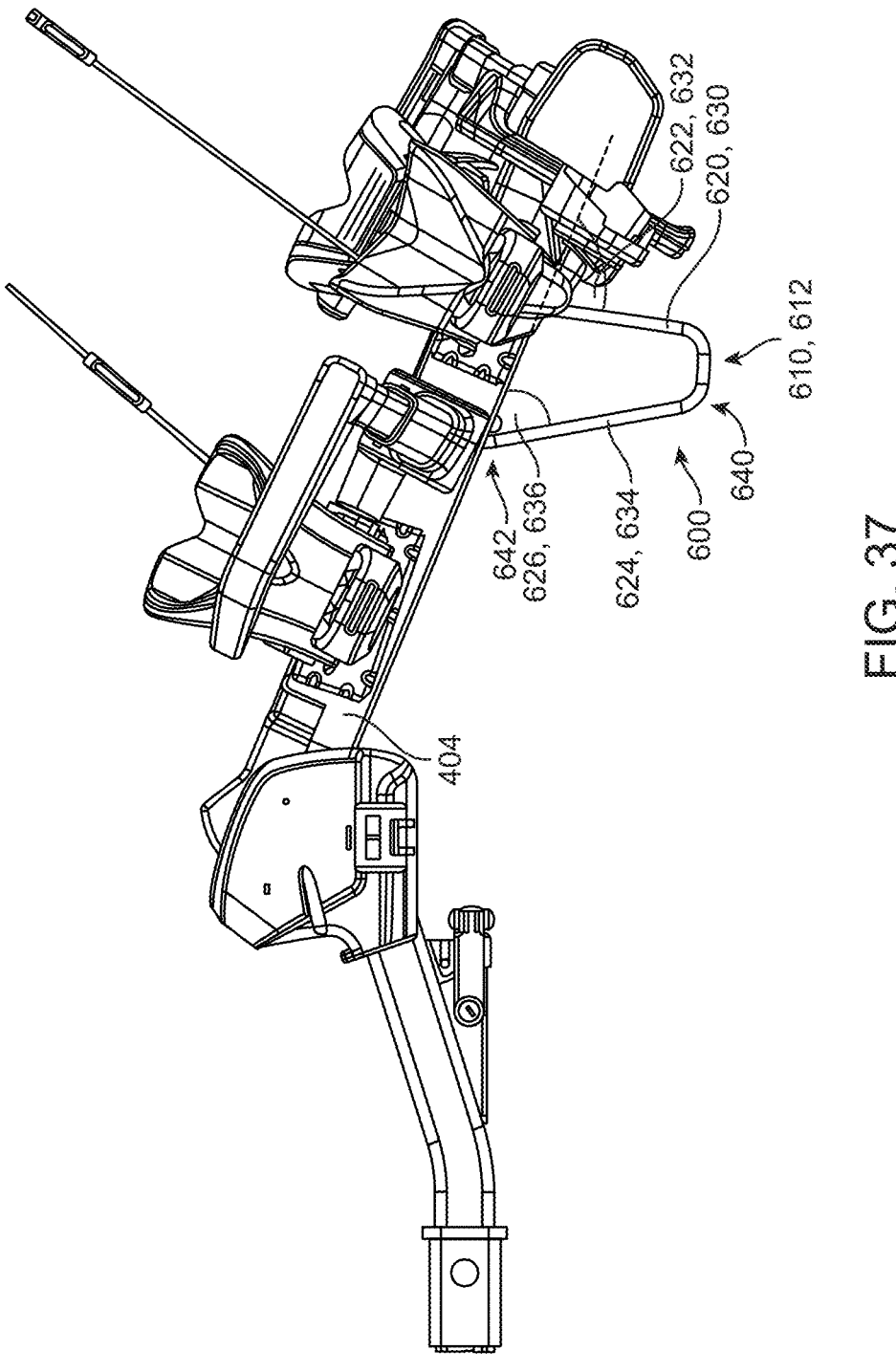
FIG. 37 illustrates a side view of a protection arm coupled to a load carrier in a tilted-down configuration, according to an embodiment.
Figure 38:
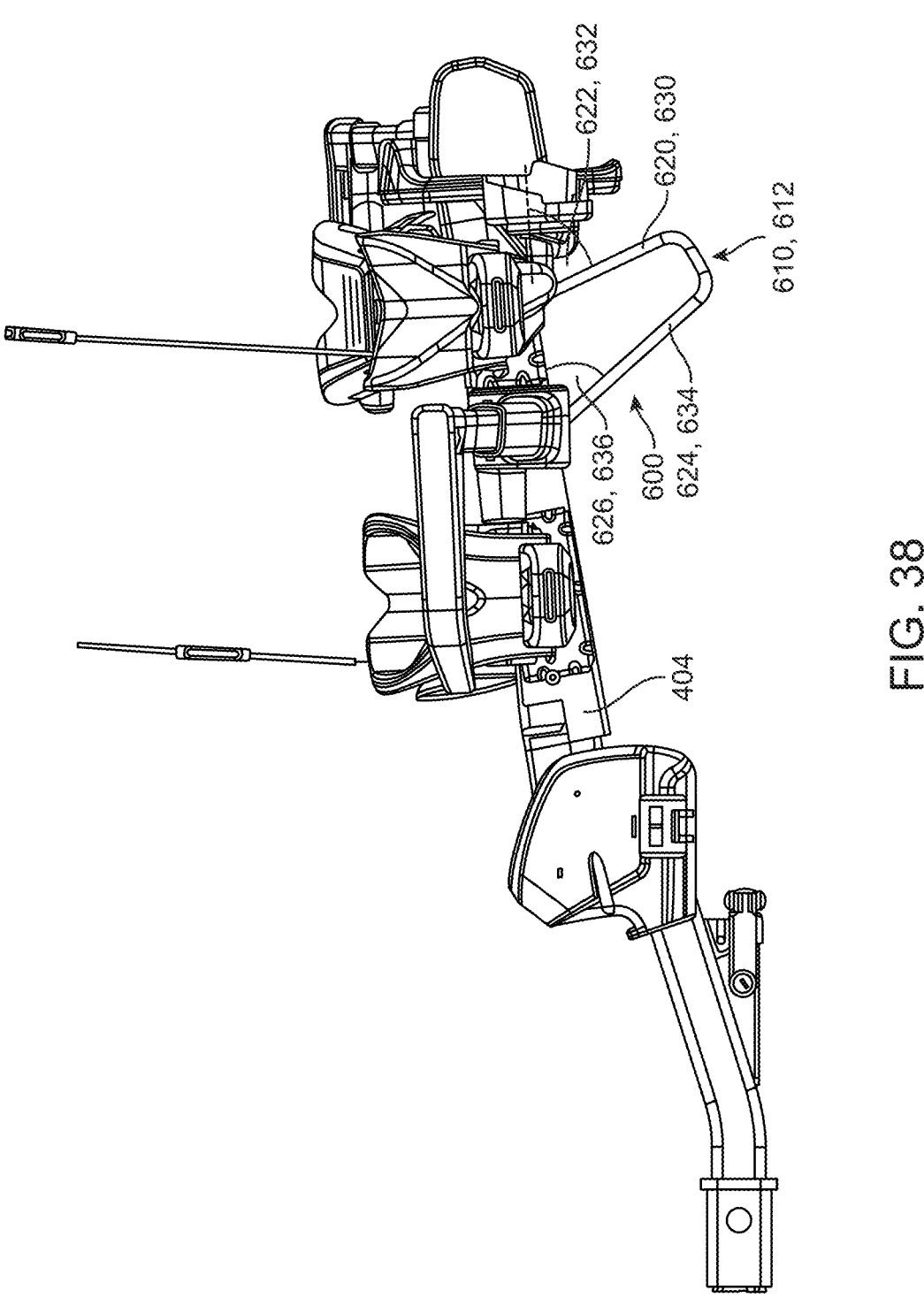
FIG. 38 illustrates a side view of the load carrier shown in FIG. 37 in an in-use configuration, according to an embodiment.

In some embodiments, protection arm 600 can be fixedly coupled with load carrier 400 and include first support 610 and second support 612 as shown for example in FIGS. 35 and 36. In some embodiments, first support 610 can be spaced apart from second support 612. In some embodiments, first and second supports 610, 612 can be spaced apart and receive wheel 110, 112 of bicycle 102 to support bicycle 102 in an upright position, such that first and second supports 610, 612 operate as a bicycle stand when the bicycle is on the ground. In some embodiments, protection arm 600 can include a single support 610. In some embodiments, first support 610 and second support can be integrally formed as a single component. In the illustrative embodiment shown in FIGS. 35 and 36, first support 610 and second support 612 are made from bar material and bent into the desired shape. In some embodiments, protection arm 600 can be spaced apart from the ground when the load carrier 400 is in an in-use configuration, as shown, for example, in FIG. 38. In some embodiments, protection arm 600 can contact the ground when the load carrier 400 tilts toward the ground, as shown, for example, in FIG. 37. In some embodiments, load carrier 400 can tilt toward the ground to provide access to a trunk or storage space of a vehicle.

In some embodiments, first support 610 includes first leg 620, extending at a first angle 622 relative to the support arm 406 or base 404, coupled with a second leg 624, extending at a second angle 626 relative to the support arm 406 or base 404. In some embodiments, first and second angles 622, 626 can be equal such that first and second legs 620, 624 extend parallel to one another. In some embodiments, first and second angles 622, 626 are different such that first and second legs 620, 624 are closer together at a ground-contacting portion 640 and further apart at a load carrier-coupling portion 642. In some embodiments, first angle 622 can be between about 45 degrees and about 90 degrees. In some embodiments, second angle 626 can be between about 45 degrees and about 90 degrees.

In some embodiments, second support 612 includes first leg 630, extending at a first angle 632 relative to the support arm 406 or base 404, coupled with a second leg 634, extending at a second angle 636 relative to the support arm 406 or base 404. In some embodiments, first and second angles 632, 636 can be equal such that first and second legs 630, 634 extend parallel to one another. In some embodiments, first and second angles 632, 636 are different such that first and second legs 630, 634 are closer together at a ground-contacting portion 640 and further apart at a load carrier-coupling portion 642. In some embodiments, first angle 632 can be between about 45 degrees and about 90 degrees. In some embodiments, second angle 636 can be between about 45 degrees and about 90 degrees.

In some embodiments, protection arm 600 can be coupled to different components of load carrier 400 and disposed in different locations around load carrier 400. In the illustrative embodiment shown in FIG. 35, protection arm 600 is coupled with end cap 452 and coupled at first or second end 432, 434 of support arm 406. In the illustrative embodiments shown in FIGS. 9-11, protection arm 600 is slideably coupled with bicycle tray 106 and spaced apart from first and second ends 132, 134. In some embodiments, protection arm can be slideably coupled to support arm 406 similarly to carrier accessory 450 and locked in position via connector 500. In the illustrative embodiment in FIGS. 36-38, protection arm 600 can be disposed at a distal end of base 404.

Example Cable Management System

Figure 44:
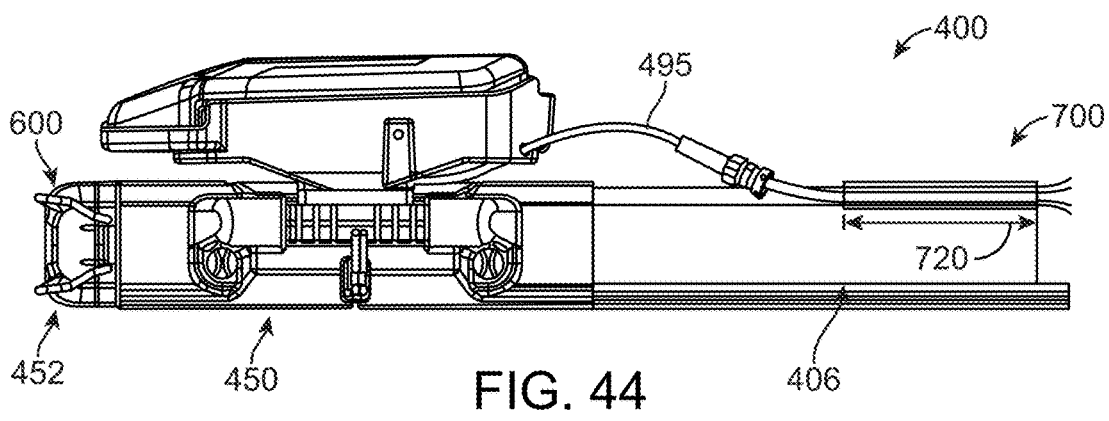
FIG. 44 illustrates a partial bottom view of a load carrier including a carrier accessory and cable management member, according to an embodiment.
Figure 45:
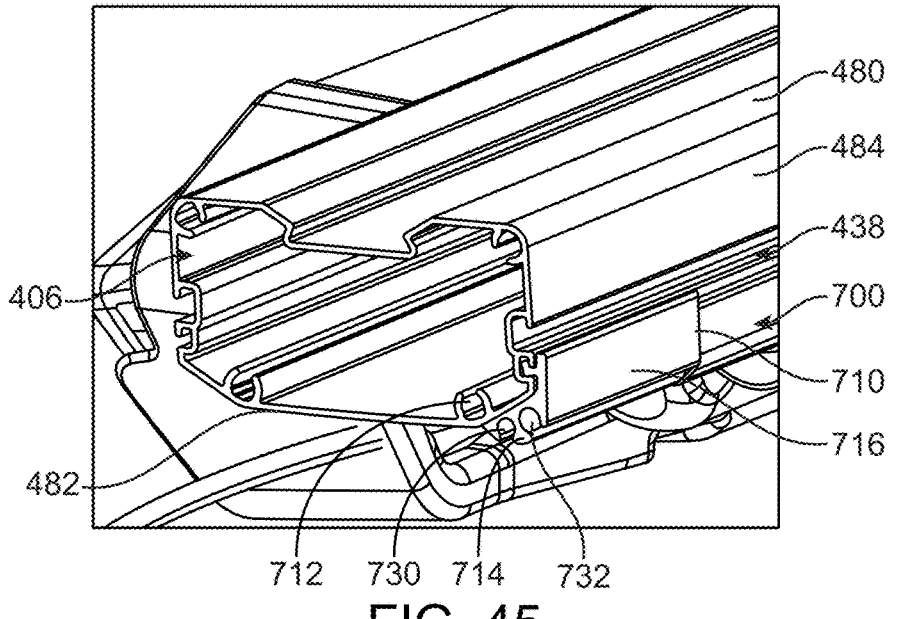
FIG. 45 illustrates a partial cutaway perspective view of the cable management member shown in FIG. 44 coupled to the load carrier, according to an embodiment.
Figure 46:
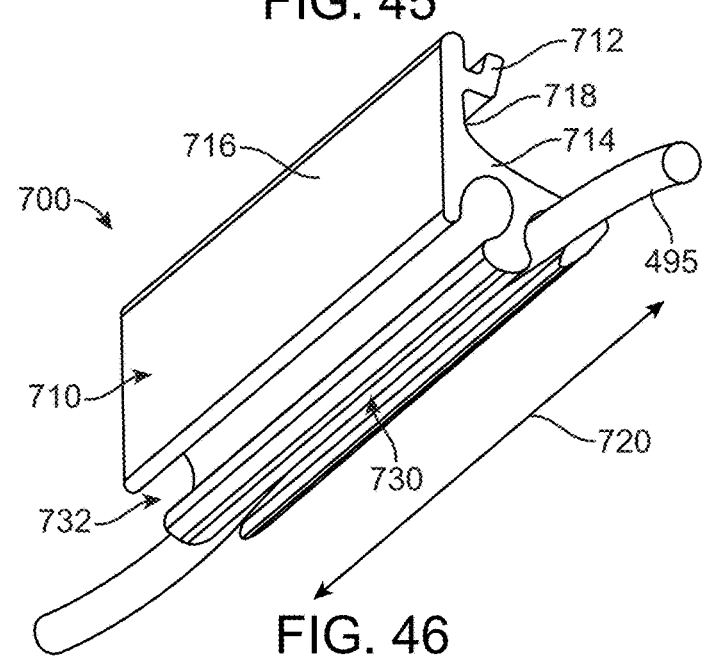
FIG. 46 illustrates a perspective view of a cable management member, according to an embodiment.

FIGS. 44-45 illustrate cable management member 700 configured to releasably couple cable 495 to support arm 406 and partially conceal cable 495, according to embodiments. In some embodiments, cable management member 700 can be configured to releasably couple cable 495 to base 404. Although cable management member 700 is shown in FIGS. 45 and 46 as a stand-alone system, the embodiments of this disclosure can be used with other apparatuses and/or systems, such as, but not limited to load carrier system 100, extension strap system 200, wheel securement arm 300, carrier accessory 450, connector 500, bumper accessory 600, vehicle information device 800, assembly system 900, bicycle work stand 1000, coupling mechanism 1100 and 1600, locking mechanism 1200, wheel assembly 1300, wall mount 1400, and tilt-release actuation mechanism 1500.

In some embodiments, cable management member 700 can be assembled adjacent to carrier accessory 450 and extend into grooves 438 formed in support arm 406 to couple therewith, as shown, for example, in FIGS. 44 and 45. In some embodiments, cable management member 700 can be coupled to either side or both sides of support arm 406. Cable management member 700 extends a length 720 along support arm 406 and includes body 710, coupling arm 712, and groove portion 714. Body 710 includes an external facing surface 716 and an internal facing surface 718 opposite external facing surface 716. In some embodiments, external facing surface 716 has a smooth finish and similar aesthetics to surfaces 480, 482, 484 of support arm 406. Coupling arm 712 can extend away from internal facing surface 718 and be configured to insert into grooves 438 in side surfaces 484 of support arm 406 to couple cable management member 700 to support arm 406. Groove portion 714 extends away from internal facing surface 718 and first and second grooves 730, 732 are formed in groove portion 714 along length 720 and extend parallel to one another. In some embodiments, groove portion 714 extends parallel with body 710. First and second grooves 730, 732 are configured to receive cable 495 and at least partially conceal cable 495 along length 720.

In some embodiments, cable management members 700 can made from extruded TPE. In some embodiments, cable management member 700 can be made of a deformable material (e.g., TPE) such that grooves 730, 732 can deform and open so that cable 495 can be pressed into grooves 730, 732, and close to frictionally clamp and retain cable 495 in grooves 730, 732. In some embodiments, cable management member 700 can slide in grooves 438 of support arm 406. In some embodiments, cable management members 700 are assembled in sequence with and before carrier accessory 450 and end cap 452 and disposed between carrier accessory 450 and base 404. In some embodiments, a first end of coupling arm 712 can be inserted into grooves 438 and then rotated to hook and couple cable management member 700 to support arm 406. In some embodiments, cable management member 700 extend around a contoured shape of support arm 406. In some embodiments, friction between coupling arms 712 and grooves 438 prevent cable management member 700 from sliding within grooves 438 after installation/assembly. In some embodiments, length 720 of cable management member 700 extends between carrier accessory 450 and base 404. In some embodiments, length 720 is less that a distance between carrier accessory 450 and base 404, and a plurality of cable management members can be assembled adjacent to one another between carrier accessory 450 and base 404 to couple cable 495 between carrier accessory 450 and base 404.

Example Vehicle Identification with Hinge

Figure 27:
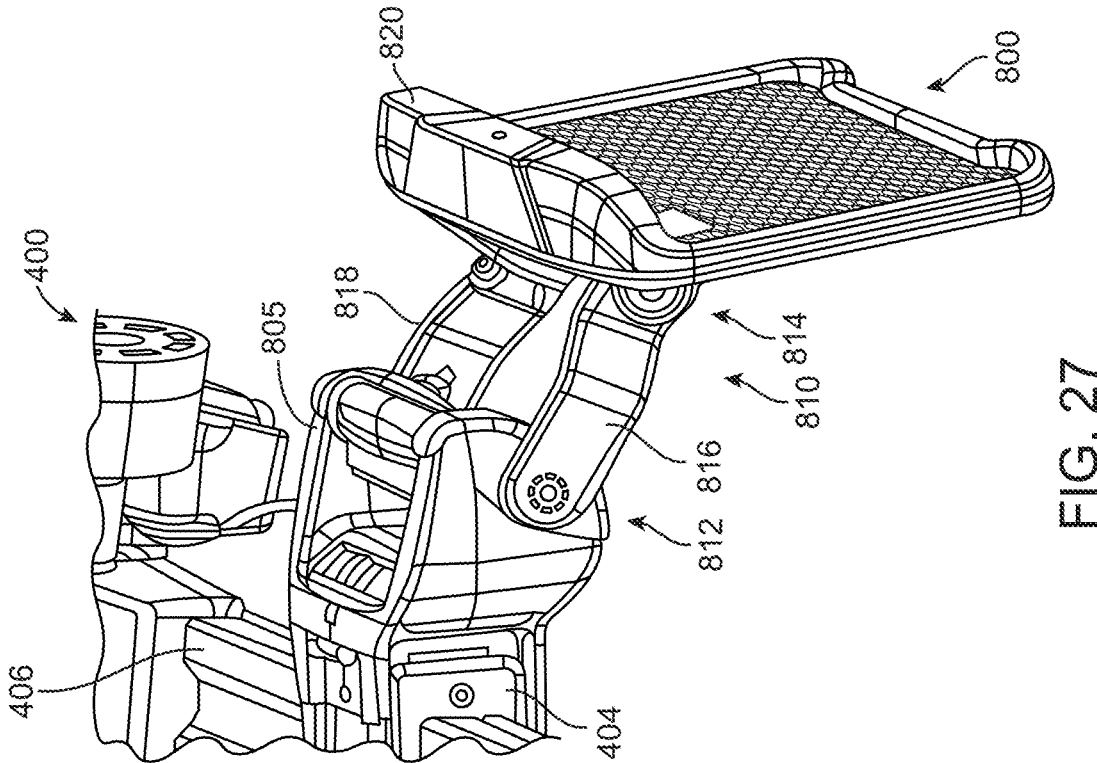
FIG. 27 illustrates a perspective view of a vehicle information device, according to an embodiment.
Figure 26:
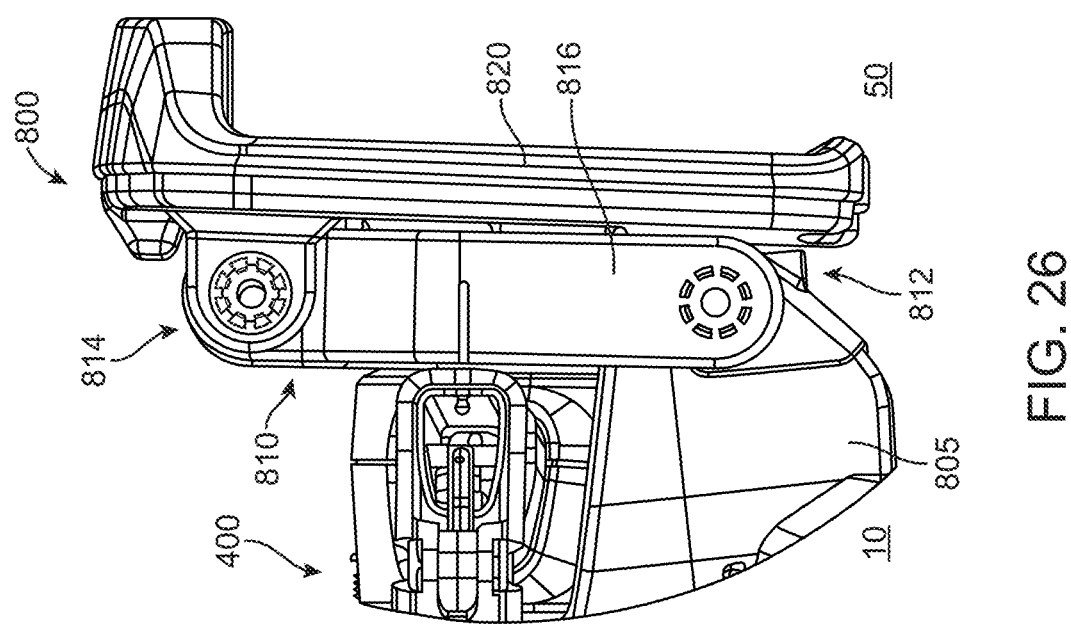
FIG. 26 illustrates a side view of a vehicle information device, according to an embodiment.
Figure 28:
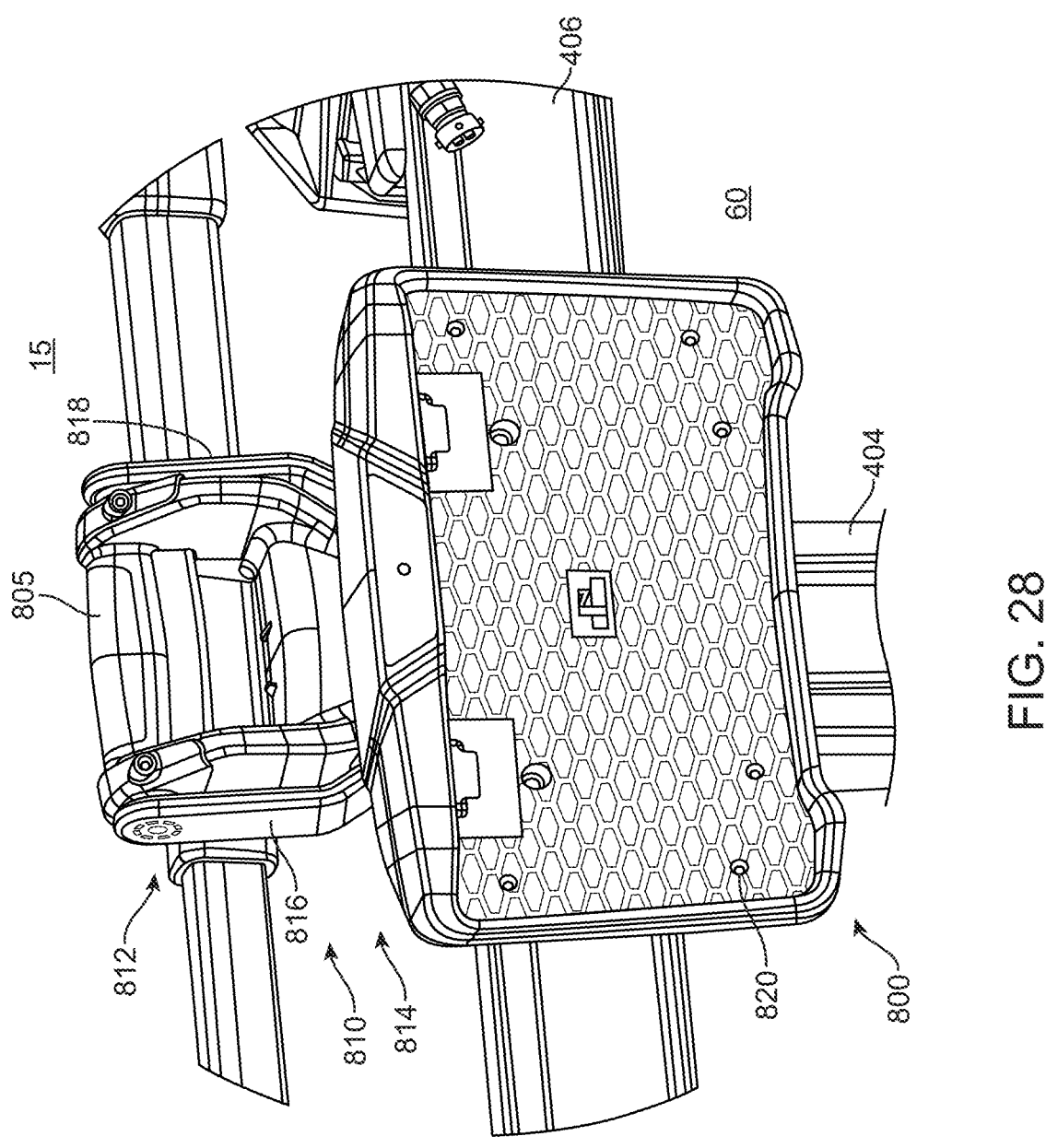
FIG. 28 illustrates a perspective view of a vehicle information device, according to an embodiment.

FIGS. 26-28 illustrate a vehicle information device 800 coupled to load carrier 400, according to embodiments. Vehicle information device 800 can be configured to hold, for example, a license plate or other identification. Vehicle information device 800 can adjust between a first position 50 when the load carrier 100 is in the in-use position 10, and a second position 60 when the load carrier 100 is in the stowed position 15, such that vehicle identification holder 820 faces rearward in either load carrier positions 10, 15. Although vehicle information device 800 is shown in FIGS. 26-28 as a stand-alone apparatus and/or system, the embodiments of this disclosure can be used with other apparatuses and/or systems, such as, but not limited to extension strap system 200, wheel securement arm 300, carrier accessory 450, connector 500, bumper accessory 600, cable management member 700, assembly system 900, bicycle work stand 1000, coupling mechanism 1100 and 1600, locking mechanism 1200, wheel assembly 1300, wall mount 1400, and tilt-release actuation mechanism 1500.

In some embodiments, vehicle information device 800 can be rotatably coupled to a handle 805 disposed at a distal end of base 404 and can include rotatable linkage 810 and vehicle identification holder 820 as shown, for example, in FIGS. 26-28. In some embodiments, vehicle information device 800 can be directly coupled to a distal end of base 404. In some embodiments, vehicle information device 800 can be coupled to support arm 406. In some embodiments, rotatable linkage 810 can include a first linkage 816 and a second linkage 818. First and second linkages 816, 818 can be spaced apart at a first end 812 on opposite sides of handle 805. First and second linkages 816, 818 can be rotatably coupled at a second end 814 to vehicle identification holder 820. In some embodiments, vehicle information device 800 can include a single linkage.

In some embodiments, first and second linkages 816, 818 can be configured to rotate together to maintain a desired orientation of vehicle identification holder 820 relative to the vehicle as shown, for example, in FIGS. 26-28. In the first position 50, first and second linkages 816, 818 can be orientated such that second end 814 can be disposed above first end 812, and vehicle identification holder 820 can be approximately parallel to first and second linkages 816, 818. In the second position, first and second linkages 816, 818 can be orientated such that first end 812 can be disposed above second end 814, and vehicle identification holder 820 can be approximately parallel to first and second linkages 816, 818 and disposed below first and second linkages 816, 818. As vehicle information device 800 moves between first and second positions 50, 60, vehicle identification holder 820 can have multiple orientations, from facing the vehicle, facing rearwards away from the vehicle, or facing the ground. In the illustrative embodiment shown in FIGS. 27 and 28, first and second linkages 816, 818 can include a bend such that the distance between the first and second linkages 816, 818 at the first end 812 can be greater than the distance between the first and second linkages 816, 818 the second end 814. In some embodiments, first and second linkages 816, 818 can be straight and extend parallel to one another between the first and second ends 812, 814. In some embodiments, the distance between the first and second linkages 816, 818 at the first end 812 can be less than the distance between the first and second linkages 816, 818 the second end 814.

In some embodiments, adjustment of vehicle information device 800 between first position 50 and second position 60 can be manual. For example, as shown in FIGS. 26-28, first and second linkages 816, 818 can be used to manually adjust vehicle identification holder 820 between first and second positions 50, 60. In some embodiments, adjustment of vehicle information device 800 between first and second positions 50, 60 can be automatic. For example, vehicle information device 800 can further include one or more springs (not shown) to automatically adjust vehicle identification holder 820 between first and second positions 50, 60. In some embodiments, one or more springs can be compressed in first position 50 and/or second position 60 and be released to apply a force to vehicle identification holder 820 thereby translating and/or pivoting vehicle identification holder 820.

Example Load Carrier Assembly System

FIGS. 29-31, 76, 77, and 81-83 illustrate an assembly system for a load carrier 900, according to embodiments. Load carrier 900 can have one or more load arms 906, 907 configured to be coupled to base 904 to secure one or more loads (e.g., bicycles) to a vehicle while allowing for reduced packaging volume (e.g., for shipping or storage) of the disassembled load carrier. Although load carrier 900 is shown in FIGS. 29-31, 76, 77, and 81-83 as a stand-alone apparatus and/or system, the embodiments of this disclosure can be used with other apparatuses and/or systems, such as, but not limited to load carrier 100, extension strap system 200, wheel securement arm 300, carrier accessory 450, connector 500, bumper accessory 600, cable management member 700, vehicle information device 800, bicycle work stand 1000, coupling mechanism 1100 and 1600, locking mechanism 1200, wheel assembly 1300, wall mount 1400, and tilt-release actuation mechanism 1500.

In some embodiments, the load carrier 900 includes base 904, first load arm 906, and second load arm 907, as shown, for example, in FIGS. 29-31 and 76. In some embodiments, base 904 can couple to a vehicle via a stinger and extend in the moving direction of the vehicle along a longitudinal axis 920. Base 904 can include a first side 910 and a second side 912 opposite first side 910. First side 910 can include first flange 970 extending approximately perpendicularly away from an upper edge of first side 910, and second flange 972 extending approximately perpendicularly from a lower edge of first side 910. Second side 912 can include third flange 974 extending approximately perpendicularly away from an upper edge of second side 912, and fourth flange 976 extending approximately perpendicularly away from a lower edge of first side 910. In some embodiments, flanges 970, 972, 974, 976 can include inner surface notches or grooves and be configured to receive attachment features of a plurality of covers that assemble over the load arm assembly plates 942, 952 to cover any bolts 948, 958, 960, 962 and provide a smooth surface to enhance aesthetics of load carrier 900.

First aperture 914 and second aperture 915 can be formed through first side 910. First aperture 914 and second aperture 915 can be spaced apart along the longitudinal axis 920 and equally spaced apart from top and bottom edges of first side 910. Third aperture 916 and fourth aperture 917 can be formed through second side 912. Third aperture 916 and fourth aperture 917 can be spaced apart along the longitudinal axis 920 and equally spaced apart from top and bottom edges of second side 912. First aperture 914 can align with fourth aperture 917 along a lateral axis 930 perpendicular to longitudinal axis 920, and second aperture 915 can align with third aperture 916 along lateral axis 930.

Figure 29:
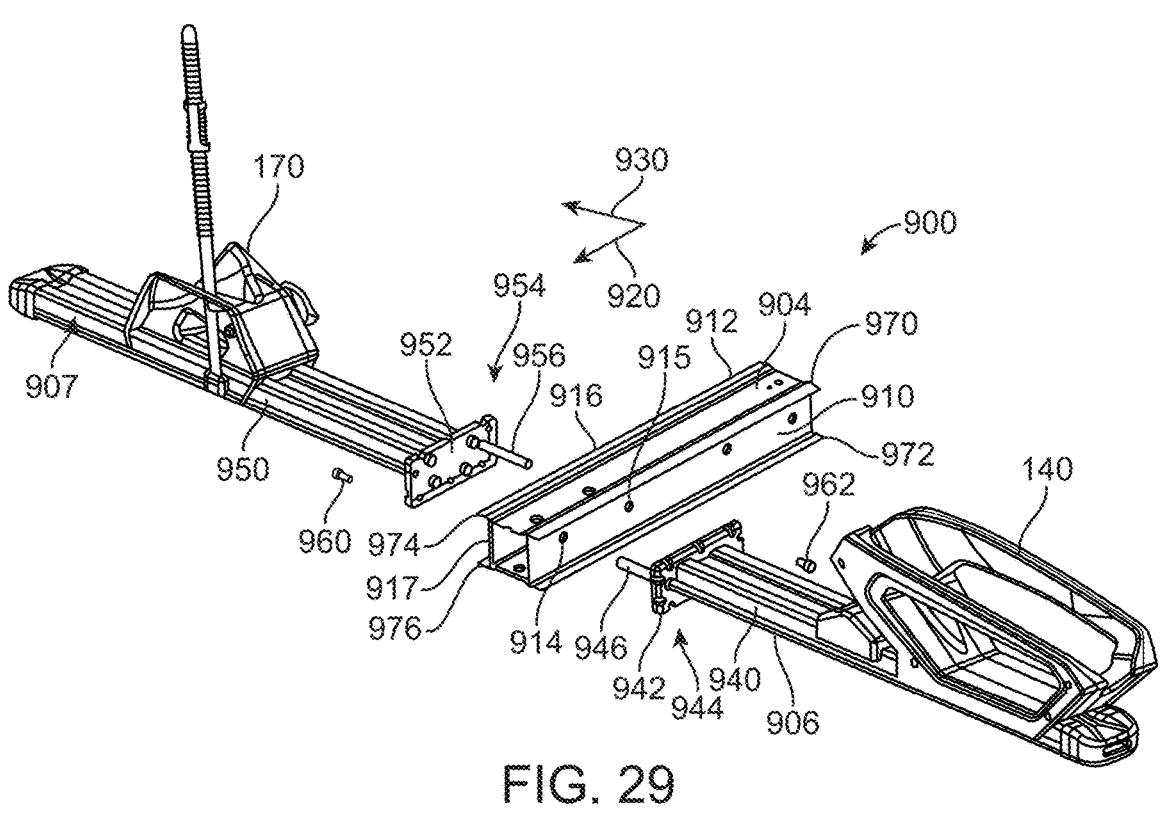
FIG. 29 illustrates a perspective view of a load carrier in a partially assembled configuration, according to an embodiment.
Figures 30, 31:
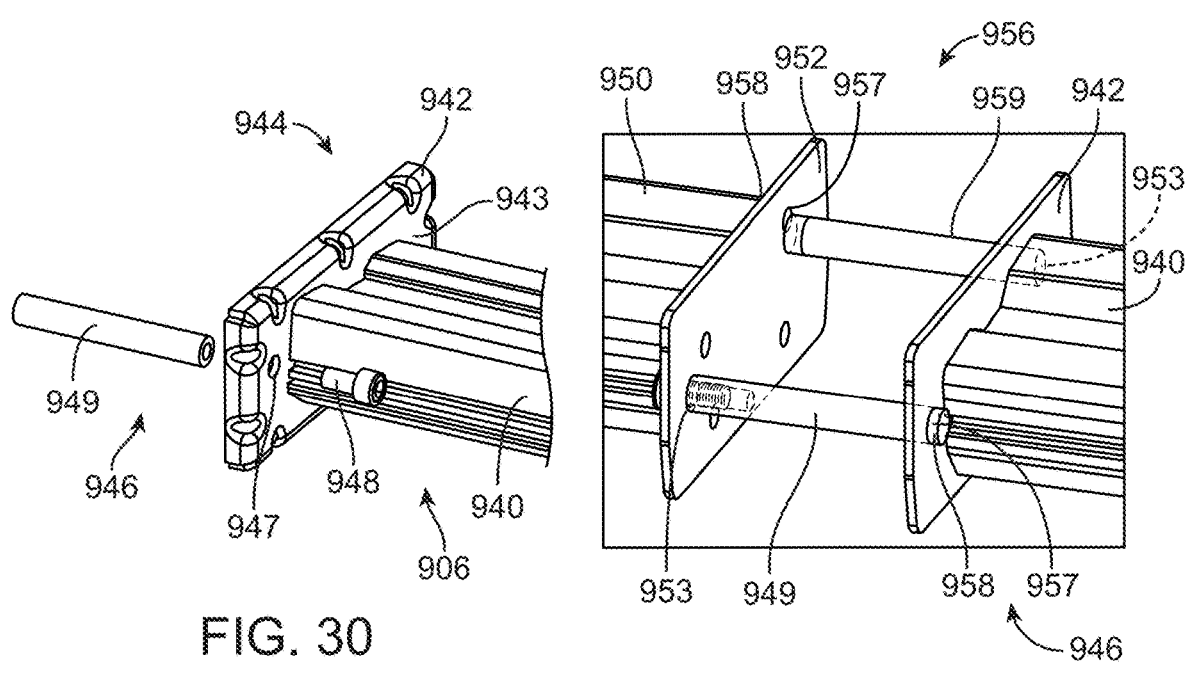
FIG. 30 illustrates a partial exploded view of a load arm of the load carrier shown in FIG. 29, according to an embodiment.
FIG. 31 illustrates a cutaway perspective view of an assembled configuration of the load carrier shown in FIG. 29, according to an embodiment.

In some embodiments, load arms 906, 907 can assemble to opposite sides 910, 912 of base 904 and extend perpendicular to base 904, as shown, for example, in FIG. 29. In some embodiments, load arm 906 couples to first side 910 of base 904 and includes first support arm 940, first assembly plate 942 disposed at a coupling end 944 of first support arm 940, and a first protrusion 946 extending away from first assembly plate 942 away from first support arm 940. In some embodiments, first assembly plate 942 can be integrally formed with first support arm 940. In some embodiments, first assembly plate 942 can be coupled to first support arm 940 using bolts, rivets, or other similar fastening devices. In some embodiments, first protrusion 946 can be integrally formed with first assembly plate 942. In the illustrative embodiment shown in FIG. 30, first protrusion 946 is coupled to first assembly plate 942 and includes bolt 948 that extends through first plate aperture 947 formed in first assembly plate 942 and couples with first sleeve 949. In some embodiments, second plate aperture 943 can be formed through first assembly plate 942 and spaced apart from first protrusion 946 along the longitudinal axis 920.

In some embodiments, load arm 907 couples to second side 912 of base 904 and includes second support arm 950, second assembly plate 952 disposed at a coupling end 954 of second support arm 950, and a second protrusion 956 extending away from second assembly plate 952 away from second support arm 950. In some embodiments, second assembly plate 952 can be integrally formed with second support arm 950. In some embodiments, second assembly plate 952 can be coupled to second support arm 950 using bolts, rivets, or other similar fastening devices. In some embodiments, second protrusion 956 can be integrally formed with second assembly plate 952. In the illustrative embodiment shown in FIG. 30, second protrusion 956 is coupled to second assembly plate 952 and includes bolt 958 that extends through first plate aperture 957 formed in second assembly plate 952 and couples with second sleeve 959. In some embodiments, second plate aperture 953 can be formed through second assembly plate 952 and spaced apart from second protrusion 956 along the longitudinal axis 920.

In some embodiments, load arms 906, 907 can be coupled to base 904 by extending first protrusion 946 through first aperture 914 on first side 910 of base 904. In some embodiments, first assembly plate 942 can be assembled between and supported by first and second flanges 970, 972. First protrusion 946 extends through base 904 and aligns with fourth aperture 917 formed in second side 912 of base 904. In some embodiments, first protrusion 946 extends partially into and can be supported by fourth aperture 917 formed in second side 912. In some embodiments, first protrusion 946 extends through fourth aperture 917 formed in second side 912 and into a recess formed in the coupling side of second assembly plate 952. Assembly bolt 960 extends through second plate aperture 953 of second assembly plate 952 to couple with first protrusion 946 to partially assemble and couple load arms 906, 907 and base 904 together. Second protrusion 956 can be inserted through third aperture 916 on second side 912 of base 904. In some embodiments, second assembly plate 952 can be assembled between and supported by third and fourth flanges 974, 976. Second protrusion 956 extends through base 904 and aligns with second aperture 915 formed in first side 910 of base 904. In some embodiments, second protrusion 956 extends partially into and can be supported by second aperture 915 formed in first side 910. In some embodiments, second protrusion 956 extends through second aperture 915 formed in first side 910 and into a recess formed in the coupling side of first assembly plate 942. Assembly bolt 962 extends through second plate aperture 943 of first assembly plate 942 to couple with second protrusion 956 fully assemble and couple load arms 906, 907 and base 904 together. An illustrative embodiment of the assembled load carrier 900 is shown in FIG. 31 with base 904 removed to show the internal coupling elements. In the illustrative embodiment shown in FIG. 29, load arm 906 can further include a wheel holder 140 and load arm 907 can further include a wheel support 170 such as that described above for load carrier 100.

Figure 76:
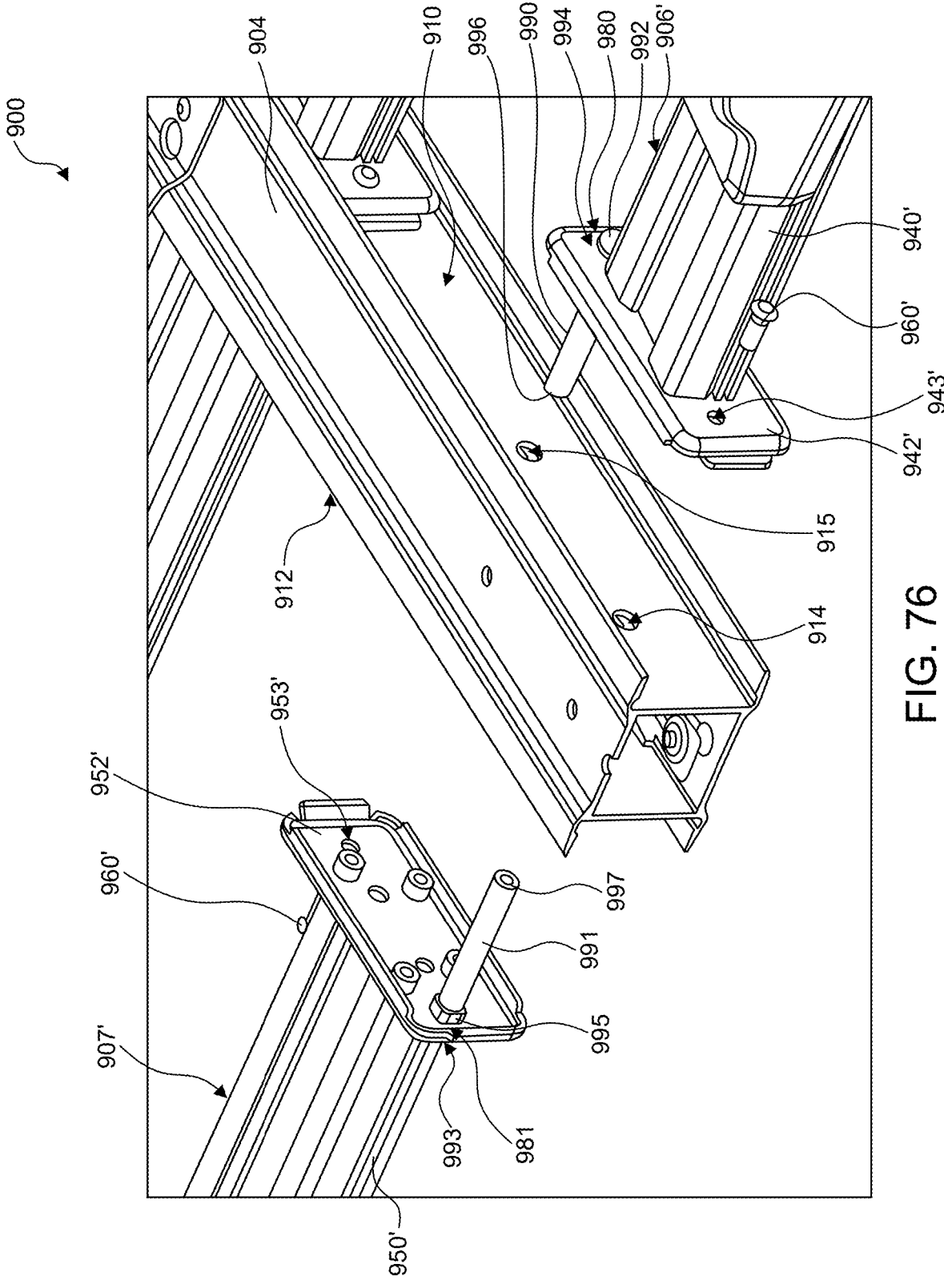
FIG. 76 illustrates a perspective view of a load carrier in a partially assembled configuration, according to an embodiment.
Figure 77:
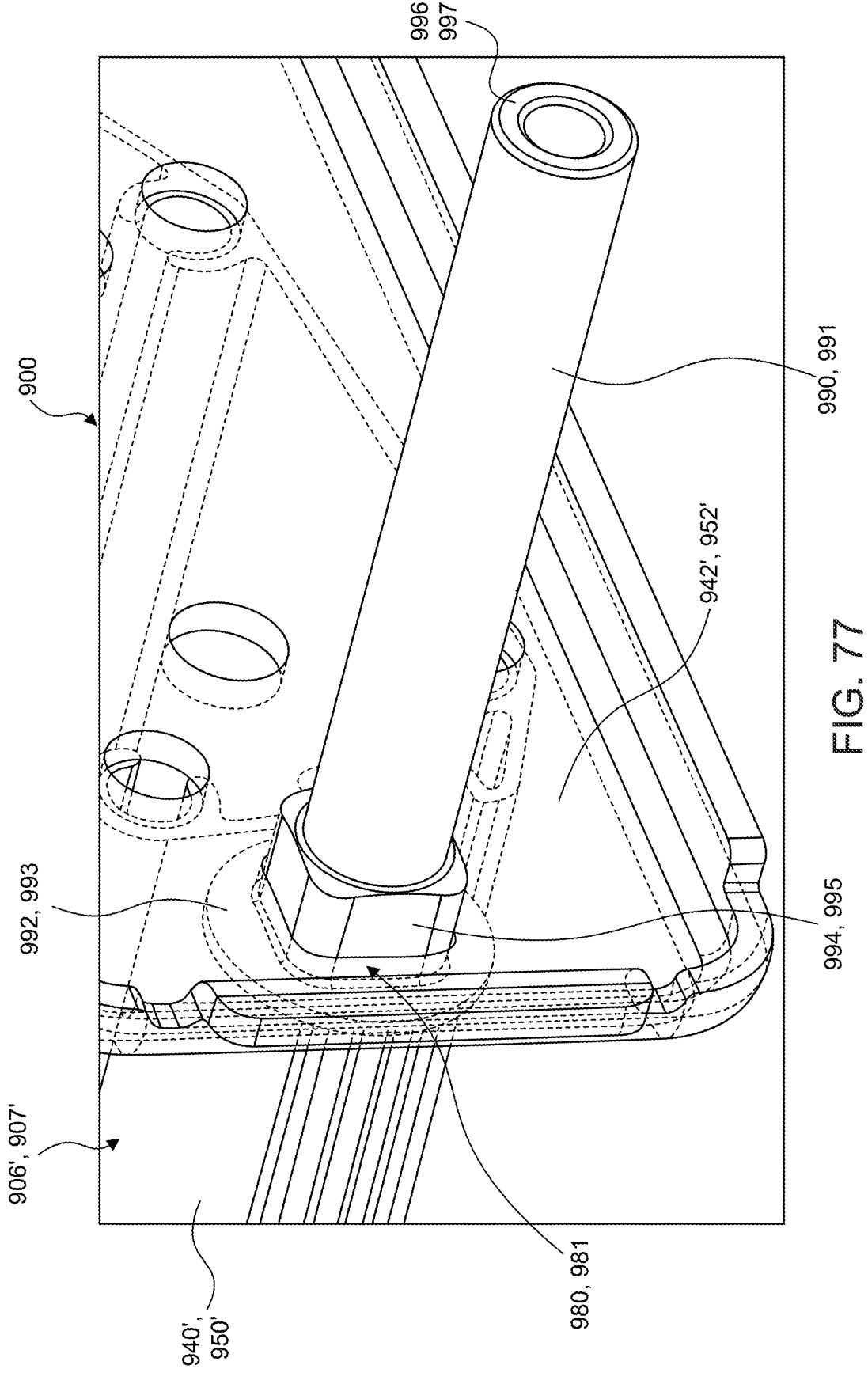
FIG. 77 illustrates a perspective view of a load arm of the load carrier shown in FIG. 76, according to an embodiment.

In some embodiments, load arms 906', 907' can be similar to load arms 906, 907 and assemble to opposite sides 910, 912 of base 904, as shown, for example, in FIG. 76. In some embodiments, load arm 906' couples to first side 910 of base 904 and includes first support arm 940' and first assembly plate 942'. In the illustrative embodiments shown in FIGS. 76 and 77, aperture 980 is formed through first assembly plate 942' and can have an approximately square shape (e.g., square with rounded corners). In some embodiments, aperture 980 can have an oval, rectangle, triangle, or any other polygonal shape. In some embodiments, first carriage bolt 990 can extend through aperture 980 and include head 992, coupling portion 994, and distal end 996. Coupling portion 994 can have a corresponding shape to aperture 980 such that aperture 980 prevents first carriage bolt 990 from rotating when coupling portion 994 is disposed in aperture 980. In some embodiments, head 992 can have a head diameter that is larger than a length or diameter of aperture 980 such that head 992 cannot extend through aperture 980 and couples with first assembly plate 942'. In some embodiments, distal end 996 extends through base 904 and is disposed adjacent to second plate aperture 953'. Assembly bolt 960' can extend through second plate aperture 953' of second assembly plate 952' and be configured to couple with first carriage bolt 990 to partially assemble and couple load arms 906', 907' and base 904 together.

In some embodiments, load arm 907' couples to second side 912 of base 904 and includes second support arm 950' and second assembly plate 952', as shown for example in FIG. 76. In the illustrative embodiments shown in FIGS. 76 and 77, aperture 981 is formed through second assembly plate 952' and can have an approximately square shape (e.g., square with rounded corners). In some embodiments, aperture 981 can have an oval, rectangle, triangle, or any other polygonal shape. In some embodiments, second carriage bolt 991 can extend through aperture 981 and include head 993, coupling portion 995, and distal end 997. Coupling portion 995 can have a corresponding shape to aperture 981 such that aperture 981 prevents second carriage bolt 991 from rotating when coupling portion 995 is disposed in aperture 981. In some embodiments, head 993 can have a head diameter that is larger than a length or diameter of aperture 981 such that head 993 cannot extend through aperture 981 and couples with first assembly plate 952'. In some embodiments, distal end 997 extends through base 904 and is disposed adjacent to second plate aperture 943'. Assembly bolt 960' can extend through second plate aperture 943' of first assembly plate 942' and be configured to couple with second carriage bolt 991 to fully assemble and couple load arms 906', 907' and base 904 together.

Figure 81:
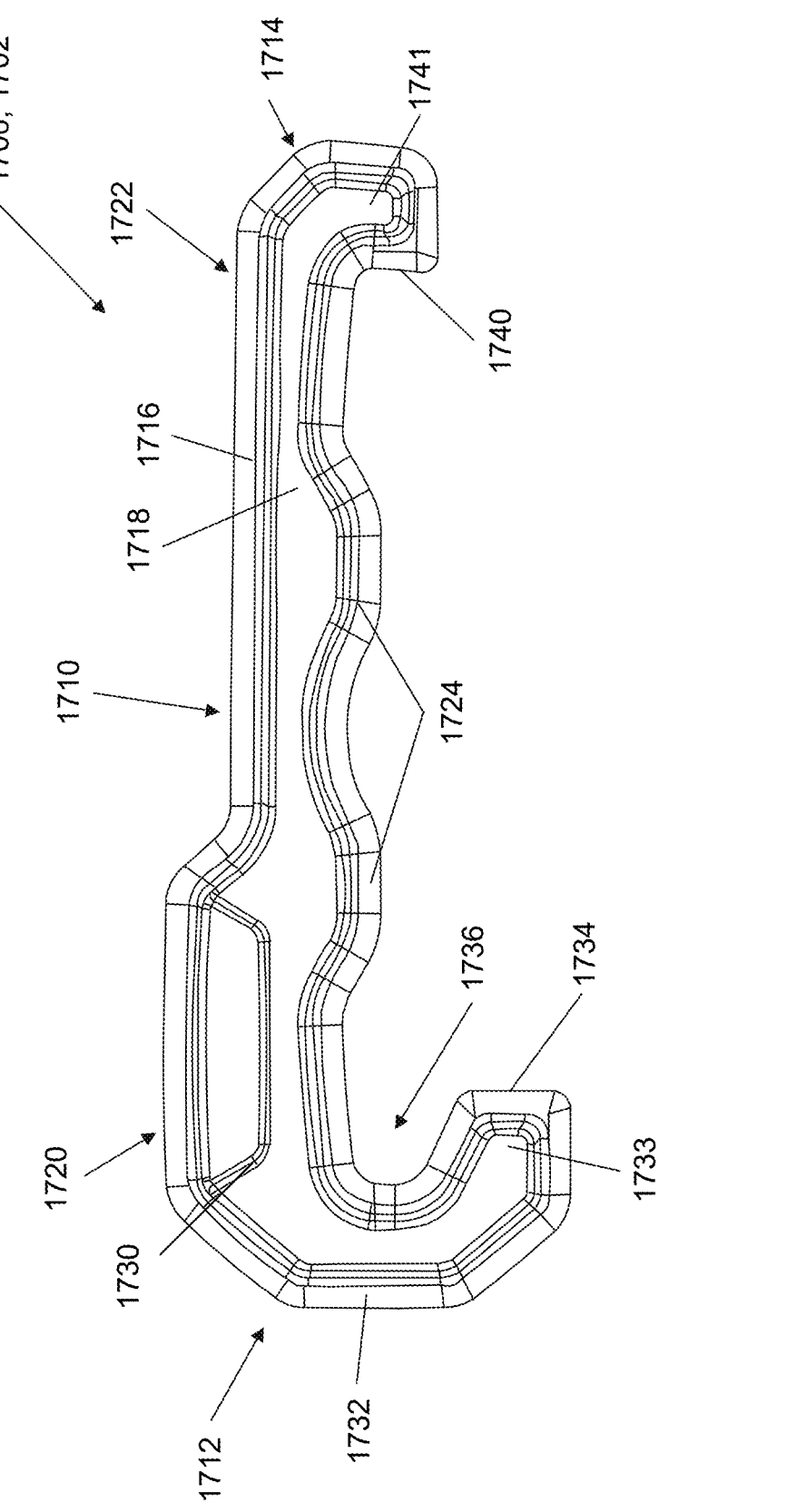
FIG. 81 illustrates a side view of an assembly support bracket, according to an embodiment.
Figure 82:
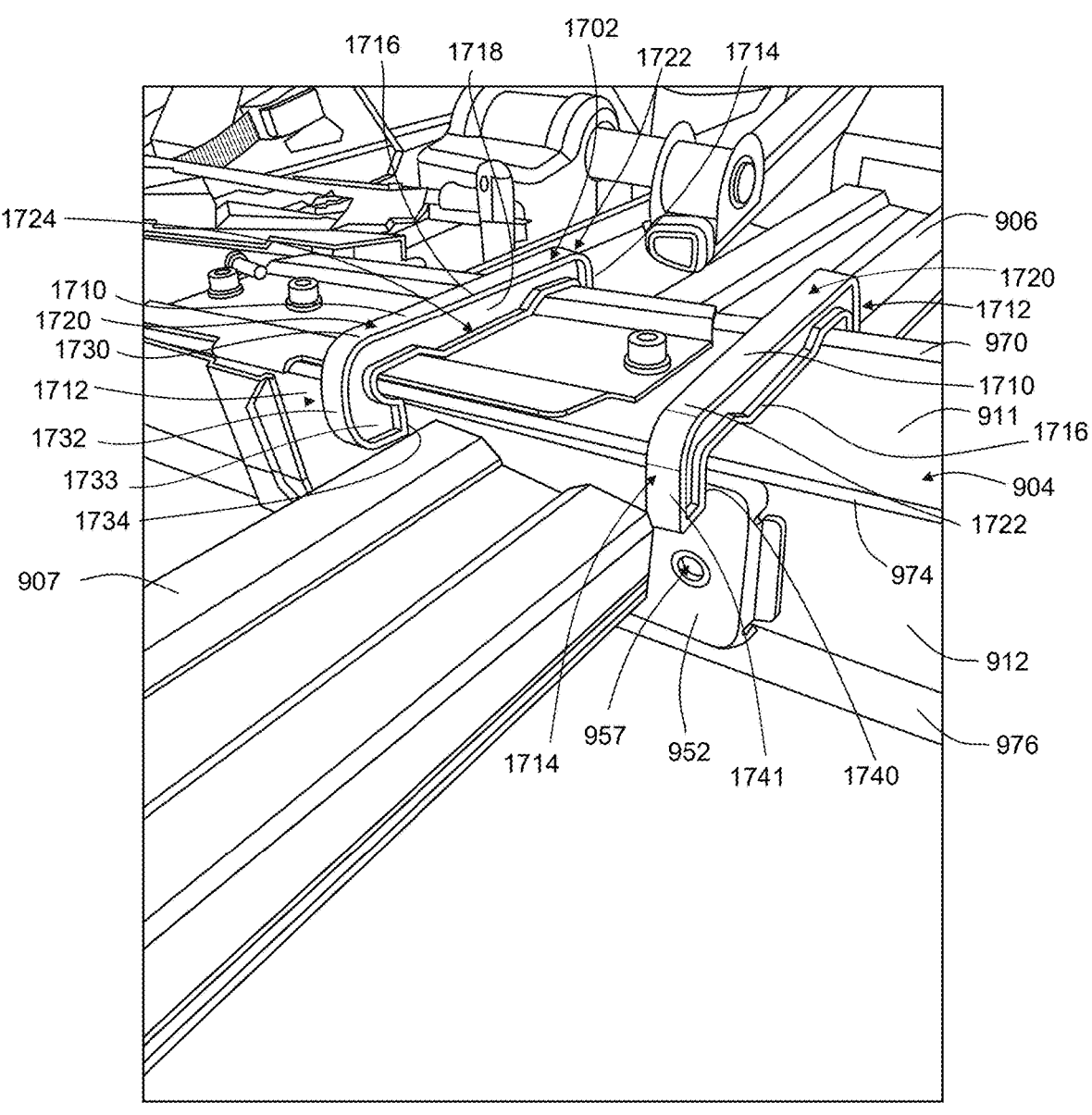
FIG. 82 illustrates a partial perspective view of a bicycle carrier, according to an embodiment.
Figure 83:
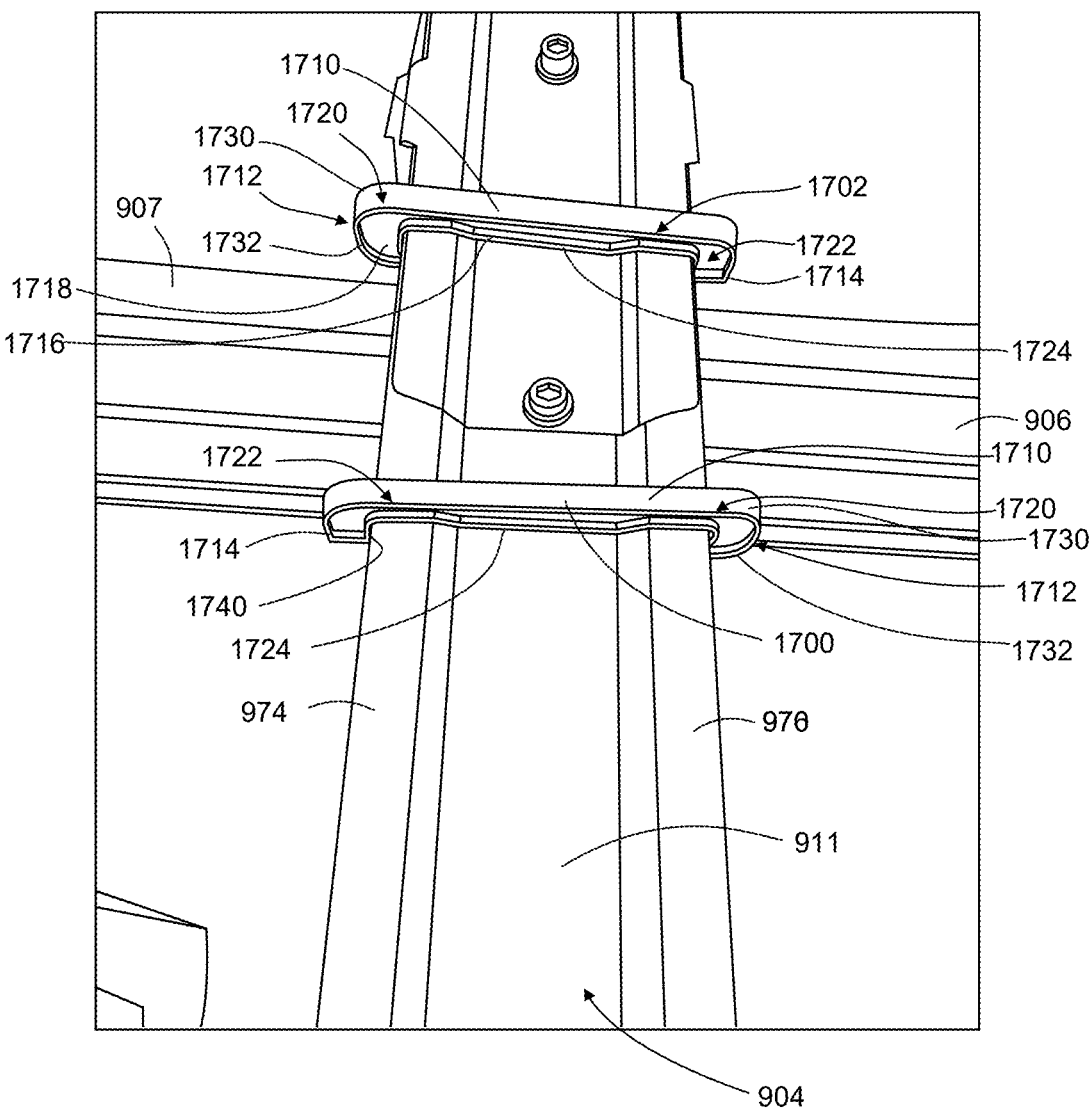
FIG. 83 illustrates a partial perspective view of a bicycle carrier, accordingly to an embodiment.

In some embodiments, support brackets 1700, 1702 (see FIG. 81) can be configured to support first load arm 906, 906' and/or second load arm 907, 907' relative to base 904 as shown, for example, in FIGS. 82 and 83. In some embodiments, support brackets 1700, 1702 can temporarily support load arms 906, 906', 907, 907' relative to base 904 before load arms 906, 906', 907, 907' are coupled to base 904, and/or while coupling load arms 906, 906', 907, 907' to base 904, by any of protrusions 946, 956, assembly bolts 960, 960', 962, 962', carriage bolts 990, 991, screws, fasteners, or any other suitable coupling fixture. In some embodiments, one or more support brackets 1700 support first load arm 906, 906' and/or second load arm 907, 907' perpendicularly relative to base 904 to facilitate assembly. In some embodiments, first support bracket 1700 can temporarily support first load arm 906, 906' against first side 910 of base 904. In some embodiments, second support bracket 1702 can temporarily support second load arm 907, 907' against second side 912 of base 904.

In some embodiments, first support bracket 1700 and second support bracket 1702 can be identical or include substantially similar features such that first support bracket 1700 can support second load arm 907, 907' against base 904 and second support bracket 1702 can support first load arm 906, 906' against base 904. In the illustrative embodiment shown in FIG. 81, support brackets 1700, 1702 can include main body 1710, first leg 1712, and second leg 1714. Main body 1710 can include first end 1720 and second end 1722 opposite first end 1720. In some embodiments, main body 1710 can have length approximately equal to the distance between a distal edge of first flange 970 and a distal edge of third flange 974 of base 904. As shown in the illustrative embodiment of FIGS. 82 and 83, in some embodiments, main body 1710 can rest on an upper surface 911 of base 904 when support brackets 1700, 1702 are arranged on load carrier 900. In the illustrative embodiment shown in FIGS. 82 and 83, main body 1710 includes a protrusion 1724 that follows a profile of upper surface 911 of base 904 to increase contact surface area between support brackets 1700, 1702 and upper surface 911 of base 904. In the illustrative embodiment shown in FIG. 81, main body 1710 can include a plurality of protrusions 1724 to at least partially follow a profile of upper surface 911 of base 904.

First leg 1712 can extend away from first end 1720 of main body 1710 and be configured to contact first assembly plate 942 for supporting first load arm 906, or to contact second assembly plate 952 for supporting second load arm 907. First leg 1712 can have an approximate C-shape and include first portion 1730, curved portion 1732, contact portion 1733, and engagement surface 1734 disposed at a distal end of contact portion 1733 and configured to contact first or second assembly plates 942, 952. In some embodiments, first portion 1730 of first leg 1712 can be integrated with and extend away from main body 1710 approximately parallel to main body portion 1710. In some embodiments, when support bracket 1700, 1702 is assembled to load arms 906, 906', 907, 907' and base 904, first portion 1730 can be adjacent to an edge of first flange 970 or an edge of third flange 974. Curved portion 1732 bends through approximately 180 degrees such that contact portion 1733 extends substantially parallel with main body 1710 and is spaced apart from main body 1710. Contact portion 1733 extends back towards first or second assembly plates 942, 952 such that engagement surface 1734 faces and can contact first or second assembly plates 942, 952. In some embodiments, curved portion 1732 forms recess 1736 between first portion 1730 and contact portion 1733. In some embodiments, recess 1736 is sized to accommodate first flange 970 or third flange 974 when support brackets 1700, 1702 are arranged on load carrier 900. In some embodiments, curved portion 1732 can form two right angle corners, 90 degrees each.

Second leg 1714 can extend away from second end 1722 of main body 1710 and be configured to contact a feature on the opposite side of base 904 to first leg 1712. Second leg 1714 can have approximate L-shape and extend substantially perpendicular away from second end 1722 of main body 1710 and include retaining portion 1741 and engagement surface 1740. In some embodiments, retaining portion 1741 can extend parallel to first or second side 910, 912 and engagement surface can face towards base 904. Engagement surface 1740 can be configured to contact first or second side 910, 912 of base 904, or a distal edge of first flange 970 or third flange 974. In the illustrative embodiment shown in FIGS. 82 and 83, engagement surface 1740 of support bracket 1700 engages third flange 974 and engagement surface 1740 of support bracket 1702 engages first flange 970.

In the illustrative embodiment shown in FIGS. 81-83, support brackets 1700, 1702 include a perimeter rim 1716 and recessed wall 1718 to increase stiffness, reduce weight, and provide features to increase grip to a user when handling the support brackets 1700, 1702. In some embodiments, support brackets 1700, 1702 can have flat side surfaces.

In some embodiments support brackets 1700, 1702 can be configured to temporarily support load arms 906, 906', 907, 907' against base 904 while a user inserts protrusions 946, 956, assembly bolts 960, 960', 962, 962', carriage bolts 990, 991, or any other suitable coupling fixture through the assembly to couple load arms 906, 906', 907, 907' to base 904. In some embodiments, first assembly plate 942 of load arm 906 can be assembled between first and second flanges 970, 972 and against first side 910 of base 904. In some embodiments, first plate aperture 947 can be aligned with first aperture 914 on first side 910 of base 904, and second plate aperture 943 can be aligned with second aperture 915 of base 904. In some embodiments, support bracket 1700 can be arranged on load carrier 900 such that engagement surface 1734 of first leg 1712 contacts first assembly plate 942 and presses first assembly plate 942 against first side 910 of base 904, main body 1710 extends over upper surface 911 of base 904, and second leg 1714 hooks over third flange 974 to retain and support load arm 906 perpendicularly against first side 910 of base 904. In some embodiments, support bracket 1700 can be rotated into position, first engaging first leg 1712 with first assembly plate 942 and extending around first flange 970, then rotating support bracket 1700 downwardly toward base 904, and finally hooking second leg 1714 around third flange 974. In some embodiments, support bracket 1700 is sized such that the distance between engagement surface 1734 of first leg 1712 and engagement surface 1740 of second leg 1714 is approximately equal to the assembled distance between first assembly plate 942 and the distal edge of third flange 974. Moment loads from load arm 906 are accommodated by support bracket 1700 and transferred through support bracket 1700 to third flange 974 to hold and support load arm 906 relative to base 904 before load arm 906 is coupled to base 904.

In some embodiments, second assembly plate 952 of load arm 907 can be assembled between third and fourth flanges 974, 976 and against second side 912 of base 904. In some embodiments, first plate aperture 957 of second assembly plate 952 can be aligned with third aperture 916 on second side 912 of base 904, and second plate aperture 953 of second assembly plate 952 can be aligned with fourth aperture 917 of base 904. In some embodiments, support bracket 1702 can be arranged on load carrier 900 such that engagement surface 1734 of first leg 1712 contacts second assembly plate 952 and presses second assembly plate 952 against second side 912 of base 904, main body 1710 extends over upper surface 911 of base 904, and second leg 1714 hooks over first flange 970 to support load arm 907 perpendicularly against second side 912 of base 904. In some embodiments, support bracket 1702 can be rotated into position, first engaging first leg 1712 with second assembly plate 952 and extending around third flange 974, then rotating support bracket 1702 downwardly toward base 904, and finally hooking second leg 1714 around first flange 970. In some embodiments, support bracket 1702 is sized such that the distance between engagement surface 1734 of first leg 1712 and engagement surface 1740 of second leg 1714 is approximately equal to the assembled distance between second assembly plate 952 and the distal edge of first flange 970.

In some embodiments, after support brackets are arranged around load carrier 900 as described above, protrusions 946, 956, assembly bolts 960, 960', 962, 962', carriage bolts 990, 991, or any other suitable coupling fixtures can be extended through assembly plate apertures 947, 957, 943, 953 and base 904 apertures 914, 915, 916, 917 to couple load arms 906, 907 to base 904. In some embodiments, after load arms 906, 907 are coupled with base 904, support brackets 1700, 1702 can be removed from load carrier 900. In some embodiments, support brackets 1700, 1702 can be removed by lifting second leg 1714 upwardly away from first or third flange, rotating support bracket 1700, 1702 approximately about first end 1720 of main body 1710, and disengaging first leg 1712 from first or third flange 970, 974.

Example Work Stand

FIGS. 32-34, 50, and 51 illustrate a bicycle work stand 1000 coupled to wheel securement arm 300 on load carrier 100, according to embodiments. Bicycle work stand 1000 can be configured to support a bicycle 102 in an upright position as shown, for example, in FIG. 32. Although bicycle work stand 1000 is shown in FIGS. 32-34, 50, and 51 as a stand-alone apparatus and/or system, the embodiments of this disclosure can be used with other apparatuses and/or systems, such as, but not limited to extension strap system 200, wheel securement arm 300, carrier accessory 450, connector 500, bumper accessory 600, cable management member 700, vehicle information device 800, assembly system 900, coupling mechanism 1100 and 1600, locking mechanism 1200, wheel assembly 1300, wall mount 1400, and tilt-release actuation mechanism 1500.

Figure 32:
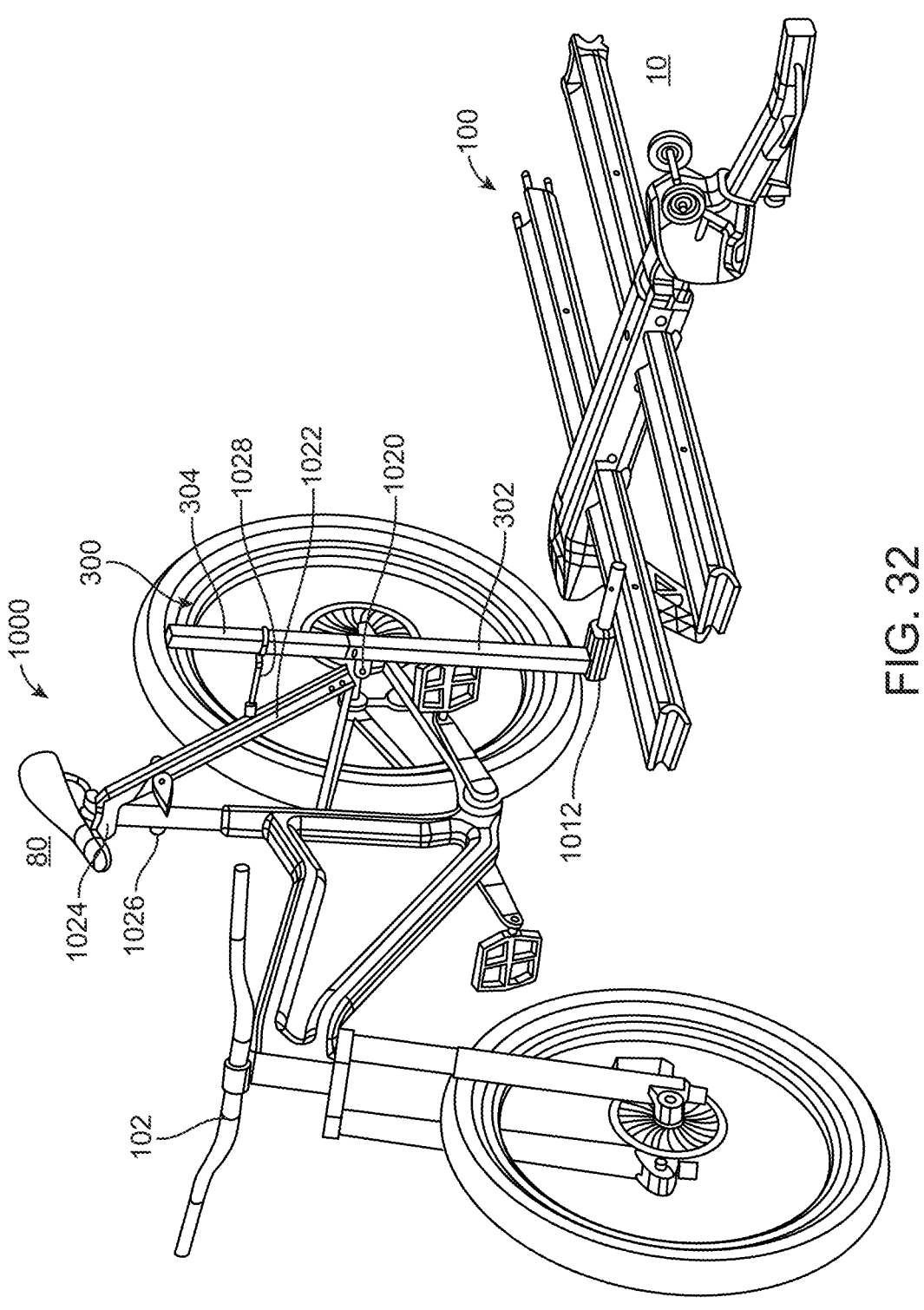
FIG. 32 illustrates a perspective view of a bicycle work stand coupled to a wheel securement arm of a bicycle carrier, according to an embodiment.
Figures 33, 34:
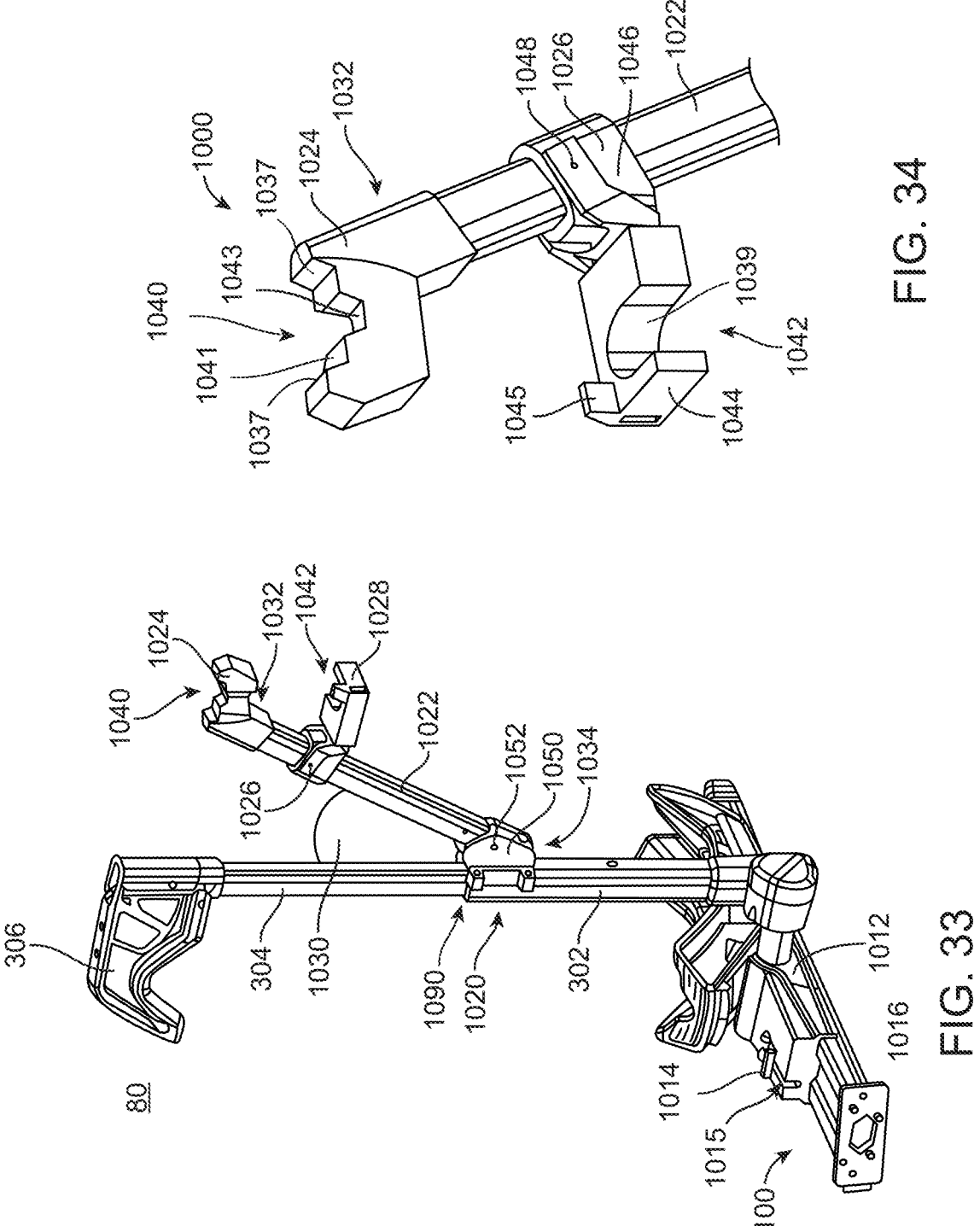
FIG. 33 illustrates a perspective view of a bicycle work stand coupled to a wheel securement arm, according to an embodiment.
FIG. 34 illustrates a partial view of the bicycle work stand shown in FIG. 33, according to an embodiment.

Bicycle work stand 1000 can be pivotally coupled to wheel securement arm 300 as shown, for example, in FIGS. 32 and 33. Wheel securement arm 300 can include a locking hinge connector 1012 that couples wheel securement arm 300 to bicycle tray 106 in a locked configuration and an unlocked configuration. In the locked configuration, locking hinge connector 1012 rigidly couples wheel securement arm 300 in an upright orientation and prevents wheel securement arm from rotating relative to bicycle tray 106. In the unlocked configuration, locking hinge connector 1012 pivotally couples wheel securement arm 300 to bicycle tray 106 such that wheel securement arm can freely rotate relative to bicycle tray 106. Locking hinge connector 1012 can include a locking actuator 1014 that translates along a slot 1015 formed in housing 1016. Locking actuator 1014 can be translated between an engagement position that engages the locking hinge connector 1012 in the locked configuration and a disengagement position that disengages the locking hinge connector 1012 in the unlocked configuration. In some embodiments, locking hinge connector 1012 can include a spring to bias wheel securement arm 300 into a vertical position and/or a horizontal position. In some embodiments, locking actuator 1014 can be spring biased into the engagement position such that as wheel securement arm 300 rotates through a locked angle relative to bicycle tray 106, locking actuator 1014 translates into the engagement position to lock wheel securement arm 300 in the locked configuration. In some embodiments, the locked angle is 90 degrees or perpendicular to the bicycle tray 106. In some embodiments, the locked angle can be between about 45 degrees and about 90 degrees.

Bicycle work stand 1000 can be pivoted between an in-use position 80 and a stowed position 90 and can include a pivoting arm joint 1020, a support arm 1022, a first support 1024, a second support 1026, and/or a linkage support 1028 as shown, for example, in FIGS. 32-34, 50, and 51. Support arm 1022 can be pivotally coupled to wheel securement arm 300 via pivoting arm joint 1020 and can extend away from wheel securement arm 300 at an in-use angle 1030 such that bicycle 102 is spaced apart from wheel securement arm 300 when bicycle 102 is supported by bicycle work stand 1000. In some embodiments, in-use angle 1030 is approximately 30 degrees. In some embodiments, in-use angle 1030 is between approximately 10 degrees and 60 degrees.

In some embodiments, pivoting arm joint 1020 can couple to wheel securement arm 300 and pivotally couple to support arm 1022, as shown, for example, in FIGS. 32, 33, 50, and 51. In some embodiments, pivoting arm joint 1020 can be removably coupled to wheel securement arm 300 and clamp around wheel securement arm 300. In the illustrative embodiment shown in FIGS. 32, 33, 50, and 51, pivoting arm joint 1020 is coupled to housing 302 of wheel securement arm 300. Pivoting arm joint can include housing 1050, pivot pin 1052, and contact surface 1054. Housing 1050 extends outwardly away from wheel securement arm 300 in the direction support arm 1022 pivots and behind load carrier 100. Support arm aperture 1056 can be formed through housing 1050 and be configured to receive support arm 1022. Pivot pin 1052 can be coupled to housing 1050 and extends into support arm aperture 1056 to couple with a slot 1036 formed in a pivoting end 1034 of support arm 1022. Contact surface 1054 can be disposed on an interior surface of housing 1050 and face support arm aperture 1056. Contact surface 1054 can be configured to engage support arm 1022 in an in-use position 80 to maintain the in-use angle 1030 of support arm 1022.

In some embodiments, first support 1024 couples to a distal end 1032 of support arm 1022 and can be configured to secure a saddle component of bicycle 102. In the illustrative embodiment shown in FIGS. 33 and 34, first support 1024 can include a stepped groove 1040 configured to accommodate different shapes and sizes of saddles and corresponding saddle rails and seat-post attachment flanges, or other suitable bicycle components. In some embodiments, first support 1024 can have U-shape, V-shape, or any other shape that corresponds to a component of a bicycle.

In some embodiments, second support 1026 couples to support arm 1022 and can be spaced apart from first support 1024. In the illustrative embodiment shown in FIG. 34, second support 1026 can include support body 1044, housing 1046, and hinge 1048. Support body 1044 can be pivotally coupled to housing 1046 via hinge 1048. In some embodiments, support body 1044 can be configured to rotate relative to housing 1046 such that in the stowed position 90, support body 1044 extends approximately parallel and contacts support arm 1022, and in the in-use position 80, support body 1044 extends perpendicular to support arm 1022 or parallel to the ground. In some embodiments, support body 1044 can include a tool hanger 1045 that extends away from support body 1044. Tool hanger 1045 can be an arm, a hook, a loop, or similar shape, such that a bag or tools can be hung from tool hanger 1045. In some embodiments, housing 1046 of second support 1026 can be adjustable coupled to support arm 1022, such that second support 1026 can be translated along support arm 1022 to correspond to the geometry of bicycle 102. In some embodiments, housing 1046 of second support 1026 can be removably coupled to support arm 1022, such that second support can be removed from the assembly in the stowed position 90, as shown, for example, in FIG. 50. In the illustrative embodiment shown in FIGS. 33 and 34, U-shaped groove 1042 can be formed in second support 1026 and configured to accommodate a seat-post or a seat tube of the frame of the bicycle 102, or other suitable component or feature of a bicycle. In some embodiments, second support 1026 can have V-shape, square shape, or any other shape that corresponds to a component or frame feature of a bicycle.

In some embodiments, support arm 1022 can pivotally couple to wheel securement arm 300 via pivoting arm joint 1020, as shown, for example, in FIGS. 32, 33, 50, and 51. In the illustrative embodiment shown in FIGS. 32, 33, and 51, support arm 1022 is in the in-use position 80 and extends an in-use angle 1030 relative to wheel securement arm 300. In the illustrative embodiment in FIG. 50, support arm 1022 is in the stowed position 90 and extends toward hinge connector 312 and approximately parallel to wheel securement arm 300. Pivoting end 1034 of support arm 1022 can be received in support arm aperture 1056 and slideably and pivotally coupled to pivoting arm joint 1020. Slot 1036 can be formed in pivoting end 1034 of support arm 1022 and configured to receive pivot pin 1052 of pivoting arm joint 1020. Support arm 1022 can be configured to translate along the length of slot 1036 and rotate around pivot pin 1052. Support arm 1022 can include angled flat surface 1038 disposed at pivoting end 1034 of support arm 1022 and configured to engage contact surface 1054 of pivoting arm joint 1020. Contact between contact surface 1054 and angled flat surface 1038, and between pivot pin 1052 and slot 1036 can support support arm 1022 at the in-use angle when support arm 1022 is in the in-use position 80.

In some embodiments, linkage support 1028 couples between support arm 1022 and wheel securement arm 300 to add support to bicycle work stand 1000 in the in-use position 80. In the illustrative embodiment shown in FIG. 32, linkage support 1028 is removably coupled to support arm 1022 and extendable portion 304 of wheel securement arm 300. Actuator housing 306, wheel holder 140, and wheel support 170 are removed from view in FIG. 32 for illustrative purposes. In some embodiments, linkage support 1028 is configured to extend approximately parallel between wheel securement arm 300 and support arm 1022. In some embodiments, linkage support 1028 can extend at an angle relative to the ground between wheel securement arm 300 and support arm 1022. Although bicycle work stand 1000 can be supported by the pivot pin 1052, slot 1036, contact surface 1054, and angled flat surface 1038, linkage support 1028 can be optionally coupled to bicycle work stand 1000 to strengthen the assembly in the in-use position, for example, when a heavy bicycle is loaded into bicycle work stand 1000.

Figure 50:
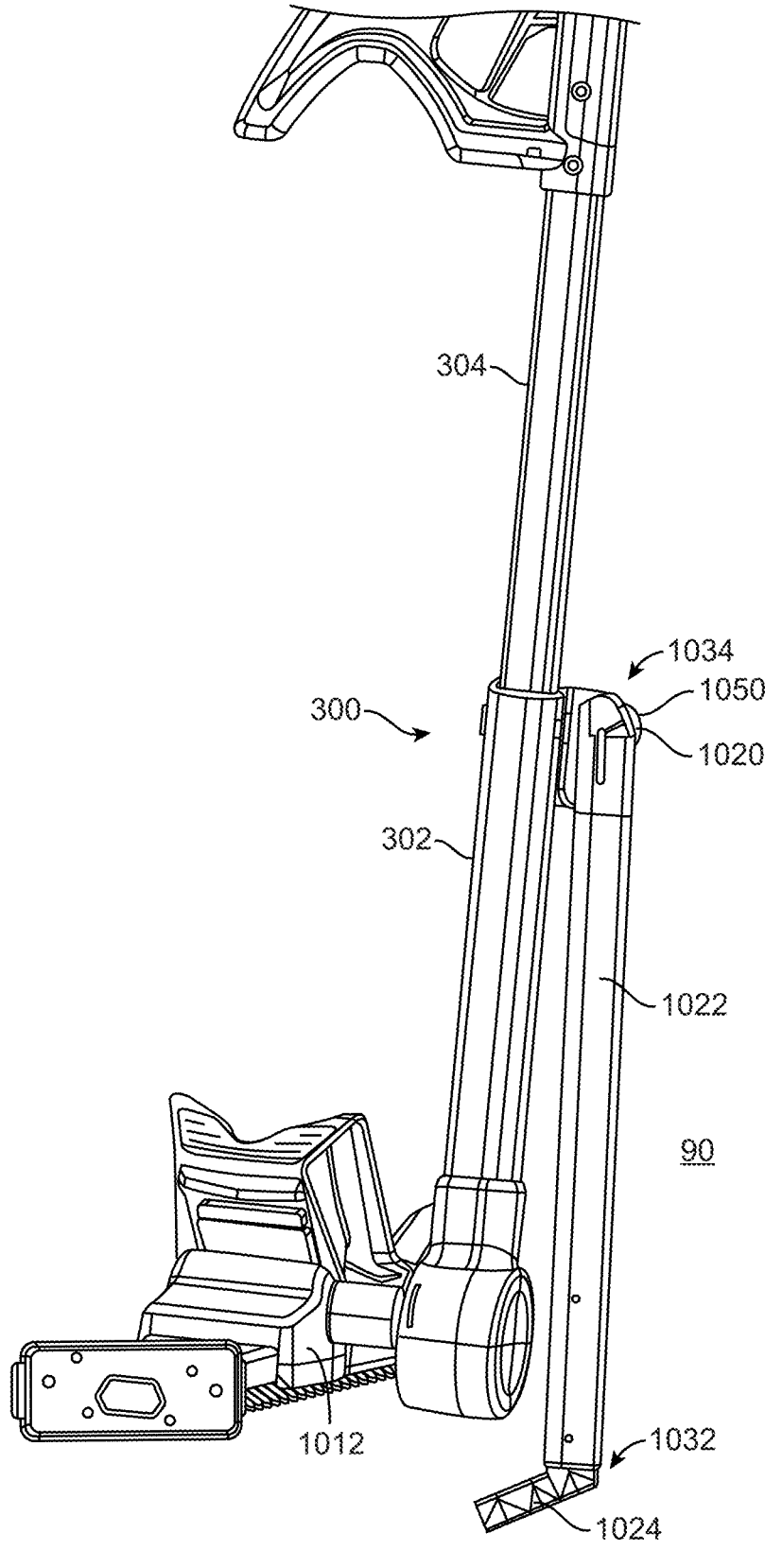
FIG. 50 illustrates a perspective view of a bicycle work stand coupled to wheel securement arm of a bicycle carrier, according to an embodiment.
Figure 51:
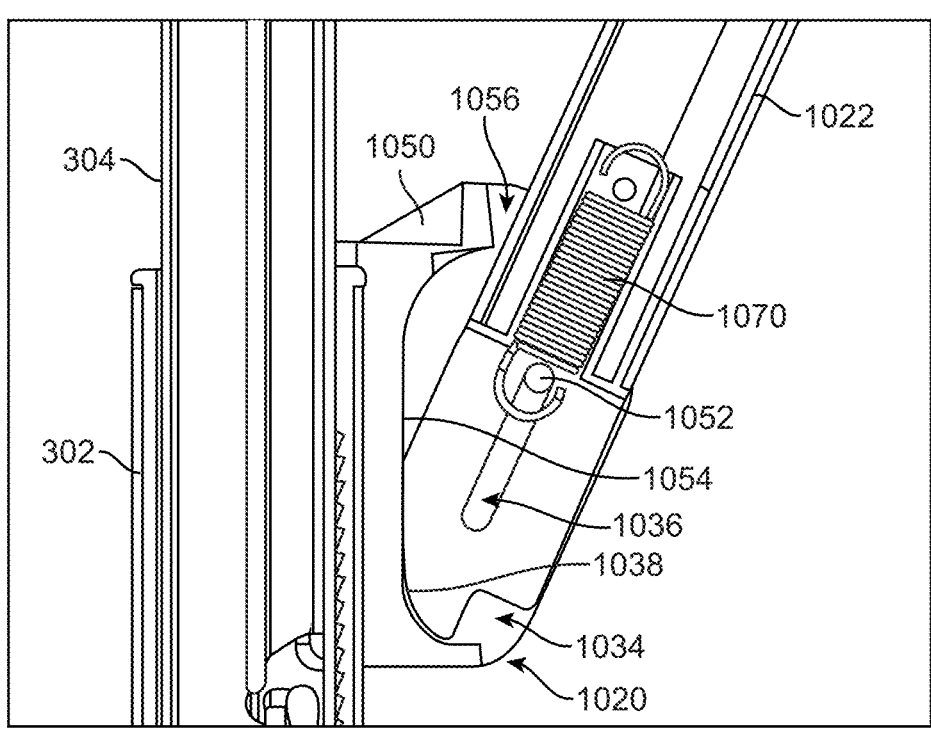
FIG. 51 illustrates a cutaway perspective view of a bicycle work stand coupled to wheel securement arm of a bicycle carrier, according to an embodiment.

In some embodiments, support arm 1022 translates and pivots around pivoting arm joint 1020 to move bicycle work stand 1000 between the in-use position 80 and the stowed position 90, as shown for example, in FIGS. 50 and 51. To move bicycle work stand 1000 between the in-use position 80 and the stowed position 90, support arm 1022 can be pulled upward and outward from wheel securement arm 300 such that pivot pin 1052 translates from a distal end 1060 of slot 1036 to a proximal end 1062 of slot 1036. Movement of the support arm 1022 can also separate angled flat surface 1038 from contact surface 1054, such that support arm 1022 can pivot around pivot pin 1052 toward the stowed position 90. Support arm 1022 continues to translate relative to pivot pin 1052 toward proximal end 1062 of slot 1036 until pivoting end 1034 of support arm 1022 is completely spaced apart from contact surface 1054 such that support arm 1022 is free to rotate into the stowed position 90. In the stowed position, pivot pin 1052 contacts proximal end 1062 of slot 1036 such that support arm 1022 hangs from pivot pin 1052. In some embodiments, a spring 1070 is coupled pivot pin 1052 and to a point along support arm 1022 such that the spring 1070 biases support arm 1022 into the in-use position 80 and/or the stowed position 90 as shown, for example, in FIG. 51.

Figure 56:
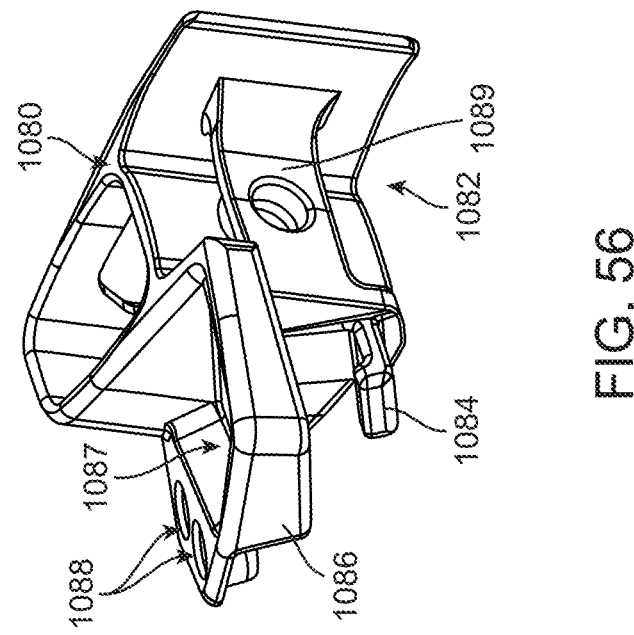
FIG. 56 illustrates a perspective view of a support of a bicycle work stand, according to an embodiment.
Figure 55:
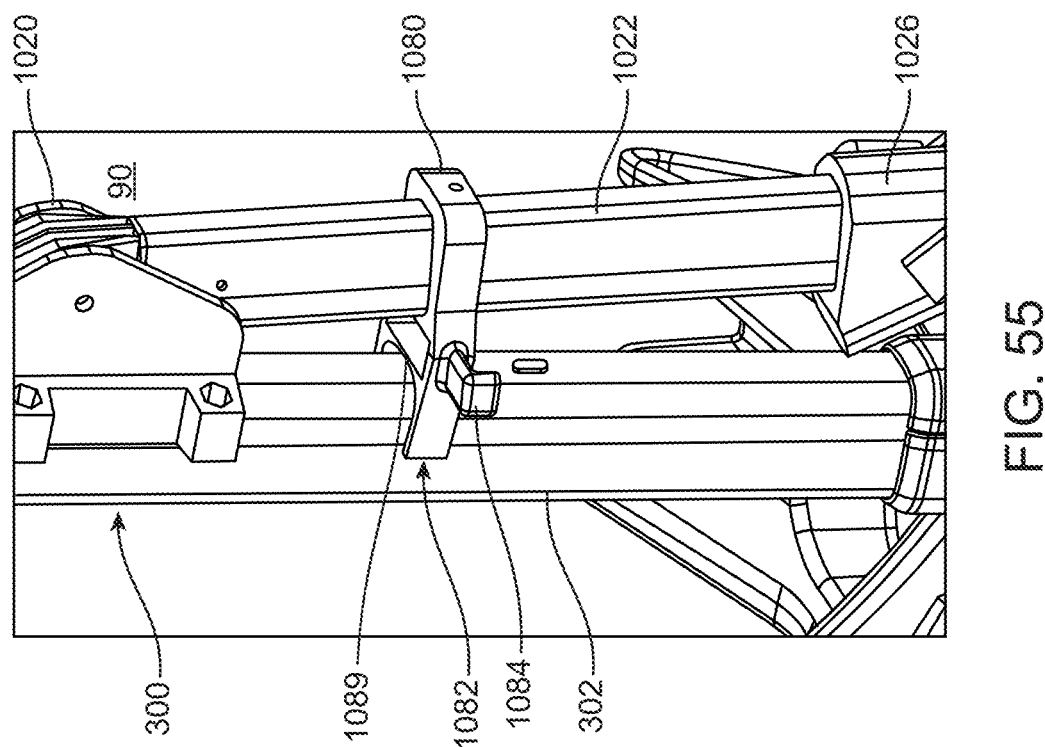
FIG. 55 illustrates a partial perspective view of a bicycle work stand, according to an embodiment.

In some embodiments, bicycle work stand 1000 can further include third support 1080 coupled to support arm 1022 as shown, for example in FIGS. 55 and 56. In some embodiments, third support 1080 can couple to support arm 1022 between second support 1026 and pivoting arm joint 1020. Third support 1080 can extend approximately perpendicular to support arm 1022 toward wheel securement arm 300 when bicycle work stand 1000 is in the stowed position 90 and away from wheel securement arm 300 when bicycle work stand 1000 is in the in-use position 80. Groove 1082 can be formed in third support 1080 and configured to engage wheel securement arm 300 when bicycle work stand 1000 is in the stowed position 90 as shown, for example, in FIG. 55. In some embodiments, groove 1082 can be narrower than wheel securement arm 300 such that third support 1080 secures bicycle work stand 1000 in the stowed position 90. In some embodiments, third support 1080 can include a tool hanger 1084 that extends away from third support 1080. Tool hanger 1084 can be an arm, a hook, a loop, or similar shape, such that a bag or tools can be attached to tool hanger 1084 when bicycle work stand 1000 is in the in-use position 80. In the illustrative embodiment shown in FIG. 56, third support 1080 can further include accessory arm 1086 configured to hold additional tools or loose fasteners. Accessory arm 1086 can extend outwardly away from third support 1080 and tray 1087 can be formed partially into accessory arm 1086 and configured to be orientated approximately horizontal when bicycle work stand 1000 is in the in-use position 80. Tray 1087 can be configured to hold loose fasteners or tools. Tool apertures 1088 can be formed through accessory arm 1086 and be configured to receive tools disposed therein. For example, a screw driver or allen key tool can be inserted through tool aperture 1088 and be removably attached to third support 1080.

Example Load Carrier Portion Coupling Mechanism

Figures 39, 40:
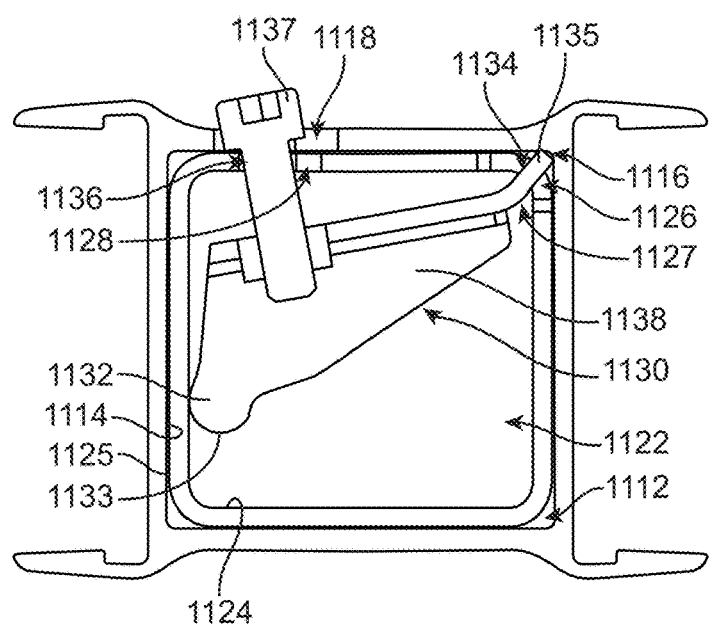
FIG. 39 illustrates a perspective view of a clamping bracket between a first carrier portion and a second carrier portion, according to an embodiment.
FIG. 40 illustrates a cross-sectional view of the clamping bracket shown in FIG. 39, according to an embodiment.

FIGS. 39 and 40 illustrate coupling mechanism 1100, according to embodiments. Coupling mechanism 1100 can be configured to secure a first carrier portion 1110 (e.g., a hitch receiver, hub 108, stinger 109, or base 104) with a second carrier portion 1120 (e.g., hub 108, base 104, or a second base (not shown) as an add-on load carrier). Although coupling mechanism 1100 is shown in FIGS. 39 and 40 as a stand-alone apparatus and/or system, the embodiments of this disclosure can be used with other apparatuses and/or systems, such as, but not limited to load carrier system 100, extension strap system 200, wheel securement arm 300, carrier accessory 450, connector 500, bumper accessory 600, cable management member 700, vehicle information device 800, assembly system 900, bicycle work stand 1000, locking mechanism 1200, wheel assembly 1300, wall mount 1400, and tilt-release actuation mechanism 1500.

In some embodiments, coupling mechanism 1100 can include first carrier portion 1110, second carrier portion 1120, and coupling member 1130, as shown, for example, in FIGS. 39 and 40. In some embodiments, second carrier portion 1120 can be received in a first interior cavity 1112 of first carrier portion 1110. Coupling member 1130 can be disposed in a second interior cavity 1122 of second carrier portion 1120 and can be configured to exert a force on first carrier portion 1110 and second carrier portion 1120 to couple first and second carrier portions 1110, 1120 together. In some embodiments, first carrier portion 1110 can be a hitch receiver and second carrier portion 1120 can be a stinger (e.g., stinger 109). In some embodiments, first carrier portion 1110 can be a load carrier base (e.g., base 104) and second carrier portion 1120 can be a hub (e.g., hub 108). In some embodiments, first carrier portion 1110 can be a load carrier base (e.g., base 104) and second carrier portion 1120 can be a second add-in load carrier base disposed between a load carrier hub and a first base. In some embodiments, first carrier portion 1110 and second carrier portion 1120 can be other components of a load carrier device that coupling together with an adjacent component.

In some embodiments, first carrier portion 1110 includes four sidewalls with inner surface 1114 and corner portion 1116 as shown, for example, in FIG. 40. First interior cavity 1112 is formed through first carrier portion 1110 and surrounded by inner surface 1114. Bolt aperture 1118 can be formed through first carrier portion 1110 to provide access to bolt 1136. In the illustrative embodiment shown in FIGS. 39 and 40, bolt aperture 1118 is a slot and is wider than a diameter of bolt head 1137 of bolt 1136.

In some embodiments, second carrier portion 1120 can be received in first interior cavity 1112 and include four side-walls with inner surface 1124, outer surface 1125, and corner portion 1127. Second interior cavity 1122 is formed through second carrier portion 1120 and surrounded by inner surface 1124. In the illustrative embodiment shown in FIG. 40, coupling aperture 1126 extends through second carrier portion 1120 at corner portion 1127. In some embodiments, coupling aperture 1126 can extend through a different corner or sidewall region of second carrier portion 1120. Coupling aperture 1126 can be sized to accommodate second contact portion 1134 of coupling member 1130. Bolt aperture 1128 can be formed through second carrier portion 1120 and align with bolt aperture 1118. In the illustrative embodiment shown in FIG. 40, bolt aperture 1128 has a smaller diameter than bolt head 1137 of bolt 1136 such that when bolt 1136 is rotated, coupling member 1130 moves towards bolt aperture 1128.

In some embodiments, coupling member 1130 can be disposed inside second interior cavity 1122 and configured to exert a force against first carrier portion 1110 and second carrier portion 1120 such that first and second carrier portions 1110, 1120 contact one another and exert frictional forces against one another to couple second carrier portion 1120 inside first carrier portion 1110. Coupling member 1130 can include first contact portion 1132, second contact portion 1134, bolt 1136, and body 1138. First contact portion 1132 can extend from a first side of body 1138 and contact a first side 1129 of inner surface 1124 of second carrier portion 1120. First contact portion 1132 can be configured to exert a force on second carrier portion 1120 such that outer surface 1125 of second carrier portion 1120 contacts inner surface 1114 of first carrier portion 1110. In the illustrative embodiment shown in FIG. 40, first contact portion 1132 can include curved portion 1133 such that as coupling member 1130 rotates, curved portion 1133 maintains a consistent contact point with inner surface 1124. Second contact portion 1134 can extend from an opposite side of body 1138 from first contact portion and extend through coupling aperture 1126 and contact inner surface 1114 of first carrier portion 1110. In the illustrative embodiment shown in FIG.

40, second contact portion 1134 includes tongue portion 1135 that contacts corner portion 1116 of first carrier portion 1110.

In some embodiments, bolt 1136 couples to body 1138 and pulls body 1138 toward bolt aperture 1128 when bolt 1136 is rotated. As body 1138 rotates and moves toward bolt aperture 1128, first contact portion 1132 exerts a force against second carrier portion 1120 in a first direction, and second contact portion 1134 exerts a force against first carrier portion 1110 in a second direction opposite the first direction. Accordingly, outer surface 1125 of second carrier portion 1120 is forced into contact with inner surface 1114 of first carrier portion 1110 and frictional forces are generated therebetween. The contact between first and second carrier portions 1110, 1120 and corresponding frictional forces couple carrier portions 1110, 1120 together.

In some embodiments, coupling mechanism 1100 can include a plurality of coupling members 1130 spaced apart along a length of the second interior cavity 1122 of the second carrier portion 1120. Each of the plurality of coupling members 1130 can be similar and provide additional coupling locations along the length of first and second carrier portions 1110, 1120 to increase the friction load applied between the outer surface 1125 and inner surface 1114, thereby increasing strength of coupling mechanism 1100.

Example Integrated Locking Mechanism

Figures 41, 42, 43:
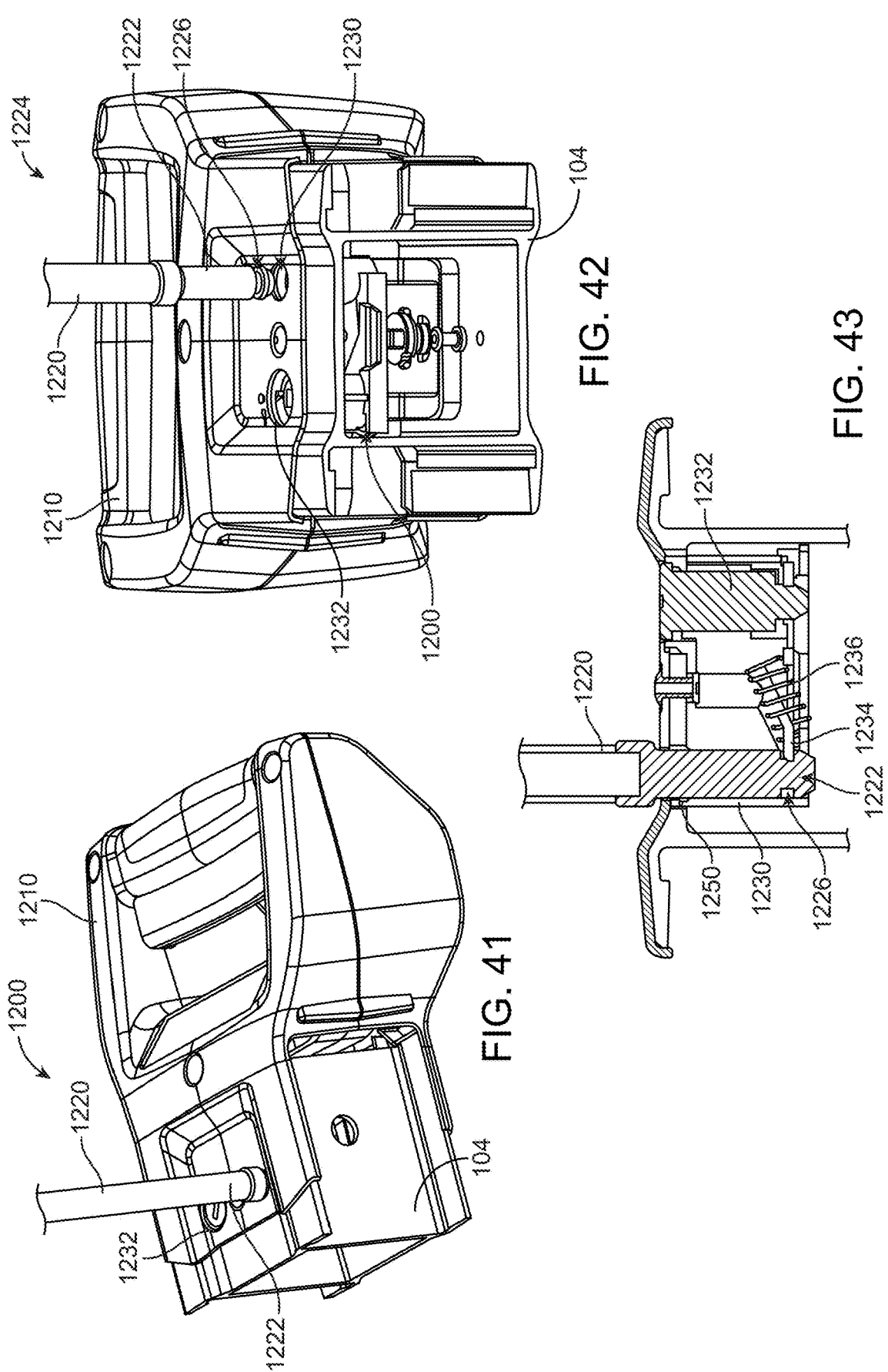
FIG. 41 illustrates a perspective view of a cable locked to a handle of a load carrier, according to an embodiment.
FIG. 42 illustrates a cutaway view of a locking mechanism housed in a handle of load carrier, according to an embodiment.
FIG. 43 illustrates a cross-sectional view of the locking mechanism shown in FIG. 42, according to an embodiment.

FIGS. 41-43 illustrate locking mechanism 1200 integrated into a load carrier, according to embodiments. Locking mechanism 1200 can be configured to lock a locking device 1220 to load carrier 100. Locking device 1220 can be arranged around or through components of bicycle 102 that is secured to load carrier 100 to lock bicycle 102 to load carrier 100. In some embodiments, locking device 1220 can be arranged around and/or through an alternative load secured to a load carrier. Although locking mechanism 1200 is shown in FIGS. 41-43 as a stand-alone apparatus and/or system, the embodiments of this disclosure can be used with other apparatuses and/or systems, such as, but not limited to load carrier system 100, extension strap system 200, wheel securement arm 300, carrier accessory 450, connector 500, bumper accessory 600, cable management member 700, vehicle information device 800, assembly system 900, bicycle work stand 1000, coupling mechanism 1100 and 1600, wheel assembly 1300, wall mount 1400, and tilt-release actuation mechanism 1500.

Figure 61:
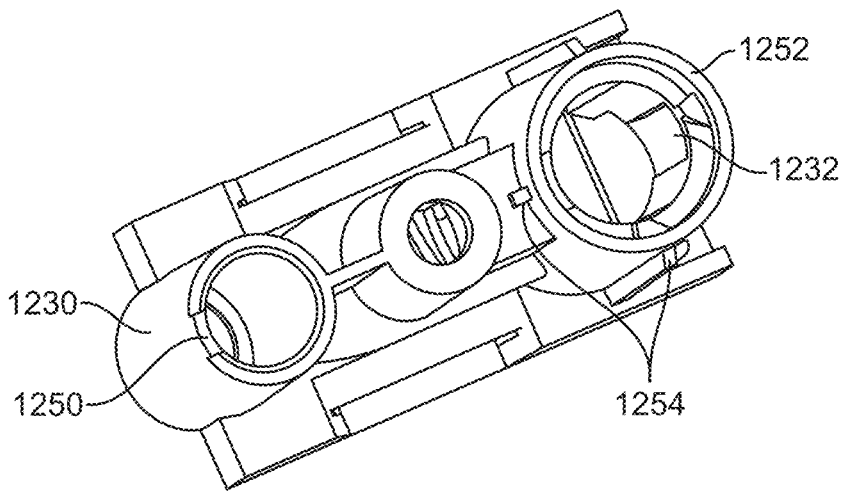
FIG. 61 illustrates a perspective view of the locking mechanism shown in FIG. 42, according to an embodiment.
Figure 62:
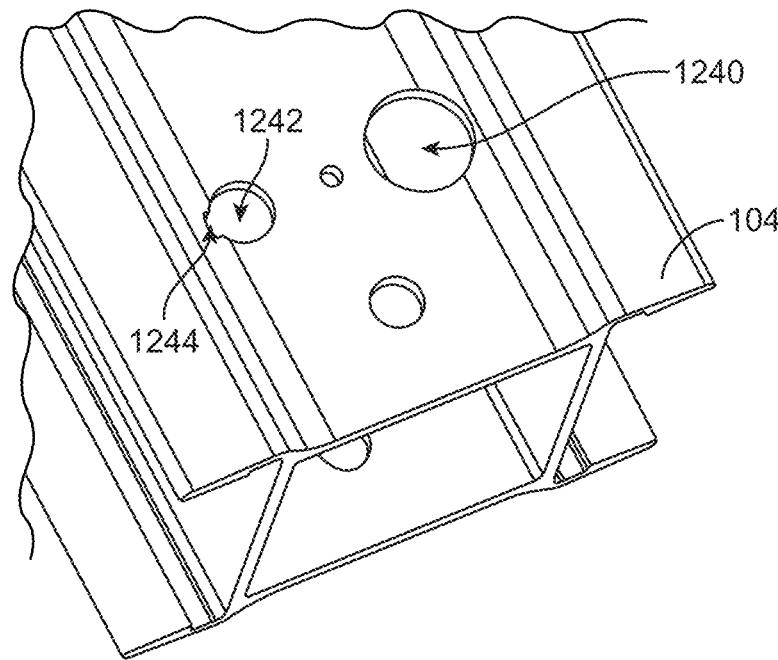
FIG. 62 illustrates a partial perspective view of the load carrier shown in FIG. 42, according to an embodiment.

In some embodiments, locking mechanism 1200 can be integrated into a distal end of base 104 of load carrier 100 such that locking mechanism 1200 can be easily accessible to a user when bicycles 102 or loads are secured to load carrier 100. In the illustrative example shown in FIGS. 41 and 42, handle 1210 is disposed at a distal end of base 104, and locking mechanism 1200 is integrated into handle 1210. In some embodiments, locking mechanism 1200 can be integrated into a bicycle tray 106, hub 108, or other component of load carrier 100. In the illustrative embodiment shown in FIG. 62, barrel aperture 1240 and locking device aperture 1242 are formed through base 104. Barrel aperture 1240 aligns with a lock barrel 1232 of locking mechanism 1200 and locking device aperture 1242 aligns with locking device chamber 1230 (see FIG. 61). Notch 1244 can be formed in a perimeter of locking device aperture 1242 and configured to receive a protrusion 1250 of locking device chamber 1230 to prevent rotation of locking mechanism 1200 relative to base 104 or handle 1210.

Locking mechanism 1200 can include locking device chamber 1230, lock barrel 1232, lock protrusion 1234, and spring 1236 configured to bias lock protrusion 1234 into a locked position, as shown, for example in FIGS. 41-43 and 61. In the illustrative embodiment shown in FIGS. 41 and 42, locking device chamber 1230 is a tube and can be configured to receive first end 1222 of locking device 1220. Locking device chamber 1230 can include protrusion 1250 configured to be inserted into notch 1244 and prevent locking mechanism 1200 from rotating relative to base 104 or handle 1210. Lock barrel 1232 is spaced apart from locking device chamber 1230 and configured to receive a key that can rotate lock barrel 1232 between a lock position and an unlock position. A rim 1252 of lock barrel 1232 can partially extend through barrel aperture 1240 to co-axially locate lock barrel 1232 with barrel aperture 1240. In the illustrative embodiment shown in FIG. 62, lock barrel 1232 can include coupling features 1254 that form a press fit engagement with base 104 and/or handle 1210. Lock protrusion 1234 can couple to lock barrel 1232 and be configured to extend into locking device chamber 1230 when lock barrel 1232 is rotated into the lock position, and retract out of locking device chamber 1230 when lock barrel 1232 is rotated into the unlock position.

In some embodiments, locking device 1220 can be a cable or bar and configured to extend around a portion of a bicycle 102 or other load secured to load carrier 100 to lock said bicycle 102 or load to load carrier 100, as shown, for example, in FIGS. 41 and 42. Locking device 1220 can extend between a first end 1222 and a second end 1224. A locking notch 1226 can be formed in first end 1222 and configured to receive lock protrusion 1234. First end 1222 can be inserted into locking device chamber 1230 when locking mechanism 1200 is in the unlock position to align locking notch 1226 with lock protrusion 1234, and then lock barrel 1232 can be rotated into the lock position such that lock protrusion 1234 inserts into locking notch 1226 as shown, for example, in FIG. 43. In some embodiments, locking notch 1226 can be a groove that extends around the circumference of first end 1222.

In some embodiments, second end 1224 of locking device 1220 can be securely coupled to a component (e.g., handle 1210, hub 108, base 104, and/or bicycle tray 106) of load carrier 100. In some embodiments, second end 1224 can include a loop such that second end 1224 is arranged around bicycle 102, and first end 1222 is inserted through the loop of second end 1224 before being inserted into locking device chamber 1230 and locked to locking mechanism 1200. In some embodiments, locking mechanism 1200 can include two locking device chambers 1230 and two lock protrusions 1234 operated by lock barrel 1232 such that first and second ends 1222, 1224 of locking device 1220 can be inserted into locking device chambers 1230 and both be securely coupled when locking mechanism 1200 is in the lock position.

In some embodiments, handle 1210 can include an actuator configured to move load carrier between an in-use position 10 and a stowed position 15. In some embodiments, when locking mechanism is in the lock position, locking mechanism 1200 can prevent handle 1210 from moving load carrier between the in-use position and the stowed position.

Example Vehicle Attachment System with Configurable Wheel Assembly

FIGS. 47-49 illustrate wheel assembly 1300 coupled to load carrier 100, according to embodiments. Wheel assembly 1300 can be configured to releasably couple, for example, to a coupling module 1320 such that wheels 1302 can be removed from load carrier 100, and/or repositioned between a transport position 70, such that load carrier 100 can be rolled via wheel assembly 1300, and a storage position, such that wheel assembly 1300 extends away from the ground. Although wheel assembly 1300 is shown in FIGS. 47-49 as a stand-alone apparatus and/or system, the embodiments of this disclosure can be used with other apparatuses and/or systems, such as, but not limited to carrier accessories and tool-free connector 400, 500, bumper accessory 600, and assembly system 900.

The wheel assembly 1300 can include wheels 1302, first support arm 1304, and second support arm 1304 as shown, for example, in FIG. 47. First support arm 1304 can extend between a first end 1310 and a second end 1312. Second support arm 1306 can extend between a first end 1311 and a second end 1313. Wheels 1302 are rotatably coupled to first ends 1310, 1311 of first and second support arms 1304, 1306. Wheels 1302 can support load carrier 100 to ease transport to and from a vehicle, or moving the load carrier system when not attached to a vehicle, etc. In some embodiments, the wheel assembly 1300 includes one wheel 1302. In some embodiments, the wheel assembly 1300 includes more than two wheels 1302. In the illustrative embodiment, shown in FIG. 47, wheel assembly 1300 includes two wheels 1302.

In some embodiments, notches 1314, 1316 can be formed in first and second support arms 1304, 1306 to engage coupling members 1334, 1344 in coupling module 1320 to couple wheel assembly 1300 to hub 108. In some embodiments, coupling notch 1314 can be formed in second end 1312 of first support arm 1304. In some embodiments, coupling notch 1314 extends perpendicularly into fist support arm 1304. In some embodiments, angled notch 1316 can be formed in second end 1313 of second load arm 1306. In some embodiments, angled notch 1316 can be a v-groove or have tapered edges. In some embodiments, first and second support arms are integrally formed as a single component as shown, for example in FIG. 48.

In some embodiments, hub 108 can include coupling module 1320 configured to receive support arms 1304, 1306 and releasably couple with wheel assembly 1300 as shown, for example, in FIGS. 47 and 49. In some embodiments, coupling module 1320 includes first module 1330 disposed on one side of hub 108, and a second module 1340 disposed on an opposite side of hub 108 to the first module 1330. First module 1330 can include actuator 1332 and coupling member 1334 configured to be biased by actuator 1332. Aperture 1336 can be formed through first module 1330 and configured to receive first support arm 1304. Coupling member 1334 includes coupling arm 1338 that extends into aperture 1336 and can be configured to engage coupling notch 1314 of first support arm 1304. In some embodiments, coupling member 1334 can be a torsion spring or spring pin and configured to bias coupling arm 1338 into aperture 1336 and into a locked configuration.

In some embodiments, actuator 1332 is configured to move coupling arm 1338 between a locked configuration and a released configuration. In the locked configuration, coupling arm 1338 engages coupling notch 1314 to couple wheel assembly 1300 to hub 108. In the released configuration, actuator 1332 pushes coupling arm 1338 out of aperture 1336 such that coupling arm 1338 disengages coupling notch 1314 and wheel assembly 1300 can be removed from hub 108.

Second module 1340 can include coupling member 1344 disposed in second module 1340 and configured to releasably couple with angled notch 1316. Aperture 1346 can be formed through second module 1340 and configured to receive second support arm 1306. Coupling member 1344 can include arm 1348 that can be biased into aperture 1346. Arm 1348 can be received in angled notch 1316 and configured to be biased outwardly by the angled surfaces of angled notch 1316. In some embodiments, angled notch 1316 can have steep sides, for example, between about 20 degrees and 45 degrees relative to the biasing direction of arm 1348, such that more force is required to bias arm 1348 from angled notch 1316. In some embodiments, angled notch 1316 can have shallow sides, for example, between about 45 degrees and 80 degrees relative to the biasing direction of arm 1348, such that less force is required to bias arm 1348 out of angled notch 1316. In some embodiments, coupling member 1334 can be a torsion spring or spring pin and configured to bias arm 1348 into aperture 1346 and into engagement with angled notch 1316.

In some embodiments, coupling notches 1314 can be formed in both first and second support arms 1304, 1306, and first and second modules 1330, 1340 can include actuators 1332 such that both actuators 1332 can be pushed to release wheel assembly 1300. In some embodiments, angled notches 1316 can be formed in both first and second support arms 1304, 1306, such that wheel assembly 1300 can be releasably coupled to hub 108 without an actuator mechanism.

Example Wall Mount for Work Stand

FIGS. 32-34, 50, 51, and 64-68 illustrate a bicycle work stand 1000 that can be releasably coupled to wheel securement arm 300 on load carrier 100 and/or wall mount 1400, according to embodiments. Bicycle work stand 1000 can be configured to support a bicycle 102 in an upright position as shown, for example, in FIG. 32. Although bicycle work stand 1000 is shown in FIGS. 32-34, 50, 51, and 64-68 as a stand-alone apparatus and/or system, the embodiments of this disclosure can be used with other apparatuses and/or systems, such as, but not limited to extension strap system 200, wheel securement arm 300, carrier accessory 450, connector 500, bumper accessory 600, cable management member 700, vehicle information device 800, assembly system 900, bicycle work stand 1000, coupling mechanism 1100 and 1600, locking mechanism 1200, wheel assembly 1300, and tilt-release actuation mechanism 1500.

In the illustrative embodiments in FIGS. 32 and 33, bicycle work stand 1000 can be releasably coupled to wheel securement arm 300. Bicycle work stand 1000 can also, or alternatively, be releasably coupled to wall mount 1400 as shown, for example, in FIGS. 66-68. Bicycle work stand 1000 can be pivoted between an in-use position 80 and a stowed position 90 and can include a pivoting arm joint 1020, a support arm 1022, a first support 1024, a second support 1026, and/or a clamp 1090 as shown, for example, in FIGS. 32-34, 50, 51, and 65-68.

Support arm 1022 can be releasably coupled to wheel securement arm 300 and/or wall mount 1400 via clamp 1090. Clamp 1090 can be configured to couple to housing 302 of wheel securement arm 300, and to couple to wall mount 1400, for example, to mounting head 1430. In some embodiments, support arm 1022 can extend away from wheel securement arm 300 at an in-use angle 1030 such that bicycle 102 is spaced apart from wheel securement arm 300 when bicycle 102 is supported by bicycle work stand 1000. In some embodiments, support arm 1022 can extend away from an axis, for example vertical axis 1401 relative to wall mount 1400 at in-use angle 1030 such that bicycle 102 is spaced apart from a wall that the wall mount 1400 is coupled to when bicycle 102 is supported by bicycle work stand 1000. In some embodiments, in-use angle 1030 is approximately 30 degrees. In some embodiments, in-use angle 1030 is between approximately 10 degrees and approximately 60 degrees.

In some embodiments, pivoting arm joint 1020 can pivotally couple to support arm 1022, as shown, for example, in FIGS. 32, 33, 50, 51, and 65-68. In some embodiments, pivoting arm joint 1020 can include housing 1050, pivot pin 1052, and contact surface 1054. Housing 1050 extends outwardly away from clamp 1090 such that support arm 1022 extends away from wall mount 1400 and/or load carrier 100. Support arm aperture 1056 can be formed through housing 1050 and be configured to receive support arm 1022. Pivot pin 1052 can be coupled to housing 1050 and extends into support arm aperture 1056 to couple with a slot 1036 formed in a pivoting end 1034 of support arm 1022. Contact surface 1054 can be disposed on an interior surface of housing 1050 and face support arm aperture 1056. Contact surface 1054 can be configured to engage support arm 1022 in an in-use position 80 to maintain the in-use angle 1030 of support arm 1022.

In some embodiments, first support 1024 is disposed at or near a distal end 1032 of support arm 1022 and can be configured to secure a saddle 103 of bicycle 102. In the illustrative embodiment shown in FIGS. 33, 34, and 64, first support 1024 can include a stepped groove 1040 configured to accommodate different shapes and sizes of saddles 103 and corresponding saddle rails 105 and seat-post attachment flanges, or other suitable bicycle components. As shown in the illustrative embodiment in FIG. 64, groove 1040 can include a first step 1041 and support walls 1037 that are sized to receive and support rails 105 of a saddle 103. In some embodiments, first step 1041 extends into first support 1024 to form a groove with support walls 1037 that constrain, align, and/or support rails 105 to prevent rails 105 from dismounting from first support 1024. In some embodiments, groove 1040 can include a second step 1043 formed in first step 1041 and extending into first support 1024. Second step 1043 and first step 1041 form a double step arrangement in groove 1040. In some embodiments, second step 1043 can be sized to receive and support a seat post clamp or lever (not shown) of a seat post of bicycle 102. In some embodiments, groove 1040 of first support 1024 can have a U-shape, V-shape, or any other shape that corresponds to a component of a bicycle.

In some embodiments, second support 1026 couples to support arm 1022 and can be spaced apart from first support 1024. In the illustrative embodiment shown in FIG. 34, second support 1026 can include support body 1044, housing 1046, and hinge 1048. Support body 1044 can be pivotally coupled to housing 1046 via hinge 1048. In some embodiments, support body 1044 can include a tool hanger 1045 that extends away from support body 1044. In some embodiments, housing 1046 of second support 1026 can be adjustably coupled to support arm 1022, such that second support 1026 can be translated along support arm 1022 to correspond to the geometry of bicycle 102. In the illustrative embodiment shown in FIGS. 33 and 34, U-shaped groove 1042 can be formed in second support 1026 and include support surface 1039. In some embodiments, U-shaped groove 1042 can be configured to accommodate a seat-post 107 or a seat tube of the frame of the bicycle 102, or other suitable component or feature of a bicycle, such that the seat-post 107 or seat tube contact and/or are supported by support surface 1039. In some embodiments, second support 1026 can have V-shape, square shape, or any other shape that corresponds to a component or frame feature of a bicycle.

In some embodiments, support arm 1022 can pivotally couple to wheel securement arm 300 and/or wall mount 1400 via pivoting arm joint 1020, as shown, for example, in FIGS. 32, 33, 50, 51, and 65-68. In the illustrative embodiment shown in FIGS. 32, 33, 51, and 65-67, support arm 1022 is in the in-use position 80 and extends at an in-use angle 1030 relative to wheel securement arm 300 and/or vertical axis 1401 of wall mount 1400. In the illustrative embodiments in FIGS. 50 and 68, support arm 1022 is in the stowed position 90 and extends toward the ground to reduce the footprint of bicycle work stand 1000. Pivoting end 1034 of support arm 1022 can be received in support arm aperture 1056 and slideably and pivotally coupled to pivoting arm joint 1020.

In some embodiments, support arm 1022 translates and/or pivots around pivoting arm joint 1020 to move bicycle work stand 1000 between the in-use position 80 and the stowed position 90, as shown for example, in FIGS. 50, 51, 67, and 68. To move bicycle work stand 1000 between the in-use position 80 and the stowed position 90, support arm 1022 can be pulled upward and outward from pivoting arm joint 1020 such that pivot pin 1052 translates from a distal end 1060 of slot 1036 to a proximal end 1062 of slot 1036 as shown, for example, in FIG. 51. Movement of the support arm 1022 can also separate angled flat surface 1038 from contact surface 1054, such that support arm 1022 can pivot around pivot pin 1052 toward the stowed position 90. Support arm 1022 continues to translate relative to pivot pin 1052 toward proximal end 1062 of slot 1036 until pivoting end 1034 of support arm 1022 is completely spaced apart from contact surface 1054 such that support arm 1022 is free to rotate into the stowed position 90. In the stowed position, pivot pin 1052 contacts proximal end 1062 of slot 1036 such that support arm 1022 hangs from pivot pin 1052. In some embodiments, a spring 1070 is coupled pivot pin 1052 and to a point along support arm 1022 such that the spring 1070 biases support arm 1022 into the in-use position 80 and/or the stowed position 90 as shown, for example, in FIG. 51.

In some embodiments, bicycle work stand 1000 can further include third support 1080 coupled to support arm 1022 as shown, for example in FIGS. 55, 56, and 65-68. In some embodiments, third support 1080 can couple to support arm 1022 between second support 1026 and pivoting arm joint 1020. Groove 1082 can be formed in third support 1080 and include stow-away holding surface 1089. In some embodiments, groove 1082 and stow-away holding surface 1089 can be configured to engage wheel securement arm 300 when bicycle work stand 1000 is in the stowed position 90 as shown, for example, in FIG. 55. In some embodiments, groove 1082 can be narrower than wheel securement arm 300 such that third support 1080 secures bicycle work stand 1000 in the stowed position 90. In some embodiments, third support 1080 can include a tool hanger 1084 that extends away from third support 1080. Tool hanger 1084 can be an arm, a hook, a loop, or similar shape, such that a bag or tools can be attached to tool hanger 1084 when bicycle work stand 1000 is in the in-use position 80. In the illustrative embodiment shown in FIG. 56, third support 1080 can further include accessory arm 1086 configured to hold additional tools or loose fasteners. Accessory arm 1086 can extend outwardly away from third support 1080 and tray 1087 can be formed partially into accessory arm 1086 and configured to be orientated approximately horizontal when bicycle work stand 1000 is in the in-use position 80. Tray 1087 can be configured to hold loose fasteners or tools. Tool apertures 1088 can be formed through accessory arm 1086 and be configured to receive tools disposed therein. For example, a screwdriver or allen key tool can be inserted through tool aperture 1088 and be removably attached to third support 1080.

In some embodiments, clamp 1090 extends away from pivoting arm joint 1020 and is configured to releasably couple bicycle work stand 1000 with wheel securement arm 300 and/or wall mount 1400. For example, a user can couple bicycle work stand 1000 to wheel securement arm 300 when the user is on a bicycle ride and using load carrier 100. The user can also couple bicycle work stand 1000 to wall mount 1400, for example, when the user is at home or without load carrier 100. In some embodiments, clamp 1090 includes first clamp portion 1092 and bracket 1094 as shown, for example, in FIG. 65. In some embodiments, first clamp portion 1092 and housing 1050 of pivoting arm joint 1020 are integrally formed as a single component. In some embodiments, first clamp portion 1092 can be coupled with pivoting arm joint 1020 via welding, bolts, rivets, or other suitable coupling elements.

Figure 65:
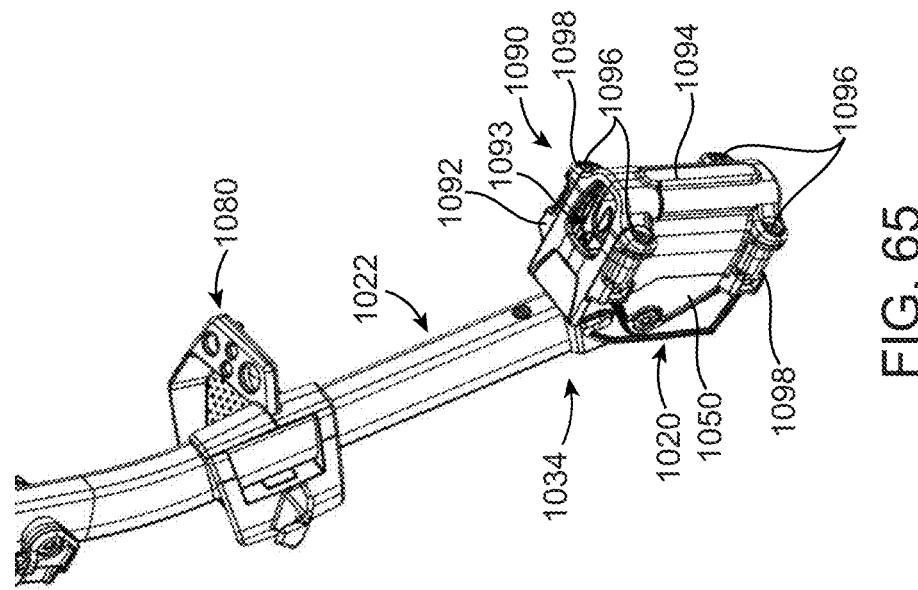
FIG. 65 illustrates a partial perspective view of a clamp for mounting a bicycle work stand to a load carrier or wall mount, accordingly to an embodiment.
Figure 64:
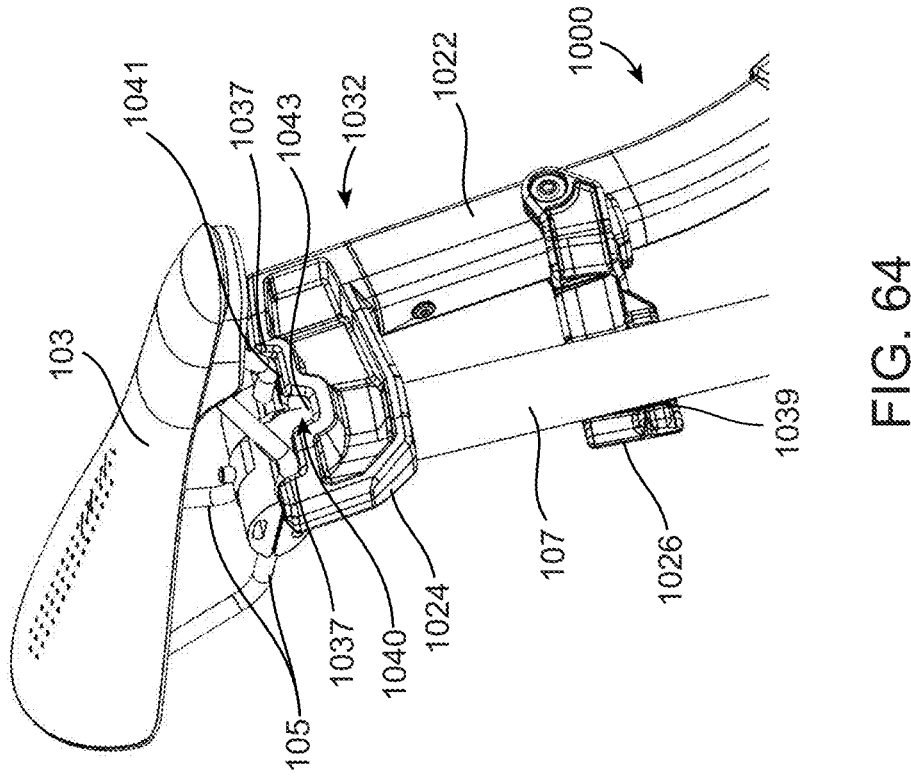
FIG. 64 illustrates a partial perspective view of a bicycle work stand supporting a bicycle seat and seat post, accordingly to an embodiment.

First clamp portion 1092 can have a U-shape and be configured to assemble around a distal side of housing 302 of wheel securement arm 300 as shown, for example, in FIGS. 33 and 65. Bracket 1094 can couple to first clamp portion 1092 on a proximal side of housing 302 to releasably couple clamp 1090 to wheel securement arm 300 such that housing 302 is disposed in a gap 1093 formed between first clamp portion 1092 and bracket 1094. In some embodiments, bracket 1094 can form a U-shape and surround a portion of housing 302, such that first clamp portion 1092 and bracket 1094 both surround a portion of housing 302. In some embodiments, bracket 1094 is approximately flat, such that first clamp portion 1092 surrounds three side of housing 302, and bracket 1094 covers the proximal side of housing 302 only. In some embodiments, first clamp portion 1092 is approximately flat and bracket 1094 is U-shaped, such that bracket 1094 surrounds three side of housing 302, and first clamp portion 1092 covers the distal side of housing 302 only. A plurality of assembly bolts 1096 can couple first clamp portion 1092 and bracket 1094 together to secure clamp 1090 to housing 302. In some embodiments, each of first clamp portion 1092 and bracket 1094 include assembly flanges 1098 with apertures through which assembly bolts 1096 can extend to couple first clamp portion 1092 with bracket 1094. In some embodiments, clamp 1090 can be adjustable coupled to housing 302, such that bicycle work stand 1000 can be translated along housing 302 to adjust a working height of bicycle work stand 1000 and bicycle 102.

Bicycle work stand 1000 can be releasably coupled to a wall via wall mount 1400, such that a user can support a bicycle 102 in an upright position without the load carrier 100. Wall mount 1400 includes a wall bracket 1410, an arm 1420, and a mounting head 1430 as shown, for example, in FIGS. 66-68. Wall bracket 1410 can be configured to be secured to a wall. In some embodiments, wall bracket 1410 can be rigidly fixed to an interior wall, and exterior wall, a panel of a vehicle, a table, or other suitable structures. In the illustrative embodiment in FIGS. 66-68, wall bracket 1410 is approximately square with rounded corners. In some embodiments, wall bracket 1410 can be rectangular, circular, oval, or other suitable shapes for mounting to a wall. Wall bracket 1410 can include a plurality of apertures 1412 through which attaching members, such as bolts, rivets, screws, or other suitable fixing elements, can attach the wall bracket 1410 to the wall. Arm 1420 extends between wall bracket 1410 and mounting head 1430 and is configured to position mounting head 1430 away from the wall such that when bicycle work stand 1000 is coupled to wall mount 1400 and supporting bicycle 102, all components of bicycle 102 are spaced apart from the wall that wall mount 1400 is rigidly fixed to. In some embodiments, arm 1420 is a generally hollow structure and includes a plurality of ribs 1422, a top surface 1424 disposed above the plurality of ribs 1422, and a bottom surface 1426 disposed beneath the plurality of ribs 1422. The plurality of ribs 1422 can extend in approximately parallel rows along the length and height of arm 1420 between wall bracket 1410 and mounting head 1430. In some embodiments, the plurality of ribs 1422 form structural cells 1423 within arm 1420. The generally hollow structure of arm 1420 and the plurality of ribs 1422 allow arm 1420 to have low weight and high strength. The plurality of ribs 1422 increase stiffness along the length of arm 1420 to resist bending forces when a bicycle 102 is supported by bicycle work stand 1000. In some embodiments, arm 1420 can be solid. In some embodiments, arm 1420 can be made from a rigid material, such as a thermoplastic, steel, aluminum, carbon fiber, or another suitable material. In some embodiments, arm 1420 can be an I-beam. In some embodiments, arm 1420 can include side surfaces such that the plurality of ribs 1422 are hidden from view by each of the top surface 1424, the bottom surface 1426, and the side surfaces (not shown).

Figure 66:
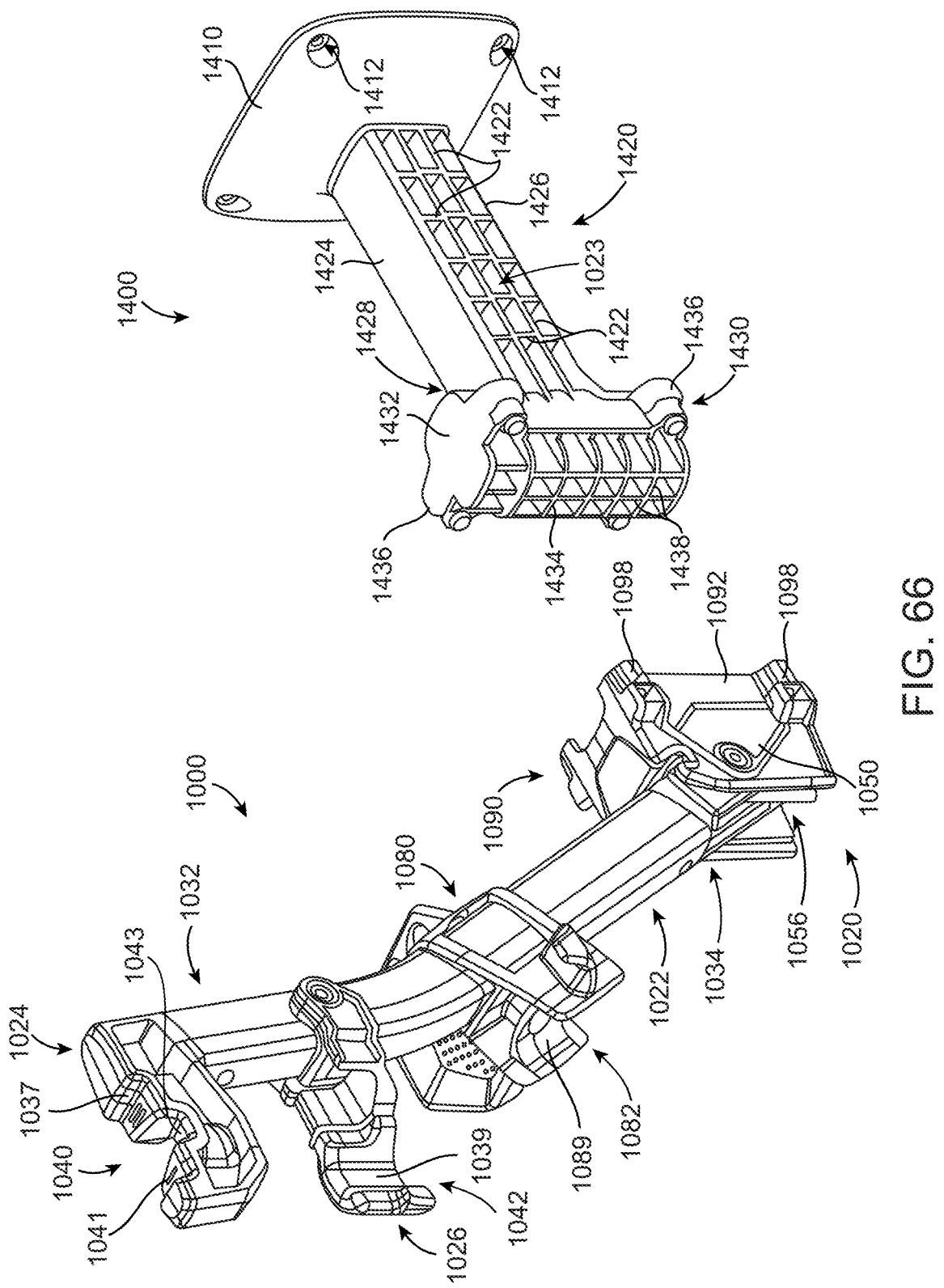
FIG. 66 illustrates a partial exploded view of an assembly for mounting a bicycle work stand to a wall mount, accordingly to an embodiment.
Figure 68:
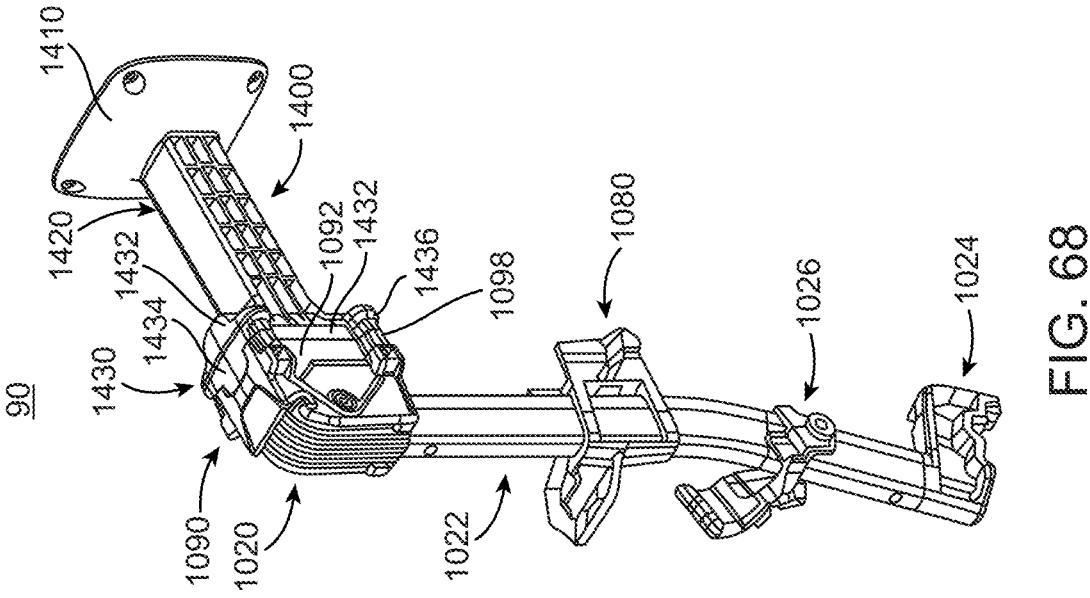
FIG. 68 illustrates a perspective view of a bicycle work stand coupled to a wall mount in a stowed configuration, according to an embodiment.
Figure 67:
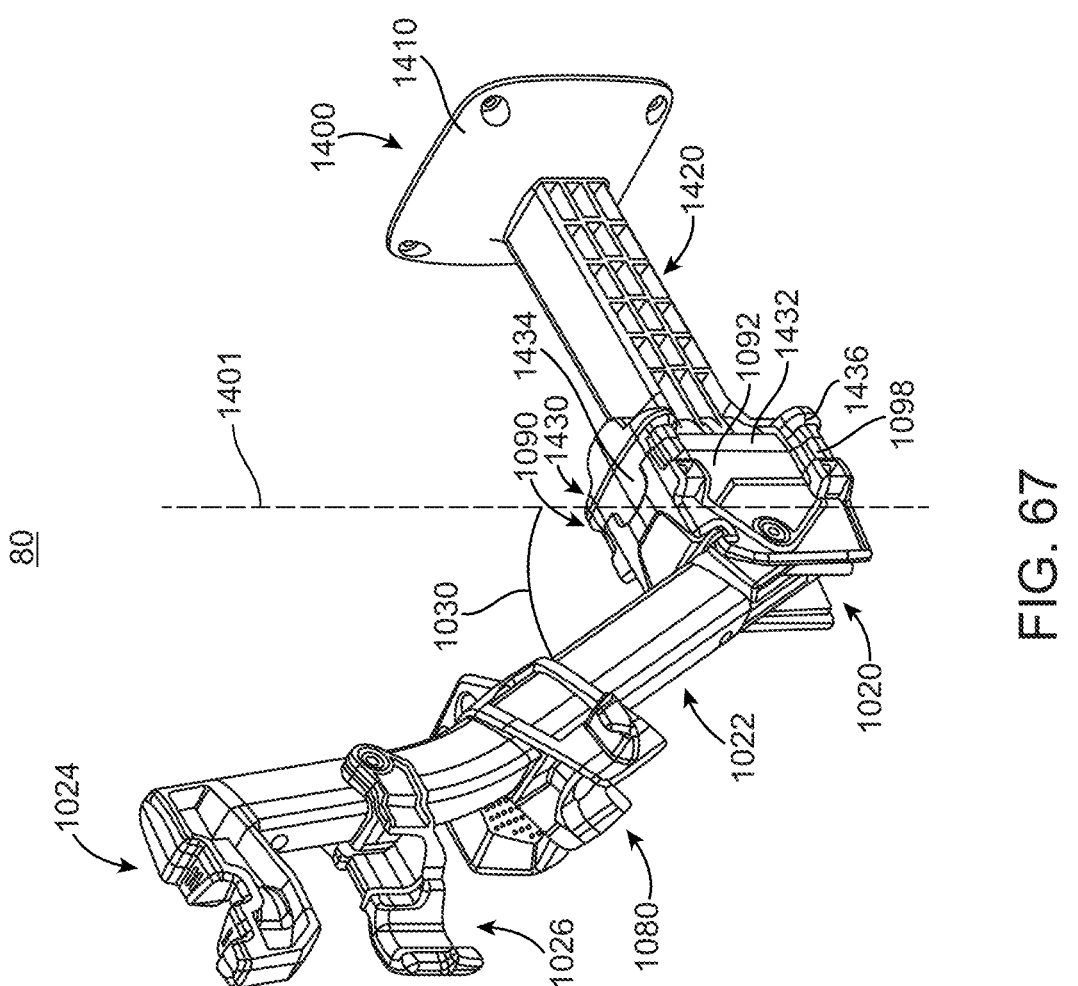
FIG. 67 illustrates a perspective view of a bicycle work stand coupled to a wall mount in an in-use configuration, according to an embodiment.

Mounting head 1430 is disposed at a distal end 1428 of arm 1420 and can be configured to receive first clamp portion 1092 of bicycle work stand 1000 as shown, for example, in FIGS. 66-68. In some embodiments, mounting head 1430 includes body 1432, clamp protrusion 1434, flanges 1436, and plurality of ribs 1438. Body 1432 extends outwardly away from each of distal end 1428, top surface 1424, and bottom surface 1426. In some embodiments, body 1432 is similarly sized to clamp 1090. Clamp protrusion 1434 extends away from body 1432 and is shaped to correspond to the U-shape of first clamp portion 1092 and/or the shape of housing 302 of wheel securement arm 300. In some embodiments, clamp protrusion 1434 closely fits the U-shape of first clamp portion 1092 such that a bending load applied on bicycle work stand 1000 is evenly distributed through mounting head 1430 and into arm 1420 and wall bracket 1410. In some embodiments, clamp protrusion 1434 has a similar profile to first clamp portion 1092 to guide clamp 1090 into a coupling position with mounting head 1430. In some embodiments, flanges 1436 extend outwardly away from body 1432 and are configured to align with flanges 1098 of clamp 1090 such that assembly bolts 1096 can extend through flanges 1098 and flanges 1436 to couple bicycle work stand 1000 to wall mount 1400. In some embodiments, mounting head 1430 is a generally hollow structure and includes plurality of ribs 1438 that extend in approximately parallel rows to increase strength of mounting head 1430 while maintaining low weight. In some embodiments, the plurality of ribs 1438 form structural cells within mounting head 1430. In some embodiments, plurality of ribs 1422 of arm 1420 extend continuously into mounting head 1430 to form plurality of ribs 1438.

In some embodiments, arm 1420 can be pivotally coupled to wall bracket 1410 such that wall mount 1400 can be pivoted between an in-use configuration and a stowed configuration. In some embodiments, in the in-use configuration, arm 1420 is approximately perpendicular to wall bracket 1410. In some embodiments, in the stowed configuration, arm 1420 is approximately parallel with wall bracket 1410. In some embodiments, flanges 1436 of mounting head

1430 can include a recess, and clamp 1090 can include a release lever with eccentric surface, such that the release lever and couple with a recess in the flange to form a quick-release coupling arrangement. In some embodiments, mounting head 1430 of wall mount 1400 includes a male receiver extending away from top surface 1424, and clamp 1090 is configured to be lowered on to the male receiver and coupled thereto. In some embodiments, the male receiver of mounting head 1430 can include a resilient tab configured to releasably attach to clamp 1090 when bicycle work stand 1000 is coupled to wall mount 1400.

Example Tilt-Release Actuation Mechanism

FIG. 69-75 illustrate tilt-release actuation mechanism 1500 of load carrier system 100, according to embodiments. Tilt-release actuation mechanism 1500 can be configured to tilt base 104 between in-use and/or storage configurations 10, 15. Although tilt-release actuation mechanism 1500 is shown in FIGS. 69-75 as a stand-alone apparatus and/or system, the embodiments of this disclosure can be used with other apparatuses and/or systems, such as, but not limited to extension strap system 200, wheel securement arm 300, carrier accessory 450, connector 500, bumper accessory 600, cable management member 700, vehicle information device 800, assembly system 900, bicycle work stand 1000, coupling mechanism 1100 and 1600, locking mechanism 1200, wheel assembly 1300, and wall mount 1400.

As shown in FIGS. 69-72, base 104 can be rotatably coupled to hub 108 via locking mechanism 1510 of tilt-release actuation mechanism 1500. Tilt-release actuation mechanism 1500 can include locking mechanism 1510, connector 1520, and handle assembly 1530. In the illustrative embodiment shown in FIGS. 71 and 72, locking mechanism 1510 is pivotally coupled to hub 108 and includes projection 1516 that biases into engagement with receivers 1508, 1509. Locking mechanism 1510 can couple to first end 1502 of base 104 such that locking mechanism 1510 and base 104 rotate together relative to hub 108. Connector 1520 can extend through base 104 and couple between locking mechanism 1510 and handle assembly 1530. Connector 1520 can be configured to transfer movements from an actuator 1534 of handle assembly 1530 to the projection 1516 of locking mechanism 1510. Handle assembly 1530 can couple to a second end 1504 of base 104 and includes actuator 1534 that couples to connector 1520, for example, via a rotating arm 1536 and a linkage member 1538. When a user operates tilt-release actuation mechanism 1500, actuator 1534 is translated relative to base 104, which in turn translates connector 1520 and projection 1516 of locking mechanism 1510. The resulting translation of projection 1516 disengages projection 1516 from one of receivers 1508, 1509, allowing locking mechanism 1510 and base 104 to rotate relative to hub 108. When actuator 1534 is released, spring 1518 biases projection 1516 toward one of receivers 1508, 1509 to lock locking mechanism 1510 with hub 108 and prevent rotation of base 104 relative to hub 108.

Figure 69:
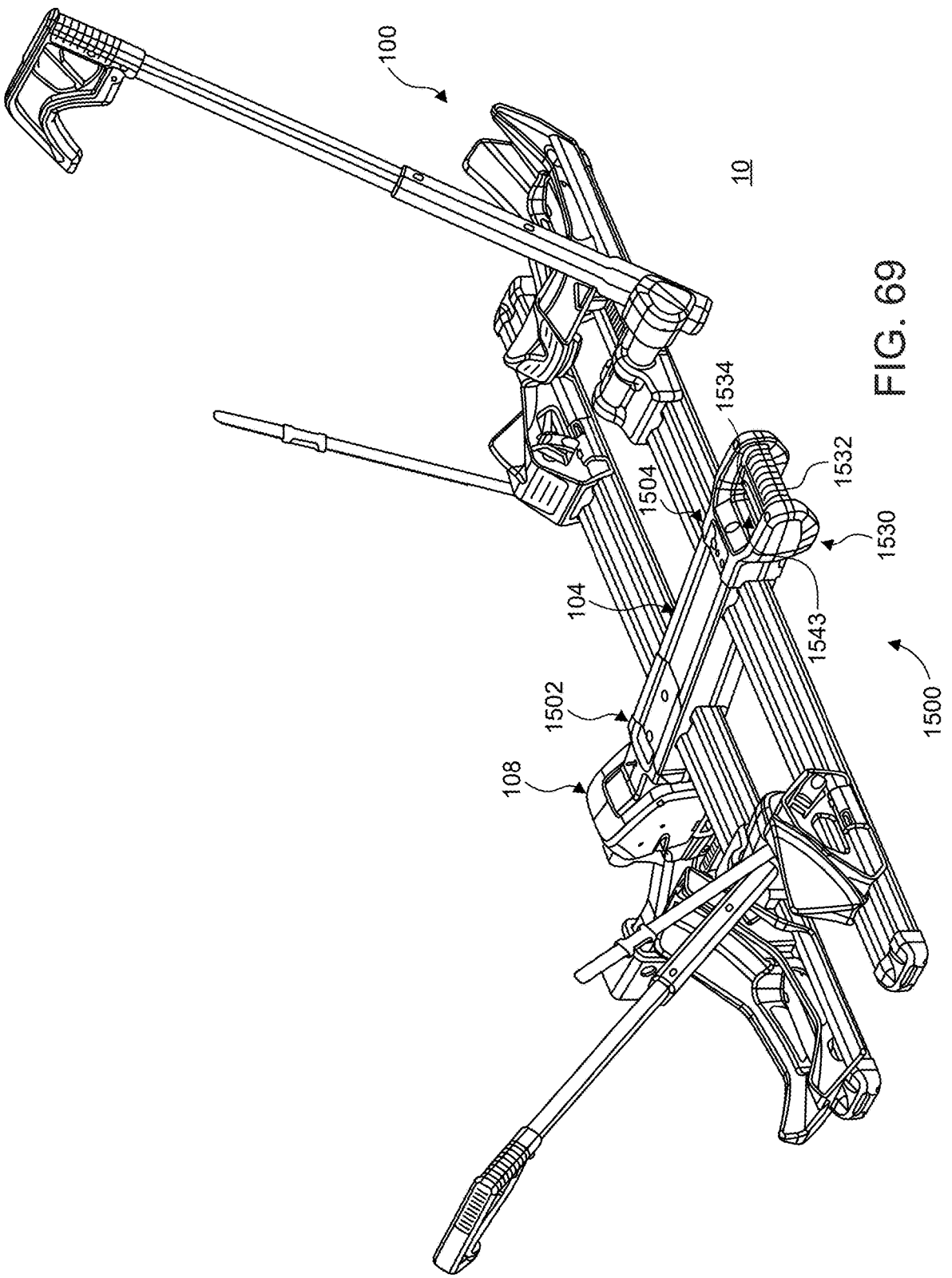
FIG. 69 illustrates a perspective view of a load carrier with a tilt release mechanism in an in-use position, according to an embodiment.

In some embodiments, locking mechanism 1510 can be pivotally coupled to hub 108 via pivot point 1507 and substantially disposed within interior cavity 1506 of hub 108. Locking mechanism 1510 can include an engaging end 1512, a coupling end 1514, a projection 1516 disposed at the engaging end 1512, and a spring 1518 configured to bias the projection 1516 away from engaging end 1512 and into engagement with receivers 1508, 1509 that are formed in hub 108. In some embodiments, coupling end 1514 extends outside of interior cavity 1506 of hub 108 and couples with a first end 1502 of base 104 such that base 104 can pivot with locking mechanism 1510 around pivot point 1507. In some embodiments, coupling end 1514 of locking mechanism 1510 can couple with first end 1502 of base 104 using coupling mechanism 1100 as described above and shown, for example, in FIGS. 39 and 40, or insert tube 1630 as described below and shown, for example, in FIGS. 78-80. In some embodiments, projection 1516 can be disposed at engaging end 1512 and be configured to engage and interlock with receivers 1508, 1509 formed in hub 108 to lock a relative rotation between hub 108 and base 104. For example, as shown in FIGS. 69 and 71, when projection 1516 is received in first receiver 1508, load carrier assembly 100 is in an in-use position 10. When projection 1516 is received in second receiver 1509, load carrier assembly 100 is in a storage/upright position 15 as shown, for example, in FIGS. 70 and 72. In some embodiments, spring 1518 can be configured to translate projection 1516 based on relative motion of an actuator 1534 and corresponding translation of connector 1520. In some embodiments, actuator 1534 can be actuated against the force from spring 1518 to translate projection 1516 and connector 1520 towards a second end 1504 of base 104 to disengage projection 1516 from receivers 1508, 1509 such that base 104 can be rotated relative to hub 108.

Figure 71:
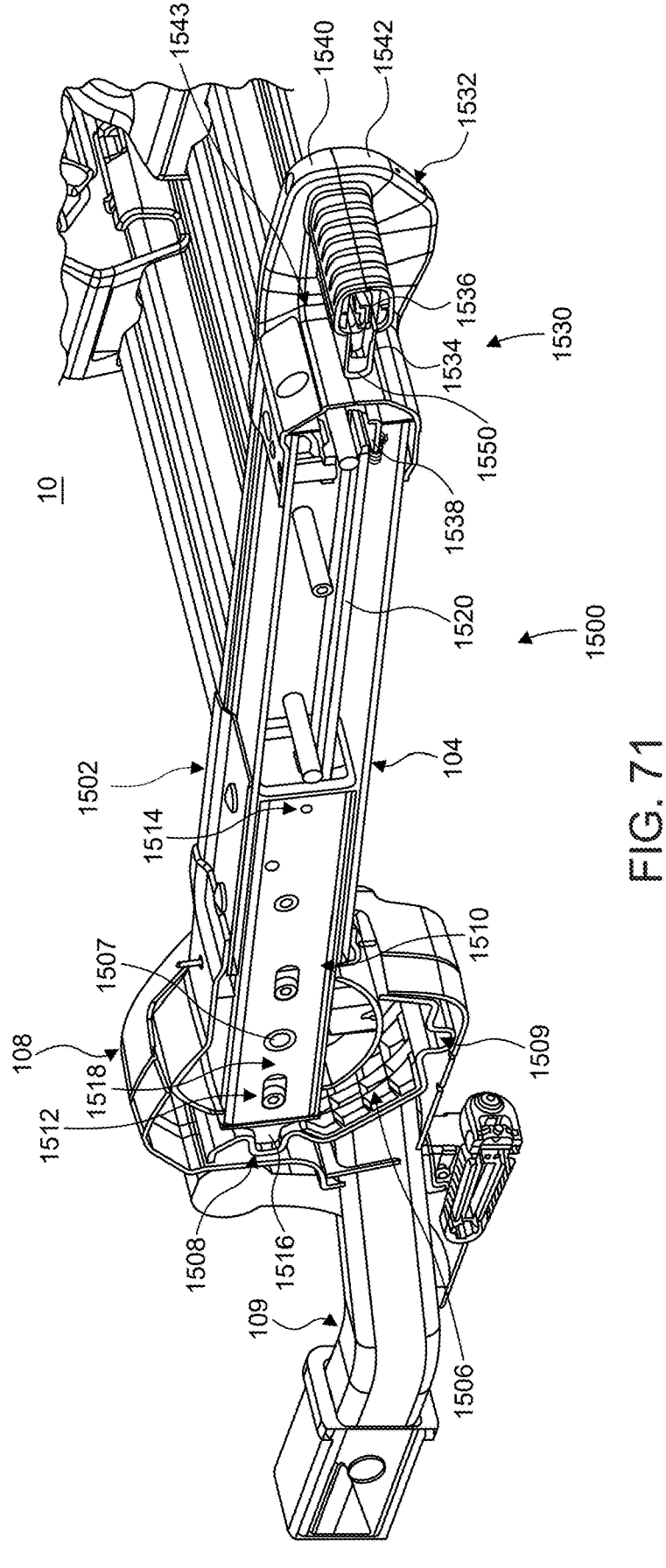
FIG. 71 illustrates a cutaway perspective view of a tilt release mechanism for a load carrier in an in-use position, according to an embodiment.
Figure 72:
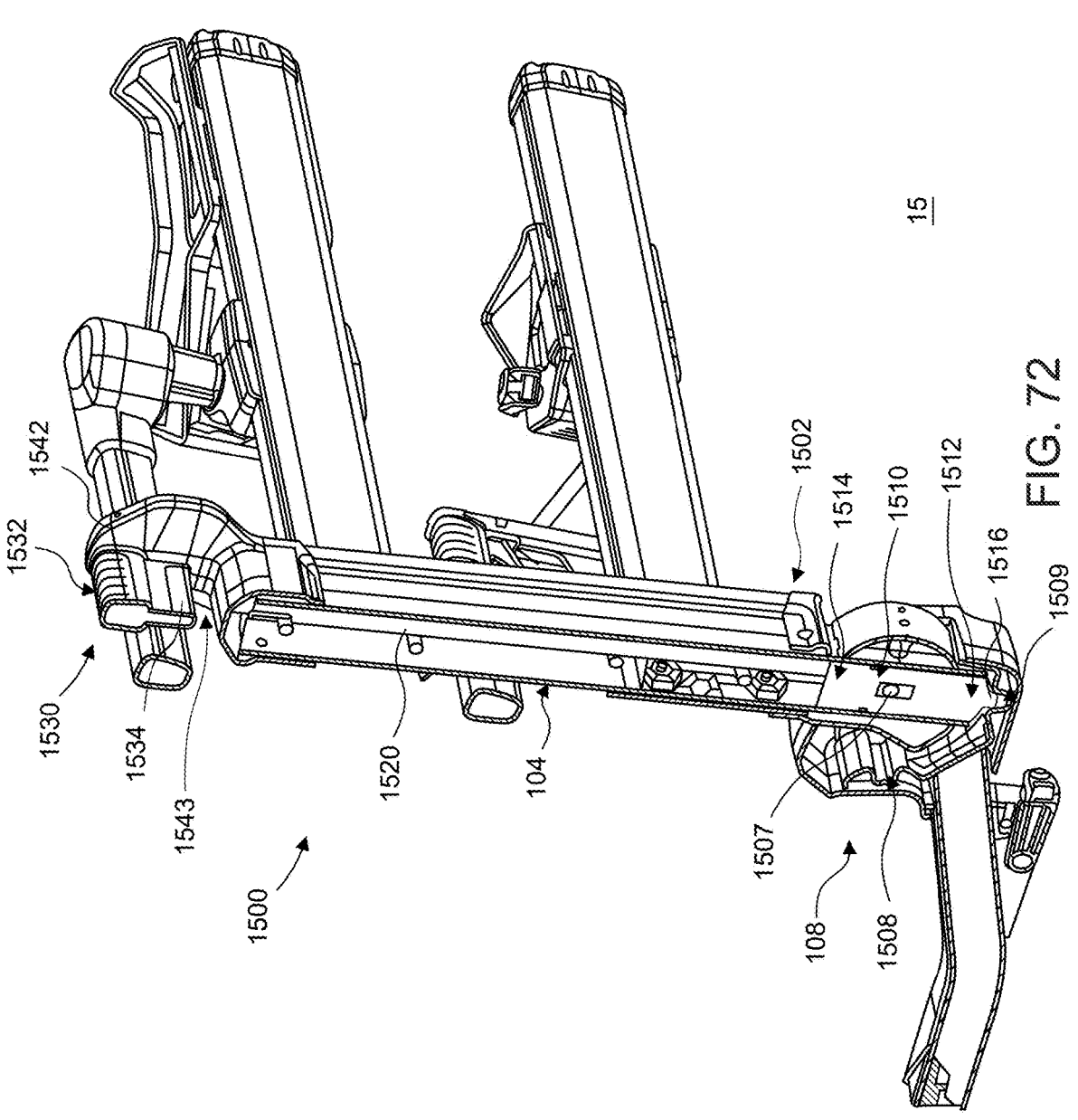
FIG. 72 illustrates a cutaway perspective view of a tilt release mechanism for a load carrier in a storage position, according to an embodiment.

In the illustrative embodiment shown in FIGS. 71 and 72, connector 1520 extends between coupling end 1514 of locking mechanism 1510 and a linkage member 1538 of handle assembly 1530 to translate motion from actuator 1534 to projection 1516. In some embodiments, connector 1520 extends inside base 104 along the length of base 104. In some embodiments, connector 1520 can include a rod, a wire, a cord, a chain, a plate (e.g., an extruded plated), or a combination thereof. In some embodiments, connector 1520 can be releasably coupled with at least one of the locking mechanism 1510 and handle assembly 1530 so that, for example, an accessory base portion can be assembled between base 104 and hub 108 so that load carrier system 100 can accommodate more items such as, but not limited to, additional bicycles.

In some embodiments, handle assembly 1530 can be disposed at second end 1504 of base 104 (e.g., fixedly attached or removably attached). In some embodiments, handle assembly 1530 can be configured to translate projection 1516 to disengage from receivers 1508, 1509 as shown, for example, in FIGS. 69-73. In some embodiments, handle assembly 1530 can be held by a user to rotate the load carrier 100 between in-use position 10 and storage/upright position 15. Handle assembly 1530 can include a first side 1531, a second side 1533, a handle 1532, actuator 1534, a rotating arm 1536, and/or linkage member 1538 as shown, for example, in FIGS. 71, 73, and 74.

In some embodiments, handle 1532 can be rigidly fixed to second end 1504 of base 104 and be configured to move with base 104 as shown, for example, in FIGS. 69-73. In some embodiments, handle 1532 can be similar to handle 805 and be configured to couple with vehicle information device 800 as disclosed above and shown, for example, in FIGS. 26-28. In some embodiments, handle 1532 can include a top shell 1540 and a bottom shell 1542, such that the actuator 1534, rotating arm 1536, and linkage member 1538 can be assembled inside handle 1532, as shown, for example, in FIG. 73. In some embodiments, operating aperture 1543 is formed through top and bottom shells 1540, 1542. In some embodiments, one or more grooves 1544 can be formed into one or both of top and bottom shells 1540, 1542. The groove(s) 1544 can be configured guide actuator 1534 along a linear path during actuation. In some embodiments, top shell 1540 and bottom shell 1542 can be coupled together using a plurality of screws 1548. In some embodiments, top shell 1540 and bottom shell 1542 can be coupled together using adhesive, rivets, bolts, or other suitable coupling fixtures. In the illustrative embodiment shown in FIG. 74, a plurality of apertures 1546 are formed through top shell 1540 and a plurality of receiving coupling fixtures 1547 are formed into bottom shell 1542 adjacent to plurality of apertures 1546. The plurality of screws 1548 can extend through the plurality of apertures 1546 and coupling with the receiving coupling fixtures 1547 to couple the top and bottom shells 1540, 1542 together.

Figure 70:
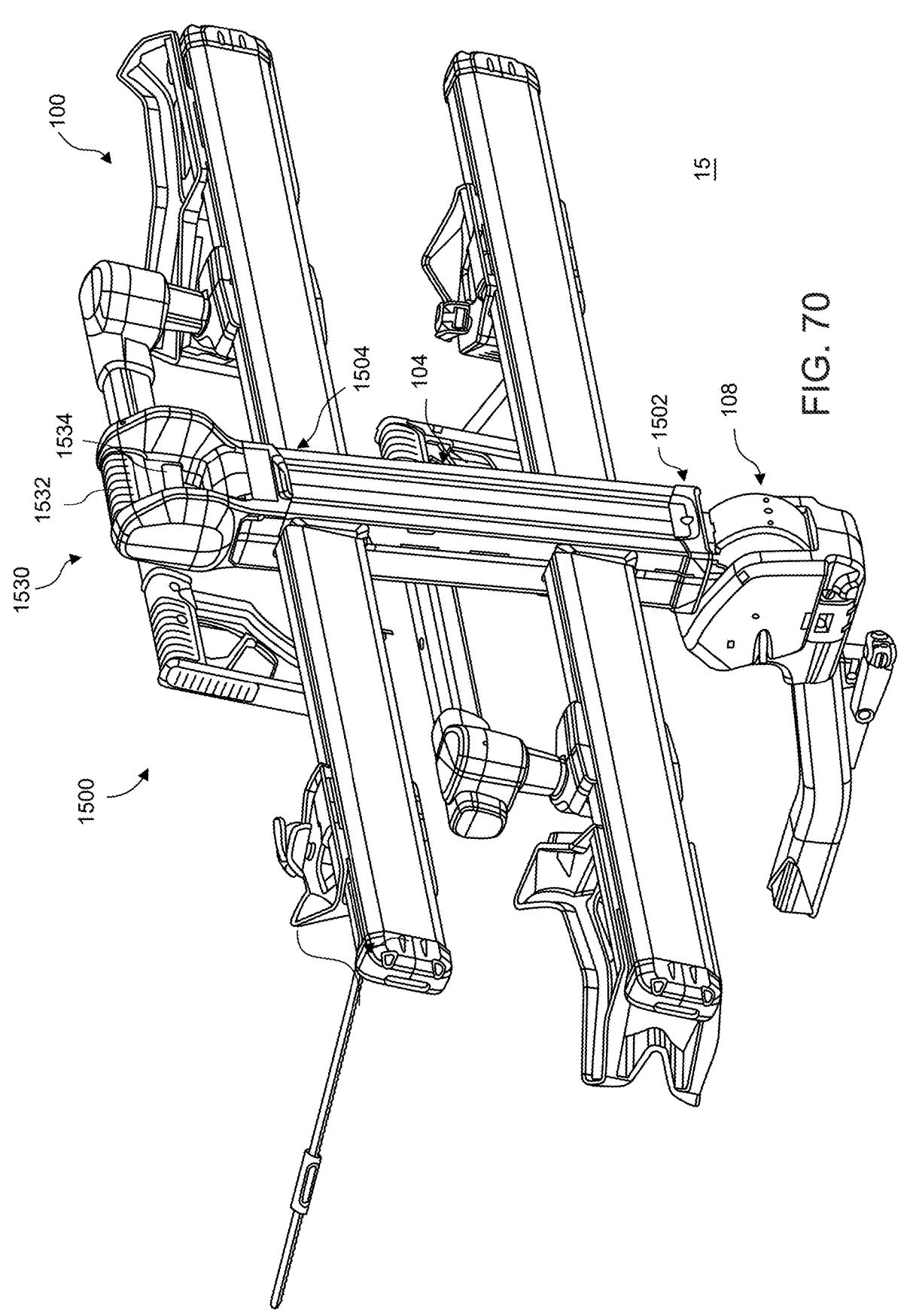
FIG. 70 illustrates a perspective view of a load carrier with a tilt release mechanism in a storage position, accordingly to an embodiment.
Figure 73:
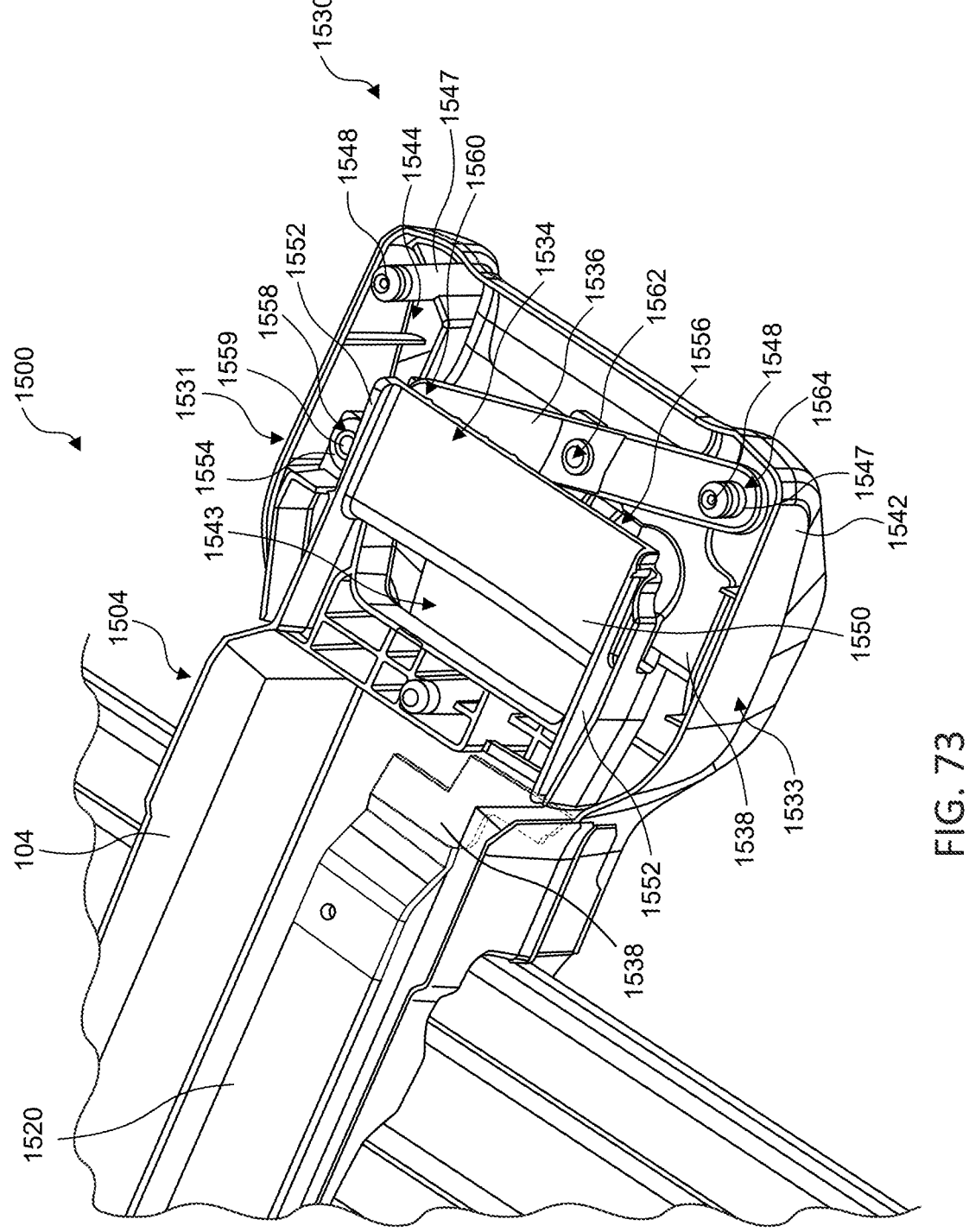
FIG. 73 illustrates a cutaway perspective view of a handle assembly of a tilt release mechanism, according to an embodiment.
Figure 74:
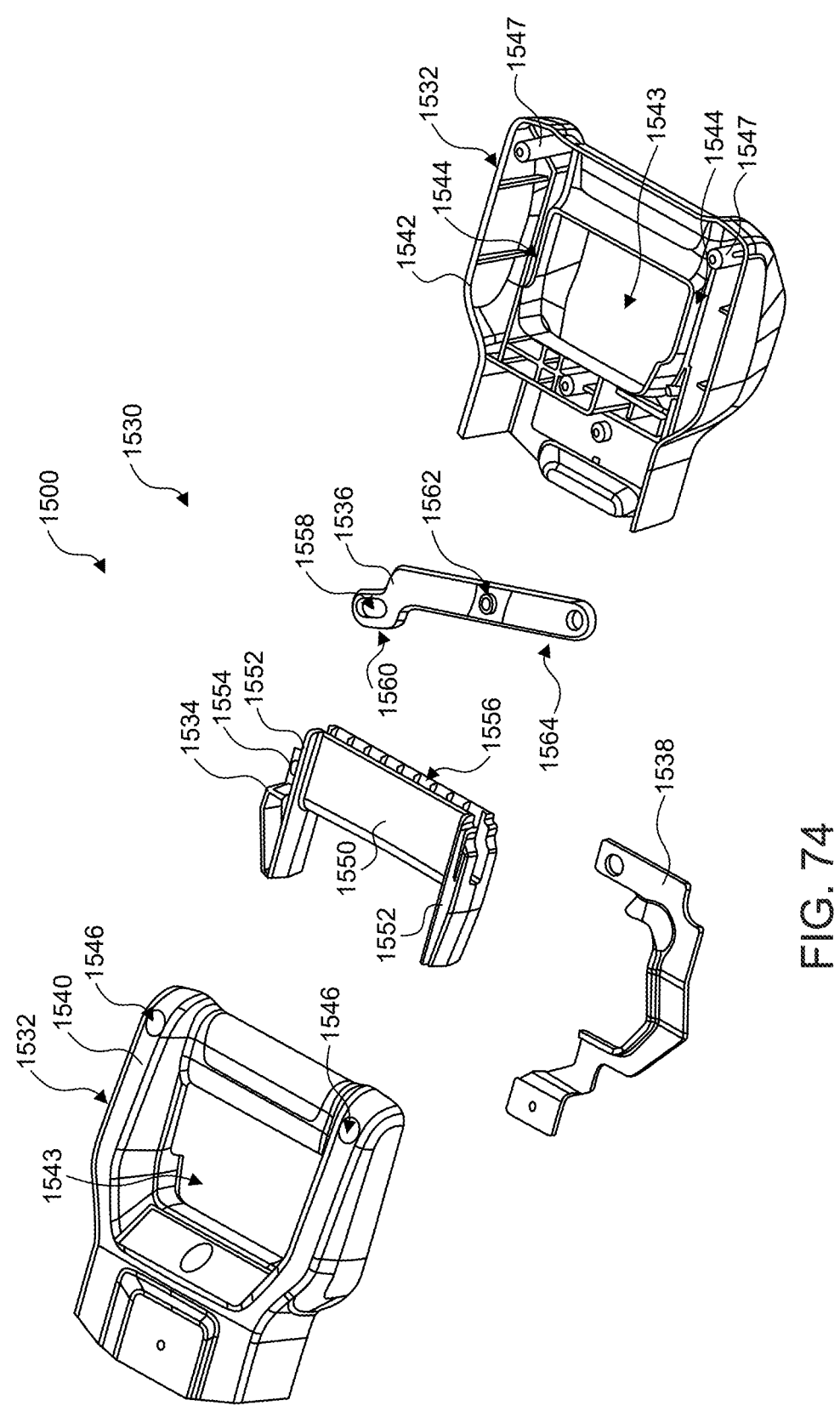
FIG. 74 illustrates an exploded view of a handle assembly for a tilt release mechanism, according to an embodiment.

In the illustrative embodiment shown in FIGS. 70, 73, and 74, actuator 1534 is configured to be translated away from the second end 1504 of base 104 to translate and disengage projection 1516 of locking mechanism 1510 from receivers 1508, 1509. When actuator 1534 is actuated, load carrier system 100 can be moved between the in-use position 10 and the storage/upright position 15. In some embodiments, actuator 1534 can be configured to rotate relative to the handle 1532 and base 104 to translate and disengage the projection 1516 of locking mechanism 1510. In some embodiments, a portion of actuator 1534 can extend into operating aperture 1543 and a remaining portion of actuator 1534 can be enclosed between top and bottom shells 1540, 1542. In some embodiments, actuator 1534 can include grip portion 1550, guide rails 1552, and coupling arm 1554 as shown, for example in FIGS. 73 and 74. A user can grasp grip portion 1550 to translate actuator 1534. In some embodiments, grip portion 1550 can have an ergonomic shape so that a user can securely hold grip portion 1550. In some embodiments, grip portion 1550 can have finger grooves or a formed pattern or texture in the outer surface of grip portion to improve grip by a user. In some embodiments, grip portion 1550 can be made from a material that increases friction with the user's hand, such as a rubber compound, grip tape, or other similar materials and textures. In some embodiments, recess 1556 can be formed in grip portion 1550 and configured to receive a portion of rotating arm 1536 as it rotates relative to actuator 1534.

In the illustrative embodiment shown in FIGS. 73 and 74, guide rails 1552 extend away from grip portion 1550 towards first and second sides 1531, 1533. In some embodiments, guide rails 1552 can be received in the plurality of grooves 1544 of handle 1532. Guide rails 1552 can translate in the plurality of grooves 1544 to linearly translate actuator 1534 towards and away from second end 1504 of base 104. In some embodiments, coupling arm 1554 can extend away from one of the guide rails 1552 towards either the first side 1531 or second side 1533 and be configured to couple with rotating arm 1536. In some embodiments, coupling arm 1554 couples with a slot 1558 formed in a first end 1560 of rotating arm 1536 via a pin 1559 such that first end 1560 of rotating arm 1536 can translate about slot 1558 when actuator 1534 is actuated. In the illustrative embodiment shown in FIG. 74, slot 1558 is an elongate slot that allows pin 1559 to slide within slot 1558 as actuator 1534 translates and rotating arm 1536 rotates.

In the illustrative embodiment shown in FIGS. 73 and 74, rotating arm 1536 is disposed inside handle 1532 and couples actuator 1534 and linkage member 1538 together. Rotating arm 1536 includes first end 1560, leverage point 1562, and second end 1564 as shown, for example, in FIGS. 73 and 74. Rotating arm 1536 is configured to create a moment arm and mechanical advantage such that the force exerted on actuator 1534 to release projection 1516 is less than the biasing force of spring 1518. For example, spring 1518 may exert a spring force of between about 80 N and about 140 N, but the force exerted on actuator 1534 to compress spring 1518 is less than the spring force. In the illustrative embodiment shown in FIG. 73, second end 1564 of rotating arm 1536 is pivotally coupled to receiving coupling fixture 1547 of handle 1532. In some embodiments, second end 1564 can be pivotally coupled to a discrete location in handle 1532. Rotating arm 1536 extends away from second end 1564, through recess 1556 in grip portion 1550, and towards first end 1560. In some embodiments, rotating arm 1536 can be a single piece component. In some embodiments, rotating arm 1536 can include multiple elements coupled together to form rotating arm 1536. Slot 1558 can be formed in first end 1560 of rotating arm 1536 and couple with coupling arm 1554. In some embodiments, when actuator 1534 is actuated, coupling arm 1554 exerts a linear force on first end 1560 of rotating arm 1536 resulting in rotation of rotating arm 1536 around second end 1564. For example, first end 1560 can move through an arc relative to second end 1564 and translate along slot 1558. Leverage point 1562 is disposed between first and second ends 1560, 1564.

In some embodiments, linkage member 1538 rotatably couples with rotating arm 1536 at leverage point 1562 as shown, for example, in FIG. 73. Accordingly, when actuator 1534 is translated a first distance, linkage member 1538 is translated a second distance that is smaller than the first distance. In the illustrative embodiment shown in FIGS. 73 and 74, linkage member 1538 has an approximate C-shape and is disposed inside handle 1532. Linkage member 1538 can have other shapes, for example, irregular polygonal shapes that allow linkage member 1538 to be disposed inside handle 1532. In some embodiments, linkage member 1538 can be a single piece component. In some embodiments, linkage member 1538 can include multiple elements coupled together to form linkage member 1538. Linkage member 1538 couples rotating arm 1536 and connector 1520 to translate movement from actuator 1534 to connector 1520. Linkage member 1538 is shaped to extend around operating aperture 1543. In some embodiments, linkage member 1538 can be sheet metal, an extruded plate, a rod, a 3D printed object, or any other suitable formed material.

Figure 75:
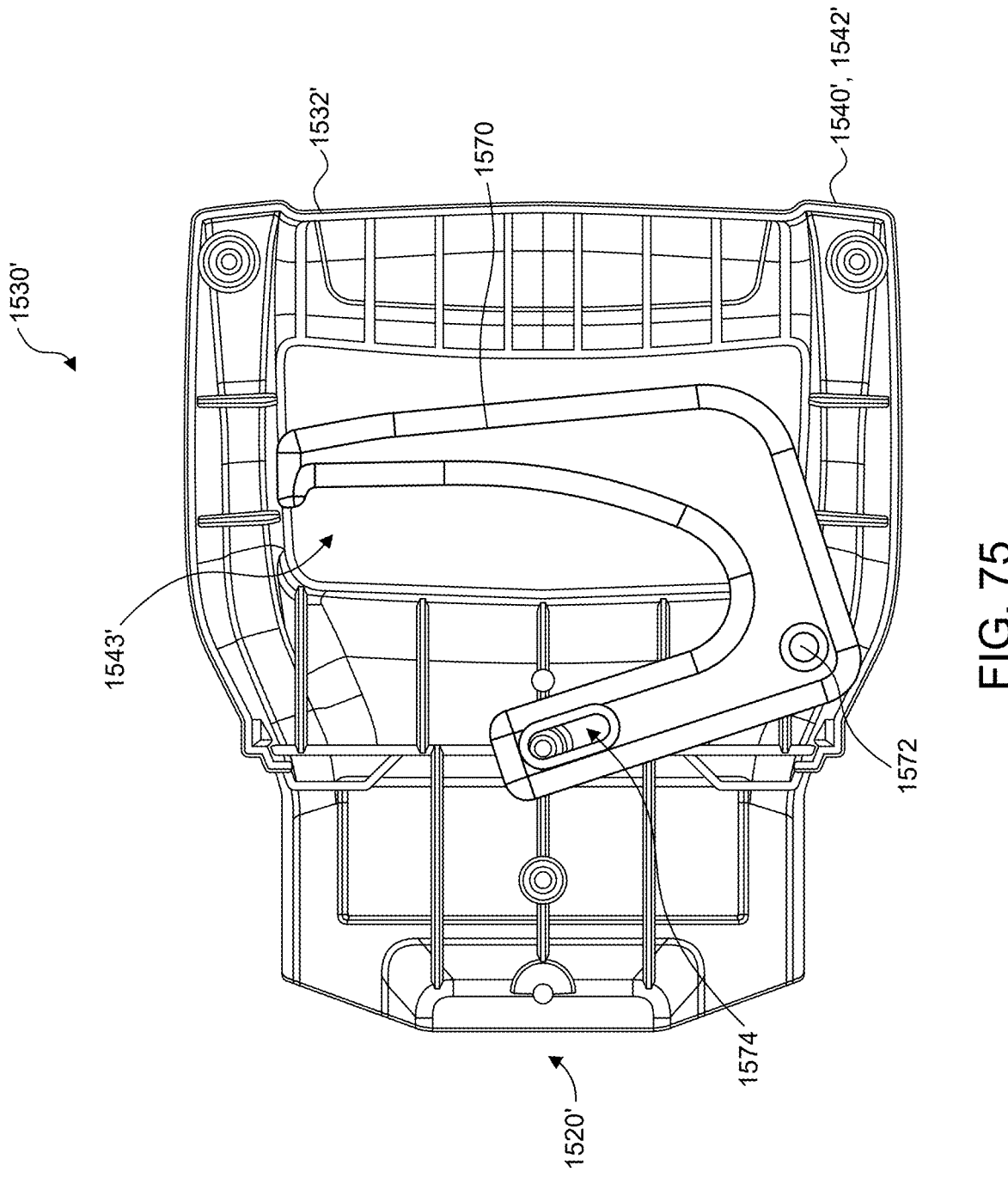
FIG. 75 illustrates a cutaway top view of a handle assembly for a tilt release mechanism, according to an embodiment.

In the illustrative embodiment shown in FIG. 75, tilt-release actuation mechanism 1500 can include handle assembly 1530'. Handle assembly 1530' can include handle 1532' and lever 1570 pivotally coupled to handle 1532'. Handle 1532' can be similar to handle 1532 and include top shell 1540', bottom shell 1542', and operating aperture 1543'. In some embodiments, a portion of lever 1570 can extend into operating aperture 1543' and a portion of lever 1570 can be disposed inside handle 1532'. In some embodiments, pivot aperture 1572 and slot 1574 can be formed through lever 1570. Lever 1570 pivotally couples to handle 1532' at pivot aperture 1572. Connector 1520' couples to lever 1570 via slot 1574. In some embodiments, lever 1570 can be rotated by a user resulting in connector 1520' being translated linearly along the length of base 104 and disengaging projection 1516 from engagement with receivers 1508, 1509 as similarly described above with respect to the embodiment in FIGS. 69-74.

Example Insert Tube

Figure 78:
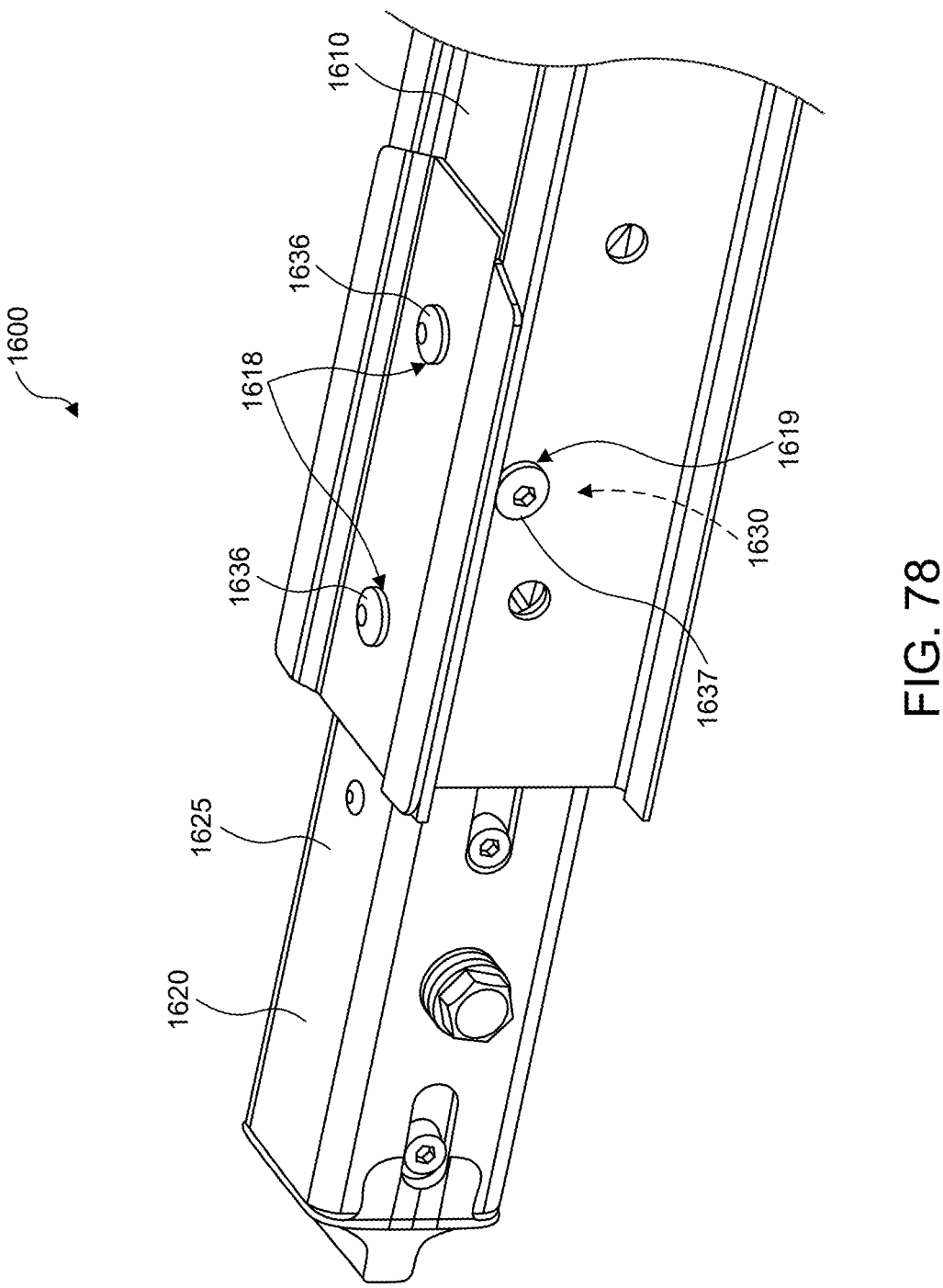
FIG. 78 illustrates a perspective view of a clamping bracket between a load carrier base and a locking mechanism, according to an embodiment.
Figure 79:
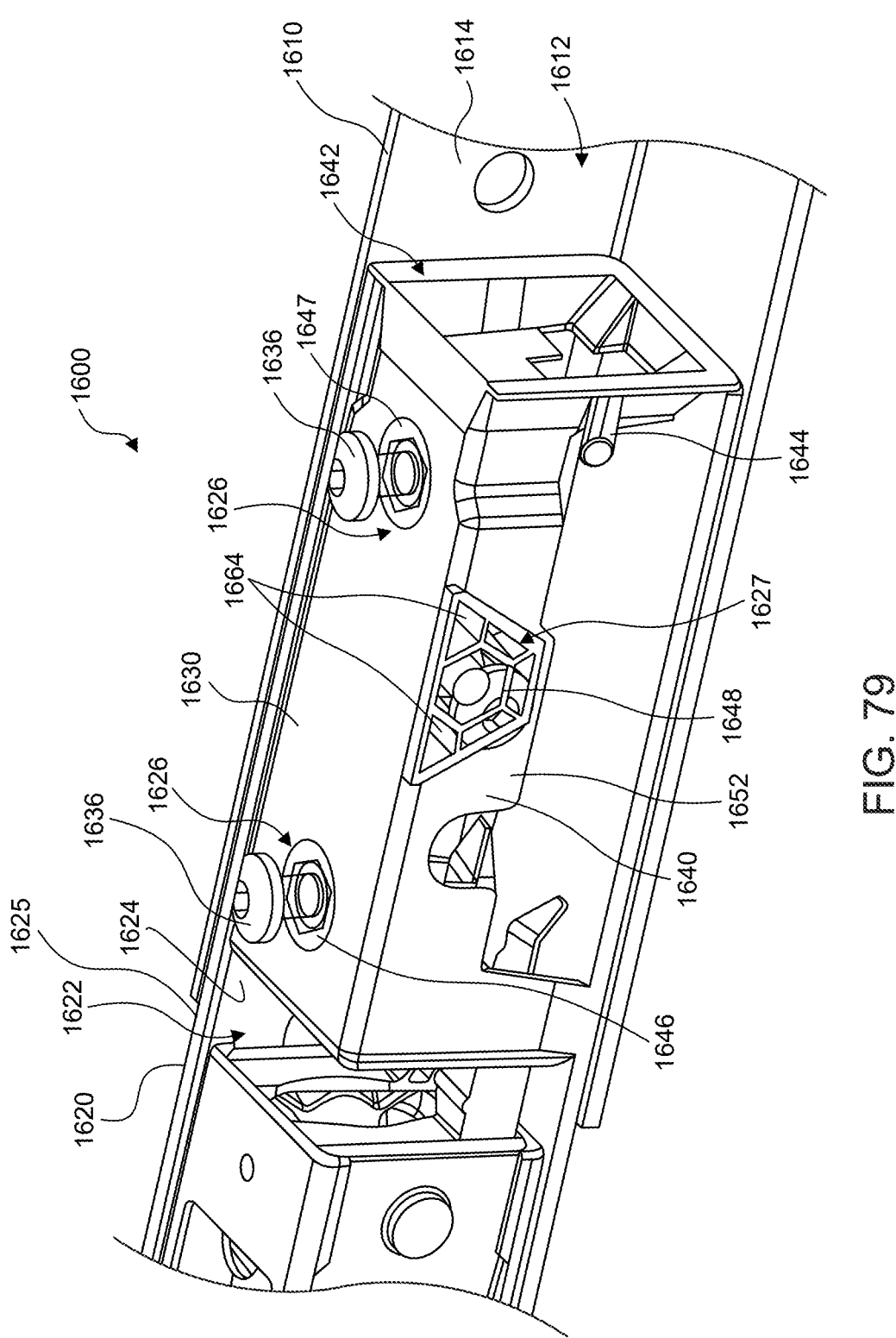
FIG. 79 illustrates a cutaway perspective view of a clamping bracket inside a load carrier base, according to an embodiment.
Figure 80:
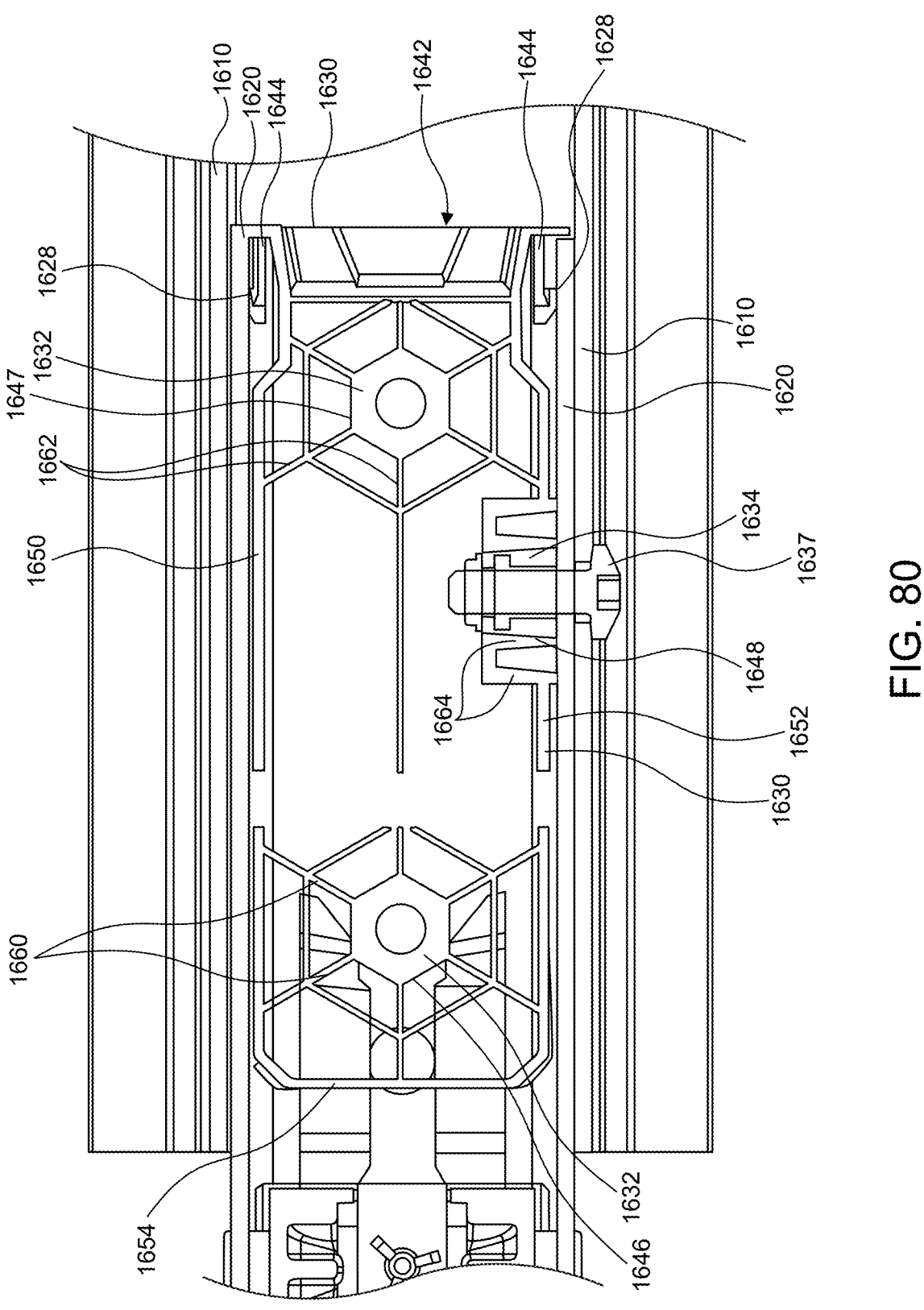
FIG. 80 illustrates a cross-sectional top view of the clamping bracket shown in FIG. 79, according to an embodiment.

FIGS. 78-80 illustrate coupling mechanism 1600, which can be similar to coupling mechanism 1100 and include insert tube 1630, according to embodiments. Insert tube

1630 can be configured to secure a first carrier portion 1610 (e.g., a hitch receiver, hub 108, stinger 109, or base 104) with a second carrier portion 1620 (e.g., hub 108, base 104, or a second base (not shown) as an add-on or add-in load carrier). Although coupling mechanism 1600 is shown in FIGS. 78-80 as a stand-alone apparatus and/or system, the embodiments of this disclosure can be used with other apparatuses and/or systems, such as, but not limited to load carrier system 100, extension strap system 200, wheel securement arm 300, carrier accessory 450, connector 500, bumper accessory 600, cable management member 700, vehicle information device 800, assembly system 900, bicycle work stand 1000, locking mechanism 1200, wheel assembly 1300, wall mount 1400, and tilt-release actuation mechanism 1500.

In some embodiments, coupling mechanism 1600 can include first carrier portion 1610, second carrier portion 1620, and insert tube 1630, as shown, for example, in FIGS. 78-80. In some embodiments, second carrier portion 1620 can be received in a first interior cavity 1612 of first carrier portion 1610. Insert tube 1630 can be disposed in a second interior cavity 1622 of second carrier portion 1620 and can be configured to press first carrier portion 1610 against second carrier portion 1620 to couple first and second carrier portions 1610, 1620 together. In the illustrative embodiment shown in FIG. 79, insert tube 1630 can include first support 1646, second support 1647, and side support 1648 that each couple with one of bolts 1636 and side bolt 1637. Each of bolts 1636 and side bolt 1637 assemble from an external region of first carrier portion 1610 such that when they engage with supports 1646, 1647, 1648, they urge insert tube 1630 and second carrier portion 1620 toward an interior surface 1614 of first carrier portion 1610. In some embodiments, bolts 1636 can urge insert tube 1630 in a first direction, and side bolt 1637 can urge insert tube 1630 in a second direction perpendicular to the first direction. Accordingly, insert tube 1630 and second carrier portion 1620 can be pressed towards, and exert frictional forces against, at least two of the four interior surfaces 1614 of first carrier portion 1610 to couple first and second carrier portions 1610, 1620 together, and limit relative movement between each of first and second carrier portions 1610, 1620.

In some embodiments, first carrier portion 1610 can be a hitch receiver and second carrier portion 1620 can be a stinger (e.g., stinger 109). In some embodiments, first carrier portion 1610 can be a load carrier base (e.g., base 104) and second carrier portion 1620 can be a hub (e.g., hub 108). In some embodiments, first carrier portion 1610 can be a load carrier base (e.g., base 104) and second carrier portion 1620 can be an add-in load carrier base disposed between a load carrier hub (e.g. hub 108) and a first base (e.g. base 104). In some embodiments, first carrier portion 1610 and second carrier portion 1620 can be other components of a load carrier device that couple together with an adjacent component.

In some embodiments, first carrier portion 1610 includes four sidewalls with inner surface 1614 as shown, for example, in FIG. 80. First interior cavity 1612 is formed through first carrier portion 1610 and surrounded by inner surface 1614. Bolt apertures 1618 and side bolt aperture 1619 can be formed through first carrier portion 1610 to provide access to bolts 1636, and bolt 1637 respectively. In some embodiments, bolt apertures 1618, 1619 can be slots configured to allow some translation of first carrier portion 1610 relative to second carrier portion 1620 during assembly.

In some embodiments, second carrier portion 1620 can be received in first interior cavity 1612 and include four sidewalls with inner surface 1624, outer surface 1625, and coupling tabs 1628 as shown, for example, in FIGS. 79 and 80. Second interior cavity 1622 is formed through second carrier portion 1620 and surrounded by inner surface 1624. In some embodiments, coupling aperture 1626 extends through a top surface of second carrier portion 1620 and side coupling aperture 1627 extends through a side surface of second carrier portion 1620.

In the illustrative embodiment shown in FIGS. 79 and 80, insert tube 1630 can be disposed inside second interior cavity 1622 and configured to press first carrier portion 1610 and second carrier portion 1620 together such that first and second carrier portions 1610, 1620 contact one another and exert frictional forces against one another to couple second carrier portion 1620 inside first carrier portion 1610. Insert tube 1630 can include body 1640, proximal end 1642, coupling arms 1644, first support 1646, second support 1647, and side support 1648. Insert tube 1630 couples with second carrier portion 1620 as shown, for example, in FIG. 80. Coupling arms 1644 can extend away from proximal end 1642 approximately parallel with body 1640. Coupling arms 1644 can be configured to couple with coupling tabs 1628 of second carrier portion 1620 to couple insert tube 1630 to second carrier portion 1620. Body 1640 can include first wall 1650, second wall 1652, and back wall 1654. First support 1646 can include a plurality of arms 1660 that extend away from first support 1646 and couple with first, second, and back walls 1650, 1652, 1654. Second support 1647 can include a plurality of arms 1662 that extend away from second support 1647 and couple with first and second walls 1650, 1652. In some embodiments, the plurality of arms 1660, 1662 can be flexible such that first and second supports 1646, 1647 can translate relative to body 1640 and each other. First and second supports 1646, 1647 couple with and secure nuts 1632 to insert tube 1630. Nuts 1632 are configured to receive and couple with bolts 1636. Side support 1648 can include a plurality of arms 1664 that extend away from side support 1648 and couple with second wall 1652. In some embodiments, plurality of arms 1664 can be flexible such that side support 1648 can translate relative to second wall 1652. Side supports 1648 couples with and secures side nut 1634 to insert tube 1630.

In some embodiments, bolts 1636 couple to nuts 1632 and pull first and second supports 1646, 1647 toward bolt apertures 1618. As bolts 1636 are tightened, first and second supports 1646, 1647 press second carrier portion 1620 and outer surface 1625 into contact with inner surface 1614 of first carrier portion 1610 in a first direction. In some embodiments, side bolt 1637 couples to side nut 1634 and pulls side support 1648 toward side bolt aperture 1619. As side bolt 1637 is tightened, side support presses second carrier portion 1620 and outer surface 1625 into contact with inner surface 1614 of first carrier portion 1610 in a second direction perpendicular to the first direction. Accordingly, outer surface 1625 of second carrier portion 1620 is forced into contact with inner surface 1614 of first carrier portion 1610 and frictional forces are generated therebetween along two respective sides of outer surface 1625 and inner surface 1614. The contact between first and second carrier portions 1610, 1620 and corresponding frictional forces couples carrier portions 1610, 1620 together.

It is to be appreciated that the Detailed Description section, and not the Brief Summary and Abstract sections, is intended to be used to interpret the claims. The Summary and Abstract sections may set forth one or more but not all embodiments of the load carrier system and apparatus, and thus, are not intended to limit the present embodiments and the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A wheel securement arm for a bicycle carrier, the wheel securement arm comprises:
   a first arm portion;
   a second arm portion coupled to the first arm portion, wherein the first arm portion is moveable relative to the second arm portion;
   an actuator housing disposed at a distal end of the first arm portion, wherein an actuator aperture is formed through the actuator housing, and the actuator housing comprises a track extending along a portion of an interior edge of the actuator aperture; and
   an actuator disposed in the actuator aperture,
   wherein a distal end of the actuator is disposed along the track.

2. The wheel securement arm of claim 1, wherein the track prevents lateral movement of the actuator.

3. The wheel securement arm of claim 1, wherein the actuator is a lever.

4. The wheel securement arm of claim 1, wherein the distal end of the actuator slides along the track.

5. The wheel securement arm of claim 4, wherein the distal end of the actuator comprises a slot, and wherein the slot at least partially surrounds the track.

6. The wheel securement arm of claim 1, wherein the actuator aperture is the only aperture extending through the actuator housing.

7. The wheel securement arm of claim 1, wherein the actuator comprises a linkage recess configured to receive a linkage of a latch mechanism, and wherein when the actuator is moved from a first position to a second position the actuator translates the linkage to operate the latch mechanism.

8. The wheel securement arm of claim 1, wherein the actuator pivots about an actuator pivot.

9. The wheel securement arm of claim 8, wherein the actuator pivot is disposed in the actuator housing.

10. The wheel securement arm of claim 8, wherein the track has a radius centered on the actuator pivot.

11. The wheel securement arm of claim 1, wherein the first arm portion is slideably disposed in the second arm portion.

12. The wheel securement arm of claim 1, wherein the actuator is configured to disengage a locking mechanism such that the first arm portion is extendible relative to the second arm portion from a first length to a second length greater than the first length.

13. The wheel securement arm of claim 1, wherein the actuator housing further comprises a wheel recess configured to contact a bicycle wheel.

14. The wheel securement arm of claim 13, wherein the wheel recess is disposed adjacent to the actuator aperture such that a horizontal plane extends through the actuator aperture and the wheel recess.

15. The wheel securement arm of claim 1, wherein the actuator aperture comprises a first portion disposed on a first side of the actuator facing away from the first arm, and wherein an area of the first portion increases when the actuator is moved toward the first arm.

16. A bicycle carrier, comprising:

a bicycle tray configured to support a bicycle;

a wheel securement arm comprising:

a housing rotatably coupled to the bicycle tray, an extendable portion coupled to the housing; and an actuator housing coupled to the extendable portion, the actuator housing comprising an aperture and an actuator disposed in the aperture, wherein the actuator is guided along a track extending along a portion of an interior edge of the aperture, wherein the actuator is configured to disengage a locking mechanism such that the extendable portion translates relative to the housing.

17. The bicycle carrier of claim 16, wherein the actuator is configured to pull the locking mechanism to disengage the locking mechanism.

18. The bicycle carrier of claim 16, wherein the actuator is a lever pivotally coupled to the actuator housing, and the track corresponds to an arc path of the lever.

19. The bicycle carrier of claim 16, wherein the track prevents lateral movement of the actuator.

20. The bicycle carrier of claim 16, wherein a distal end of the actuator slides along the track.

21. The bicycle carrier of claim 20, wherein the distal end of the actuator comprises a slot, and wherein the slot at least partially surrounds the track.

\* \* \* \* \*